United States Patent
Terman

(10) Patent No.: US 8,488,916 B2
(45) Date of Patent: Jul. 16, 2013

(54) KNOWLEDGE ACQUISITION NEXUS FOR FACILITATING CONCEPT CAPTURE AND PROMOTING TIME ON TASK

(76) Inventor: David S Terman, Pebble Beach, CA (US)

(*) Notice: Subject to any disclaimer, the term of this patent is extended or adjusted under 35 U.S.C. 154(b) by 0 days.

(21) Appl. No.: 13/554,398

(22) Filed: Jul. 20, 2012

(65) Prior Publication Data

US 2013/0021346 A1    Jan. 24, 2013

Related U.S. Application Data

(60) Provisional application No. 61/572,853, filed on Jul. 22, 2011.

(51) Int. Cl.
*G06K 9/22* (2006.01)
*G06K 9/00* (2006.01)
*G06F 17/27* (2006.01)
*G06F 17/00* (2006.01)

(52) U.S. Cl.
USPC ................ 382/315; 382/187; 704/9; 715/254

(58) Field of Classification Search
USPC .......................................................... 382/305
See application file for complete search history.

(56) References Cited

U.S. PATENT DOCUMENTS

| | | | | |
|---|---|---|---|---|
| 5,384,703 A | * | 1/1995 | Withgott et al. | 715/236 |
| 5,638,543 A | * | 6/1997 | Pedersen et al. | 704/1 |
| 5,721,939 A | * | 2/1998 | Kaplan | 704/9 |
| 5,778,397 A | * | 7/1998 | Kupiec et al. | 715/243 |
| 6,289,304 B1 | * | 9/2001 | Grefenstette | 704/9 |
| 6,789,228 B1 | * | 9/2004 | Merril et al. | 715/243 |
| 7,322,526 B1 | * | 1/2008 | Koenck | 235/462.45 |
| 7,689,898 B2 | * | 3/2010 | Merril et al. | 715/201 |
| 2006/0029296 A1 | * | 2/2006 | King | 382/313 |
| 2006/0294453 A1 | * | 12/2006 | Hirata | 715/500.1 |
| 2008/0018591 A1 | * | 1/2008 | Pittel et al. | 345/156 |
| 2009/0081630 A1 | * | 3/2009 | Jeffers | 434/362 |
| 2009/0132590 A1 | * | 5/2009 | Huang | 707/104.1 |
| 2009/0227283 A1 | * | 9/2009 | Pylvanainen | 455/556.1 |
| 2011/0123115 A1 | * | 5/2011 | Lee et al. | 382/185 |

* cited by examiner

*Primary Examiner* — David Zarka
(74) *Attorney, Agent, or Firm* — Central Coast Patent

(57) ABSTRACT

Described herein is an interactive digital software program and hardware that enables rapid acquisition of textual or audio subject matter, its conversion to editable text and immediate compression into a user understandable summary. The software program maximizes "time on task" while minimizing the time-consuming steps of "concept capture" and "compression". The instant invention provides an accurate condensate of textual subject matter in a fraction of the time it would take to prepare such a document by manual note taking. In a single step, mobile devices such as cameras, camera phones, tablets, iPODs™, scanners and the like rapidly capture textual images convert them to OCR and to a user understandable summary in a fraction of the time it takes to process such a document by manual note taking. With more study time available for repetitious practice of the lesson, the user improves preparedness and performance on tests and presentations.

8 Claims, 5 Drawing Sheets

KNOWLEDGE ACQUISITION NEXUS FOR FACILITATING CONCEPT CAPTURE AND PROMOTING TIME ON TASK

CROSS REFERENCE TO RELATED DOCUMENTS

The present application claims priority to U.S. provisional patent application Ser. No. 61/572,853 filed on Jul. 22, 2011. U.S. patent application Ser. No. 61/572,853 filed on Jul. 22, 2011 and its references and all references cited in the instant application with their references are incorporated in entirety by reference.

I. BACKGROUND

Most college students in the US and Western Europe use the traditional study method to acquire and learn course material. This method comprises three major steps. First, it consists of identifying, extracting and recording the most relevant subject matter from textbooks, journals and lectures, an exercise known as "concept capture." Second, the key concepts are combined and compressed into a brief condensate. Third, in a process known as "time on task", the condensate is recited repeatedly until rapidly recalled or memorized. Subjects generally use manual or computational note taking for each of the first two steps. Educators assert that the best results from the traditional method are achieved when the largest measure of study time is devoted to step 3, "time on task" rather than step 1, "concept capture." This notion is conceptually rooted in the theory that repeated use or stimulation of information-bearing neural pathways lowers their conduction threshold and facilitates knowledge retention and recall.

In practice, the success of this method has been hampered by the inordinate length of time it takes a student to manually transcribe the key ideas from textual material. Students contend that the manual transcription process is laborious, tedious and interdicts the sustained concentration required to assimilate the subject matter. Importantly, most find that despite long hours of study input the method fails to produce superior test performance. Educators agree that the traditional method is ineffective largely because of the disproportionate amount of study time required in "concept capture" and consequent reduction in the fraction of time devoted to the all important "time on task." They further assert that boredom/frustration with the traditional method is a major cause of student dropout and that conceptually new learning systems are needed.

The claimed method provides a solution this problem. In principle, it rapidly captures textual images from books, journals, manuals and transfers them into a computer or mobile device. It further extracts the key concepts from this material and converts them into an accurate summary. The entire process is accomplished in a single step and a fraction of time it takes to prepare such a document by the manual transcription method. A further advantage of the instant invention is that it reduces the amount of study time spent in "concept capture" and increases that expended in "time on task" or the repeated practice of the summarized material until memorized. As a consequence the claimed method outperforms the traditional method, promoting better command of the subject matter and test performance.

The instant invention uses camera phones, iPODs™, iPADs™, PDAs™, tablets, BlackBerries™, mobile computers and any other mobile device equipped with automated image acquisition software (collectively "image capture devices") to precisely capture textual images. Once framed in the viewfinder, the image capture device automatically stabilizes, focuses (autofocus), rotates, brightens, auto-enhances and deskews/straightens printed lines. Precise and sharp image capture is also facilitated by omnidirectional image sensors in the image capturing device. Next, the image in JPEG, TIFF or binary format is transferred automatically to an OCR program where it is converted to editable text and then to a user understandable summary. The final summary may be practiced repeatedly and memorized in preparation for tests, discussion groups or presentations.

In an additional application the image capturing devices efficiently captures textual images by projecting on the text LED or laser framing brackets with a centered bulls-eye. Once the text is encompassed in the brackets, the image is automatically autofocused and captured as described below.

The claimed invention is rapid, accurate and simple to use and adapted to virtually any subject matter. Summaries can be performed on printed material such as law contracts, book chapters, magazine/newspaper articles, manuals and manuscripts. it is well adapted to the lifestyle of students, business people, lawyers, doctors and other professionals with a limited amount of time to capture and digest the key concepts from a large volume of printed material.

The claimed invention is based on the teachings of framed educational psychologist David Ausubel who held that effective learning occurs when the most significant ideas of a subject are presented first and then expanded progressively by adding related concepts and details.

According to Ausubel, instructional materials should attempt to integrate new material with previously presented information through comparisons and cross-referencing of the new and old ideas (Ausubel D P *The Psychology of Meaningful Verbal Learning*. Orlando, Fla.: Grune & Stratton, 1963; Ausubel, D P In defense of advance organizers: A reply to the critics. *Review of Educational Research* 48:251-257 (1978); Ausubel D P *The Acquisition and Retention of Knowledge* Dordrecht, The Netherlands: Kluwer Academic Publishers, 2000).

The claimed invention applies Ausubel's learning principles by first producing an accurate summary of the subject matter which then functions as a knowledge tree with branches designed to accommodate related material.

The instant invention is especially useful for subjects with reading comprehension disorders the most common of which is failure of "significance detection" in which the subject cannot distinguish key points from less important information or prioritize data with different levels of detail. "Concept recognition dysfunction" is a subset of "significance detection" in which subjects have difficulty recognizing familiar themes in subject matter with only superficial differences. Struggles with these disorders usually surface in high volume college courses such as biology, political science, economics and psychology. The claimed invention is useful in this group because it rapidly identifies, extracts, consolidates and condenses the key concepts in textual subject matter into a machine summary. Frequent drill with this method enhances subjects' ability to recognize the most significant concepts in textual subject matter.

The claimed invention is also useful for short-term memory dysfunction. These subjects absorb information at a slow pace and are unable to keep up with the rapid rate of information in-flow in a classroom lecture. Similarly, subjects with short attention span cannot concentrate long enough to get work done before fatigue sets in. In a related malady, subjects with active working memory dysfunction actually lose track of what they are doing while they are doing it. They have to work fast lest they forget what they are doing.

The claimed method is useful in these disorders because it rapidly captures and summarizes key concepts thereby allowing these subject to concentrate their limited "brain fuel" in repetitive practice of the subject matter. The audio summarizer of the claimed invention described herein is useful for this group because it eliminates note taking during a lecture. The audio summarizer acquires the lecture audio input, converts it from voice to editable text and summarizes the lecture content in real-time as the lecture proceeds. It also provides a printed summary of the entire lecture that can be readily accessed from the summary by clicking on its highlighted key words/phrases. In this way, slow note takers and those with short attention spans can access all the relevant subject matter at their own pace without being overwhelmed by the rapid rate of information input.

The claimed invention's major advantage over the traditional method is streamlining and accelerating the "concept capture" phase thereby allowing more "time on task" and improved mastery of the subject matter. With a single click, the claimed invention captures and autofocuses the textual image, converts it to OCR and summarizes the key concepts with the same alacrity as a barcode scanner that recognizes/decodes barcodes at the point of sale. No other program in the art consolidates these tools into a "simple to use" process that increases learning efficiency and promotes mastery/practical usage of textual subject matter.

II. BRIEF DESCRIPTION OF THE DRAWING FIGURES

FIGS. 6A, 6B and 6C. Displayed are jpeg images captured from 3 sequential pages of a contract law textbook (6A, 6B, 6C) using a 5 megapixel back camera of the iPAD3™ with desktop lighting and default camera settings.

Figure 7:
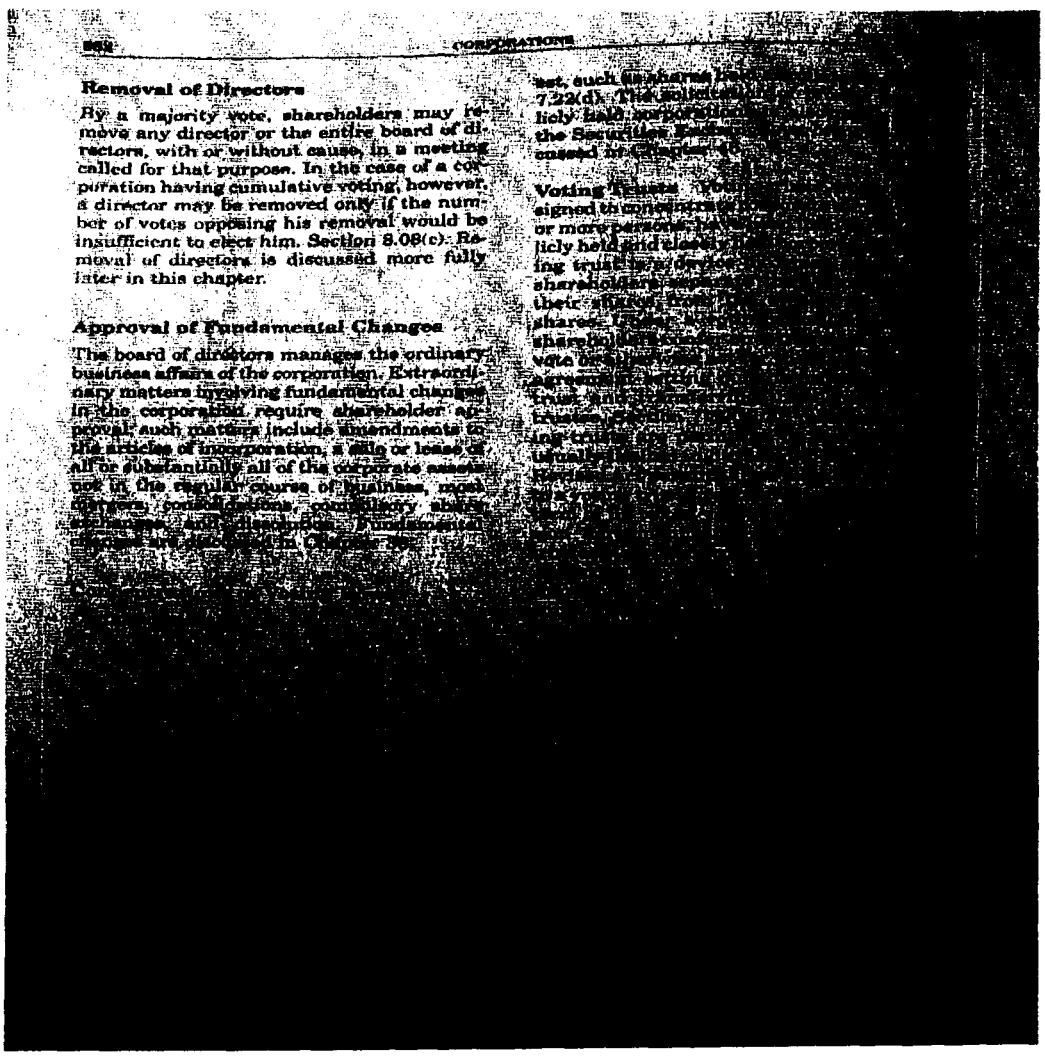

FIG. 7. Displayed is original Text with curved surface in suboptimal desktop lighting acquired with Canon IXY Digital 800IS 6 megapixel camera using settings described in the text.

Figure 8A:
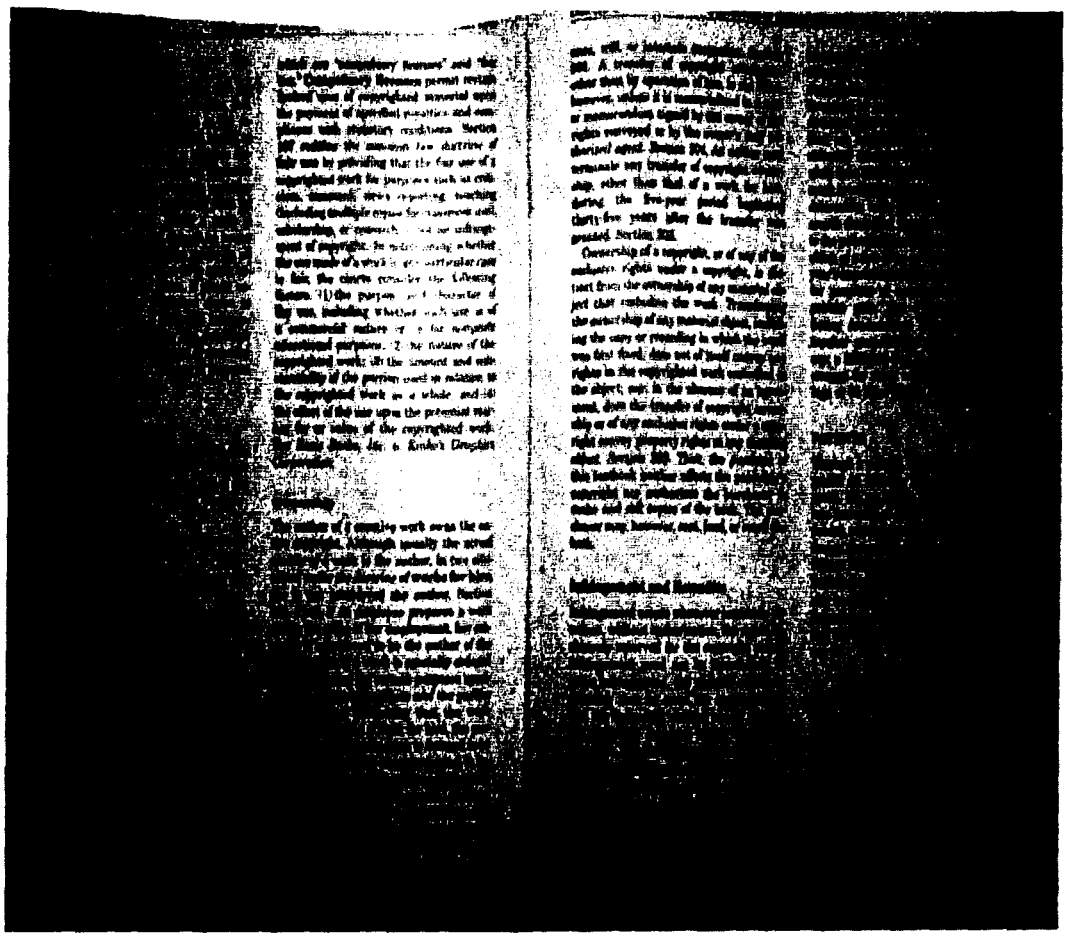
Figure 8B:
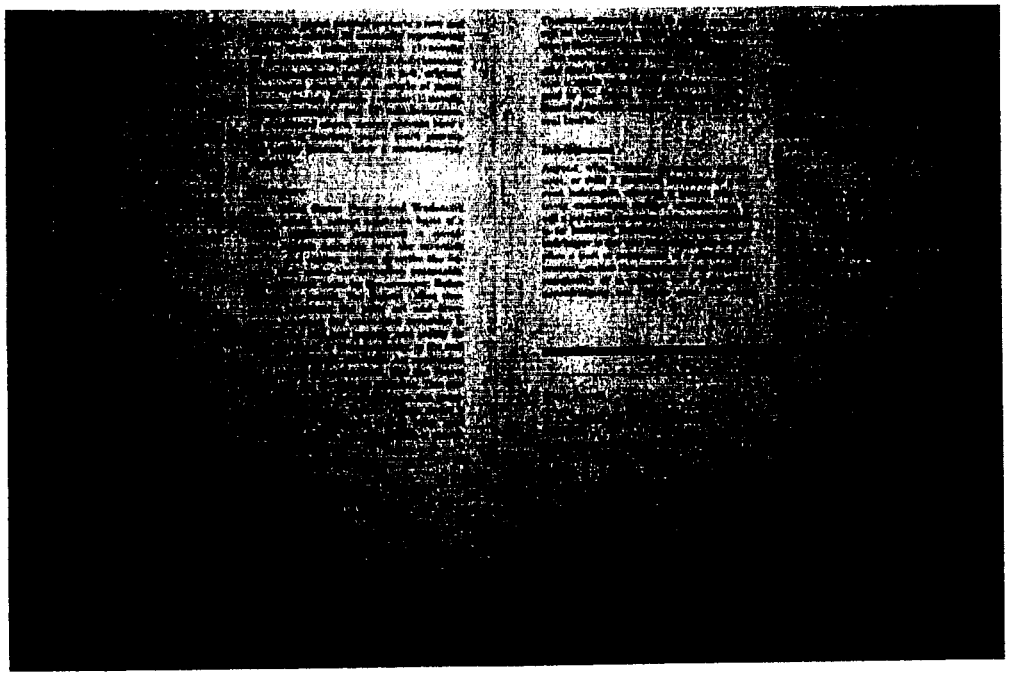

FIGS. 8A and 8B. Digital image (JPEG) of two text book pages (FIGS. 8A and 8B) captured with a digital FCCE™ 3.2 megapixel ultra compact digital camera suitable for OCR and machine summarization.

Figure 10A:
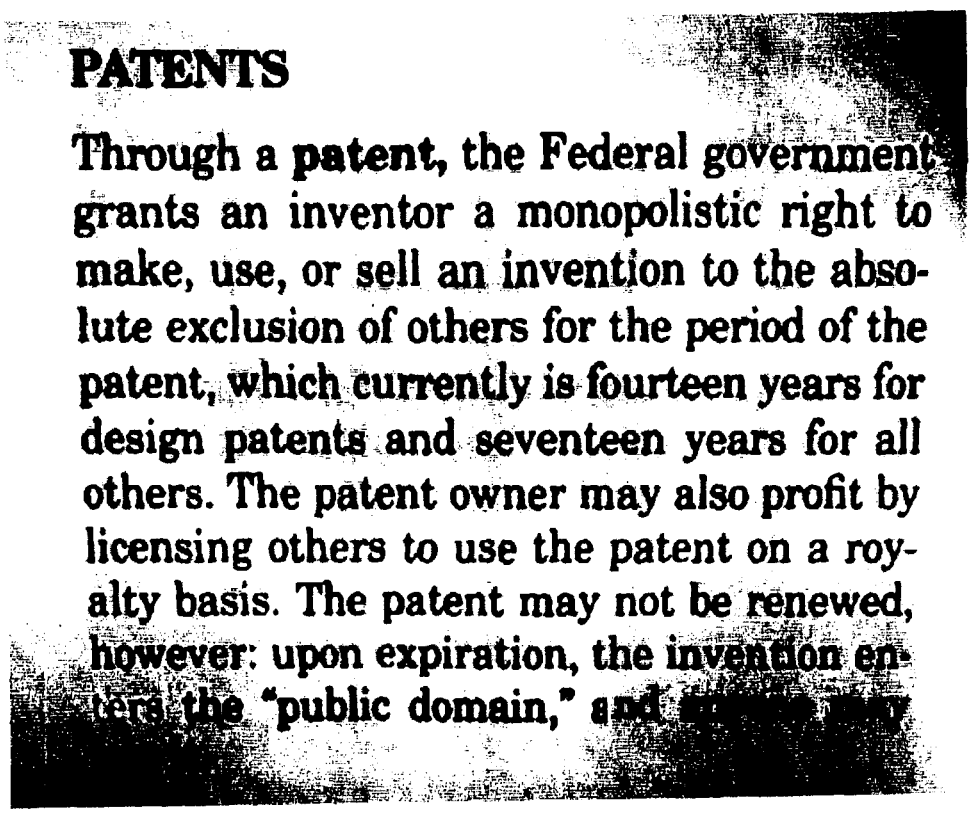

FIGS. 9A, 9B and 9C. Displayed is raw text acquired with a DS6700-DC2001zzr handheld digital image scanner (9A and 9B). In 9C, raw text acquired with DS6700-DC2001 zzr handheld digital image scanner in which form the text is transferred to OCR software where it is converted to editable text FIGS. 10A and 10B. Shown is a textual image captured with DS6700-DC2001zzr handheld digital image scanner. In this form, the text is transferred to ABBYY 9.0 fine reader where it is converted to a pdf file. From there it is transferred to an Idautomation pdfd417 font and encoder wherein it is converted to a pdf417 2D barcode.

Figure 11:
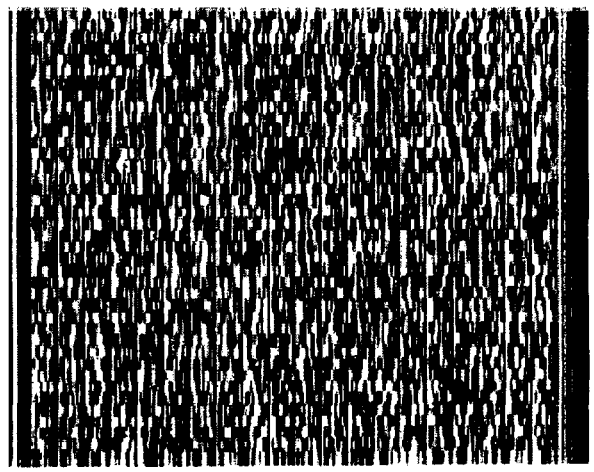
Figure 1:
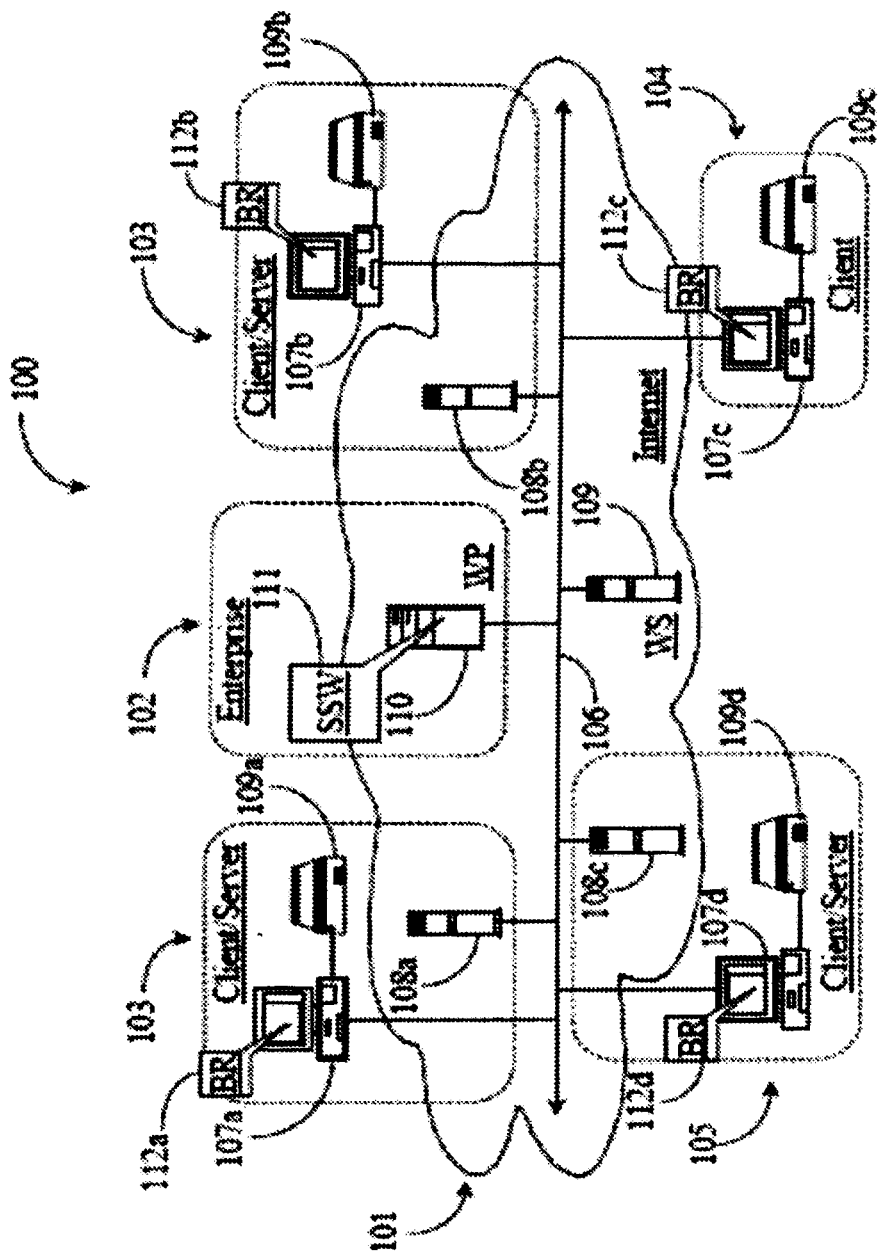
Figure 2:
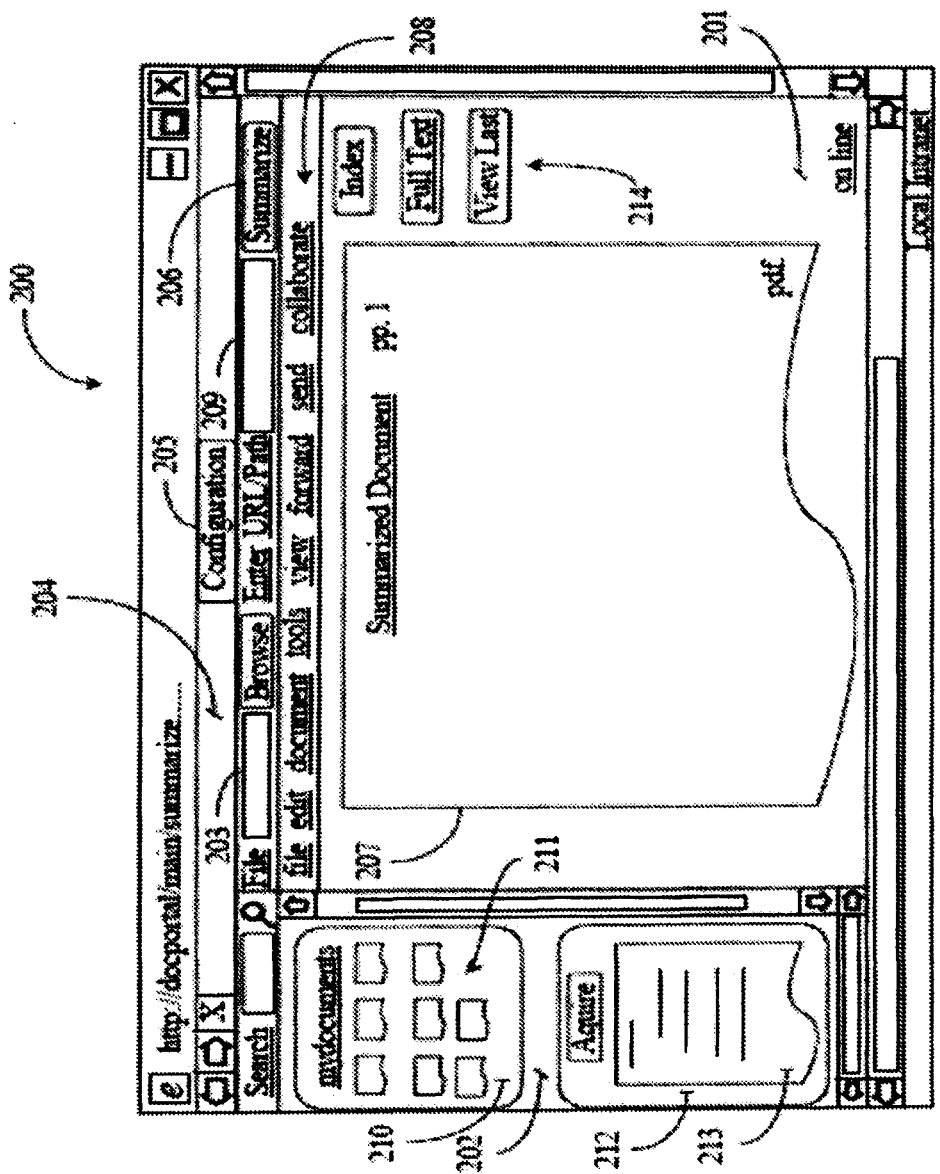
Figure 3:
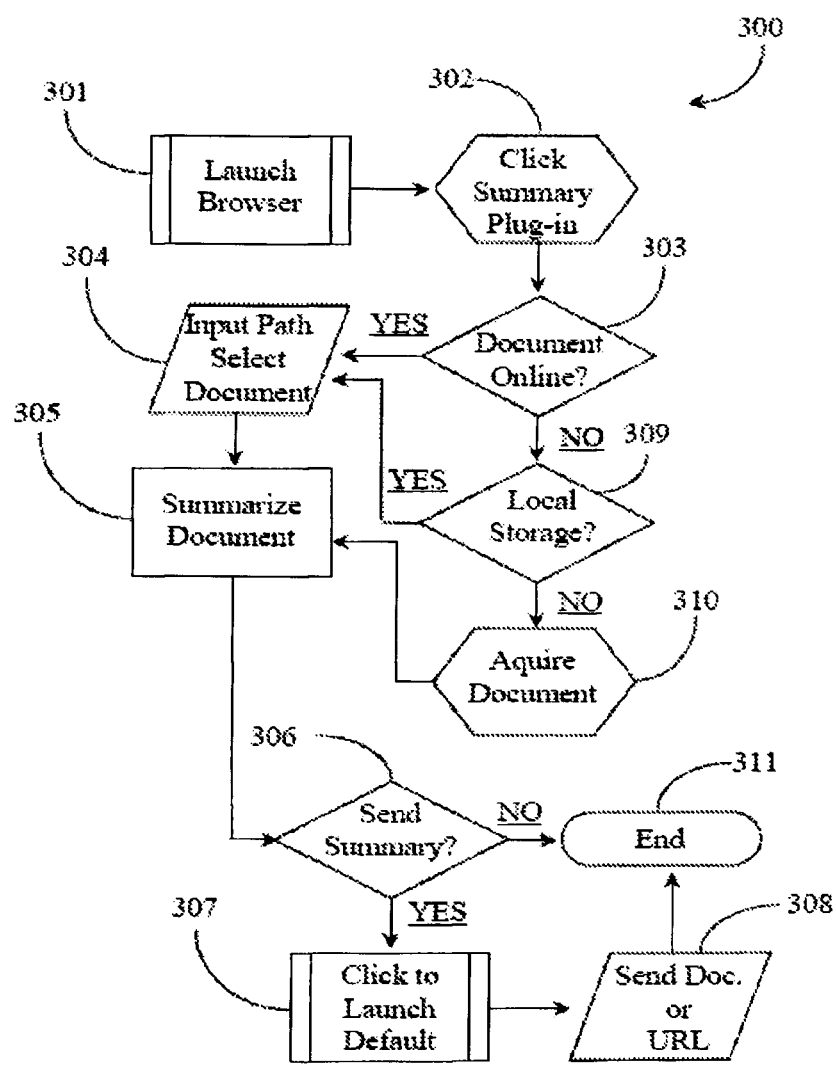
Figure 4:
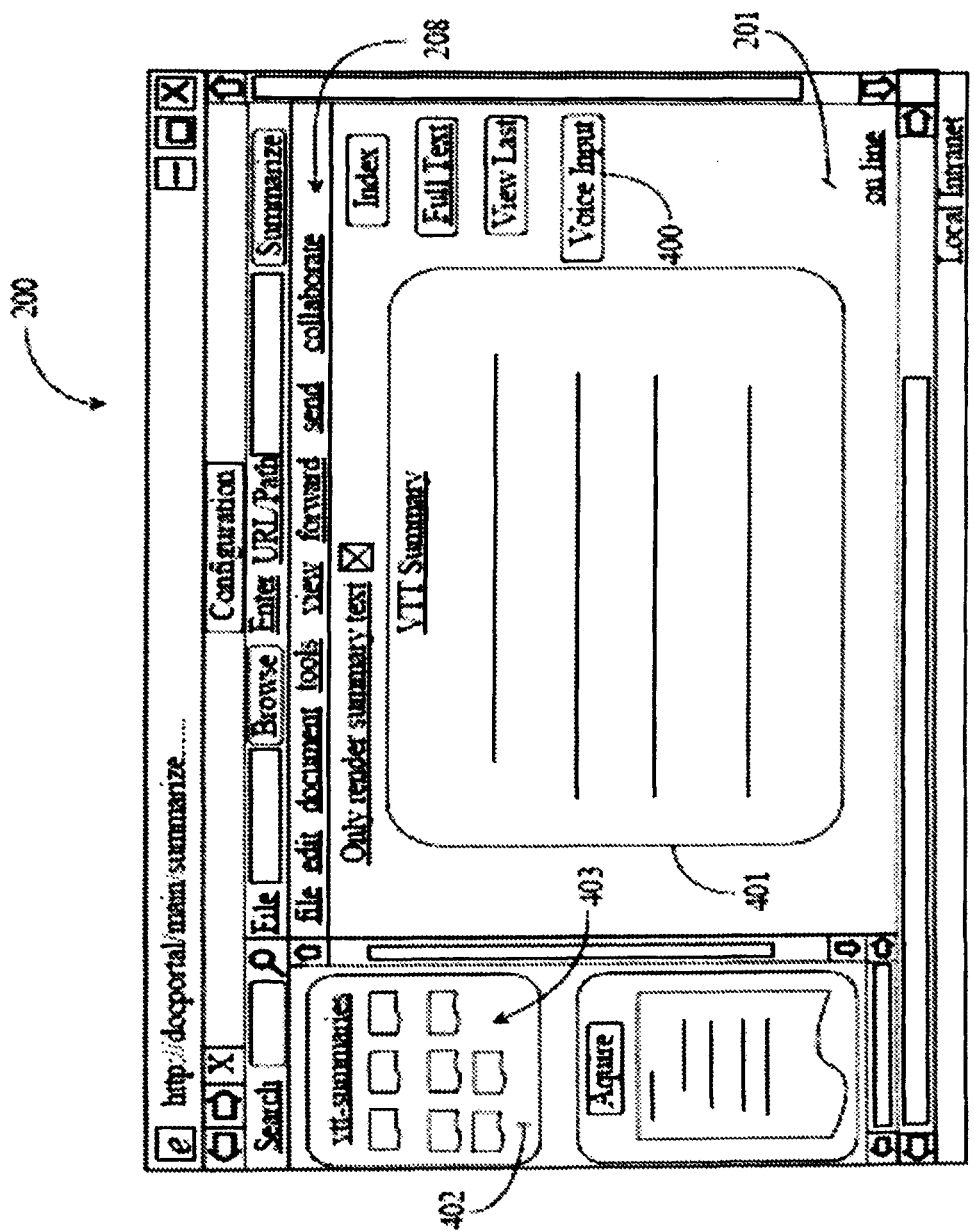
Figure 8B:
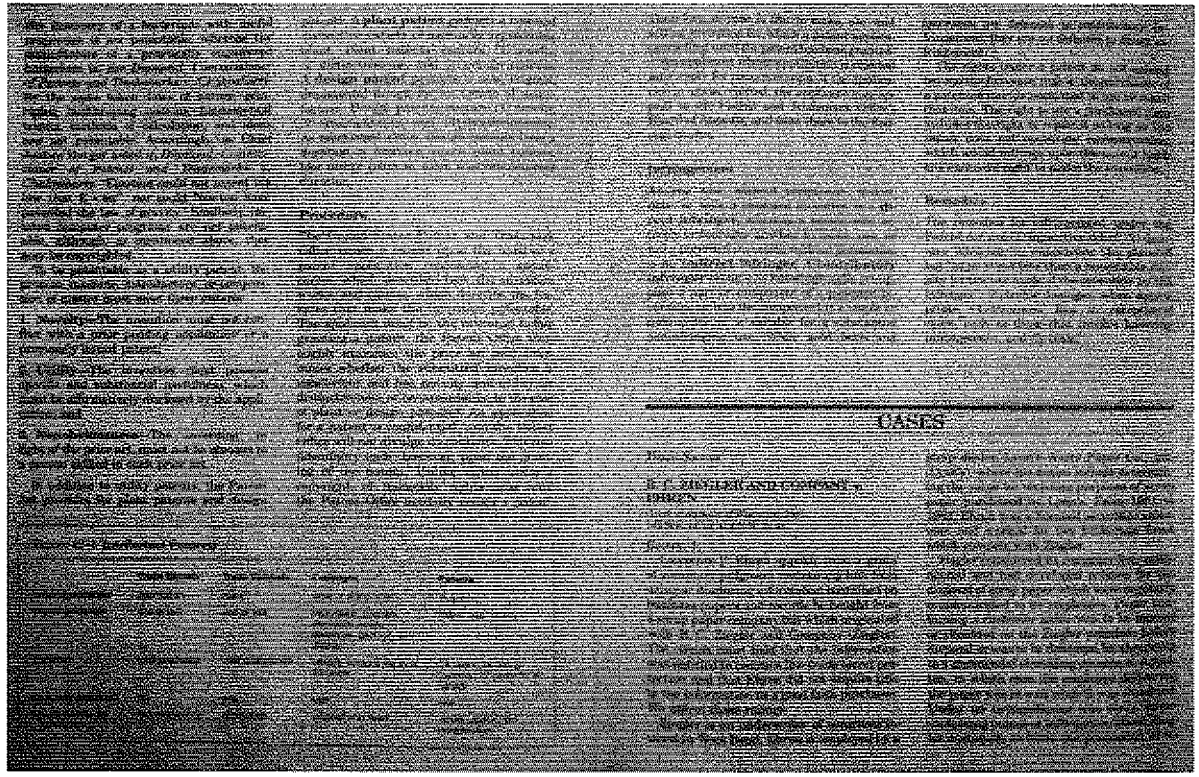

FIG. 11. Shown is a pdf417 2D barcode of textual image.

III. SUMMARY OF THE INVENTION

Described herein is an interactive program that enables rapid capture and processing of textual or audio subject matter, extraction of key concepts and conversion to a user understandable summary. The claimed invention uses mobile imaging devices such as cameras, camera phones, tablets, iPODs™, scanners equipped with omnidirectional aim and shoot framing features that automatically focus, stabilize and capture textual images. With a single click, the textual image is processed through OCR and to a user understandable summary. The entire process is completed in a fraction of the time it takes to prepare such a document by the traditional manual note taking method. By virtually minimizing the time-consuming "concept capture" phase the claimed invention maximizes the all important "time on task" function (repeated practice of the subject matter) critical for efficient learning and superior test performance.

IV. DETAILED DESCRIPTION

A. Capture of Textual Material

The claimed method contemplates textual image capture and processing with the same alacrity/efficiency as a bar scanner used to scan and decode barcodes on commercial products at point of sale. In this context, the instant invention efficiently identifies and automatically focuses and sharpens textual image within the monitor screens of camera phones, iPODs™, iPADs™, tablets, Blackberrys™ or other such devices referred to collectively herein as "image capture devices." These devices are equipped with a high resolution digital cameras up to 8 megapixels with most between 3 and 5 megapixels. Tablets with a range of 0.7 to 30 megapixels are useful in this invention. The image need only to be framed within the boundaries of the screen in order to obtain a sharp, focused image of textual material.

Monitor displays in smart phones range from 4.5-5.2 inches and tablets come in 9-10 inch and 7-9 inch screens which makes it easy for the user to identify and frame textual images devoid of training and the hassle/frustration of focusing/centering the object in the small digital camera screens. Tablets with screens ranging from 4 to 25 inches are useful in this invention. Additionally, because the camera in the mobile imaging device contains autofocus, image stabilizing and rotation functions, the user does not have to precisely center or focus the image in the monitor screen in order to obtain a crisp and sharp image. Once the image is positioned within the monitor screen borders the image is captured automatically or the user can click the image capture button or tap the device to lock the focus/exposure. Once captured, the image is further processed to OCR and a user understandable summary as described below.

For most printed documents the distance of the image capture device above the document is two to nine inches depending on the dimensions of the image. For small images, the imaging device is held closer to the documents while for larger images it is held farther from the document. The instant method is particularly adapted to smart phones and tablets because the large viewfinders in these devices allow the user to rapidly identify and frame the image with a minimum of fine tuning manual adjustments. In this fashion, tens of pages of printed images or textual images can be rapidly imaged, focused, sharpened, rotated, deskewed, captured and processed for machine summarization.

To facilitate rapid and accurate image capture, the "mobile imaging devices" are equipped with an automated image finder that projects an image of the textual material in the monitor. Once the entire image is framed within the boundaries of the viewing monitor, the image is captured automatically. This integrated image finder captures small images as well as large legal size documents. The mobile imaging devices can optionally capture between 2 and 35 images of the same textual material which are merged to produce the single sharpest and most accurate image. The devices detect and straighten any curvature and distortion of text content enabling even the areas near the binding to emerge clearly for accurate OCR processing. Mobile imaging devices contain optical image stabilization to reduce motion sensitivity, autofocus and unidirectional imaging which capture and straighten text presented at acute angles. These devices are also equipped with an integrated illumination system, multiple lighting modes and an integrated diffuser that facilitates capture of images in poor lighting without a flash.

In contrast digital point and shoot and SLR cameras require the user to manually identify, frame and focus the textual image within the borders of their small monitors. This task is time consuming. It calls for concentration and a steady hand to optimally identify, frame and focus the image. Optical scanning devices require separate hardware through which pages must be fed and scanned. Images in bulky books and journals cannot be processed unless they are precopied. In the latter two cases, the process is time consuming, requires training and cannot be conveniently carried out in an "out of office" environment such as a lunchroom or café.

In another embodiment, "mobile imaging devices" are equipped with an automated image finder that projects an image framing grid and a bulls-eye centering pattern on textual material. With gentle circular and up and down movement of the device, the image is centered in the bulls eye, framed within the brackets of the grid and then captured automatically by omnidirectional sensor without using the camera monitor screen. This device contains all of the elements described above including automated image finder, page curvature and deskewing distortion, optical image stabilization, unidirectional imaging to capture images viewed at acute angles, integrated illumination, multiple lighting modes and integrated light diffuser.

Most smart phones can be used with default camera settings. With cameras less than 5 megapixels, shooting at low compression and 100 ISO eliminates graininess. Some smart phone have digital zoom and image cropping features that can be used to tightly frame the text. The setting menus of some smart phones allow selection of ISO or Macro which should be used as needed depending on the ambient light and the size of the object. In other instances, add-on lenses such as Photojojo™ or Olloclip™ can be attached to the outer lens to improve close-up quality and resolution of the textual images.

Once the image is captured it is then processed seamlessly through OCR and text summarization programs resulting in a user understandable summary of the text in the captured images. The claimed method is the only one that consolidates such diversified software and hardware into a single program that with a single click of the camera provides a functional summary of the textual images (Example 1).

An excellent image capturing device is the Samsung 10.1 Galaxy Tablet™ or iPAD3™. These devices contains a 5 megapixel rear camera equipped with image recognition and autofocusing functions. The textual image is rapidly framed in the monitor screen by placing the device over the text. The camera automatically centers, focuses, sharpens and deskews the image in the monitor screen. The image is then transferred automatically to OCR where it is readily converted to editable text and then to a user understandable summary. The specifications and configuration of representative tablets useful in this invention are shown below in Table 1.

TABLE 1

| Representative models | OS | Network | Display | Processor | Memory | Front Camera | Rear Camera | Wi-Fi | Bluetooth |
|---|---|---|---|---|---|---|---|---|---|
| Galaxy Tab 10.1V | Android 3.0 Honeycomb | HSPA + 21 Mbit/s 850/900/1900/2100 EDGE/GPRS 850/900/1800/1900 | 1280 × 800 TFT | 1 GHz Dual-Core Nvidia Tegra 2 | 1 GB DDR2 | Yes 2 MPx | Yes 8 MPx | Yes Dual Antenna 802.11 (a/b/g/n) | Yes 2.1 + EDR |
| Galaxy Tab 10.1 | Android 3.1 Honeycomb | HSPA + 21 Mbit/s 850/900/1900/2100 EDGE/GPRS 850/900/1800/1900 | 1280 × 800 TFT | 1 GHz Dual-Core Nvidia Tegra 2 | 1 GB DDR2 | Yes 2 MPx | Yes 3 MPx | Yes Dual Antenna 802.11 (a/b/g/n) | Yes 2.1 + EDR |
| Galaxy Tab 8.9 | Android 3.1 Honeycomb | HSPA + 21 Mbit/s 850/900/1900/2100 EDGE/GPRS 850/900/1800/1900 | 1280 × 800 PLS | 1 GHz Dual-Core Nvidia Tegra 2 | 1 GB DDR2 | Yes 2 MPx | Yes 3 MPx | Yes 802.11 (a/b/g/n) | Yes 3.0 |

Another image capturing device useful in the claimed method is partially exemplified in the Motorola ds6707™ digital image scanner under the control of 123Software™. For use in the claimed application, this software or its likeness is integrated into a camera phone, iPOD™, or tablet and other such mobile imaging device with a camera of 1.3-25 megapixels and additional specifications described above. Preferred configuration settings for 123Software are provided below.

TABLE 2

| Imaging Configuration for 123Software | |
|---|---|
| Trigger Mode | Autoaim |
| Low light Enhancement | Yes |
| Presentation Mode Field of View | Full |
| Image Capture Autoexposure | Yes |
| Illumination Bank Control | Full |
| Fixed Exposure | 100 |
| Image Size (pixels) | Full |
| Image Enhancement | High |
| Image File Format Selection | JPEG, TIFF, BMP |
| JPEG Image Optimization | |
| JPEG Image Options | JPEG Quality or Quantity Detector |
| JPEG Quality and Size Value | 100 |
| JPEG Target File Size | 600 |
| Snapshot Mode | yes |
| Gain Exposure Priority | Autodetect |
| Snapshot Mode Timeout | 30 sec |

TABLE 2-continued

Imaging Configuration for 123Software

| | |
|---|---|
| Snapshot Aiming Pattern | On |
| Image Cropping | On |
| Top Pixel Address | 0 |
| Left Pixel Address | 0 |
| Bottom Pixel Address | 1023 |
| Right Pixel Address | 1279 |

Cameras embedded in "mobile imaging devices" are useful in this invention. Because a text image can be conveniently recognized and framed in their screens, tablets equipped with digital cameras or scanners and 4-10 inch monitor screens are especially useful in this invention. In this context, the text page is imaged in the monitor screen and automatically stabilized, focused and sharpened without manual adjustment by the user. The image is then captured by pressing the capture button or tapping the monitor screen. The captured image may be focused (autofocused), sharpened and brightened before or after capture. Thereupon, the software automatically launches an OCR program which converts the image to editable text which is then summarized by the machine summarizer software. The final product is a user understandable summary of the captured textual material. The entire multi-step process is seamlessly accomplished with a single click or tap of the image capturing device.

The present invention contemplates that the digital camera in "mobile imaging devices" such as the camera phone, smart phone, iPOD™ or tablet uses the following preferred configurations. "Auto" mode uses (i) Image stabilization (ISO) at the highest setting in continuous mode (ii) "Large" recording pixels (2816×2112), (iii) Macro mode to magnify and clarify images within 6-36 inches of the camera (iv) "Superfine" compression mode for high quality images (v) Evaluative Metering mode in which the camera divides the image into several zones, gauges complex lighting conditions and adjusts the settings to the correct exposure (vi) Auto rotate mode which is a sensor that detects the orientation of an image and automatically rotates it to the correct orientation in the monitor screen. In Auto and Evaluative Metering modes, the camera makes automatic adjustments for the lighting conditions making it possible to photograph text even in poor lighting conditions. In Macro and Autorotate modes the page image is focused sharply in the monitor screen with the camera held 6-36 inches above the printed page. ISO mode minimizes and eliminates blurry images from small inadvertent movements of the operator. Thus the camera has multiple built in automatic features and a broad range of error that make it easy for the user to capture page images on curved surfaces that can be readily recognized by the OCR program.

Conventional point and shoot digital cameras independent of mobile devices described above are also useful with the same preferred megapixel range and settings defined in the above paragraph. The image is manually focused on the center of a page and the document image is tightly framed in the monitor screen. Natural light is preferred with the flash disabled (in most point-and-shoot digital cameras, the flash is on auto mode by default). In poor lighting the flash may be used from 20 inches away but should be avoided with glossy paper. The camera may be postioned approximately 14-18 inches from center of the text and one textbook page (10"×7" each) should be photographed at a time. If the camera has manual white balance, a white sheet of paper may used to set white balance. Otherwise, the appropriate balance mode for lighting conditions is selected. The anti-shake or image stabilization setting is enabled, but if absent a tripod or any other steadying device may be employed. In poor lighting conditions autofocus may function incorrectly in which case manual focus is used with the maximum aperture allowed by the camera (2.3 or 4.5). In bright daylight, smaller apertures will produce sharper images. If the camera gives you more than one choice of ISO speed, the highest ISO setting is selected. For camera phones, iPODs™ and tablets, these camera settings may be fixed as default for textual image camera function in the claimed method.

Canon IXY Digital 800 IS (6 megapixels) with image stabilization, 4× zoom, autofocusing, autorotate, evaluative metering and macro modes satisfies most of the above criteria for rapid acquisition of printed images but nearly all digital cameras with at least 1.9 megapixels are useful. Cameras with a range of 3-12 megapixels are preferred. The Canon IXY Digital 800 IS™ (6 megapixels) with image stabilization is a good example for this purpose. The printed material is positioned on a flat surface and the camera is placed 15-36 inches above and parallel to it. The image is focused in the camera's 2.5 cm monitor screen when it is placed in a range of 12-50 inches above the printed page. The page to be imaged is encased tightly within the perimeter of the monitor screen; the camera can be turned 90 degrees horizontally for this purpose. The entire page image may be reduced to 50% of the monitor screen areas and still maintain sharp focus. If parts of the printed surface are curved and the printed lines are slanted, the camera can be raised several inches which will reduce the image size but also will also partially straighten out any curved lines.

In the claimed method, printed images captured by the mobile imaging devices are automatically converted to JPEG or TIFF files and rotated to the vertical position (reading position). Here the image is automatically sharpened, brightened, deskewed, cropped and text lines are straightened. In addition, ABBYY FINE READER Professional 9.0-10 edition™ OCR programs automatically straightens and deskews lines and adjusts resolution of the captured images prior to processing. In the claimed invention, these steps are carried out automatically without user prompting.

In the next automated step, the image is processed through an OCR program, converted to editable text and summarized optionally converted in outline format (Examples 1-4). The preferred OCR programs for this purpose is NUANCE OMNIPAGE™ or ABBYY FINE READER™ 9.0 and 10.0 editions and the preferred summarization program is Megaputer TextAnalyst™ or PolyAnalyst™. In the claimed method, the entire operation from image capture to machine summarization is carried out automatically and seamlessly starting with the step of placing the mobile imaging device over the textual subject matter.

The machine summarization is carried out by several types of text summarization programs of which Megaputer TextAnalyst™ or PolyAnalyst™ is preferred. The text of a single or a multiple page document can be summarized individually or sequentially. The program can automatically summarize individual subsections of the textual material containing relatively homogeneous subject matter. This is accomplished by highlighting the text to be summarized. Several such separate summaries may be obtained in this fashion to be used individually or all subsection summaries can be further summarized as a whole.

Once the mobile imaging device completes the entire process, the machine summary appears in the monitor screen of the device. The summary can be transferred to the top of the original document or transferred to a separate page. The summary can also highlight the key words in the summary which when clicked by the mouse allows the user to instantly access the site in the original text where the term or phrase was originally used. In the fashion, the user can obtain further clarification of the term or phrase from the preceding or succeeding sentences in the original text. The clarifying sentence or phrase can then be immediately copied and placed in the summary or margin next to the highlighted key word. Alternatively, the user can identify the relevant material in the original text and using a microphone connected to Voice to Text technology such as the Nuance PDF-8 Professional™ recite the relevant material and place it in the summary adjacent to the relevant subject matter.

The summary is also be saved or transferred to other devices such as a personal computer, eReader, or any mobile device (e.g., iPhone™, iPOD™, tablets etc.) using a USB cord (or other connecting wire), memory card or wireless technology. For this purpose, Wi-Fi adapters are useful in the present invention making it possible to transfer the text via 802.11 wireless networks to a PC eliminating the need to physically connect the camera or a memory card to a computer. Bluetooth™ or Nikon WT-1™ technology enables the user to access a personal computer in coffee shops, airports, and businesses that have "hotspot" capability. Removable memory card devices that are removed from the device and transferred to a card reader connected to a computer are also useful. Bluetooth™ wireless connectivity allows the user to "send" printed material to another Bluetooth™-enabled device wirelessly such as a computer, camera phone, iPOD™, tablet, reader or a PDA. Infrared (IR) transfer IR image transfer works similarly to Bluetooth™, but are not as fast. Both devices require an IR transceiver to move the printed matter. Images of the textual material and/or summaries can also be sent via email to a computer for further processing. Multimedia Messaging Service (MMS)™ is an extension of the text-only Short Messaging Service (SMS)™ that allows one to send matter from a camera phone to a computer.

Scanners

Acquisition of textual images for OCR and summarization can also effected with an optical scanner which may be fixed or hand held. For actual scanning, the printed material from books or journals can be captured by manually dragging the scanner over the page or by feeding the document into the scanner or placing it over the plate of flat bed scanner. Alternatively, multiple pages may be placed in an automated page feeding device for automatic sequential scanning. Individual pages from books and journals can be scanned by removing binding of the publication and placing free pages in the automated paper feed device. Pages from a bound book or journal may also be first copied with a conventional copier and loaded into the automatic paper feed scanner for sequential scanning.

Most commercial personal scanners or "all in one" scanners, copiers and/or fax machines capable of scanning standard textbook and letter size documents are useful in the present invention. Scanning devices should be capable of processing at least 5-30 documents/min in automatic or manual mode at 90 to at least 1200 dpi. Scanners with automatic paper feed attachments are preferred. In manual mode, the scanner should have previewing feature, which allows the user to select and bracket the printed material to be scanned. Portable scanners are useful for scanning journal articles or reference textbooks in a library or museum. The images acquired by the scanner may be transferred to a computer at a later point via USB port, wireless, infrared, floppy disc or CD. The stored memory of the scanned library material is readily formatted into the word-processing program of a PC or notebook with the aid of the OCR software programs mentioned above. Most commercially available scanners are useful. Particularly preferred for the present system are scanners in the EPSON™ Perfection Series with automatic paper feed but nearly all other commercial desktop or business scanners are useful in this invention.

A particularly preferred scanner is the bendable sheet image scanner. It is 2-5 mm thick and has the unique advantage of conforming to the bent page of a book or document when placed over it. While still in development at this time, the bendable scanner consists of organic transistors as electronic switches and organic diodes as photo detectors, both manufactured on plastic films without optics or mechanical components. Employing this new principle, the bendable scanner can capture images in the reflection geometry. These multilayered structures consist of soft materials except electrodes and, as a consequence, the whole device is mechanically flexible, lightweight, thin and portable.

Capture of Textual Material from CDs, eBooks in WORD, pdf or JPEG/TIFF Files

The present invention contemplates acquiring text from CDs, eBooks, the Internet or other storage vehicles containing the content of textbooks, journals or other printed material in WORD, pdf or JPEG/TIFF binary format. The claimed method processes this material through an OCR program to editable text and converts it to a functional summary of the key concepts in the identical fashion described above for mobile imaging devices and scanners using the Nuance OMNIPAGE™, PDF-8™ or ABBYY FINE READER™ 10 professional™ OCR programs and Megaputer TextAnalysist™ or Polyanalyst™. In some instances, the textual material may be in a format such as WORD or pdf that is transferred directly and converted to a summary by the summarizer program without requiring the intermediary OCR processing. Textual material in JPEG or TIFF format, however, does require OCR processing to editable TEXT or WORD before transfer to the summarizer program at this point in time but can be transferred directly to the summarizer programs when they are capable of processing JPEG and TIFF images.

Software Programs and User Interactions

The software program has several major features which include acquisition of printed matter, digital images and audio input. Digital images in JPEG or PDF format are converted via OCR to editable text in WORD or TEXT format in normal formatting The editable text is machine summarized and converted into a Roman, numbered or bullet-point format. Using a split screen to compare the outline with the original text, the user can add or subtract material from the outline to achieve the desired content density. The user can also query the outline with relevant questions whose answers broadly cover the subject matter. The outline can then be printed or transferred elsewhere for repetition and memorization.

OCR Software

The OCR software converts printed matter from a scanner, camera, camera phone or mobile device into editable text with semantic accuracy >95%. The preferred program is the Fine Reader Professional™ 10.0 edition in which the jpeg images from the digital camera are transferred directly to this program. In a single step, this program focuses the image, straightens the text lines and converts it to editable text. The specifications for this program are listed below.

System Requirements

PC with 1 GHz or higher.

Operating System Microsoft® Windows® 7, Microsoft Windows Vista®, Microsoft Windows Server 2003, Microsoft Windows Server 2008, Microsoft Windows XP.

To work with localized interfaces, corresponding language support is required.

Memory: 512 MB available RAM. In a multiprocessor system, an additional 256 MB of RAM is required for each additional processor core.

Hard disk space: 650 MB for typical program installation and 650 MB for program operation.

TWAIN- or WIA-compatible scanner, digital camera or fax-modem (optional).

Video card and monitor (1024×768 or higher).

Keyboard, mouse or other pointing device.

File Input Formats

| Format | Description |
| --- | --- |
| BMP | black and white, gray, colour |
| PCX, DCX | black and white, gray, colour |
| JPEG, JPEG 2000 | gray, color |
| JBIG2 | black and white |
| PNG | black and white, gray, colour |
| TIFF | black and white, gray, color (RGB, CMYK), multi-image. |
| PDF | any type of PDF |
| XPS | Microsoft .NET Framework 3.0 is required |
| DjVu | file format for storing compressed scanned images |
| GIF | popular image format for Web publishing |
| WDP | Windows Media Photo format. WIC or Microsoft .NET Framework 3.0 required |

Document Saving Formats

| Format | Description |
| --- | --- |
| DOC | Microsoft Word 97-2003 Document |
| DOCX | Microsoft Word 2007-2010 Document |
| XLS | Microsoft Excel 97-2003 Worksheet |
| XLSX | Microsoft Excel 2007-2010 Workbook |
| PPTX | Microsoft PowerPoint 2007-2010 Presentation |
| RTF | Rich Text Format |
| PDF, PDF/A | text and pictures only, page image only, text over the page image, text under the page image |
| HTML | |
| CSV | |
| TXT | |

Image Saving Formats

| Format | Description |
| --- | --- |
| BMP | black and white, gray, colour |
| TIFF | black and white, gray, colour (RGB, CMYK), multi-image |
| PCX, DCX | black and white, gray, colour |
| JPEG, JPEG 2000 | gray, colour |
| JBIG2 | black and white |
| PNG | black and white, gray, colour |

Barcode Types Recognized

| | |
| --- | --- |
| Code 3 of 9 | Check Interleaved 2 of 5 |
| Check Code 3 of 9 | Matrix 2 of 5 |
| Code 3 of 9 without asterisk | Popstnet |
| Codabar | Industrial 2 of 5 |
| Code 93 | UCC-128 |
| Code 128 | UPC-A |
| EAN 8 | UPC-E |
| EAN 13 | PDF417 |
| IATA 2 of 5 | Aztec Code |
| Interleaved 2 of 5 | Data Matrix |

Supported Equipment

Supported Scanners and MFPs

ABBYY FineReader™ supports TWAIN- or WIA-compatible scanners, multi-function peripherals (MFPs) and all-in-one devices.

A list of tested equipment.

Supported Digital and Mobile Phone Cameras

ABBYY FineReader™ can recognize TIFF and JPEG files created by any digital camera.

Minimum Requirements 2-megapixel sensor with variable focus lens

Recommended Requirements 5-megapixel sensor

Optical zoom

Flash disable feature

Manual focusing

Manual aperture control or aperture priority mode

An anti-shake system or a tripod

In older versions such as the Fine Reader 8.0 Professional™, the JPEG or TIFF image taken by a camera or camera phone is first downloaded via USB or wireless device and software into a file on a computer, or mobile imaging device. This file may be accessed and opened by the OCR program. The image is then manually cropped and sharpened and text lines straightened by clicking and selecting each function in the "Image" menu on the toolbar. The image is then read by clicking the "Read Image" icon. The read image is then manually transferred to a WORD or pdf file by clicking the appropriate "Transfer" function. The final product appears as editable text in the selected format. The final text format can appear as a reproduction of the original text or all formatting can be omitted by selecting the preferred format in the Tools options menu. "Omit all Formatting" function in the OCR program is preferred for machine summarization. If the English text contains Greek symbols (as with medical genetics documents), the user can select dual Greek and English as the recognition languages in the OCR program.

Textual material may also be scanned by a flat bed optical scanner by simply opening the Fine Reader™ 8.0 or 9.0 programs and clicking "Scan and Read" icons. The textual material (single or multiple pages) is scanned and converted to editable text in the desired format by the OCR program.

In the multistep operation JPEG images from cameras, camera phones, iPODs, tablets and the like are saved to a file in the computer. The OCR program is then opened to the "Find and Open" function in which the file containing the desired jpeg is identified and opened. The images appear in the OCR program and may be cropped, despeckled, inverted and text lines straightened to improve recognition by the OCR program.

A. Straighten lines

B. Despeckle image

C. Invert image

D. Crop image

The user then clicks the "Read and Transfer to Word" icon wherein the editable text that recognized by a machine summarizer program as described below. Most commercially available OCR programs such as OMNIPAGE™, TEXTREADER™ and FINEREADER™ are acceptable. However, the FINE READER™ 8.0-10.0 Professional Editions™ are preferred. The acquisition of printed matter (pdf) and digital images in JPEG or TIFF format and conversion by OCR to editable text can be accomplished in a single step with a single click of software menu titled "Acquire and Convert to Editable Text".

Likewise audio input is converted to printed text or PDF by voice recognition technology prior to use of the OCR program to convert it to editable text. The voice recognition and conversion by OCR to editable text can be accomplished in one step by selecting the "Acquire and Covert to Editable Text" function.

Summarizer Software

The claimed method uses summarizer technology to summarize the documents captured with the image capture devices and converted to editable text with an OCR program. The summarizer principles of operation are provided below. The summarizer provides a condensate of the key concepts from any printed Material regardless of length or complexity. The user can compress or condense the summary document to varying degrees determined as a percent of the total word volume of the original material. The user can also use summaries at various degrees of compression to determine the volume and depth of meaning in the original document. A summary with a compression of 30% would be expected to include more relevant concepts than one with a compression of 10% (See Example 1).

In practice, the pages to be summarized are placed sequentially in editable WORD, TEXT or PDF format. With a single click the summarizer summarizes the entire document. The summary appears promptly in a box on the same page. For custom summarization of individual paragraphs or subsections at disparate places in a document, the user simply highlights the text of interest at each site. These selections are pooled in order of appearance in the text and all the selections are summarized as a whole. Each subsection can also be summarized by itself in which case the summaries may be optionally summarized collectively.

The key words in the summary identified by the summarizer are routinely highlighted in red. The user can obtain detailed clarification of the meaning of a highlighted word or phrase in the summary by simply double clicking on the word or phrase. This immediately identifies the place(s) in the unsummarized document where the word or phrase appears enabling the reader to clarify the context in which the word/phrase was used originally by simply reading the adjacent sentences. These clarifications from the original text are highlighted, cut and pasted directly into the summary. These same clarifications can also be voice dictated into the summary using voice to text technology available in the present Nuance PDF-8 Professional™.

The summarized word/phrases can be collected as a single document by itself or the key summarized material can be highlighted directly in the original text. The finished summary can then be converted by the user into any outline format (e.g., Roman, bullet points, stars, asterisk etc.) using existing tools in the WORD program.

Summarizer Intervals

Machine summarizers are most effective when summarizing a homogeneous body of information. Authors of journal articles and textbook chapters commonly divide subject matter into sub-sections comprising a body of related concepts that make one or more key points. The user therefore first selects the summarizer intervals from a menu comprising:

A. Summarize entire document
B. Summarize from each emboldened or highlighted subsection of text and eliminate tables and graphs
C. Summarize summaries of all major subsections The program can also recognize markers created by the user in the text that denote the preferred textual sections that should be summarized individually. The program collates these individual subsection summaries into the final output summary and also provides for summarization of this summary.

Concept Density

The user must determine the concept density of the summary. For general overview of the text, a 10% compression of the subject matter will suffice. For more rigorous review, the user may prefer a more concept dense summary. Therefore, he is given a range of concept densities from 10% to 95% from which to choose. The summary density menu can be accessed at any point in the process should the user wish to compare a detailed with a more general summary of the subject matter.

Format

The user can choose the format of the final summary from menu options that include paragraph or sentence form, bullet points of each sentence or Roman outline with subheadings. Hybrid documents consisting of paragraphs, bullet points and Roman outlined material can also be prepared by the user. To confirm the effectiveness of extraction, the user can also view the entire document with the key phrases highlighted or emboldened. Likewise, the non-highlighted text can be deleted while the remaining highlighted phrases and sentences are pooled into a paragraph, bullet points or Roman outline.

Split Screen

Split screen displaying the original and machine summarized text is employed to allow the user to add relevant points from the original text to the machine summary. The key points in the original text are highlighted for ease of recognition and relevant sentences or words are dragged from the original document to the summary.

Summarizing the Final Summary(s)

The present invention envisions that effective learning involves progressive condensation of the subject matter to a final group of notes that can be readily reviewed before a presentation or examination. Thus, the claimed subject matter includes the option of a further summary of the final summary itself to provide a set of condensed notes for rapid review.

Disposition of the Final Summary

The present invention envisions that the entire operation from image capture through OCR and text summarization can be carried out completely in a mobile imaging device. Alternatively, the captured image may be transferred via USB connection or e-mail or wirelessly via Bluetooth™ or WiFi™ to a PC where it is further processed through OCR to a machine summary. The final summary can be printed or distributed to any other digital device such as eReaders of mobile devices via USB, wireless or e-mail.

Real-Time Summarization of Audio

It is estimated that using the traditional note taking method most high school and college students extract less than 30% of the key concepts from a classroom lecture. The act of comprehending an audio concept while transcribing an earlier one is extremely difficult and beyond the capability of most students. Most emerge from a lecture sensing that they may have missed or failed to understand more than 80% of the content. The present invention provides an solution to this problem. It envisions the use of summarization technology to summarize the content of an audio lecture in real-time and provide a summary as the lecture on a digital screen as the lecture is proceeding and a final summary at the end of the lecture. For this purpose, a parabolic or any other sensitive microphone or wireless transmitter is used to transfer the speech of the lecturer to the screen or monitor of a computer or mobile device equipped with voice to text software of which Nuance Dragon™, ViaVoice™, Naturally Speaking™ are excellent examples. The verbal input of the speaker is rapidly converted from speech to text using any of the commercially available speech recognition software such as Dragon, ViaVoice, Naturally Speaking etc. OCR programs in the computer convert the printed matter to editable text. A machine summarizer program operating in the device continuously summarizes the content of the editable text and projects the summarized/editable material on the screen of the computer or mobile device as the lecture is proceeding. The summarizer continuously updates/revises the summary as it receives new information from the speaker. The user can stop and restart a new summary as the speaker signals a change to new subject matter. In this way, the user can listen to a lecture and at the same time visibly review the speaker's key ideas in real time on his computer screen. At the end of the lecture, the user can access the original text of the lecture to clarify/expand/edit the machine summary for accuracy, clarity and depth. To accomplish this, the key word/phrases of the lecture summary are highlighted so that when clicked by the mouse the user immediately accesses the place in the complete lecture text from which the key word originated. Such complete text of the lecture is provided on the same screen as the summary as a separate box. The real-time system has the following major advantages. It eliminates note taking during a lecture enabling the user to concentrate on understanding the key concepts. By reading the main concepts on the computer screen while the lecture is ongoing, the key elements of the lecture are reinforced. It also permits rapid editing/clarification of key points in the final summary by providing easy reference to the exact place in the complete lecture text from which the summarized phrase/word originated. For use of this invention any personal computer, laptop and its variants or any mobile device such as smart phones, iPods or tablets can be used with the installation of the voice to text software and the summarizer programs described herein. Microphones provided by most computers or long range parabolic microphones are useful for audio acquisition. The computer may also be connected directly to wire or wireless networks originating from the speaker's microphone or its voice dissemination/amplification system.

Principles of Machine Summarization Systems

The claimed method uses OCR to acquire and format text material. Once formatted into editable text, an automatic text summarizer is used to extract the key concepts at the desired degree of compression. Examples of text extraction and summaries of various compression levels are given Example 3. This material is rapidly converted into bullet points or outline form. The machine summary and outlined notes are then reviewed and practiced. The user can also formulate questions from the text, enter them into the summarizer, which will extract and display the answers via a semantic search on the material (See Example 1). The fundamental steps in the summarizer process are given below.

A. Reduction. Information acquired from multiple sources is scanned and OCR used to convert the printed image to editable text in outline form specified above.

B. Parsing. The text is parsed into paragraphs, sentences, and words using a lexical analyzer. A system for separating words into stems (morphological stemming) and affixes, which can be used to reduce incoming texts into word stem form. A morphology analyzer can be used to tag key words based on suffixes employing disambiguation rules for syntactic context. Fast parsing with a full grammar parser such as the Tagged Text Parser (TTP) is also useful. The resultant parse tree is analyzed grammatically and nouns, verbs, adjectives, adverbs identified. The adjacency of each word is evaluated in making the determination. Subjects and predicates are identified. A different set of grammar rules is used for each natural language, making the product multilingual.

C. Analysis. The grammar tree is then analyzed and major concepts extracted according to relevancy rules. These relevancy rules are selected and/or entered by the user. Keywords and phrases are used for relevancy discrimination and assigned weights. The value of the key words and phrases is assessed according to their frequency and weight.

D. Construction of Vector Space Diagrams and Cluster Generation. The subject matter is hierarchically arranged, and derived directly from the text under consideration. Key term weighted vectors based on the above relevance criteria are derived statistically or probabilistically from vector space diagrams and used to construct key term clusters. Synonymy classes and subsumption hierarchies are prepared. Index terms are related to each other via statistical association methods, which compute similarity coefficients between words, word stems or concepts based on co-occurrence patterns between these entities in the sentences of the text material.

E. Relevance Feedback and Reduction. The degree of summarization is determined by the user. Non-essential and redundant verbiage is eliminated, as is redundant information. New key terms and weighted clusters are prepared via relevance feedback, i.e., a repeat of the process after completion of the initial abstracting using new key terms to condense the subject matter.

F. Rendering. The result is presented as a summary and outline. It can be printed, rendered for a web browser or mobile device, eReader or the like. Using text to speech, it could even be read aloud.

G. User Feedback (Query and Answering Feature). The automated program allows the user to provide generic or specific queries about the textual material and provides answers from the text.

Specific Summarization Systems

Neural Network Approach: Megaputer's TextAnalyst™

The present invention contemplates the use of the machine summarization of the digitized text into a useful outline. For this purpose any summarizer program is useful. The principles involved in these systems are below. Megaputer's TextAnalyst™ and PolyAnalyst™ are the preferred summarizers in the claimed invention because they provide many desirable features, including accurate summarization and a query feedback system. Megaputer supports a range of summarizer operations without a predefined knowledge base. The basis for TextAnalyst's processing is a neural network technique that analyzes preprocessed text to develop a semantic network. The semantic network provides the core information required for clustering, summarizing, and navigating textual material.

TextAnalyst uses a three-step process for compiling text mining information in a document, preprocessing, statistical analysis and renormalization. These steps are performed sequentially.

The first pre-processing phase is a language-dependent operation during which "stop" words are eliminated, since they provide no semantic information. Next, the roots of the remaining words are identified so that the subsequent statistical analysis and renormalization phases have to deal only with a canonical form of words, with the text reduced to only semantically important words in standard form.

For statistical analysis, TextAnalyst calculates correlation weights between words. Words that appear together frequently have higher weights than words that appear together infrequently. Weights are also assigned to individual words and multiword terms in order to calculate a sentence weight and then the most relevant sentences are extracted. Using the default threshold of "90" for semantic weight, only a single sentence is extracted for the summary.

The final phase is renormalization. During this stage, the weights between words are adjusted to reflect the strength of the relationship between the words in a sentence. Iterative adjustments are made to the weights until a stable set of weights is found that reflects the most important words and word combinations in the text.

The semantic network in TextAnalyst is the foundation upon which other operations depend. Words and terms are linked to other words and terms according to weight of terms. Multiword terms are identified on the basis of the frequency with which they co-occur. Text Analyst does not usually include verbs outside of noun phrases in person, place, and organization terms, and does not terminate at the first or last multiword term. TextAnalyst uses a strictly mathematical approach, after preprocessing, to formulate the semantic network and limits language-specific operations to the preprocessing stage to provide more adaptability in later stages.

Another analytic approach provided in Megaputer™, is the means to interrogate a text using natural language to find answers to questions not necessarily captured in a summary. Processing questions is similar to processing sentences in documents. Words in the question are scored according to their relationship with other words. Based upon the results of that scoring similar sentences are extracted from the source text. The intuition for this approach is straightforward. A question is a sentence with a placeholder (identified by terms such as who, what, when, and where) and some selection criterion. The selection criterion provides the means of filtering sentences to find matches. The assumption is that at least one of the top matches will contain the answer targeted by the placeholder in the question.

As with other text processing operations, question answering does not entail a full semantic analysis resulting in an elaborate representation of the meaning of a question. Instead, statistical techniques combined with the neural-network-generated semantic network, provide likely answers to the question.

Homepage for the Instant Invention

The textual image or barcode from the mobile imaging devices may be processed directly to a user understandable summary in the mobile imaging device itself or a PC, laptop and the like. The textual image is also transferred directly to the homepage of the mobile imaging device or PC wherein image can be processed automatically through OCR to a final summary or where alterations that facilitate capture by OCR and summarizer programs can be carried out. Textual images from mobile devices in JPEG or TIFF or other format can be imported to the homepage of a PC and converted by OCR to editable text in WORD or TEXT format and then machine summarized (Examples 1, 2, 3, 4). Barcodes encoding textual material can also be acquired by the mobile imaging devices and decoded therein or transferred to a PC using barcode reader alone or embedded in an OCR program such as FINE READER 9.0-10.0 Professional Edition™.

The homepage provides the users with options for the format of the summary, i.e., as non-formatted text, formatted text such as the in the original document or in formatted or non-formatted text with or without Tables. The custom program also specifies the amount of desired detail in the summary ranging from 10-90%. The user can specify or highlight the desired text intervals for summarizations such as subheading to subheading or subsection to subsection within a book chapter. In this case, multiple summarizations of the text material are prepared. The user can also designate the preferred format of the final summary, e.g., Roman outline, bullet points, separate sentences.

The user can optionally highlight the key points in the original text and compare them to the highlights in the machine summary. For this purpose, a split screen is useful that enables the user to incorporate additional points of his own in the machine summary via a drag and drop function.

The homepage contains files for manual or automatic processing of the captured image. The homepage of the instant invention contains space for the complete text image and toolbar icons titled "Import", "Edit Image", "Editable Text Format", "Convert to Editable Text", "Editable Text Modifications", "Summarizer Settings" for processing the image through OCR and machine summarization.

The "Import" toolbar contains the following options:
1. Import Image via Wireless Devices, Cardreader or USB port from:
  a. Cameras or Digital Cameras
  b. Mobile Imaging Devices
2. Import Image from Scanner
3. Import Image from Internet, Files and Folders
4. Acquire Image by Searching By clicking any one of these options, the textual image in thumbnail form containing printed material is acquired from the source into the homepage.

Next the user edits the printed image in the file titled "Edit Image" containing the following options:
1. Rotate Left
2. Rotate Right
3. Sharpen Image
4. Straighten Lines
5. Optimize Contrast & Brightness
6. Crop image Next the user converts the printed text in JPEG or TIFF format to editable and summarizable text. Before doing so, the user selects the preferred format from the folder titled "Editable Text Format" which contains the following menu options:
1. Preferred Layout
  a. Original Layout
  b. Retain Columns, Tables, Paragraphs, Fonts
  c. Retain Tables, Paragraphs, Fonts
2. Preferred Format
  a. PDF
  b. RTF/DOC/WORD
  c. HTML
  d. TXT
  e. DBU
  f. CSU
  g. LIT Next the user converts the printed pages into editable text by opening the next folder titled "Convert to Editable Text" and clicking on "OCR-Convert to Editable Text". Once the text is converted to editable text by OCR the image can be further improved using the file titled "Editable Text Modifications."
1. Eraser
2. Rotate/Flip/Invert
3. Straighten Lines
4. Despeckle image Next the user determines the preferred method of summarization by opening the file titled "Summarizer Settings."
1. Summarize entire document
2. Summarize intervals between subheadings
3. Summarize the summaries 4. Summarize the highlighted text in the original document
5. Summarize with summary on top of original document
6. Summarize the interval summaries
7. Place summary in Roman outline form
8. Place summary in bullet-point form
9. Place summary in paragraph form
10. Desired compression of the summary: 20-75%

The user then clicks the "Summarize" icon. The final summary appears in specified form in a few seconds. It may be further refined and compared to the original document by placing it in split screen next to the original document using the file titled "Split Screen documents." Upon opening this folder, the content of the outline is synchronized with the site from which this content originated in the text. This enables the user to rapidly compare the original paragraphs with the summary outline at the same eye level and add, subtract or edit the outline as desired.

The user can process the initial text images from import to summarization in a single step using preset configurations specified by the user. For single step processing method, the folder marked "Rapid Single Step" containing the following menu options is opened with the following options.

1. Import from Mobile Imaging Device, Barcoder, Read and Summarize
2. Import from wireless/card reader, Read and Summarize
3. Import from pdf file/web, Read and Summarize Capture of Barcodes Encoding Textual Images An additional embodiment of the present invention is to capture 1 or 2D barcodes encoding textual material using barcode reader applications embedded in "mobile imaging devices" such as iPODs™, iPADs™, tablets, BlackBerrys™ and the like. Because barcodes are spatially smaller than the textual material they encode, they are readily captured by conventional 1 or 2D barcode scanners. Digital cameras are also useful in capturing and processing barcodes. Once captured, the barcode is automatically decoded into alphanumeric editable text in WORD format which is thereupon processed seamlessly to a machine summary without requiring OCR text format conversion (Example 6).

In practice, a barcode encoding alphanumeric or binary text is placed in a non-text segment of a printed page where it is captured and decoded by a barcode scanner and converted into alphanumeric text in WORD format. The present invention contemplates attaching such a barcode to each printed page of textbooks or at the end of chapters or sections therein. The barcode scanner captures barcodes encoding text material more rapidly than mobile imaging devices and can facilitate the "concept capture" phase of the learning process.

The present invention envisions that an entire textbook can be converted to barcode that can be rapidly captured and decoded by the mobile operating systems with embedded barcode reading applications such as NeoReader™ for iPhone, ZXing Barcode Scanner™ for Google Android, Nokia Barcode Reader™ for Nokia. Preferentially the barcode encoding the textual material is high density and 2 dimensional such as QR, PDFf417™ or AZTEC™ that can be decoded by simply placing the barcode reader or mobile imaging device over it.

High density and 2 dimensional barcodes such the PDF417™, Data Matrix™, QR™ or Aztec™ that support full ASCII, binary and numeric data and encode foreign language character sets are the most useful barcodes in this invention. The PDF417™ symbology accommodates up to 340 characters per square inch with a maximum alphanumeric of 1850 text characters; with a mix of alphanumeric and binary data, the capacity ranges from 1108 and 1850 bytes. Data Matrix 2D™ matrix style barcode symbology that encodes up to 3116 bytes or characters from binary or alphanumeric data is also useful. The symbol is built on a square grid arranged with a finder pattern around the perimeter of the barcode symbol. The QR 2D™ barcode encodes text, URL and is decoded at high speed with mobile imaging devices equipped with applications that convert the QR code to text. QR codes are utilized in Google's mobile Android™, Nokia's Symbian™, Maemo operating system™s and App World™ applications for BlackBerry™ devices. QR has a maximum of 4296 alphanumeric characters, 7,089 numeric characters and 2953 binary bytes. Aztec Code™, a high density 2D matrix style bar code symbology that encodes up to 3750 characters from the entire 256 byte ASCII character set of binary or alphanumeric data is also useful. The symbol is built on a square grid with a bulls-eye pattern at its center. Data is encoded in a series of "layers" that circle around the bulls-eye pattern. Aztec's primary features include orientation independent scanning and a user selectable error correction mechanism.

Modern bar code scanners are normally available with one of three "output options"—either "Keyboard Wedge" output, RS232 serial output, or USB output and all are useful in this invention.

1) Keyboard Wedge Output or USB Output

If the barcode scanner has Keyboard Wedge output or USB output special data collection software is not needed. Both these outputs will deposit the data into the foreground application on a PC wherever the cursor is flashing.

2) RS232 Output (Includes Some RFID Scanners)

RS232 output is characterized by either a 9 or 25 pin rectangular connector plug. It attaches to one of the COM ports on a PC. BC-Wedge software (short for Bar Code Wedge) is useful for adapting to Windows. It inputs data directly into Windows or DOS applications as if the data were being typed in. For RS232 barcode users requiring more options WinWedge 32 Std™, WinWedge 32 Pro™ and DOS-Wedge Pro™ are useful. These advanced versions offer sophisticated data parsing, filtering and formatting, date and time stamps, 2-way I/O (for RFID), keystroke macro insertion, data translation.

3) TCP/IP Output (Includes Some RFID Scanners)

TCP/IP compatible devices typically connect to an Ethernet™ network. This type of output requires additional software in order to collect data from the barcode scanner directly into most Windows applications. TCP-Wedge™ collects data from TCP/IP ports (i.e. a device connected to a TCP/IP port) directly into any Windows application. It has all the advanced data parsing, filtering, formatting, 2-way communications, etc. of WinWedge Pro™ and is a part of the WinWedge 32 Pro™ package.

Digital cameras or document scanners alone or integrated into a conventional 1D or 2D barcode scanner capable of capturing 1 or 2D barcodes are also useful in the instant invention. An example of such an integrated device is the Motorola™ 6707series which contains both linear barcode scanners and a 1.3 megapixel digital camera which can capture images in binary, TIFF or JPEG format.

Cordless barcode scanners that can communicate barcode data wirelessly to other digital devices such as Analog-99 MHz (Radio Technology) or 802.11a/b/g WLAN or Eye-Fi™ or Digital-Bluetooth™Class 2 radio, v1.2 WPAN™ (Digital Spread Spectrum) with a range of up to 300 feet from the base are also useful in this invention.

The present invention contemplates that all these image capturing devices may be used independently to accomplish the entire process of barcode capture, decoding, conversion to OCR and summary. Mobile imaging devices such as iPODs™, iPADs™, tablets, PDAs,™, mobile computers and the like equipped with applications that incorporate these functions such as NeoReader™, ZXing Barcode Scanner™ and Nokia Barcode Reader™ and the OCR and summarizer programs, e.g., FINE READER™ 10.0 and Megaputer TextAnalyst™ or Polyanalyst™ are preferred for this purpose.
Textual Images in Foreign Languages are Recognized, Translated and Processed in the Same Fashion as the Native Language The claimed invention also contemplates that textual images in foreign languages can be processed in the same fashion as images in a native language. The foreign language document is first captured by the mobile imaging device, autofocused, sharpened and then translated into any of 165 different foreign languages using automated translation software. At this point, the translated image is processed through OCR in the preferred FINE READER™ professional 10.0 program that recognizes 167 foreign languages and then summarized by the preferred summarizer that similarly recognizes the foreign language.

Server-Side Content Summarization System

Figure 1:
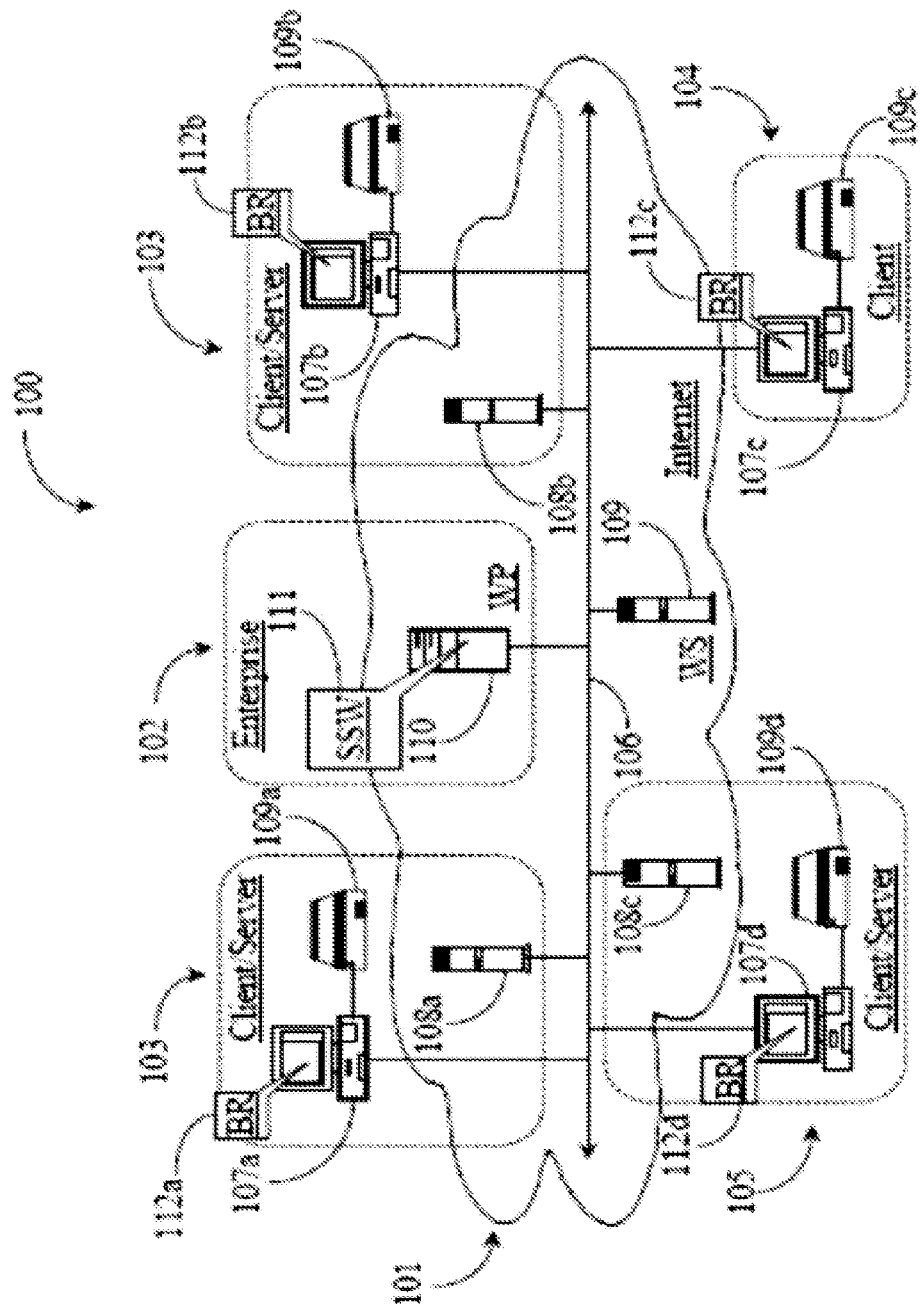
FIG. 1 is an architectural overview of a network environment practicing document summarization according to an embodiment of the present invention.

The present invention envisions a server-side program enabling the summarizer technology to be accessed by a large number of users. The system is best demonstrated by referring to the FIGS. 1-5. FIG. 1 is an architectural overview of a network environment 100 where document summarization is practiced according to an embodiment of the present invention. Network environment 100 is represented herein by an Internet network cloud labeled Internet and further defined in illustration by a network backbone 106. Backbone 106 represents all of the lines equipment and access points making up the Internet network as a whole. Therefore, there are no geographic limitations to the practice of the present invention. It will be appreciated by the skilled artisan that Internet 101 includes all sub networks connected thereto although none are specifically illustrated in this example. These may include local area networks (LANs), wide area networks (WANs) corporate, private or public. Network 100 may hereinafter be referred to as Internet 100.

In accordance with an embodiment of the present invention, an enterprise 102 is illustrated and is adapted to provide document summarization services by maintaining a Web Portal (WP) 110 that is connected in this example to backbone 106. WP 110 is adapted as a service portal accessible to clients subscribing to or otherwise authorized to access document summarization services according to embodiments of the present invention. WP 110 has an instance of summarization software (SSW) 111 provided thereto and executable thereon. SSW 111 is a server-based application that automatically creates document summaries for users who summit or otherwise provided location information to the server enabling server access to documents for summarizing. SSW 111 also performs other tasks which are related to summary management and distribution upon user request and direction.

A client station 101 is illustrated in this example and has connection to backbone 106 via one of several possible Internet access methods. In this case, client 101 has a desktop computer 107a connected by a high speed Internet link to backbone 106. The connection method may be digital services line (DSL), broadband connection, integrated services digital network (ISDN), or some other Internet connection method. Computer 107a may be a laptop computer or any other Internet-capable appliance with a browser display that may access portal 110. Computer 107a has a browser (BR) instance 112a installed thereon and adapted for general Internet access and navigation. The inventor prefers a high-speed Internet connection method over a lower bandwidth dial-up connection; however a dialup Internet access method may be used without departing from the spirit and scope of the present invention. The connecting network may be any telephony carrier network including the public switched telephone network (PSTN) or, perhaps a wireless carrier network. For the sake of simplicity, a carrier network and equipment is not illustrated in this example but may be assumed present in some embodiments. Computer 107a has an optical character recognition (OCR) scanner 109a connected thereto as a peripheral. Scanner 109a may be used in one embodiment to scan documents onto computer 107a for upload to server 110 for summarizing. In one embodiment, documents on computer 107a may be summarized by server 110 without requiring upload to the server. Client 101 maintains an Internet-connected server 108a that is accessible to other authorized users via Internet 100. Client 101 may therefore be an enterprise providing services and/or products to customers. A client station 103 and a client station 105 are illustrated in this example. Client station 103 is similar to station 101 in that a computer 107b running a browser instance 112b is provided as well as an OCR scanner 109b. Client 103 may therefore be an enterprise as was described above with respect to client 101. Furthermore, client 105 is similarly adapted as described above with respect to client station 101 including a computer 107d, a scanner 109d, a BR instance 112d running on computer 107d and an enterprise server 108c.

Clients 101, 103, and 105 may subscribe to the services provided by enterprise 102 and may access those services by accessing portal 110 with respective browser interfaces 112a, 112b, and 112d. A browser plug-in such as an active x control, a java-based plug-in, a direct x plug-in, or some other plug-in component may be temporarily or permanently downloaded to each of computers 107a, 107b, and 107d when portal 110 is accessed and the user is authenticated for first time use of the service. In the case of stations 101, 103, and 105, document summarization as provided by SSW 111 may be performed on any electronic documents that may be uploaded to the server from an internet-capable appliance such as from computers 107a, 107b, and 107d. Document summarization may also be performed on documents that are resident on the connecting appliance, computer 107a, for example, without requiring the documents to be uploaded. In this case, the documents for summarizing may be dragged and dropped into a shared folder that portal 110 is authorized to access over Internet 100.

As described further above, each station 101, 103, and 105 have enterprise servers 108a, 108b, and 108c which may be adapted to hold and serve enterprise documents internally and to serve electronic information pages using hypertext markup language (HTML) or an extension thereof such as SHTML, XML, or the like. Internal documents may include HTML-based information pages addressed in the server, and other document types that may be stored on the servers. These may include extensions such as .doc, .PDF, or virtually any known extension for any known word processing application used to create those documents. In this example, stations 101, 103, and 105 may authorize portal 110 aided by software 111 to search and summarize any documents or electronic information pages maintained in that enterprise servers 108a-108 c. Portal 110 accesses those servers over Internet 100 based on a request from the appropriate client station 101, 103, or 105.

Document summaries created from resident documents accessed remotely by portal 110 may be stored on the same system that holds the documents that were summarized. Portal 110 may associate those summaries to the full-text versions of those documents and may provide notification of the existence of a summary version of a full text document to anyone operating on the network that has requested access to a document that has a summary version associated therewith.

In one embodiment, portal 110 may keep stored document summaries on its own data storage system and may provide network hyperlinks links to those summaries, the links associated with the full text versions of the summaries at any browsable location of those full text documents. It is clear that documents and their summaries need not be stored on a same computing system, server, or hard drive. It is also clear that links to the remotely stored summaries may be placed in a Web page, in a full text document that has been summarized, or simply in an accessible file folder represented as a shortcut icon that is executable as long as the searched system has connection to the Internet network.

A client station 104 is illustrated in this example and includes a computing system 107c and a connected OCR scanner 109c. Computing system 107c has a browser instance 112c resident therein and adapted for browsing the network. Client station 104 may be a private consumer rather than an enterprise maintaining a document and or Web server. Client station 104 may subscribe to services offered through portal 110 and may have documents summarized in the same manners described with respect to the other enterprise stations. For example, a user operating station 104 may scan documents into computing system 107c and have them summarized on the computing system if the system is online and connected to portal 110.

In one embodiment, the scanned documents may be uploaded to portal 110 for summarizing. Word documents such as those with the extensions .doc, .PDF, or other known extensions may be uploaded to portal 110 from computer 107c for summarizing. Those same documents may be summarized on computing system 107c by dragging them from their original folder and dropping them into a shared folder made accessible to portal 110 or a special window that may be part of a browser plug-in adapted to enable portal 110 to gain limited control over the computer for the purpose of summarizing those documents.

A user operating computer 107c and in session with portal 110 using browser 112c may request a summary of a document available through or an electronic information page hosted on an Internet-connected server such as one illustrated in this example as Web server (WS) 109. In this case, the user submits a URL/URI to the document or Web page for summarizing and the portal downloads the page or document in order to summarize the document. The portal then sends the summary document to the user or makes it available to the user at the server depending on enterprise rules and whether the requested document has been made freely available for download.

In one embodiment, portal 110 with the aid of SSW 111 may access documents available through the Internet and may summarize those documents storing the summaries in a searchable data storage facility. Links may be made available to those documents via a search engine as a result of a keyword or phrase entry and submission through a search interface. For example, a third party search service may provide search result pages containing links to Web pages containing documents that have been summarized in the past. Clickable links to those document summaries may be provided along with the links to the full text documents on the search result page.

As more documents are summarized, search results served will provide more and more summary links to those full text documents. There may be some rules in place to determine which documents that are generally available through the Internet should be summarized, such as for example, popularity (frequently accessed), class (education, technical paper, etc.), and so on. Research papers and other technology white papers may be good candidates for document summaries. User guides, product manuals, tutorials, public information works and other frequently accessed materials may be good candidates for summarizing. Each document summary accessed from a search results page may also contain a hyperlink to the full text version of the document summary. Summary formats may vary according to the nature of a document. Summary outlines, searchable indexes, graphics slide shows, and other tools may be provided to help a user determine whether to access a full document or not.

Figure 2:
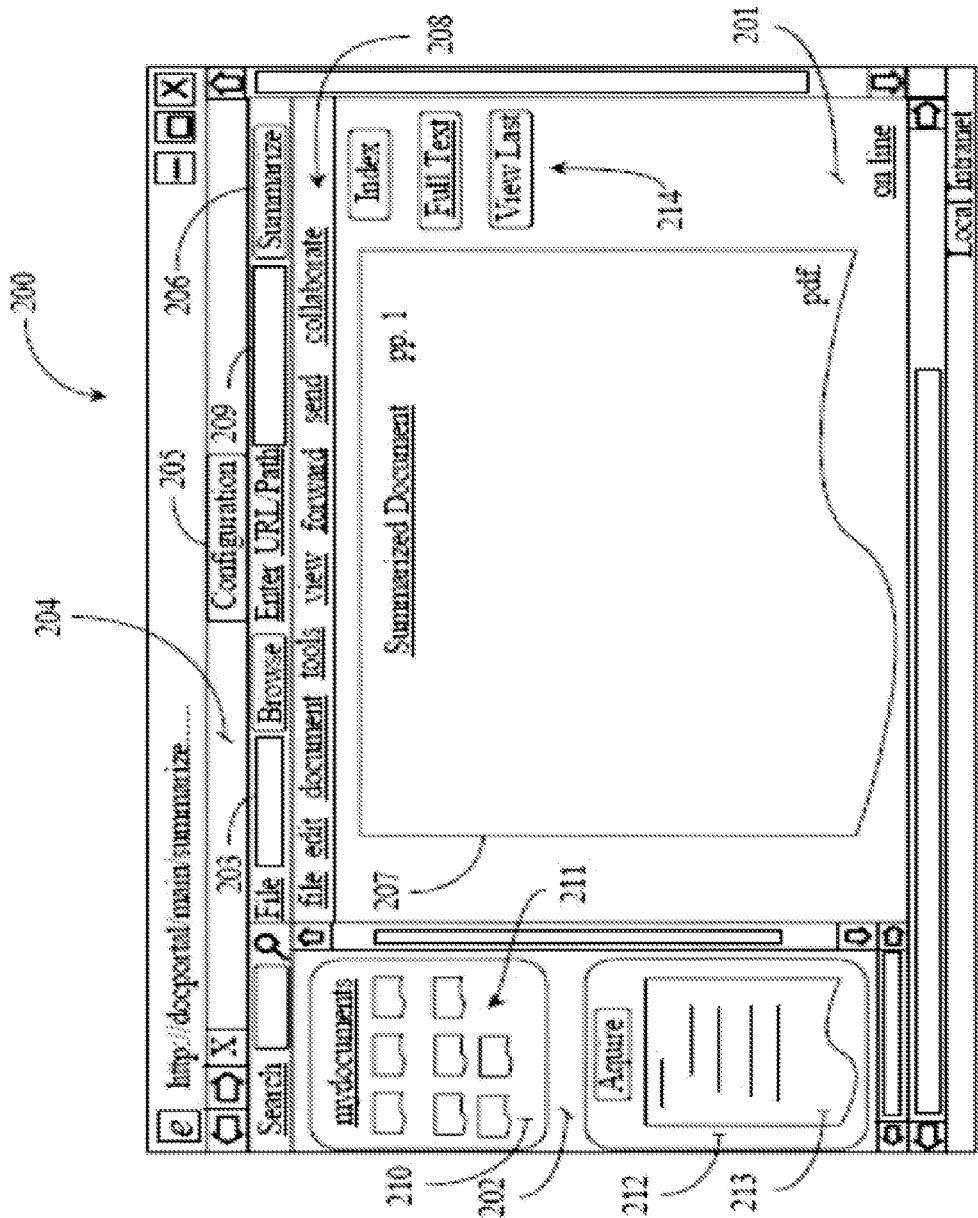
FIG. 2 is an exemplary screen shot of a browser window illustrating a summarization user interface according to an embodiment of the present invention.

FIG. 2 is an exemplary screen shot of a summarization user interface 200 according to an embodiment of the present invention. Interface 200 is provided of the form of a navigation capable browser window. A browser plug-in may be provided in one embodiment, to enable some of the capabilities of the service of the present invention such as folder sharing. The portal server may perform local document summarizing on the user's appliance if the user authorizes the process. Executable controls may also, in one embodiment, be temporarily downloaded to interface 200 if required, to perform certain server-side functions on the user's device. Those controls may be discarded after the user logs off from the portal.

Interface 200 is illustrated as currently online and logged into an enterprise portal providing the service of the present invention, such as portal 110 aided by SSW 111 described above with reference to FIG. 1. Interface 200 has a toolbar 204 provided thereto similar to any browser interface and may contain user actionable icons and drop down menus typical of a browser interface including text entry fields for entering URLs for navigation and for entering keywords or phrases for initiating data searches. A search window is illustrated in this example, just below toolbar 204. A configuration icon 205 is provided to enable a first time user to configure the service of the invention for use. Configuration options may vary according to service plan.

Interface 200 has a file browse window 203 for finding documents for summarizing, which are stored locally on the computing appliance or on a connected storage medium. The local file-browsing interface 203 may also be used to find previously created document summaries. A data entry field 209 is provided on interface 200 and adapted for enabling a user to enter a URL and document path to a full text document that the user wishes to have a summary of. The entry field may be filled manually by a user or a shortcut may be copied and pasted into the field. A user actionable icon summarize 206 is provided conveniently adjacent to field 209. When the field is populated, the user clicks on summarize to submit the network path to the service of the present invention. The portal aided by software then navigates to the document downloads the full text version and summarizes the document according to configured user preferences if any. If the user has not indicated exact preferences then a default summarization template may be used instead.

Once the document has been acquired and summarized, then the summary version of the document may be sent to the user and may be displayed in a window 201 adapted for the purpose. In this example, page 1 of a PDF file 207 is displayed. The user may scroll normally if there is more of the summary document than can be displayed on the screen. If the service already has a summarized version of a document that the user has provided the network path to, then the service may notify the user that a summary of the document is currently available for display. Once a summary is displayed, the user may save the summary locally and perform other common editing and file tasks that may be available with normal word processing software. Options 208 are provided in this example and may include drop-down menus file, edit, document, tools, and view, forward, send, and collaborate. The option 208 labeled tools may include file converters or plug-in viewers for certain document types. The option 208 labeled views may offer different types of views of the summary based on any considerations. For example, a user may wish to view only a broad outline of the subject matter contained in the full text version of a document.

The user may activate forward or send to deliver the document to a third party through email, file share program, or through some other resident application used to send connected appliances for the purpose of sharing the user's screen and document display with other users. Actionable icons 214 are provided conveniently within window 201 and are adapted to provide other options. An icon of icons 214 labeled index may allow the user to view an index of summarized documents currently available for view. An icon of icons 214 labeled full text enables the user to immediately retrieve a full text version of the summary from the portal if desired. An icon 214 labeled view last enables the user to view the last summary acquired.

Interface 200 has a second scrollable side-bar or area 202 provided thereto and adapted to contain more options. A window 210 provided within scrollable area 202 and adapted to show a user the aggregate of document summaries that have been created for the user. Labeled my documents, the window contains summary documents 211 that are available for viewing. These summary documents 211 may include links to the full text versions of those documents. The folder may be maintained at the portal and made accessible to the user in personalized fashion such that only the user has authorization to access the folder.

Space 202 also supports a scanner interface for acquiring documents via OCR scanner for summarizing. In this example, a page 213 of a document scanning into the commuting appliance is illustrated. If the user is connected to the portal while scanning is taking place, the service of the invention may begin summarizing finished scans as soon as they are completely scanned onto the appliance. The summarization process is flexible such that if subsequent scanned pages parsed by the service indicate a shift in any completed portion of the summary, then that completed portion may be modified. This particular feature of the present invention provides for an organized summary from an otherwise unorganized full text document. In other words, the summary software of the invention may be enabled to determine some priority in arrangement of different sections of a document depending upon what content a user looking for. Interface 212 may support a single document scanner or a multiple document scanner without departing from the spirit and scope of the present invention.

Using interface 200, a user may submit documents to the service portal over the network for summarizing, or the user may allow the portal to summarize documents on the user appliance without requiring document transfer. After a session is complete, any downloaded utilities or plug-ins may be disposed of or rendered unusable. In another embodiment, a persistent browser plug-in may be provided using activeX™, directX™, Java™ bean, or one of many other known executables. The service of the present invention is intended to support a variety of operating platforms including Windows™, Apple™, Linux™, and any other known operating platforms.

In an embodiment wherein the user is an operator of an enterprise station having a large cache of documents to summarize, the URL to the server or folder containing the documents may be submitted to the portal service, at which time the portal may navigate to the URL and search and summarize all of the documents contained at that location such as in the server, or in a file folder or directory. There are many possibilities. Using the present invention in this way enable an enterprise to quickly send many summary documents, perhaps summarizing a complicated sales or other contract to a prospective buyer, who may then access the full-page versions at will if desired.

Figure 3:
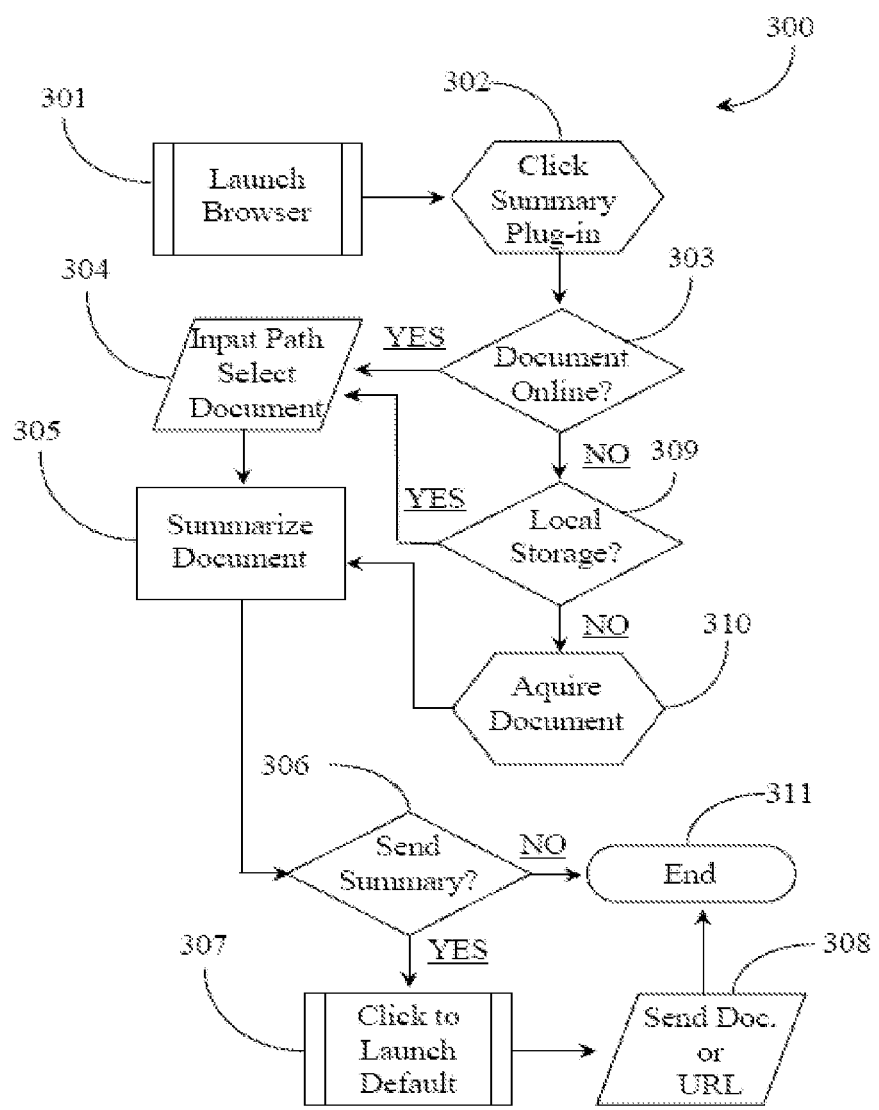
FIG. 3 is a process flow chart illustrating acts for summarizing a document according to embodiments of the present invention.

FIG. 3 is a process flow chart 300 illustrating acts for summarizing a document according to embodiments of the present invention. At act 301a user operating a network-capable appliance launches the Web browser on the appliance. At act 302 the user logs onto portal by clicking on a plug-in icon conveniently placed into the browser. In one embodiment, there is no plug-in downloaded until the user navigates to logs onto the portal analogous to portal 110 of FIG. 1. In this case, the functionality for having documents summarized locally by the portal over the network may be downloaded as an automatically executable control, that executes and displays a user interface in the browser like interface 200 described earlier.

At act 303 the user determines if the document for summarizing is online. If at act 303 the target document for summarizing is online, then at act 304, the user provides the correct network path to the document by manually typing the path or by copying and pasting a shortcut to the document into a data field provided. At act 305, the user may click on summarize to have the service navigate to the URL retrieve the document and summarize it for the user. Step 305 includes making the summary version available to the user by sending it to the user over the network or by placing in a server-side folder personalized to the user wherein the user may access and download the document.

At act 306, the user has the option of sending the created summary to another user or users. If the user decides to send the summary to a third party or parties in act 306, then at act 307 the user clicks on forward or send to launch a preferred email application or some other communications application capable of handling attachments. If at act 306 the user does not want to forward or send the application then at act 311 the process ends. The user may view, edit and perform other tasks with the summarized document.

If at act 303 the user determines that the document to be summarized is not online, then the process proceeds to act 309 where the user determines if the document is in local storage. Local storage means that the document is on a storage medium accessible locally to the station or appliance the user is operating. The storage may be internal or peripherally accessible to the network connected appliance. At act 309 if the document is in local storage, then the process resolves back to act 304 where the user may submit the document to the portal through a file share utility or the user may select the document and drag it into a special share folder accessible to the summarizing software running server side.

In one embodiment, the user may copy a shortcut to the document and submit the shortcut to the portal so that the portal may navigate to the document. In the latter aces the appliance hosting the document would have a network address such as a URL or URL and machine address. In a wireless embodiment, the portal may be a corporate server connected to a local WAN and may have access to a local network supporting the hosting machine. There are many possibilities. At act 305, the document is summarized according to a default protocol or customized protocol if the user has pre-configured any preferences.

Still possible is that at act 309, the user determines that the document is not in local storage and therefore must be acquired such as by scanning. In this case, the user acquires in the document at act 310. In some cases, a peripheral scanning device may be made accessible to the summarization software through the appliance operated by the user. An example might be a networked and shared enterprise scanning device capable of independent storing and, perhaps serving scanned documents. In the latter case, the device may have a network address or URL and the service may be authorized to access the scanning device over the network, thus enabled, may also summarize the document at the scanning device. Likewise, the scanning device may be enabled to serve the full text document directly to the portal upon request where it may be summarized at the portal and sent to the authorizing user or otherwise made available to the authorizing user.

At act 306, after the document has been summarized, an option for sending the summarized version of the document to another party or parties may be presented to the user that ordered the summary. The summarized version might be sent by proxy from the portal server or if the summarized version is available on the user's appliance then the user may send the document at the time the document displays on the user appliance. If at act 306 the user decides not to send a copy to another party or parties, then the process may end at act 311. If at act 306 the user decides to send the summary version to one or more parties, then at act 307 the user may click to send launching a default application. The default application may be an email application, a file sharing application, or some other messaging application capable of handling attachments. In one embodiment, a user may authorize the summary document to be distributed by proxy the user providing the recipient address or list of recipient addresses to the portal.

At act 308, the summary document is sent to one or more intended recipients over the network. As described above, the document may be sent directly by the user or by proxy without the user actually taking possession of the document. After the document is distributed, the process may end for that document at act 311. A user may, of course, perform many other document management tasks such as ordering a re-summarization of a document according to an alternate criterion.

It will be apparent to one with skill in the art of network communication between nodes connected to an Internet or other network that the process of this example may include more or fewer acts than illustrated herein without departing from the spirit and scope of the present invention. For example, an optional act for editing a summary version of a full text document may be provided before act 306 if the summarized version is on the appliance of the user and if the summary version is an editable version. In some cases the summaries may be read only depending upon enterprise rules taking into account user preferences. Act 306 may not be performed at all and other tasks not mentioned here may be contemplated without departing from the spirit and scope of the present invention.

Figure 4:
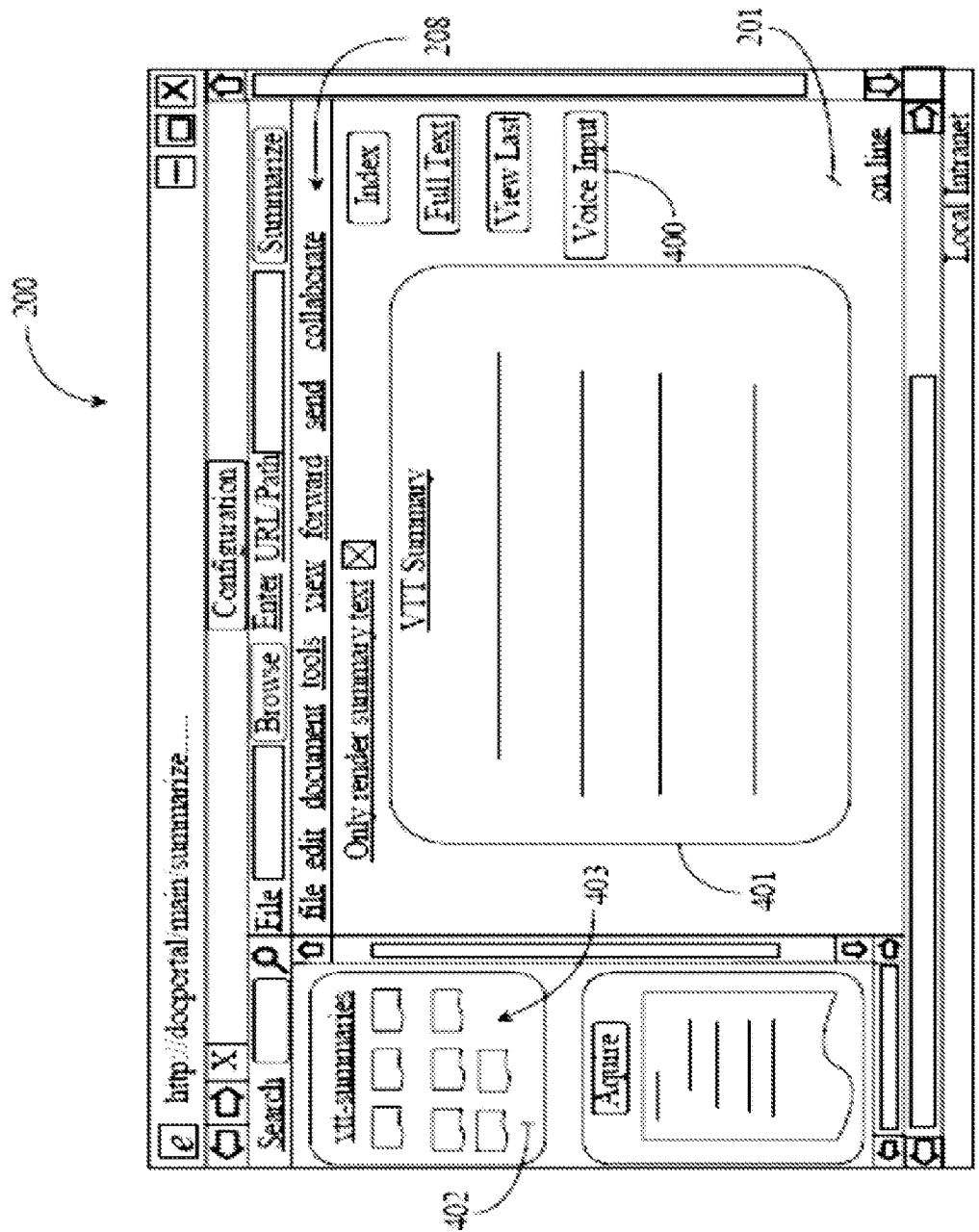
FIG. 4 is an exemplary screen shot of the user interface of FIG. 2 illustrating a voice to text summarization feature according to an embodiment of the present invention.

FIG. 4 is an exemplary screen shot of the user interface 200 of FIG. 2 illustrating a voice to text summarization feature according to one embodiment of the present invention. According to one embodiment of the present invention, a voice to text summarization feature is provided that enables near real-time summarization of documents acquired by voice or audio input and translated to text using voice-to-text software.

Interface 200 contains many of the same elements described with respect to FIG. 2 above. Therefore elements in this example that have already been described and that are not changed from their description in this example shall not be re-introduced. Screen area 201 contains a user actionable icon 400, labeled voice input, that is adapted to enable audio input into voice-to-text software provided on the user appliance or, in one embodiment, at the portal server. The voice-to text software is adapted as is generally known in the art to translate the voice input to text.

In one embodiment, the user appliance is enabled for voice input to text translation. In this case, the voice input may be provided to the appliance anytime while online or offline and a text rendition of the voice input may be created for eventual summarizing by the service of the present invention. In another embodiment, the voice-to-text capability is provided server-side with the summarization software. In this embodiment, the user may call the portal server from the user appliance that is supporting interface 200 or from any a voice-capable appliance associated with and verifiably registered with the service. The user may then provide the voice input to the server. Voice over Internet protocol (VoIP) may be used to carry the voice input to the portal sever. In another variation of this embodiment, the user's voice is recorded and converted to voice extensible markup language VXML or some other voice markup language and then recreated at the server as synthesized voice input that is then translated into text at the server.

In one embodiment text summarizing may begin at the portal server once sufficient voice input has been translated into text at the server and before all of the voice input has been received at the server. In an example of this embodiment, a user may speak into the connected appliance and at the server summarization begins almost immediately. In this case, the summarization text rendered is considered temporary and revisable as more input is received and main themes are added and perhaps reprioritized for summary rendition. Once a user is finished with voice input, a signal that the input stream has completed enables the summarizing engine to finalize the summary version of the full text translation. A user option is presented within screen 201 for only rendering summary text instead of a full text version of the document. In this case, the text rendered that ultimately will not be a part of the summary version is not discarded until the final summary version is decided or finalized. At that point the unneeded text may be discarded.

In this example, a voice-to-text (VTT) summary version of a translated document is displayed in browser window 201 once it has been finalized by the system. A window 402 is provided in the browser sidebar area that is very similar to window 210 described with reference to FIG. 2 above accept that it contains voice-to-text rendered summary documents 403 that were acquired ultimately by voice input. One with skill in the art of voice communications will appreciate that voice to text rendering may be performed over a network, the network separating the source of the voice input from the translation software hosted on a network-connected node.

In one embodiment, the VTT software is local to the user appliance and the text translation is completed locally. In this case, the voice summarization may also begin before the voice input has finished as long as the user is connected to the portal server while the process ensues. In this case, the text rendered may be submitted to the service over the network as it is being rendered and the summary may be performed at the server. In another case, the server has access to a shared folder, or a special component of the VTT software that enables the summarizing engine to cooperate with the local instance of VTT software over the network such that the summary may be performed by the portal server but rendered locally on the user appliance.

In one possible example, a user may attend a lecture equipped with a powerful handheld voice and network-capable appliance whereby the user records the lecture live. The appliance may be connected wirelessly to the portal server hosting the summarization software. As the lecture is recorded, the voice is being translated into text and then being summarized such that when the lecture is complete, the user already has a summary text document highlighting the important parts of the lecture to use as notes. The lecture may be recorded off line, translated locally and then summarized when the user next connects to the portal-based document summarizing service.

Figure 5:
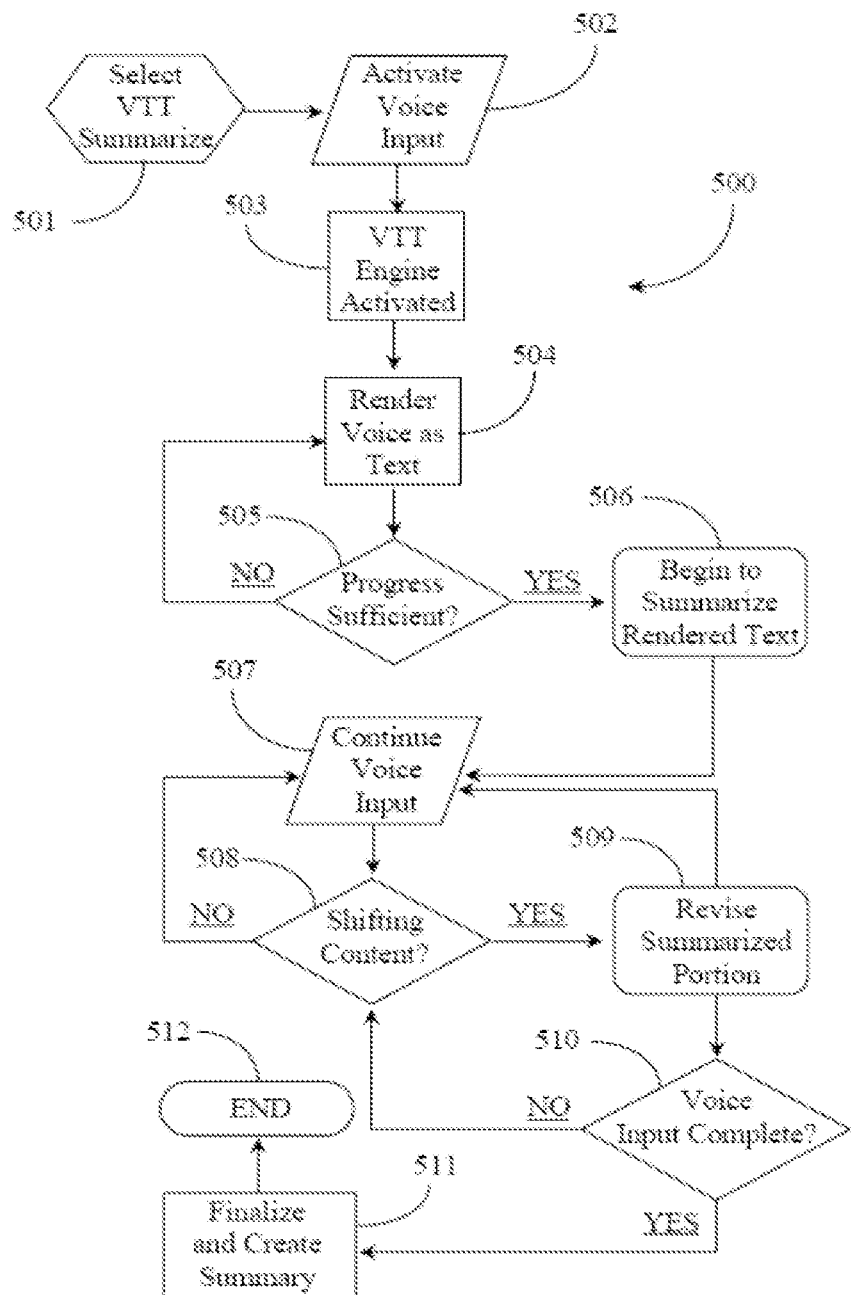
FIG. 5 is a process flow chart illustrating acts for summarizing voice to text in near real time according to an embodiment of the present invention.
Figure 1:
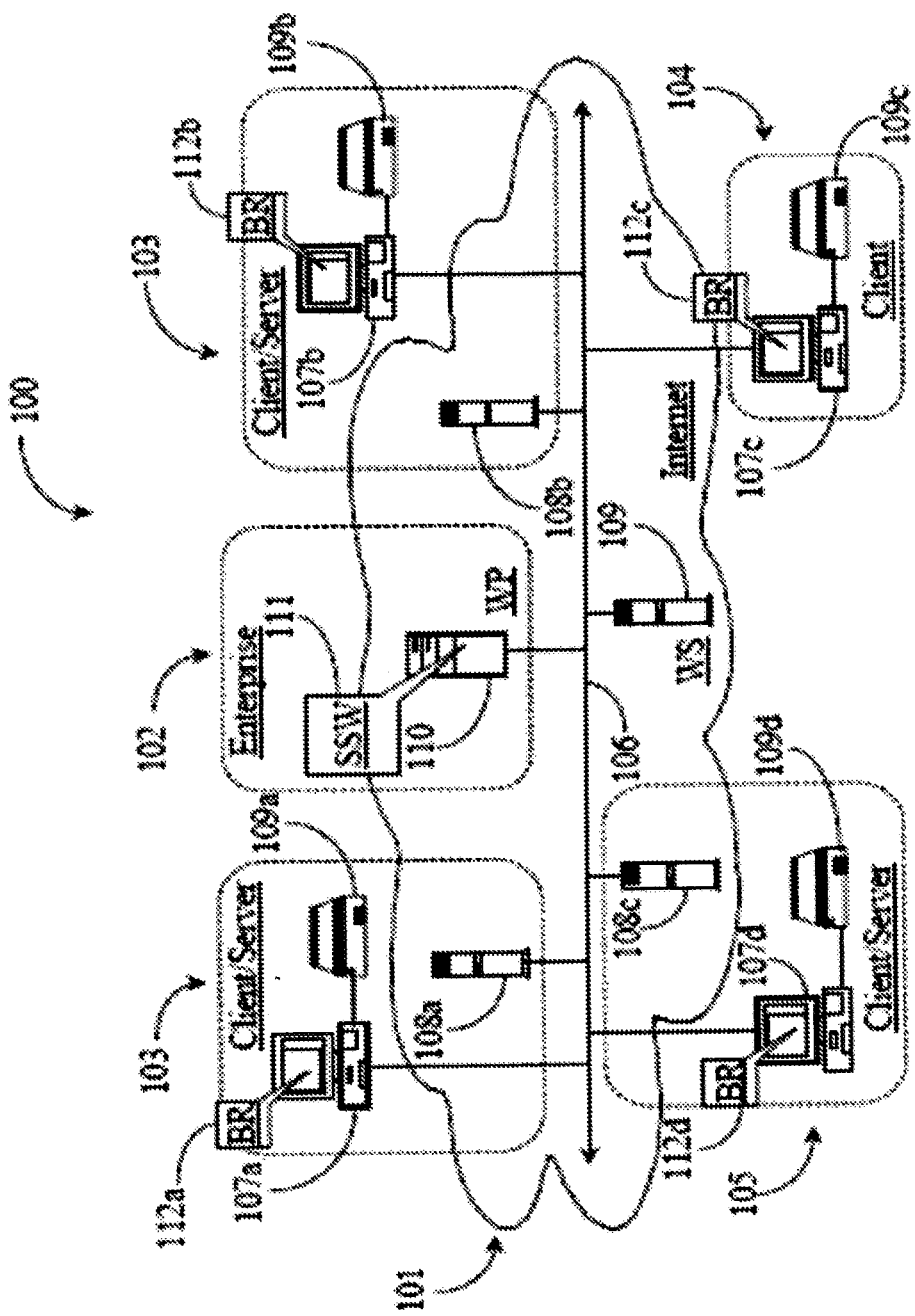
Figure 2:
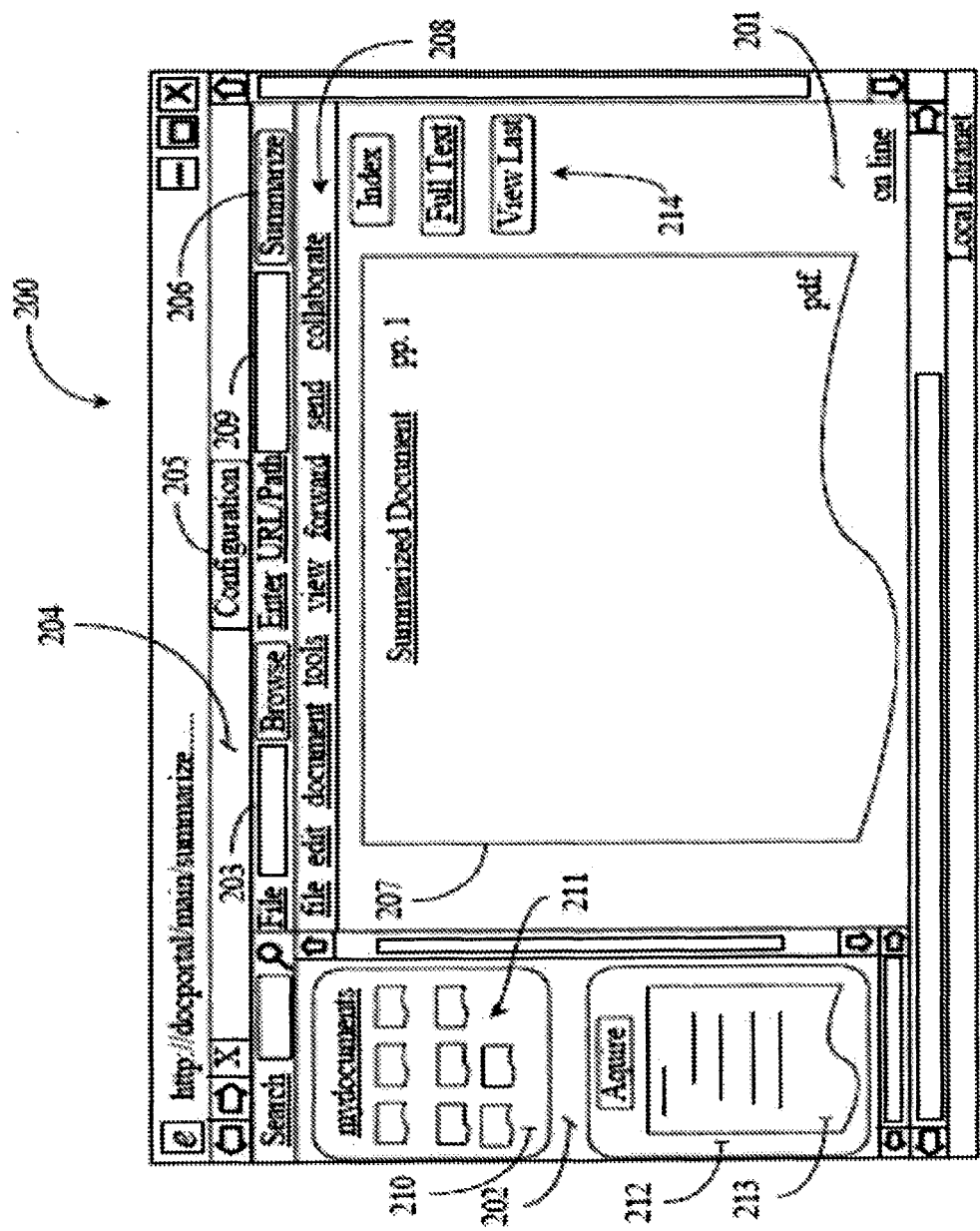
Figure 3:
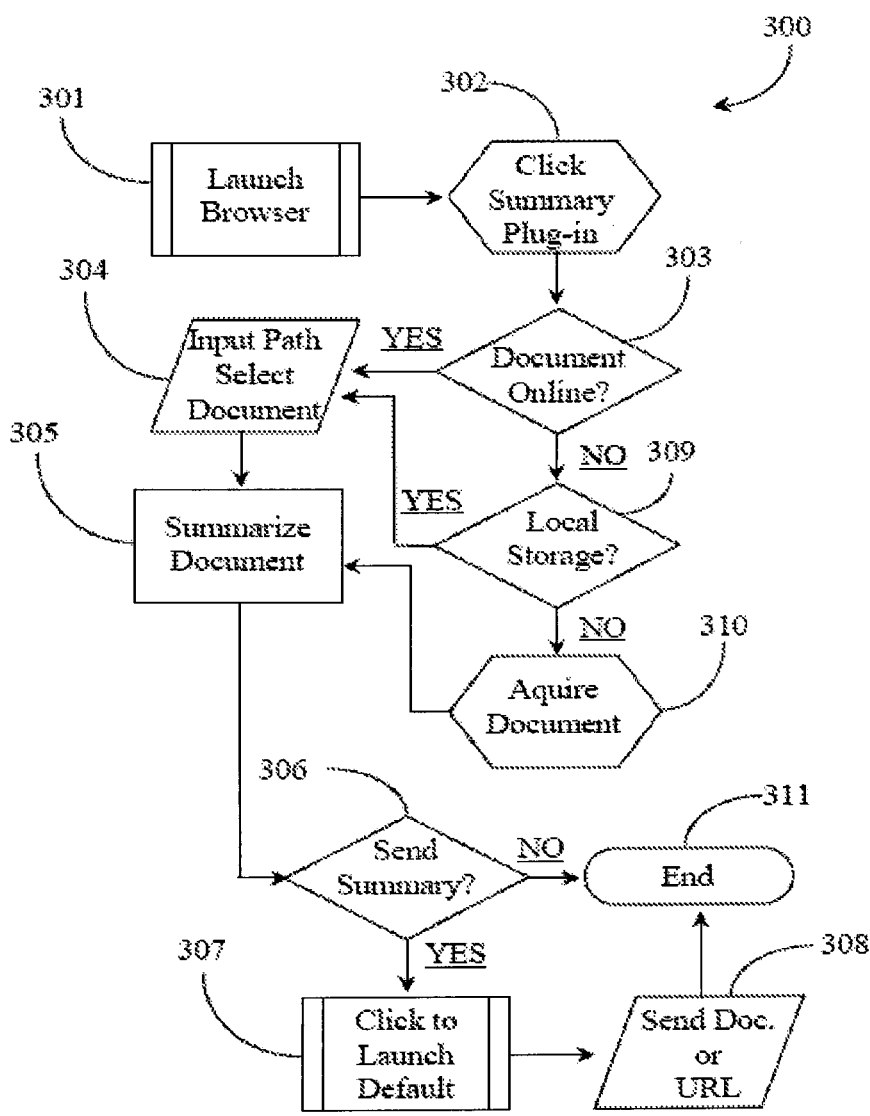
Figure 4:
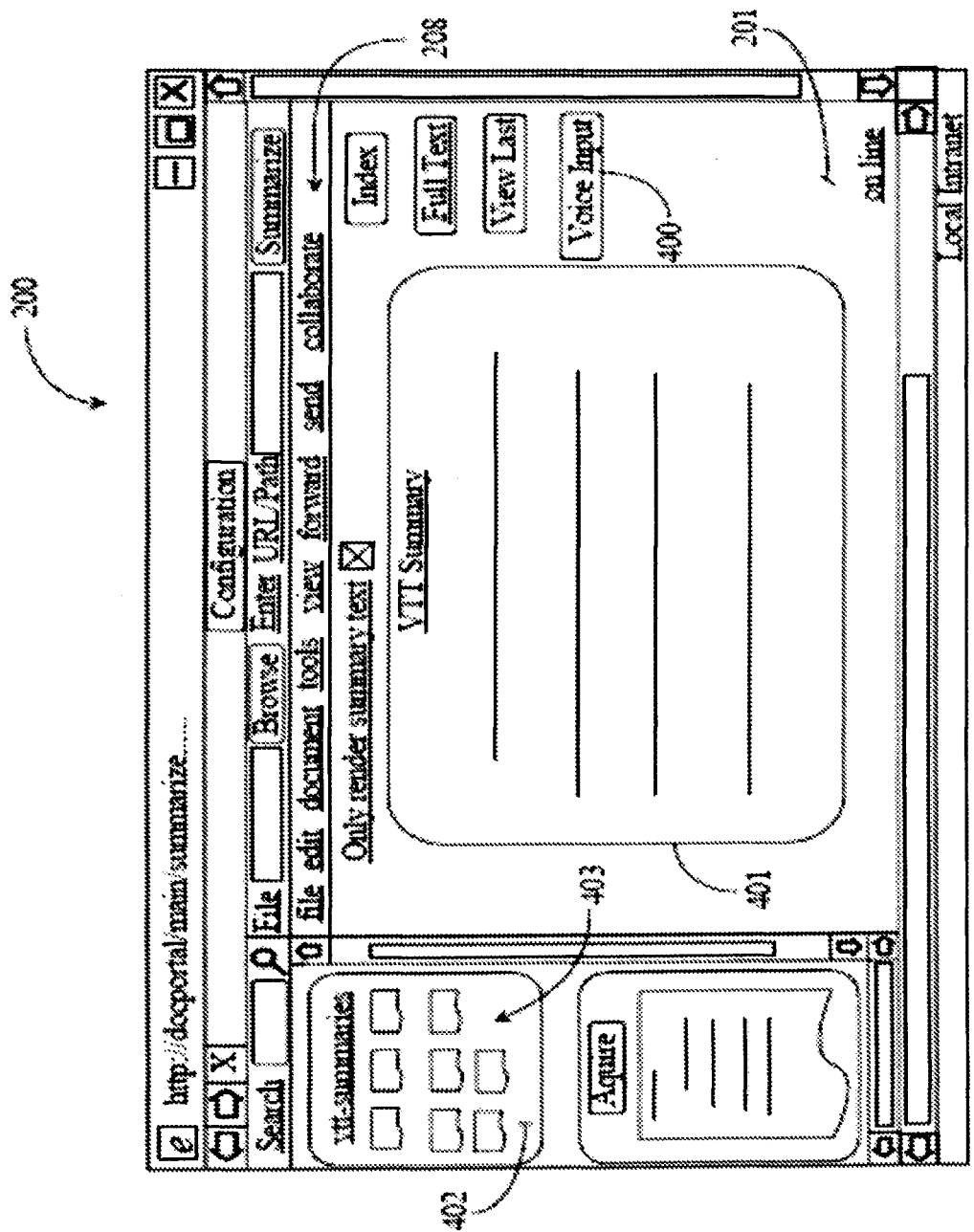
Figure 5:
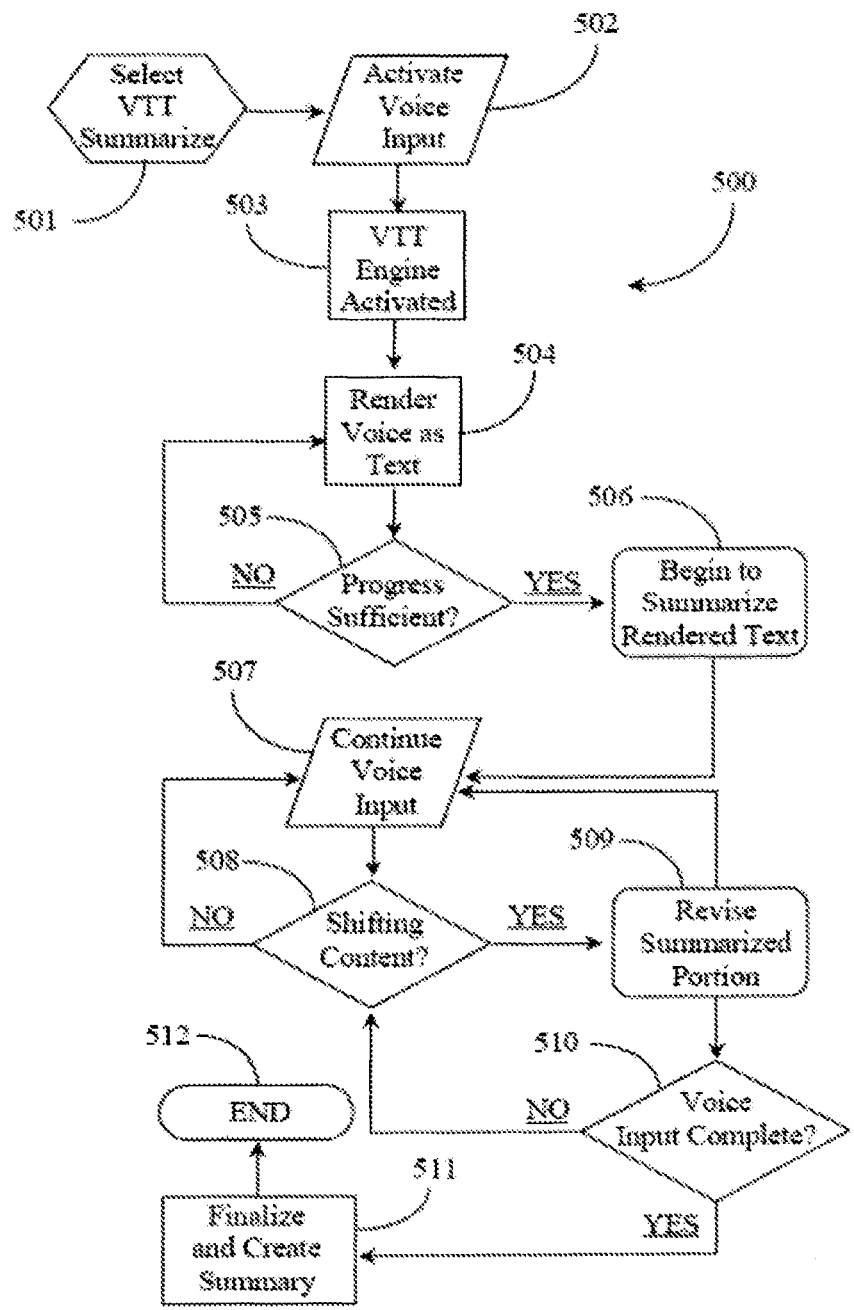

FIG. 5 is a process flow chart 500 illustrating acts for summarizing voice to text in near real time according to an embodiment of the present invention. At act 501, a user selects a voice to text summarizing option, in one embodiment, while connected online to the service of the present invention. At act 502, a voice input mechanism is activated such as a microphone and VTT software. At act 503, a voice to text translation engine is activated to begin translating the voice input and the voice input begins. The VTT software may, in one embodiment, be locally stored and executable from the user appliance.

At act 504, the VTT software begins rendering text from the voice input. At act 505, the service determines whether there is enough rendered text to begin summarization. If progress is not sufficient to begin summarizing, then the process loops back until there is sufficient text to begin. At act 505 once there is sufficient text rendered for summarizing, then at act 506 the document summarization process begins. It is important to note herein that all of the voice input is translated into text, but only some of the translated text will be included in the summary version. The user may elect to render both a full and summary version of the voice input session, or just to render a summary version discarding the text that is not required for the summary.

At act 507 voice input continues while summarization continues. At act 508 a determination is made whether the content being received and parsed for summary is shifting in theme, perhaps requiring some modification or reorganization in the rendered summary text. If not in act 508, then the process loops back to act 507 and then back to act 508 repeatedly until there is some shift in theme or new content that shifts away from the current summarized content. It is important to note herein that it is certainly possible that a summary may be completed without determining a positive at act 508. However, it is highly likely that a summary begun before all of the text has been acquired will need some revision before presentation. For example, with voice input is likely that a salient or important point may be brought up out of order of importance later in the input stream. This feature accounts for that possibility and enables the system to reprioritize the summary points. At act 508, if there is some shifting of content that might warrant a revision of the format of a summary and/or the text reserved for that summary then at act 509, the system may perform a revision or an adjustment to what has already been rendered as text and reserved for summary presentation.

At act 510, the system determines if the voice input has completed for a current session. If not, the process loops back to act 508 to determine if there is any shifting content that may require an adjustment to form, format or text already reserved for the summary document. If at act 510 it is determined that voice input is complete for that session, then at act 511, the summary rendering is finalized and the summary version is created for display, editing and other task considerations. At act 512, the summary document has been rendered so the process may terminate for that session. It is noted herein that the system continually revises its summary form, format and text while voice input continues and different themes, point, and ideas are interpreted until all of the input has been interpreted, at which time the complete summary is available. If at any time the session is interrupted, the summary version may still be created and presented based on the data that has been received.

In one embodiment, a user may add to a summary document by calling it up from storage and initiating a voice session associated with document editing. In this case, the summarizing engine may pick up where it left off and continue to build and revise the summary document as necessary based on the new content added. This particular feature of near-real-time summarization of translated voice is not available with current document summarization applications. By providing prioritization rules that also recognize key words and phrases that are used to describe importance, the engine can create a prioritized and organized summary almost immediately after the voice input session has completed. For example, the phrase "This is a key component" may be interpreted as it is used in association with one or more paragraphs just received. "The most important aspect" might also be recognized as a prioritization key in summarizing so that whatever aspect is associated with the phrase retains the priority in the summary document. The phrase, "A more important aspect is" . . . or "More importantly" . . . can also be integrated into a prioritization scheme to help create more organized summaries than would otherwise be rendered. This feature, although applicable to summaries created only from text documents, is particularly useful for creating summaries from rendered speech as the organization of voice input is typically not as evident as a prepared text document.

It will be apparent to one with skill in the art that a capability of summarizing VTT renderings is not required in order to practice the present invention. However, the feature enables broadening of the types of input that may be summarized not limited to complete text documents. In an additional embodiment, summarizing may be practiced according to the present invention in near real time wherein the input is a typing session. For example, a user may be creating a document while connected to the service in a session so that whenever the user stops typing input, a latest version of the summary may be presented following generally the process of FIG. 5 where the input is text input instead of voice input. There are many possibilities.

The methods and apparatus of the present invention may be practiced using all of or some of the components described herein without departing from the spirit and scope of the present invention. The invention may be practiced over the Internet network and any connectable sub networks including wireless cells having a routed connection to the Internet.

Operative Features of Automated Summarizer Systems:
1. Overview

This abstracting feature provides an automatic condensation and readable outline of text material. The instant invention provides methods for manipulating and accessing texts in arbitrary subject areas in accordance with user needs. In particular, methods are given for determining text themes, traversing texts selectively, and extracting summary statements that reflect text content.

The system analyzes text material and the extracts key words and phrases from text paragraphs. The content is automatically classified by indexing methods, which assign a weight to each term or phrase. Vector-space diagrams and clustered centroids are constructed based on the measurement of word frequencies and co occurrences. A hierarchy of key words and phrases is established. Clustered centroids with links to related key words and phrases are contracted. The process is aided by additions which classify and collate key terms by syntax, synonyms and semantics. The entire process is also improved by relevance feedback provided by the user in which the content of the analysis is refined and reprocessed. The system also has provision for degrees of precision required by the user and is adjusted for a general versus a more detailed outline of the key subject matter in the text material.

Automated vector space systems information retrieval systems alone or combined with parsing or syntactical programs are used to abstract and produce an outline of text material. In the vector space model, sets, or vectors, of terms, represent text. A term is typically a word, a word stem, or a phrase associated with the text under consideration. In principle, the terms are chosen from a controlled vocabulary list or a thesaurus derived directly from the texts under consideration. Collectively, the terms assigned to a particular text represent text content.

Because the terms are not equally useful for content representation, a term-weighting system is used that assigns high weights to terms deemed important and lower weights to the less important terms. A powerful term-weighting system of this kind is the well-known equation fxl/fr (term frequency times inverse collection frequency), which favors terms with a high frequency (f) in particular subject matter.

The terms used to identify the text items are extracted from the text material after elimination of common words and removal of word suffixes. All texts or text queries are represented by weighted term vectors of the form $D=(d_{i1}, d_{i2} \ldots d_{ik})$, where $d_{ik}$ is the weight assigned to term k in document D and a similarity measure is computed between pairs of vectors that reflects text similarity. Thus, given document $D_i$ and query Q (or sample document $D_j$), a similarity computation produces a ranked list of key terms and phrases in decreasing order of similarity with a query.

2. Text Decomposition and Structure

The system can manage text containing heterogeneous subject matter of varying length, including text sections, paragraphs, groups of adjacent sentences, and individual sentences. Long texts are broken down into smaller text passages.

When analyzing large and diverse subject matter, the combined global and local similarity computations improves abstracting effectiveness over the use of global vector similarity measurements alone. An additional improvement is obtainable by use of the passage identification that identifies text excerpts in addition to full texts. When text passages are available for processing, similarity measurements are computed between texts and text excerpts, text relation maps are generated showing text similarities that exceed a particular threshold value.

3. Text Theme Identification

A text theme is defined as a specific subject that is discussed in some depth in a particular text or in a number of related texts. Themes represent centers of attention and cover subjects of principal interest. The identification of text themes is useful to obtain a snapshot of text content.

Text analysis methods identify text themes using text relation maps as inputs to a clustering process that identifies groups of text excerpts that are closely related to each other but also relatively disconnected from the rest of the text. In this process, first triangles in the relation map are recognized (a triangle is a group of three text excerpts, each of which is related to the other two to a degree that is above the stated similarity threshold). A centroid vector is then constructed for each triangle, as the average vector for the group of three related items. Finally, triangles are merged into a common group (theme) whenever the corresponding centroids are sufficiently similar (that is, when the pairwise centroid similarity exceeds a stated threshold). A global centroid vector that is constructed as the average vector of all text excerpts included in the theme represents each theme.

An alternative theme generation method is to build a text relation map with the use of a high similarity threshold (where the number of linked text excerpts is small). Each disconnected component of the map, consisting of groups of highly related text excerpts, is then identified with a particular theme.

When text relation maps are used as the main input, themes are generated at various levels of detail. The larger the text excerpts used for text grouping purposes, the wider is the scope of the corresponding themes. Contrariwise, when sentences and other short excerpts are used in the grouping process, the theme coverage is normally narrow. By suitable variation of the scope of the theme generation process, it is thus possible to derive a smaller number of broader themes or a larger number of narrower themes.

4. Selective Text Traversal

Text skimming methods are used which are capable of concentrating on text passages that are of immediate interest. These skimming operations are used both for selective text traversal, in which only text passages of special importance are actually retrieved or read, and for text summarization, in which summaries are constructed by extraction of selected text excerpts.

In selective text traversal, starting with a text relation map and a particular text excerpt of special interest, three different strategies are used: (i) the path covers many of the central nodes, which are defined as nodes with a large number of links to other nodes of the map. (ii) the path uses text excerpts located in strategic positions, for example, the first paragraphs in each text section or the first sentences in each paragraph. (iii) the path uses the link weight as the main path generation criterion by starting with the desired initial node and choosing as the next node the one with maximum similarity to the current node. This last strategy is known as a depth-first search.

When individual text excerpts are selected for path formation or summarization, a number of factors receive special attention which includes:

a) coherence of the resulting text, i.e., the ease with which the text can be read and understood
b) exhaustive of coverage of the final text, i.e., the degree to which all the main subject areas are covered
c) text chronology, i.e., the accuracy with which timing factors are recognized
d) The amount of repetition in the selected text excerpts Text chronology is often maintained by the use of only forward-pointing paths and backtracking is not allowed (if a particular paragraph is included in a path, no other text excerpt appearing earlier in the same text can appear in the same path).

Text coherence is used as the main criterion, and forward depth-first paths are used in which each chosen text excerpt is linked to the most similar text excerpt. In a depth-first path, each chosen excerpt is closely related to the next one to minimize the chance of poor transitions between selected paragraphs.

A depth-first path provides a coherent body of information in practically every subject environment. If there is repetition of subject coverage in two or more excerpts in a given path, repeated text passages are eliminated by a sentence-sentence comparison, and removal of duplicate occurrences of sufficiently similar sentences. Alternatively, a shorter excerpt replaces a larger text excerpt in a path with large similarity to the previous text element. An additional method of reducing the path size is to use theme generation methods to obtain text excerpts.

5. Text Summarization

By judicious text extraction methods, collections of text passages are identified that provide adequate coverage of the subject areas of interest. Homogeneous text relation maps produce a good summary using the longer text-traversal paths in chronological (forward) text order.

When the text relation map is substantially disconnected, the text-traversal process does not produce comprehensive summaries. In that case, adequate subject coverage is generally obtained by taking the initial paragraph of the document under consideration, followed by the best paragraph for each text theme.

When paths and themes are used for text summarization, longer summaries are obtained compared to text relation maps generated with low similarity thresholds. This produces denser maps with large number of text links. The themes partly overlap and the summaries obtained by text extraction are discursive. Contrariwise, when high similarity thresholds are used, the maps and themes are disconnected and the summaries are sparser.

Representative computer programs that are useful for automated abstraction of the instant invention include but are not limited to programs which use vector space diagrams and weighted relevance terms, probabilistic and lexical programs. The preferred system comprises consolidation features of these and other programs. Any comprehensive automated text abstraction system, which produces an acceptable outline, is useful in the present application including but not limited to any combination of the above programs. Features of several statistical systems may be adapted for use in the text abstraction function of the present invention.

The vector space system is a fully automatic text processing system which uses synonym dictionaries, hierarchical arrangements of subject identifiers, phrase-generating methods in order to obtain the content identifications useful for the abstracting process. The system does not rely on manually assigned keywords or index terms for the identification of text material and search requests, nor does it use primarily the frequency of occurrence of certain words or phrases included in the text.

The following systems incorporated into the vector space program for text analysis are of principal interest:

a) A system for separating English words into stems and affixes which can be used to reduce incoming texts into word stem form.

b) A synonym dictionary or thesaurus which replaces significant word stems by concept numbers, each concept representing a class of related word stems.

c) A hierarchical arrangement of the concepts included in the thesaurus which makes it possible, given any concept number, to find its "parent" in the hierarchy, its "sons, "it's "brothers," and any of a set of possible cross references.

d) Statistical association methods which compute similarity coefficients between words, word stems, or concepts, based on co-occurrence patterns between these entities in the sentences of a text or in the texts of a collection; associated items can then serve as content identifiers in addition to the original ones.

e) Syntactic analysis methods which permit the recognition and use, as indicators of text content, of phrases consisting of several words or concepts where each element of a phrase must hold a specified syntactic relation to each other element.

f) Statistical phrase recognition methods which operate like the preceding syntactic procedures by using a reconstructed phrase dictionary, except that no test is made to ensure that the syntactic relationships between phrase components, are satisfied.

g) Request-subject matter matching procedures which make it possible to use a variety of different correlation methods to compare analyzed texts with analyzed requests, including concept weight adjustments and variations in the length of the text being analyzed.

Text material is processed by the system without any prior manual analysis using one of several hundred automatic content analysis methods; subject matter which most nearly matches a given search request is identified. Specifically, a correlation coefficient is computed to indicate the degree of similarity between key terms and phrases and each search request, and each is ranked in decreasing order of the correlation coefficient. Then a cutoff is selected, and key text terms and phrase above the chosen cutoff are withdrawn from the file and turned over to the user as answers to the search request.

Individual Components of the Automated System

1. Term Weighting

The standard text content vector matching methods is used to identify the subject matter whose word stem vectors are sufficiently similar to the query vectors. The system retains a large number of content indicators, and the larger number and greater diversity of the terms compensate for the lack of precision in the term selection. Two main operations are needed to transform the word stem vectors into useful term vectors:

a) Term weight is assigned to each term reflecting the usefulness of the term in the text material under consideration b) Terms whose usefulness is inadequate as reflected by a low term weight are transformed into better terms.

The term weighting task is separated into two parts:

a) the term characteristics within the text material b) the term function in the remainder of the text material.

Terms that exhibit high importance in the subject matter to which they are assigned, are those that that show high occurrence frequencies in the text material. At the same time, the best terms are able to distinguish the text subject matter to which they are assigned from the remainder of the subject matter. The importance of a given term in specific subject matter is conveniently measured by the frequency of occurrence in the text. The usefulness of the term in the subject matter as a whole is reflected by the term discrimination value, or by an inverse function of the subject matter frequency (that is, the number of subject areas to which the term is assigned).

Terms with a low weight according to expression are deleted from the indexing vocabulary. The deletion of broad, high frequency terms causes losses in recall, and the elimination of specific, low frequency terms impairs precision. Ranked retrieval and relevance feedback are implemented in binary indexing systems where the index terms are either present or absent from the subject matter and query vectors. However, the text material is easier to rank when weighted terms are assigned to the queries, and to the key terms in the text material, because a composite query subject matter similarity coefficient is computed for each query-text subject matter pair based on the weights of matching query-key terms.

In the present system, text subject matter is represented by a vector of terms and each vector is stored as a complete entity, the use of term weights presents no conceptual problem, because a term weight is simply listed with each term identification in the corresponding term vector. In binary inverted file systems, the term weighting information is included in the various inverted lists.

To compute the cosine measure of expression for the inverted file (binary) system, an additional normalization factor consisting of the sum of the squares of all term weights included in each subject matter and each query is needed. This makes it necessary to provide for each subject matter a certain factor. These factors are computed in advance for each subject matter and stored in a special "subject matter length" file, which is accessed for all subject matter that has a non-zero similarity with the query. The expanded inverted subject matter reference lists together with the subject matter length file permit the computation of the full cosine similarity measure for all terms sharing one or more terms with the query, followed by the ranking of subject matter in decreasing order of the query-text material similarity.

Finding a proper term weighting scheme is critical in term-based retrieval since the rank of the subject matter is determined by the weights of the terms it shares with the query. One popular term weighting scheme, known as tf.idf, weights terms proportionately to their inverted subject matter frequency scores and to the subject matter frequencies (tf). The subject matter length usually normalizes the in-text frequency factor, that is, it is more significant for a term to occur in a short 100-word abstract, than in a 5000-word article. The following terms and principles are used:

a) Terms that occur fairly frequently in a text, which supports only general-type queries (e.g., "all you know about X").

b) Attaching low weights to infrequent, highly specific terms, such as names and phrases, whose only occurrences in the subject matter are often decisive for relevance.

The weighting scheme is altered so that the phrases (but not the names) are more heavily weighted by their idf scores while the text material frequency scores are replaced by logarithms multiplied by sufficiently large constants. In addition, the top N highest-idf matching terms (simple or compound) are counted.

The selection of a weighting formula is partly constrained by the fact that text-length-normalized tf weights are precomputed at the indexing stage and are not altered without re-indexing of the entire database. The maximum number of terms on which a query is permitted is restricted to match the text subject matter to N highest weight terms, where N can be the same for all queries or may vary from one query to another. This is not the same as simply taking the N top terms from each query. Rather, for each text subject matter for which there are M matching terms with the query, only those which have highest weights, will be considered when computing the text subject matter score. Moreover, only the global importance weights for terms are considered (such as idf), while either taking a log or replacing them with a constant suppresses local key term frequency. Changing the weighting scheme for compound terms, along with other minor improvements (such as expanding the stop word list for topics, or correcting a few parsing bugs) can lead to an overall increase of precision.

c) Derivation of the Relevance Number

A judgment is made on each term on a probabilistic basis, i.e., to assert that a given term may hold with a certain degree or weight. Given the ability to weight index terms, one can characterize more precisely the information content of text material. The indexer assigns a low weight such as 0.1 or 0.2 to a term, rather than to say that the term does not hold for the text. Conversely, the indexer assigns a weight of 0.8 or 0.9 to a term, rather than to say that it definitely holds for the text subject matter. Thus, given weighted indexing, it is possible to more accurately characterize the information content of the text. The notion of weighting the index terms that are assigned to subject matter and using these weights to compute relevance numbers is basic to the technique called probabilistic indexing.

4. Vector Generation

The text material indexing process or the method is used to construct the text material vectors. The basic function of an indexing system is the segregation of the subset of text material relevant to a query from the remainder of the subject matter. Preferably, all the relevant items might then occur in one or more key term clusters, whereas the nonrelevant items are placed in separate clusters. Such an ideal subject matter space is constructed by assigning to the relevant text set the terms utilized by the user to formulate the corresponding search requests.

In practice, it is not possible to find a single clustering which is ideal for all subject areas and all users, even given full relevance information in advance. Furthermore, new text material must necessarily be processed without the use of term relevance information. The best method is to use index terms capable of distinguishing each particular key term from the remainder of the subject matter. This is achieved by using as a controlling criterion the frequency of each term in the subject matter. The term discrimination theory indicates that the preferred terms are medium-frequency terms that are assigned to a few text subject matter but not to the rest of the subject matter.

In the present system, the text material (or the text of the query statements obtained from the user) is analyzed automatically. Terms whose frequency is neither too large nor too small are incorporated directly into the query vectors for indexing purposes. Terms whose frequency in text material exceeds a given threshold are considered too broad and unspecific and are rendered more specific by being combined with other terms into term phrases before assignment to the subject matter and query vectors. On the other hand, terms with a very low frequency covering one or two areas of subject matter are considered too specific; they are broadened by grouping them into term classes of the kind found in a thesaurus of terms. The thesaurus class identifiers are then incorporated into the term and subject matter vectors instead of the individual rare terms.

a) Vector Processing Model

The vector-processing model is implemented as follows: Indexing terms are regarded as the coordinates of a multidimensional information space. Text material (key phrases and terms) and queries are represented by vectors in which the element, denotes the value of the each term, with the precise value of each such element being determined by the particular term weighting scheme that is being employed. The complete set of values in a vector describes the position of the text material or query in the space, and the similarity between a text material and a query (i.e., their separation in the space) is then calculated by comparing their vectors using a similarity measure such as the cosine coefficient.

This simple, geometric interpretation of retrieval provides a unifying basis for a very wide range of text discrimination operations, including indexing, relevance feedback, and subject matter classification. Indexing involves the assignment of content descriptors to text material in such a way that the latter is readily distinguished from each other by a query.

Indexing in this model separates subject matter from each other in the multidimensional term space. The word-frequency information, which determines the selection of the output sentences, comes entirely from within the text and these relative frequencies are used as criteria for scoring and selecting sentences. Two classes of words are determined i.e., generic words and discriminating words. Generic words are those common to many of the terms in the cluster, and therefore the words whose co-occurrences cause the map structure. Discriminating words are those, which indicate some special purpose or motive of a text material. The effectiveness of a potential indexing term is assessed by its discrimination value, which quantifies the extent to which the use of that term leads to the text subject matter in a database being separated from each other. There is an interactive component of the program wherein the user can provide cognitive input on generic and discriminating words according to his perception of the significance of the cluster, which is known as relevance feedback.

b) Vector Representation and Similarity Computation

The system is characterized as follows:

1) uses fully automatic indexing methods to assign content identifiers to text material and search requests 2) collects related words and phrases into common subject classes, making it possible to start with specific items in a particular subject area and to find related items in neighboring subject fields 3) identifies the key words and phrase by performing similarity computations between stored items and incoming queries, and by ranking the selected items in decreasing order of their similarity with the main subject matter (4) includes automatic procedures for producing improved abstract statements based on information obtained as a result of earlier excerpting operations.

Each term or phrase is represented by a vector of terms. Each term or phrase or collection of terms and phrase in text material represents the weight or importance of the term. By "term" is meant some form of content identifier such as a word extracted from a text, a word phrase, or an entry from a term thesaurus. A given text collection is then represented as an array, or matrix of terms where each row of the matrix is represented and each column represents the assignment of a specific term to the subject matter of the text. Positive term weights above zero are chosen for terms actually assigned to the subject matter of the text c) Automatic Indexing Tools The indexing system is based on language analysis tools as follows:

1. Synonym dictionaries, or thesauruses, are used to group the individual terms into classes of synonymous or related terms. When a thesaurus is available, each original term is replaced by a complete class of related terms, thereby broadening the content description.

2. Hierarchical term arrangements are constructed to relate the content terms in a given subject area. With such preconstructed term hierarchies, the standard content description is "expanded" by adding to a given content description hierarchically superior (more general) terms as well as hierarchically inferior (more specific) terms.

3. Syntactic analysis systems serve for the specification of the syntactic roles of the terms and for the formation of complex content descriptions consisting of term phrases and larger syntactic units. A syntactic analysis system is used to supply specific content identifications and it prevents confusion between compound terms.

4. Semantic analysis systems supplement the syntactic units by using semantic roles attached to the entities making up a given content description. Semantic analysis systems utilize various kinds of knowledge extraneous to the text, often specified by preconstructed "semantic graphs" and other related constructs.

The stepwise process is as follows:

1. The individual words that make up an abstract or a query text are first recognized.

2. A stop list, comprising a few hundred high-frequency function words, such as "and," "of," "or," and "but," is used to eliminate such words from consideration in the subsequent processing.

3. The scope of the remaining word occurrences is broadened by reducing each word-to-word stem form using relatively simple suffix removal methods together with special rules to take care of exceptions.

4. Following suffix removal, multiple occurrences of a given word stem are combined into a single term for incorporation into the text material or query vectors.

5. Correlation Between Indexing Performance and Space Density

In this process, certain word stems are extracted from text material and weighted in accordance with the frequency of occurrence of each term in text material a method known as term-frequency weighting. Recall-precision graphs are used to compare the performance of this standard process against the output produced by more refined indexing methods. Typically, a recall-precision graph is a plot giving precision figures, averaged over a number of user queries, at ten fixed recall levels, ranging from 0.1 to 1.0 in steps of 0.1.

The better indexing method produces higher precision figures at equivalent recall levels. One of the best automatic term weighting procedures consists of multiplying the standard term frequency weight by a factor inversely related to the subject matter frequency of the term (the number of subject matter in the collection to which the term is assigned). A term weighting system assigns the largest weight to those terms, which arise with high frequency in individual terms, but are at the same time relatively rare in the text material as a whole.

Decreased performance implies increased space density and is tested by carrying out term weighting operations inverse to the ones previously used. Specifically, since a weighting system in inverse subject matter frequency order produces a high recall-precision performance, a system which weights the terms directly in order of their term frequencies (terms occurring in a large number of areas in a text receive the highest weights) should be correspondingly poor.

6. Probabilistic Models

Most probabilistic retrieval models incorporate information about the occurrence of index terms in relevant and non-relevant subject matter. Based on a probabilistic model, strategies are proposed for the initial outline and an intermediate outline. The intermediate outline is useful substitute for an outline based on relevance feedback search.

Probabilistic models of abstract generation provide a theoretical basis for methods, which have previously relied on heuristics. A major assumption made in these models is that relevance information is available. Classifying key terms on the basis of the query and presenting them to the user for judgment as relevant or non-relevant obtain partial relevance information. This process of obtaining relevance information and using it in a further search is called relevance feedback which is the information about the relevant text material that is the most important since the characteristics of the non-relevant subject matter is approximated by those of the entire collection. For relevance feedback to be effective, the initial outline using the query should present a relevant outline to the user. The application of probabilistic models to the initial search is used to improve the outlining effectiveness of this search.

Regarding methods for improving the initial search, the simplest approach to this search is to rank the subject matter and key terms according to the number of index terms in common with the query (sometimes called a coordination level search). Terms are weighted using inverse subject matter frequencies and clusters of key terms are searched rather than the key terms themselves. The same probabilistic model for the initial search is used for the relevance feedback search.

The second stage depends on the relevance information obtained in the first stage by presenting retrieved subject matter to the user. The initial search should provide relevant terms at the top end of the ranked list of terms. This leads to the associated problem of methods for dealing with queries, which do not elicit key terms at the top of the ranked list. The outline process is therefore a two-stage application of a probabilistic model where the main difference between the stages is the increase in the amount of relevance information available.

A probabilistic model of abstracting is thus applied to two searches, which can occur before relevance feedback, the initial search and the intermediate search. For the initial search there is no relevance information available whereas for the intermediate search the relevance information is derived from the top-ranking terms or clusters of the initial search. This combination match performed better than the simple match, the match using inverse subject matter frequency weights and the match using the cosine correlation. The combination match is the most effective initial search. A cluster search is a good alternative initial search strategy.

Each subject matter is assumed to be described by a binary vector $x=(x_1, x_2, \ldots x_y)$ where $x_i=0$ or 1 indicates the absence or presence of the ith index term. A decision rule can be formulated by which any subject matter can be assigned to either the relevant or the non-relevant subject matter for a particular query. The rule is to assign a subject matter to the relevant set if the probability of the subject matter being relevant given the subject matter description is greater than the probability of the subject matter being non-relevant, i.e., if:

$$P(\text{Relevant}/x) > P(\text{Non-Relevant}/x)$$

A more convenient form of the decision rule is found by using Bayes' theorem. This new rule when expressed as a weighting function is:

$$g(x)=\log P(x/\text{Relevant}) - \log P(x/\text{Non-Relevant})$$

This means that instead of making a strict decision on the relevance of a key term, the terms are ranked by their value such that the more highly ranked a subject matter is, the more likely it is to be relevant.

The probabilities P (x)Relevant) and P(x/Non-Relevant) are approximated in a number of different ways. If the assumption is made that the index terms occur independently in the relevant and non-relevant key terms then:

P(x)/Relevant)=P(x/Relevant)P($x_2$/Relevant)...P($x_y$/Relevant) and similarly for P(x/Non-Relevant). Let $pi = P(x_i=1/\text{Relevant})$ and $q_i = P(x_i=1/\text{Non-Relevant})$ where these are the probabilities that an index term occurs in the relevant and non-relevant sets respectively.

The second term of this function is constant for a given query and will not affect the ranking of the subject matter. The first term involves a summation over all the terms in the text but this summation is usually restricted to just the query terms. This function is then equivalent to a simple matching function between the query and the subject matter wider query term 1 has the weight $\log p_i(1-q_i)/(1-p_i)q_i$. If the terms are assumed to be not independently distributed then more accurate approximations for P(x/Relevant) and P(x/Non-Relevant) are possible.

When the model is applied to a retrieval system, the binomial parameter p is estimated from the sample of relevant subject matter obtained by use judgments and q is usually estimated from the total subject matter. The effect of this assumption is seen by splitting the first term of g (x) into two parts.

Where no relevance information is available, the best function for ranking the subject matter is a combination of a simple match and a match using inverse subject matter frequency weights. This function is referred to as the combination match.

Another possible application of the model is to introduce an intermediate search between the initial search and the relevance feedback search. The subject matter at the top of the ranking produced by the initial search has a high probability of being relevant. The assumption underlying the intermediate search is that the subject matter is relevant whether in actual fact they are or not. Therefore before asking the user to give relevance judgments a search is performed in which the top few subject matters are used to provide estimates for $p_i$. The intermediate search would be most useful if the process of interacting with the user to obtain relevance judgments is very expensive or even impractical.

Another application arises when the query does not retrieve any relevant subject matter at a particular cutoff. In this case, the user has judged all the retrieved subject matter as being non-relevant whereas the intermediate search is performed before the user looks at any of the subject matter.

Thus the combination of match, the intermediate search and the negative feedback search are all based on the same probabilistic model and in each case no relevant subject matter is known. The differences in the searches are in the method of estimating the p, values.

7. Parsing: Automatic Abstract Generation by Linguistic Processing

Computer generates abstracts by extracting from text material those sentences, which describe the central subject matter and findings of the paper. Sentences are selected on the basis of various statistical, grammatical, positional and presentational clues. Concatenations of extracted sentences show a lack of cohesion, due partly to the frequent occurrence of anaphoric references. Sentences, which contain non-anaphoric noun phrases and introduce key concepts into the text, are worthy of inclusion in an abstract. In this process key concepts are identified which faithfully reproduce the essence of the text material. The text processing used to identify these anaphors, which enhance the sentence selection criteria, is described. Text processing is necessary to identify these anaphors so that their effects are neutralized in the sentence selection criteria. The sentence selection and rejection rules are coupled to automatic abstracting techniques described above.

Anaphora is often used only to designate pronouns as they operate within the sentence. Coherent texts comprise sequences of sentences or other linguistic units each with a discernable relation of meaning to its predecessors. Successive sentences either discuss further properties of a real or abstract object, related objects, or events instigated or affected by the objects.

Definite noun phrases (DNP) are phrases like the motor, which can refer over long distances. DNPs may involve reference to objects introduced into the discourse by quite different noun phrases (a Ford car, the vehicle or the engine etc). DNPs can also refer back to events, "X bought the purchase". The objective is to analyze texts to find chains of DNPs and to ascertain how far back in the text one should be expected to look to resolve each DNP. These sentences fail to be propositions. It is assumed that the anaphors must be resolved within the boundaries of a proposition: thus the aim is to identify the points in the text where new propositions begin.

Grammatical criteria are used to identify points in the text where new concepts are introduced. Those sentences, which introduce important concepts and do not refer to discourse entities previously mentioned in the text are candidates for extraction. Thus, a new criterion for selecting isolated sentences for abstracting is adopted.

The outcome is a set of heuristics to identify non-anaphoric noun phrases and the selection of sentences containing these key concepts for abstracting. Summaries of those which form part of the sentence selection or rejection criteria are presented here. Text processing, which is necessary to exploit the grammatical clues and text structure in abstracting, is presented.

a) Sentence Selection Rules

The methodology represents an extension of the sentence selection, extraction and rearrange methods. The system is constructed out of two rule sets, the first of which is a selective tagger and parser derived from a similar approach. The tagger assigns grammatical tags to each word in the text according its morphological structure using criteria on the kinds of ending (or suffixes) words will take. The parser is used to disambiguate the tags and in the process structures the sequence of these word categories according to a grammar.

The second rule set identifies two classes of sentence in the source text for inclusion in the abstract. The sentence selection/rejection rules make use of and develop indicator phrases and clue words. Some of the rules specify rhetorical constructs indicating the relative salience of sections of text (conclusions have high salience, references to previous work have low salience and so on). These are mostly concerned with sentence rejection. Other rules rely on logical and linguistic hypotheses about text structure, and exploit more narrowly grammatical criteria to identify points in the text where new concepts are introduced. Sentences lacking anaphors and not introduced by rhetorical connectives frequently introduce key information into a discourse. These two rule sets, to identify non-anaphoric sentences and to identify sentences containing an indicator phrase, are the only sentence selection rules used in the system. Further rules, as stated above, are concerned with the elimination or rejection of sentences. The sequence of the sentence selection rules is based on an adaptation of Definite Clause Grammar (Pereira and Warren) rules are described in Black and Johnson.

Non-anaphoric sentences introduce key concepts into the text. A sentence is rejected if it is introduced by a connective or by an anaphoric prepositional phrase. These sentences are dependent on others in the text and should not be included. This also applies to a connective, which occurs before or just after the main verb. For example, the following sentence would be rejected because the connective "however" appears just after the verb indicating that the statement relies on some previous sentence for its full interpretation.

This approach to sentence selection depends on the ability to recognize anaphoric noun-phrases in a sentence and also any rhetorical structures. Most of the rules are implemented without recourse to real parsing. However, parsing requires that definite noun-phrases (DNPs) be recognized. As such, it requires that text be unambiguously tagged to permit noun-phrase parsing.

The system defines an implementation of the sentence selection and rejection rules as a series of text filters, using the tagger and parser developed for this purpose. The first filter subjects a text to morphological and lexical analysis, assigning grammatical tags to words. This is referred to as initial tagging. Partial parsing to identify the noun-phrases required by the abstracting rules then disambiguates multiple tag assignments. This filter works selectively, only assigning tags where they are required by the sentence selection rules. The use of a parser to disambiguate tags means that a corpus for statistical analysis is not necessary, as in the stochastic methods. Also, the parser segments the sentence into phrasal units rather than relying on a full linguistic analysis with an extensive grammar. This ensures that there is no restriction on the type of sentence structure which the system will attempt to parse, thus for example it will not fail when faced with a garden path sentence, e.g., the largest rocks during the experiment, where local ambiguity forces a parser to backtrack to arrive at a single correct interpretation.

The only manual intervention required is the initial pre-editing of the texts to separate out headings, captions, figures and formulae, and to mark up the start of each new paragraph. This is, in principle, automatable, particularly assuming access to marked up versions of the text. The information is used at a later automated stage to record structural information, which may be used in abstracting.

b) The Dictionary

The construction of a dictionary is important in tagging, since the words in the dictionary carry information about the syntactic structure of a sentence. The initial tag assignment is performed on the basis of a limited dictionary (e.g., 300 words) consisting of most function words and some content words (such as all adverbs not ending in -ly and common verbs do, be and have). Exceptions to the morphology rules are induced, e.g., the irregular forms of the nouns women, men. This allows for the assumption that all plural nouns and s-forms of verbs can be identified. The dictionary lists all the possible parts-of-speech for each word. For instance, the word after has the possible tags preposition, adverb, or adjective.

An extract of the dictionary with its information in the format word and tag is shown below. The features associated with determiners (ana, non) state whether they form anaphoric noun-phrases and the second feature (s,p) state whether the determiner when combined with a noun will form a singular or plural noun-phrase. The features of verbs and auxiliaries (pres, past, ing) state the tense.

c) The MorphologyAnalyzer

The majority of content words not listed in the dictionary can be tagged using morphological information about suffixes (usually, -meet, -ness indicate nouns, -ous, -cal indicate adjectives and -ly adverbs). Various checks are used to avoid incorrect assignments. In general, the stem must contain at least three letters. For example, only words with more than three letters ending in -s are assigned the associated tag of plural noun or s-form verb. This excludes bus and gas. A check to ensure that the penultimate letter is not s, u or rules out s-form tagging of discuss, surplus and analysis. In addition to these rules, a word containing a capital letter is tagged as a likely proper noun. The program for the recognition of word endings was written in C using the UNIX LFX utility for pattern matching.

The default categories of single noun or base form verb are assigned to any word, which does not comply with the morphology rules. The majority of new words will be nouns, abbreviations or proper names. An unknown word may also be an adjective, but since adjectives and nouns occur interchangeably in similar positions in our grammar the information lost by treating adjectives as nouns is not considered to be important in this application.

d) The Parser

Definite Clause Grammar rules are adapted for use with a bottom-up parser by storing the results on the arcs of a chart. The basic principle of bottom-up parsing is to reduce the words whose categories match the right hand side of a grammar rule to a phrase of the type on the left hand side of the rule. There are several rule invocation strategies for chart parsing. A left corner parsing strategy is used which is based on an interaction of data-driven analysis and prediction based on grammar rules. Some state-of-the-art heuristics are used to cut the parser's search space roughly by a third. Details of the implementation are recorded in Johnson, Black, Neal and Paice.

e) The Grammar

The left corner chart parsing strategy is used with a predominantly noun-phrase grammar to return a partial analysis of the text. The NP grammar can correctly identify NPs especially when they are separated by an auxiliary verb, a common verb or a determiner, which signals the end of a verb-phrase. The NPs selected for these sentences are given from their start to end position.

f) The Global Parser

The determination of higher-level syntactic structures that link these groups together is difficult, especially when dealing with unrestricted text. The approach is to recover the units that occur in-between the NPs initially selected. In the global parser these are acceptable units to occur between NPs and for the NPs to be accepted as correct. Further illustration of the global parsing indicates the categories, which appear between two NPs. The parser only does what is necessary in this application and in doing so reduces the search space and thus the time taken.

An enhanced sentence selection method for automatic abstracting may be used, which relies on grammatical criteria to identify desirable isolated sentences to include in an abstract. A simple system, based on the limited resources of a dictionary, morphological analyzer and noun-phrase parser, is used. The advantage of using a partial grammar and a chart parser for simple abstracting procedures means that no restrictions are placed on the text to be abstracted.

The effectiveness of statistical text subject matter abstraction is enhanced by use syntactic compounds to represent the text material and in the user queries, coupled with an appropriate term weighting strategy. For terms that represent text subject matter, e.g., words, syntactic phrases, fixed phrases, and proper names, various levels of "regularization" are needed to assure that syntactic or lexical variations of input do not obscure underlying semantic uniformity. This kind of normalization is achieved through the following processes:

1) Morphological stemming: e.g., retrieving is reduced to retriev;

2) Lexicon-based word normalization: e.g., retrieval is reduced to retrieve;

3) Operator-argument representation of phrases: e.g., information retrieval, retrieving of information, and retrieve relevant information are all assigned the same representation, retrieve+information;

4) Context-based term clustering into synonymy classes and subsumption hierarchies: e.g., take-over is a kind of acquisition (in business), and FORTRAN is a programming language.

An advanced NLP module is inserted between the textual input (new subject matter, user queries) and the database search engine (in our case, the PRISE system). This design produces a better performance than the base statistical system (Strzalkowski, 1993). This system is completely automated, including the statistical core and the natural language processing components and no human intervention or manual encoding is required.

In this system, the text subject matter is first processed with a sequence of programs that include a part-of-speech tagger, a lexicon-based morphological stemmer and a fast syntactic parser. Subsequently certain types of phrases are extracted from the parse trees and used as compound indexing terms in addition to single-word terms. The extracted phrases are statistically analyzed as syntactic contexts in order to discover a variety of similarity links between smaller subphrases and words occurring in them. A further filtering process maps these similarity links onto semantic relations (generalization, specialization, synonymy, etc.) after which they are used to transform a user's request into a search query.

The user's natural language request is also parsed and all indexing terms occurring in it are identified. Certain highly ambiguous, usually single-word terms are dropped, provided that they also occur as elements in some compound terms. For example, "natural" may be deleted from a query already containing "natural language" because "natural" occurs in many unrelated contexts: "natural number", "natural logarithm", "natural approach", etc. At the same time, other terms may be added, namely those which are linked to some query term through admissible similarity relations. For example, "unlawful activity' is added to a query containing the compound term "illegal activity" via a synonymy link between illegal" and "unlawful".

Removing low-quality terms from the queries is as important (and often more so) as adding synonyms and specializations. In some instances (e.g., routing runs), low-quality terms are removed (or inhibited) before similar terms are added to the query or else the effect of query expansion is all but drowned out by the increased noise.

After the final query is processed, the database search follows, and a ranked list of subject matter or key terms is returned. It should be noted that all the processing steps, those performed by the backbone system, and those performed by the natural language processing components, are fully automated, and no human intervention or manual encoding is required.

To summarize, content characterization here involves defining a suitable selection procedure, operating over a larger set of phrasal units than that generated by a typical term identification algorithm (including not only all terms, but term-like phrases, as well as their variants, reduced forms, and anaphoric references), with the following properties. First, it reduces this set to a list of expressions that uniquely refer to objects in the discourse (the referent set). Second, it makes informed choices about the degree to which each phrase is representative of the text as a whole. Finally, it presents its output in a form which retains contextual information for each phrase. The key to normalizing the content of a document to a small set of distinguished, and discriminating, phrasal units is establishing a containment hierarchy of phrases (term-relational context-clause-sentence-paragraph-and so forth; this would eventually be exploited for capsule overview presentation at different levels of granularity), and being able to make refined judgments concerning the degree of importance of each unit, within some segment of text.

The goal is to filter a term set in such a way that those expressions which are identified as most salient are presented as representative of document content. This process of "salience-based content characterization" builds on and extends the notion of salience that forms a crucial component of the anaphora resolution procedure developed by (Lappin & Leass 1994). Moreover, it presupposes very little in the way of linguistic processing, working solely on the basis of the shallow analysis provided by the LINGSOFT tagger. It thus meets the desired requirement of domain independence, permitting extension of the technology to a wide range of texts, without regard to genre, style, or source.

8. Lexical Chains

Lexical chains can serve as a source representation of the original text to build a summary. The next question is how to build a summary representation from this source representation. The most prevalent discourse topic plays an important role in the summary. Lexical chains are a good indicator of the central topic of a text. The summary representation reflects that all these words represent the same concept. Otherwise, the summary generation stage would extract information separately for each term.

For each text, chains are manually ranked in terms of relevance to the main topics. Different formal measures on the chains then computed, including chain length, distribution in the text, text span covered by the chain, density, graph topology (diameter of the graph of the words) and number of repetitions.

a. Extracting Significant Sentences

Once strong chains have been selected, the next step of the summarization algorithm is to extract full sentences from the original text based on chain distribution.

Choose the sentence that contains the first appearance of a chain member in the text. This heuristic produces the summary for the text. A second heuristic based on the notion of representative words is defined: For each chain in the summary representation, the sentence that contains the first appearance of a representative chain member in the text is chosen. Often, the same topic is discussed in a number of places in the text, so its chain is distributed across the whole text. Still, in some text unit, this global topic is the central topic (focus) of the segment. This unit is identified and sentences extracted related to the topic from this segment (or successive segments) only.

For each chain, the text unit where the chain is highly concentrated is identified. The sentence with the first chain appearance in this central unit is extracted. The third heuristic extracts sentences from the middle of the text and several sentences from distant places in the text for a single chain. The best chain for a text is chosen based on the number and weight of different relations in the chain.

Text coherence models in summarization are exemplified by Marco who uses a rhetorical parser for unrestricted text that exploits cue-phrases to build rhetorical structure theory (RST) trees out of clauses in the text. The salience scores are then be used to extract corresponding sentences or clauses to form summaries.

9. Extracting Text

Each component of a summary needs to be instantiated by one or more passages extracted from the original text. These can be paragraphs, paragraph parts, sentences, or even sentence fragments. A well thought out paragraph structure organizes information within a text is exploited for summarization. Content-based segmentation techniques may be applicable.

The following list discusses the passage selection criteria in general.

a) Words and phrases frequently occurring in a text are likely to be indicative of content especially if such words or phrases do not occur often elsewhere.

b) Title of a text is often strongly related to its content. Therefore, words and phrases from the title are considered as important indicators of content concentration within a document.

c) Noun phrases occurring in the opening sentences of multiple paragraphs, or those used in the subject phrases or even as the first non-trivial phrase in multiple sentences tend to refer to entities that are central to text content.

d) Words and phrases occurring in only some paragraphs are weighted more highly than those scattered across the entire document, because such terms are more likely to be discriminators of summary passages. In generic summarization this score is set up so that the summary-worthiness of paragraphs is decreasing, as we read deeper into the text. Examples of summary cue phrases include: "In summary", "To sum up", "The point is", etc.

e) Paragraphs that are closer to the beginning of a news report tend to be more content-loaded than those towards the end. This ordering may be reversed in editorial-like texts. Therefore, the position of each passage carries an additional score. Position scoring is appropriate in generic summarization, but arguably not in topic-based summarization, where themes which are not necessarily central to the original text need to be summarized. In generic summarization this score is set up so that the summary-worthiness of paragraphs is decreasing as one reads deeper into the text. In many cases, a summarizer does not need to look beyond the first 6-7 paragraphs. In the subsequent versions, it has been replaced by a score supplement for summaries containing either the first or the second paragraph of a document. This way, the summarizer naturally defaults to the opening segment of a document if no other information is available to guide the passage selection.

f) Proper names of people, places, organizations, etc., various acronyms, numerical amounts, etc. are likely to refer to factual data that can improve the informativeness of a summary. At present score supplements are added to passages containing names or numbers, if the summary is requested to be an informative digest (approx. 30% of the original).

g) Certain cue phrases explicitly suggest that what follows is a summary or the main point of an article. Passages containing such cues should therefore be preferred for selection. Examples of summary cue phrases include: "In summary", "To sum up", "The point is", etc. In general, such heuristics are of little use, except in summarizing editorials or commentaries, where the usual top-down flow of arguments is frequently reversed. They are not at present implemented in this summarizer.

h) The process of passage selection closely resembles query-based subject matter retrieval. The "documents" here are the passages (paragraphs), and the "query" is a set of words and phrases collected from the title and from across the document. This analogy, while not entirely accurate, is nonetheless a useful one since other proven IR techniques may be applicable to summarization. Specifically, automatic query expansion techniques discussed later in this chapter may benefit the passage search process. We are currently experimenting with such options.

The background section supplies information that makes the summary self-contained. Passages may also be connected via rhetorical and other discourse relations. If a full discourse analysis is an unpalatable option, we can resort, again, to supplying a background/context passage.

10. The Generalized Summarization Algorithm a) Segment text into passages. If no paragraph or sentence structure is available, use approximately equal size chunks.

b) Build a paragraph-search query out of the content words, phrases and other terms found in the title, a user-supplied topic description (if available), as well as the terms occurring frequently in the text. A background link from passage N+1 to passage N means that if passage N+1 is selected for a summary, passage N must also be selected.

c) Normalize passage scores by their length, taking into account the desired target length of the summary. With sum over unique content terms q. In extreme cases, to prevent obtaining empty summaries, the summarizer will default to the first paragraph of the original text. Add premium scores to groups based on the inverse degree of text discontinuity measured as a total amount of edited text material between the passages within a group.

d) Rank passage groups by score. All groups become candidate summaries. Select the top scoring passage or passage group as the final summary.

e) Length of the original text: Discard all passages with length in excess of 1.5 times the target length. This reduces the number of passage combinations the summarizer has to consider, thus improving its efficiency. The decision whether to use this condition depends upon the user's tolerance to length variability. In extreme cases, to prevent obtaining empty summaries, the summarizer will default to the first paragraph of the original text.

f) Combine passages into groups of 2 or more based on their content, composition and length. The goal is to maximize the score, while keeping the length as close to the target length as possible. Any combination of passages is allowed, including non-consecutive passages, although the original ordering of passages is retained. If a passage attached to another through a background link is included into a group, the other passage must also be included, and this rule is applied recursively. The background links work only one way: a passage which is a background for another passage, may stand on its own if selected into a candidate summary.

g) Recalculate scores for all newly created groups. This is necessary, and cannot be obtained as a sum of scores because of possible term repetitions. Again, discard any passage groups longer than 1.5 times the target length. Add premium scores to groups based on the inverse degree of text discontinuity measured as a total amount of edited text material between the passages within a group. Add other premiums as applicable.

h) Rank passage groups by score. All groups become candidate summaries.

i) Repeat steps 6 through 8 until there is no change in top-scoring passage group through 2 consecutive iterations. Select the top scoring passage or passage group as the final summary.

Many robust summarization systems have opted for statistical sentence extraction: systems have been designed which extract "important" sentences from a text, where the importance of the sentence is inferred from low-level properties which can be more or less objectively calculated. Over the years there have been many suggestions as to which low-level features can help determine the importance of a sentence in the context of a source text, such as stochastic measurements for the significance of key words in the sentence, its location in the source text, connections with other sentences and the presence of cue or indicator phrases or of title words. The result of this process is an extract, i.e. a collection of sentences selected verbatim from the text.

These extracts are then used as the abstract of the text. Assuming that the text is coherent, the semantics gaps between potentially unconnected sentences are filled in. Even if these sentences do not form a coherent text that does not matter much: the extract is short enough to still make sense. Simple sentence extraction methods reduce a 20-page article to a 2-page collection of unconnected sentences, a document surrogate that is not adequate as an abstract. To overcome this problem, abstract-worthy material is selected from the source text, whilst at the same time keeping information about the overall rhetorical structure of the source text and of the role of each of the extract sentences in that rhetorical structure. Rather than attempting a full rhetorical analysis of the source text, just enough rhetorical information is extracted so as to be able to determine the rhetorical contribution of all and only the abstract-worthy sentences, without modeling domain knowledge or performing domain-sensitive reasoning. Abstracting means analyzing the argumentative structure of the source text and identifying textual extracts, which constitute appropriate fillers for the template.

Fusion of Multiple Information Systems

The present invention contemplates the use and fusion of multiple input methods and sources as part of the total apparatus for use as a study method. The source of the material to be abstracted and condensed may be written text, computer-generated textual material, e.g., internet, e-mail, audio sources such as lectures and speeches. The digitized textual material is converted into editable text with OCR technology and then compressed into an outline with summarizer software as described in the above methods. The treatment of audio input involves the combination of automatic speech recognition and text abstracting software. In a one step method, speech recognition and abstracting engine is applied to the audio input to generate a time-marked textual representation or transcription of the speech. In a two step method, the speech is first converted to editable text by voice-to-text software and then rendered into a user understandable outline by the summarizer software operating on the computer system. The entire process can operate in real time in the course of a lecture. For example, the user can view a condensation or outline of an ongoing lecture as the lecture is proceeding. At the conclusion of the lecture, an outline of the entire lecture is displayed on the screen for review and memorization. The amount of detail that the user wishes to retain in the outline can be adjusted by users by referring to the full-length transcript of lecture also recorded and transcribed in the computer.

EXAMPLES

Example 1

Exhibit A:

Shown in FIGS. 6A, 6B and 6C are three jpeg images captured from 3 sequential pages of a contract law textbook with a 5 megapixel back camera of the iPAD3™ using desktop lighting with default camera setting. These jpeg images are imported into the OCR program (FINEREADER 9.0 Professional™) and summarized with the Megaputer™ Summarizer.

Exhibit B:

Shown below is the conversion of the above printed text acquired with the iPAD3™ converted to editable text in WORD format by OCR program ABBYY Professional 9.0™.

Patents

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patents. Section 101 provides: Whoever invents or discovers any new and useful process, machine, manufacture, or composition of matter, or any new and useful improvement thereof, may obtain a patent therefore, subject to the conditions and requirements of this title. Thus, naturally occurring substances are not patentable, as the invention must be made or modified by humans. For example, the discovery of a bacterium with useful properties is not patentable, whereas the manufacture of a genetically engineered bacterium is. See *Diamond, Commissioner of Patents and Trademarks v. Chakrabarty*. By the same token, laws of nature, principles, bookkeeping systems, fundamental truths, methods of calculation, and ideas are not patentable. Accordingly, as Chief Justice Burger noted in *Diamond, Commissioner of Patents and Trademarks v. Chakrabarty*, "Einstein could not patent his law that $E=mc^2$, nor could Newton have patented the law of gravity." Similarly, isolated computer programs are not patentable, although, as mentioned above, they may be copyrighted.

To be patentable as a utility patent, the process, machine, manufacture, or composition of matter must meet three criteria:
1. Novelty—The invention must not conflict with a prior pending application or a previously issued patent;
2. Utility—The invention must possess specific and substantial usefulness, which must be affirmatively disclosed by the application; and
3. Nonobviousness—The invention, in light of the prior art, must not be obvious to a person skilled in such prior art.

In addition to utility patents, the Patent Act provides for plant patents and design patents. A plant patent protects a new and distinctive variety of asexually reproducing plant. Plant patents require (1) novelty, (2) distinctiveness, and (3) nonobviousness. A design patent protects a new, original, ornamental design for an article of manufacture. Design patents require (1) novelty, (2) ornamentality, and (3) nonobviousness. As mentioned above, design patents have a duration of fourteen years; plant patents, like utility patents, have a seventeen-year duration.

Procedure

The United States Patent and Trademark Office issues a patent upon the basis of a patent application containing a specification, which describes how the invention works, and claims, which describe the features that make the invention patentable. The applicant must be the inventor. Before granting a patent, the Patent Office thoroughly examines the prior art and determines whether the submitted invention is nonobvious and has novelty and utility (or distinctiveness or ornamentality, in the case of plant or design patents). An application for a patent is confidential, and the Patent Office will not divulge its contents. This confidentiality ends, however, upon the granting of the patent. Unlike rights under a copyright, no monopoly rights arise until the Patent Office actually issues a patent.

Therefore, anyone is free to make, use, and sell an invention for which a patent application is filed until the patent has been granted. An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance are defenses to contributory infringement, they are not defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

Exhibit C

Shown below are summaries of the above text using the Megaputer summarizer program at varying degrees of compression.

Megaputer TextAnalyst™ Summaries of Varying Lengths

Example for Compression to 21% of Original Text Size
Through a patent, the Federal government grants an inventor a monopolistic right to make, use, or sell an invention to the absolute exclusion of others for the period of the patent, which currently is fourteen years for design patents and seventeen years for all others.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

Before granting a patent, the Patent Office thoroughly examines the prior art and determines whether the submitted invention is nonobvious and has novelty and utility (or distinctiveness or ornamentality, in the case of plant or design patents). Therefore, anyone is free to make, use, and sell an invention for which a patent application is filed until the patent has been granted.

Example of Compression to 30%
Through a patent, the Federal government grants an inventor a monopolistic right to make, use, or sell an invention to the absolute exclusion of others for the period of the patent, which currently is fourteen years for design patents and seventeen years for all others.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

Plant patents require (1) novelty, (2) distinctiveness, and (3) nonobviousness.

The United States Patent and Trademark Office issues a patent upon the basis of a patent application containing a specification, which describes how the invention works, and claims, which describe the features that make the invention patentable.

Before granting a patent, the Patent Office thoroughly examines the prior art and determines whether the submitted invention is nonobvious and has novelty and utility (or distinctiveness or ornamentality, in the case of plant or design patents).

Therefore, anyone is free to make, use, and sell an invention for which a patent application is filed until the patent has been granted.

Example of Compression to 48%

Through a patent, the Federal government grants an inventor a monopolistic right to make, use, or sell an invention to the absolute exclusion of others for the period of the patent, which currently is fourteen years for design patents and seventeen years for all others.

The Patent Act specifies those inventions that may be patented as utility patents.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

A plant patent protects a new and distinctive variety of asexually reproducing plant.

Plant patents require (1) novelty, (2) distinctiveness, and (3) nonobviousness.

Design patents require (1) novelty, (2) ornamentality, and (3) nonobviousness.

plant patents, like utility patents, have a seventeen-year duration.

The United States Patent and Trademark Office issues a patent upon the basis of a patent application containing a specification, which describes how the invention works, and claims, which describe the features that make the invention patentable.

Before granting a patent, the Patent Office thoroughly examines the prior art and determines whether the submitted invention is nonobvious and has novelty and utility (or distinctiveness or ornamentality, in the case of plant or design patents).

Therefore, anyone is free to make, use, and sell an invention for which a patent application is filed until the patent has been granted.

Anyone who, without permission, makes, uses, or sells a patented invention is a direct infringer, whereas a person who actively encourages another to make, use, or sell a patented invention without permission is an indirect infringer.

A contributory infringer is one who knowingly sells or supplies a part or component of a patented invention, unless the component is a staple or commodity or is suitable for a substantial noninfringing use.

The right to use a purchased item includes the right to repair it so long as the repair does not constitute reconstruction, which would infringe upon the patent holder's exclusive right to make the invention.

Exhibit D:

Shown below are results of the semantic query of the above text

Q. Define Patentability

Answer

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

The United States Patent and Trademark Office issues a patent upon the basis of a patent application containing a specification, which describes how the invention works, and claims, which describe the features that make the invention patentable.

Q. What is a patent?

Answer

Before granting a patent, the Patent Office thoroughly examines the prior art and determines whether the submitted invention is nonobvious and has novelty and utility (or distinctiveness or ornamentality, in the case of plant or design patents).

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

Therefore, anyone is free to make, use, and sell an invention for which a patent application is filed until the patent has been granted.

The United States Patent and Trademark Office issues a patent upon the basis of a patent application containing a specification, which describes how the invention works, and claims, which describe the features that make the invention patentable.

Through a patent, the Federal government grants an inventor a monopolistic right to make, use, or sell an invention to the absolute exclusion of others for the period of the patent, which currently is fourteen years for design patents and seventeen years for all others.

plant patents, like utility patents, have a seventeen-year duration.

Design patents require (1) novelty, (2) ornamentality, and (3) nonobviousness.

Q. What is infringement?

Answer.

Anyone who, without permission, makes, uses, or sells a patented invention is a direct infringer, whereas a person who actively encourages another to make, use, or sell a patented invention without permission is an indirect infringer.

A contributory infringer is one who knowingly sells or supplies a part or component of a patented invention, unless the component is a staple or commodity or is suitable for a substantial noninfringing use.

The right to use a purchased item includes the right to repair it so long as the repair does not constitute reconstruction, which would infringe upon the patent holder's exclusive right to make the invention.

Example 2

Exhibit A.

FIG. 7 shows original Text with curved surface and suboptimal desktop lighting acquired with Canon IXY Digital 800IS 6 megapixel camera using settings described in the text. Note curved surface and variable lighting as user would encounter photographing from a café or library without professional lighting.

Exhibit B.

Conversion of the above image with OCR to unformatted text. Note despite curved surface and poor lighting, the OCR program converted the image to editable text without significant error. This document is now ready for digital summarization.

Removal of Directors a majority vote>> shareholders may remove any director or the entire board of directors, with or without cause, in a meeting called for that purpose—In the case of a corporation having cumulative voting, however, a director may be removed only if the number of votes opposing his removal would be insufficient to elect him. Section 8.08(c). Removal of directors is discussed more fully later in this chapter.

Approval of Fundamental Changes

The board of directors manages the ordinary business affairs of the corporation. Extraordinary matters involving fundamental changes in the corporation require shareholder approval; such matters include amendments to the articles of incorporation, a sale or lease of all or substantially all of the corporate assets not in the regular course of business, most mergers, consolidations, compulsory share exchanges, and dissolution. Fundamental changes are discussed in Chapter 38.

Concentrations of Voting Power

Certain devices enable groups of shareholders to combine their voting power for purposes such as obtaining or maintaining control or maximizing the impact of cumulative voting. The most important methods of concentrating voting power are proxies, voting trusts, and shareholder agreements.

Proxies

A shareholder may vote either in person or by written proxy. Section 7.22(a). As mentioned earlier, a proxy is simply a shareholder's authorization to an agent to vote his shares at a particular meeting or on a particular question. Generally, proxies must be in writing to be effective; furthermore, statutes typically limit the duration of proxies to no more than eleven months, unless the proxy specifically provides otherwise. Section 7.22(c). Since a proxy is the appointment of an agent, it is revocable, as all agencies are, unless conspicuously stated to be irrevocable and coupled with an interest, such as shares held as collateral. Section 7.22(d). The solicitation of proxies by publicly held corporations is also regulated by the Securities Exchange Act of 1934, as discussed in Chapter 46.

Voting Trusts

Voting trusts, which are designed to concentrate corporate control in one or more persons, have been used in both publicly held and closely held corporations. A voting trust is a device by which one or more shareholders separate the voting rights of their shares from the ownership of those shares. Under a voting trust, one or more shareholders confer on a trustee the right to vote or otherwise act for them by signing an agreement setting out the provisions of the trust and transferring their shares to the trustee. Section 7.30(a). In most States, voting trusts are permitted by statute but are usually limited in duration to ten years. The Revised Act permits all or some of the parties to a voting trust to extend it for an additional term of up to ten years by signing an extension agreement and obtaining the voting trustee's written consent. Section 7.30 (c). The extension runs from the time the first shareholder signs the agreement but binds only those shareholders who consent to it Shareholder Voting Agreements In most jurisdictions, shareholders may agree in writing to vote in a specified manner for the election or removal of directors or on any other matter subject to shareholder approval. Section 7.31(a). The Revised Act and some State statutes expressly provide that shareholder agreements are enforceable by a decree of specific performance. Section 7.31(b). Unlike voting trusts, shareholder voting agreements are usually not limited in duration. Shareholder agreements are used frequently in closely held corporations, especially in conjunction with restrictions on the transfer of shares, in order to provide each shareholder with greater control and delectus personae (the right to choose those who will become shareholders).

*Galler y. Galler,* 32 D1.2d 16, 203 N.&&1 577 (1964), provides a well-known example of the effect a shareholder agreement m#

Example 3

Printed Matter Acquisition with Ultra-Compact Digital Camera

FIGS. 8A and 8B show four text pages (each 10"×7") from a textbook on Business Law Documents that were photographed using a FCCE™ ultra compact digital camera with the following specifications: Lens specification: CMOS 2408×1536 Pixels (3.2M pixels); Focus Range: Normal: 1.5 m to infinity, Macro: 50 cm; Exposure Control: Automatic/Manual (−2EV-2EV); Storage Capacity: XXL 12.0M 400× 3000 Pixels; XL 0.0M 3456×2592 Pixels; L 6.0 M 2848× 2136 Pixels; M 3.2 M 2048×1536 Pixels; S XVGA 1600× 1200 Pixels.

The textbook page images are converted by the camera software into jpeg format The camera position and settings used to acquire the images below were as follows: (i) "macro" lens setting, (ii) picture size: large (2848×2136) (iii) superfine compression setting (iv) lighting setting: "0" (v) camera held approximately 14-18 inches above the center of text (vi) no zoom (vii) image encased in monitor screen. With these settings and positions, two textbook pages (10"×7" each) were acquired at the same time (Exhibits 3A and 3B below).

This JPEGs are then transferred from the camera via USB 2.0 port to Adobe PhotoAlbum™ where they were copied and sent to "My Pictures" folder positioned on Desktop. The OCR program (Fine Reader 8.0™) is then opened and the jpeg images are acquired by clicking "Open and Read" that converts the jpeg images of the printed matter to editable text viewable and saved as a WORD file. The formatting instructions for the editable text are provided in OCR program under "Options" and are fixed beforehand. By selecting "Retain only paragraphs, fonts and tables", the editable text that appears in WORD program is devoid of the original columns and major subheading breaks. That format is illustrated in exhibit A below.

The editable text is manually edited to highlight the major subheading and extraneous material is deleted as shown in Exhibit B. The text is now copied and pasted into a summarizer program such as Megaputer Content Analyst™. The final summary from Megaputer is the same as shown above for content acquired via an optical scanner.

Exhibit A. The Digital Photographic Image of Text in jpeg Format is Converted to Editable Text (WORD) Via an OCR Program in Normal Format Devoid of the Columns and Graphs in the Original Text Procedure Applications for copyright are filed with the Register of Copyrights in Washington, D.C. Although copyright registration is not required, since copyright protection begins as soon as the work is fixed in a tangible medium, registration is, nonetheless, advisable because it is a condition of certain remedies (statutory damages and attorneys' fees) for copyright infringement. When a work is published, it is advisable, though no longer required, to place a copyright notice on all publicly distributed copies so as to notify users about the copyright claim. If proper notice appears on the published copies to which a defendant in a copyright infringement case had access, then the defendant will be unable to mitigate actual or statutory damages by asserting a defense of innocent infringement. Section 401.

Rights

In most instances, copyright protection subsists for the duration of the author's life plus an additional fifty years. Section 106 of the Copyright Act gives the owner of the copyright the exclusive right to 1. reproduce the copyrighted work in copies or recordings;
2. prepare derivative works based upon the copyrighted work;
3. distribute copies or recordings of the copyrighted work to the public by sale or other transfer of ownership, or by rental, lease, or lending,
4. perform the copyrighted work publicly, in the case of literary, musical, dramatic, choreographic, pantomime, motion picture, and other audiovisual works; and
5. display the copyrighted work publicly, in the case of literary, musical, dramatic, and choreographic works, pantomimes, and pictorial, graphic, or sculptural works, including the individual images of a motion picture or other audiovisual work.

These broad rights are subject, however, to several limitations, the most important of which are "compulsory licenses" and "fair use." Compulsory licenses permit certain limited uses of copyrighted material upon the payment of specified royalties and compliance with statutory conditions. Section 107 codifies the common law doctrine of fair use by providing that the fair use of a copyrighted work for purposes such as criticism, comment, news reporting, teaching (including multiple copies for classroom use), scholarship, or research is not an infringement of copyright. In determining whether the use made of a work in any particular case is fair, the courts consider the following factors: (1) the purpose and character of the use, including whether such use is of a commercial nature or is for nonprofit educational purposes; (2) the nature of the copyrighted work; (3) the amount and substantiality of the portion used in relation to the copyrighted work as a whole; and (4) the effect of the use upon the potential market for or value of the copyrighted work. See *Basic Books. Inc.* v. *Kinko's Graphics Corporation.*

Ownership

The author of a creative work owns the entire copyright. Although usually the actual creator of a work is the author, in two situations under the doctrine of works for hire, she is not considered the author. Section 101. First, if an employee prepares a work within the scope of her employment, her employer is considered to be the author of the work. Second, if a work is specially ordered or commissioned for certain purposes specified in the copyright statute and the parties expressly agree in writing that the work shall be considered a work for hire, the person commissioning the work is deemed to be the author. The kinds of works subject to becoming works for hire by commission include contributions to collective works, parts of motion pictures or other audiovisual works, translations, supplementary works such as prefaces, illustrations, or afterwords, compilations, instructional texts, and tests.

The ownership of a copyright may be transferred in whole or in pert by conveyance, will, or intestate succession. Section 201. A transfer of copyright ownership, other than by operation of law, is not valid, however, unless it is memorialized in a note or memorandum signed by the owner of the rights conveyed or by the owners duly authorized agent. Section 204. An author may terminate any transfer of copyright ownership, other than that of a work for hire, during the five-year period beginning thirty-five years after the transfer was granted—

Section 203.

Ownership of a copyright, or of any of the exclusive rights under a copyright, is distinct from the ownership of any material object that embodies the work. Transferring the ownership of any material object, including the copy or recording in which the work was first fixed, does not of itself convey any rights in the copyrighted work embodied in the object; nor, in the absence of an agreement, does the transfer of copyright ownership or of any exclusive rights under a copyright convey property rights in any material object. Section 202. Thus, the purchase of this textbook neither affects the publisher's copyright nor authorizes the purchaser to make and sell copies of the book. The purchaser may, however, rent, lend, or resell the book.

Infringement and Remedies

Infringement occurs whenever somebody exercises, without authorization, the rights exclusively reserved for the copyright owner. Infringement need not be intentional. To prove infringement, the plaintiff need only establish that he owns the copyright and that the defendant violated one or more of the plaintiffs exclusive rights under the copyright. Proof of infringement usually consists of showing that the allegedly infringing work is substantially similar to the copyrighted work and that the alleged infringer had access to the copyrighted work.

To be the subject at a suit for infringement, the copyright must be registered with the Copyright Office, unless the work is a Berne Convention work whose country of origin is not the United States. For an infringement occurring after registration, the following remedies are available: (1) injunction; (2) the impoundment and, possibly, destruction of infringing articles; (3) actual damages, plus profits made by the infringer that are additional to those damages, or statutory damages of at least $500 but no more than $20,000 ($100,000 if the infringement is willful), according to what the court determines to be just; (4) costs and, in the court's discretion, reasonable attorneys' fees to the prevailing party; and (5) criminal penalties of a fine of up to $10,000 or up to one year's imprisonment for willful infringement for purposes of commercial advantage or private gain. The Piracy and Counterfeiting Amendments Act of 1982 imposes harsher punishments for large scale piracy: a $250,000 fine and five years* imprisonment for those who pirate 1,000 recordings or 65 films within 180 days.

Patents

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patent*. Section 101 provides:

Whoever invents or discovers any new and useful process, machine, manufacture, or composition of matter, or any new and useful improvement thereof, may obtain a patent therefor, subject to the conditions and requirement* of this title.

Thus, naturally occurring substances are not patentable, as the invention must be made or modified by humans. For example, the discovery of a bacterium with useful properties is not patentable, whereas the manufacture of a genetically engineered bacterium is. See *Diamond, Commissioner of Patent\* and Trademarks* v. *Chakrabarty*. By the same token, laws of nature, principles, bookkeeping systems, fundamental truths, methods of calculation, and ideas are not patentable. Accordingly, as Chief Justice Burger noted in *Diamond, Commissioner of Patents and Trademarks* v. *Chakrabarty*, "Einstein could not patent his law that $E=mc^2$, nor could Newton have patented the law of gravity." Similarly, isolated computer programs are not patentable, although, as mentioned above, they may be copyrighted.

lb be patentable as a utility patent, the process, machine, manufacture, or composition of matter must meet three criteria:

1. Novelty—The invention must not conflict with a prior pending application or a previously issued patent;
2. Utility—The invention must possess specific and substantial usefulness, which must be affirmatively disclosed by the application; and
3. Nbnobviousness—The invention, in light of the prior art, must not be obvious to a person skilled in such prior art.

In addition to utility patents, the Patent Act provides for plant patents and design patents. A plant patent protects a new and distinctive variety of asexually reproducing plant. Plant patents require (1) novelty, (2) distinctiveness, and (3) nonobviousness. A design patent protects a new, original, ornamental design for an article of manufacture. Design patents require (1) novelty, (2) ornamentality, and (31 nonobviousness. As mentioned above, design patents have a duration of fourteen years; plant patents, like utility patents, have a seventeen-year duration.

Procedure

The United States Patent and Trademark Office issues a patent upon the basis of a patent application containing a specification, which describes how the invention works, and claims, which describe the features that make the invention patentable. The applicant must be the inventor. Before granting a patent, the Patent Office thoroughly examines the prior all and determines whether the submitted invention is nonobvious and has novelty and utility (or distinctiveness or ornamentality, in the case of plant or design patents). An application for a patent is confidential, and the Patent Office will not divulge its contents. This confidentiality ends, however, upon the granting of the patent. Unlike rights under a copyright, no monopoly rights arise until the Patent Office actually issues a patent.

Therefore, anyone is free to make, use, and sell an invention for which a patent application is filed until the patent has been granted. An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial non infringing use. While good faith and ignorance are defenses to contributory infringement, they are not defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

Cases

Trade Secrets

*B. C. ZIEGLER AND COMPANY* v. *EHREN*

Court of Appeals of Wisconsin, 1987. MI Wis. 2d 19, 414 N.W. 2d 48.

BROWN, J.

Lawrence P. Ehren appeals from a grant of summary judgment restraining him from using or disclosing information contained on business papers and records he bought from a scrap paper company but which originated with B. C. Ziegler and Company (Ziegler). The circuit court held that the information was entitled to common law trade secret protection and that Ehren did not acquire title to the information as a good faith purchaser. We affirm those rulings.

Ziegler is an underwriter of securities located in West Bend. Ehren is employed by a scrap dealer, Lynn's Waste Paper Co., Inc. (Lynn's), where his duties include determining the value for recycling purposes of scrap paper purchased by Lynn's. From 1981 to 1983, Ehren was a licensed securities salesman and worked for two brokerage firms which compete with Ziegler. Ziegler considered its customer lists confidential and had developed policies for the disposal of scrap paper which were regularly communicated to its employees. Paper containing a customer name was to be burned or shredded on the Ziegler premises before disposal or was to be delivered for shredding to a commercial shredding concern in Apple-ton, in which case the employee delivering the paper was to wait while it was shredded. Under no circumstances was scrap paper containing names or information about Ziegler customers to leave the possession of its Exhibit B. Machine Summarization (Megaputer™) of "3D" above is shown below.

Example of Compression to 30%

Through a patent, the Federal government grants an inventor a monopolistic right to make, use, or sell an invention to the absolute exclusion of others for the period of the patent, which currently is fourteen years for design patents and seventeen years for all others.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

Plant patents require (1) novelty, (2) distinctiveness, and (3) nonobviousness.

The United States Patent and Trademark Office issues a patent upon the basis of a patent application containing a specification, which describes how the invention works, and claims, which describe the features that make the invention patentable.

Before granting a patent, the Patent Office thoroughly examines the prior art and determines whether the submitted invention is nonobvious and has novelty and utility (or distinctiveness or ornamentality, in the case of plant or design patents). Therefore, anyone is free to make, use, and sell an invention for which a patent application is filed until the patent has been granted.

Example 5

Textual material captured using a DS6700-DC2001zzr handheld digital image scanner using the settings described in the application is captured verbatim and converted to editable text by ABBYY Fine Reader OCR 9.0 Professional Edition. The image is captured by pointing the imager at LED crosshairs provided by the imager. The image is automatically focused, framed and captured with a hand held imager without the need for framing in an LED monitor. The image capturing method is as rapid as barscanning a code at the checkout counter in a supermarket. The image can be sharpened, rotated and brightened by image correction software such as Canon Zoom so that is easily recognized, analyzed and read by the OCR software which converts it verbatim to editable text. In this form the text is rapidly summarized by summarization software to a summary that can be used for repetitious practice and "time on task" to improve performance on tests and presentations. Below are examples of image capture using only the autoaim, focusing and framing feature of the DS6700-DC2001zzr handheld digital image scanner. The image is sharpened, brightened in Canon Zoom and then transferred to Fine Reader 9.0 where it is converted to editable text with OCR software. From this point, the content is machine summarized into a user understandable summary.

Exhibit A:

FIG. 9A shows raw text acquired with a DS6700-DC2001zzr handheld digital image scanner. In FIG. 9B, the image is sharpened, brightened in Canon Zoom and then transferred to Fine Reader 9.0 where it is converted to editable text with OCR software.

Exhibit B:

In FIG. 9C raw text is acquired with DS6700-DC2001zzr handheld digital image scanner. In this form, the text is transferred to OCR software where it is converted to editable text shown below.

Therefore, anyone is free to make, use, and sell an invention for which a patent application is filed until the patent has been granted. An applicant whose application is rejected may apply for reexamination. If the application is again rejected, the applicant may appeal to the Patent and Trademark Office's Board of Appeals, and from there to the Fed- Infringement Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance are defenses to contributory infringement, they are not defense* to direct infringement. The rights under a patent do not extend beyond the first sale; that is, the purchaser of a patented item, 1—permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

Example 6

Figure 10B:
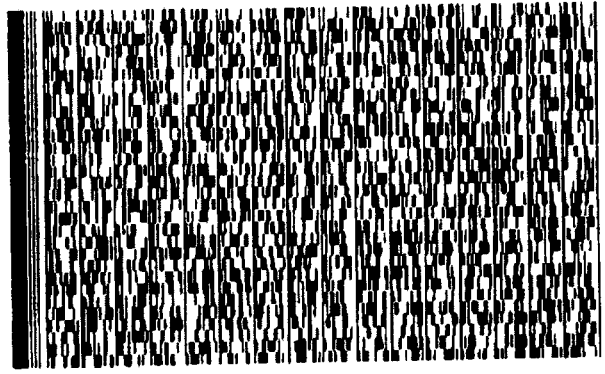
Figure 10B:
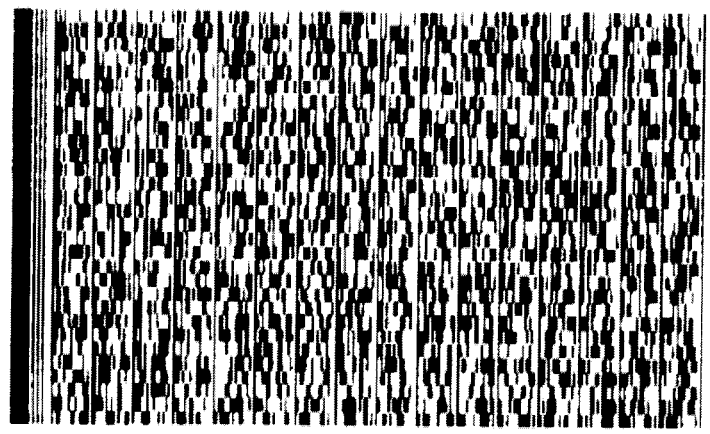
Figure 11:
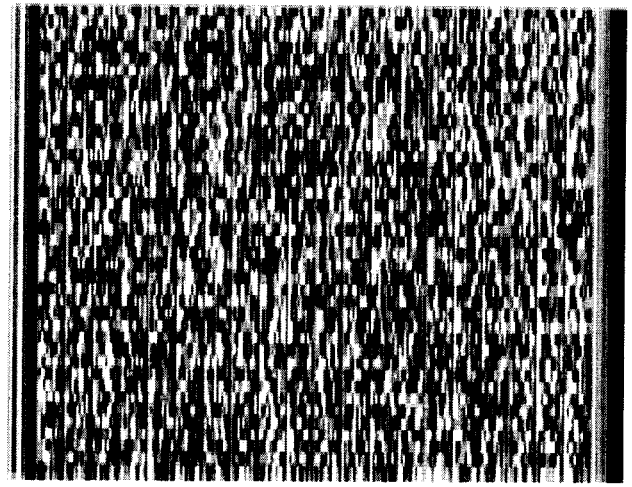

Exhibit A:

FIG. 10 shows a textual image captured with DS6700-DC2001zzr handheld digital image scanner. In this form, the text is transferred to ABBYY 9.0 Fine Reader where it is converted to a pdf file shown below. From there it is transferred to an Idautomation pdfd417 font and encoder where it is converted to a pdf417 2D barcode shown in FIG. 10B.

Patents

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain."

Example 7

Exhibit A:

Below is (a) a textual image as published which, is converted to a pdf417 2D barcode using Idautomation pdfd417 font as shown in FIG. 11. This image is then converted back to the original text with a DS6700-DC2001zzr bar code reader as shown in (b) below.

a. FIG. 1, i.e., shade along the "spine" of the book (photometric distortion) and warping in the shade area (geometric distortion). The distortion introduces problems in image restoration of archived documents and in word spotting for document retrieval from the digital library. Given these problems and the large number of books to be scanned, our objective in this research is to design an efficient content-free algorithm to restore the document images by correcting the above two types of distortion.

There have been related techniques reported in the literature. We classify them into two categories: 1) restoration approaches based on 2D document image processing and 2) restoration approaches based on 3D document shape discovery.

b. FIG. 1, i.e., shade along the "spine" of the book (photometric distortion and warping in the shade area (gemoetric distortion). The distortion introduces problems in image restoration of archived documents and in word spoting for document retrieval from the digital library. Given these problems and the large number of books to be scanned, our objective in this research is to design an efficient content-free algorithm to restore the document images by correcting the above two types of distortion. There have been related techniques reported in the literature. We classify them into two categories: 1) restoration approaches based on 2D document image processing and 2) restoration approaches based on 3D document shape discovery.

All references and their references referred to in this application are incorporated in entirety by reference.

The spirit and scope of the present invention shall be limited only by the claims that follow.

The invention claimed is:

1. A single-action method to facilitate identification, condensation and capture of key concepts from subject matter of printed paper text, said single-action method comprising;
   (a) obtaining still images directly of said printed paper text with one or more compact, handheld, mobile data input devices comprising a digital camera and computer system wherein said compact, handheld, mobile data input device is selected from a group consisting of tablets;
   (b) stabilizing, rotating, deskewing, brightening and focusing said still images; and
   (c) converting said stabilized, rotated and focused still images into digitized text using software operating on said mobile data input device;
   (d) converting said digitized text into editable text form using optical character recognition software; and
   (e) converting said editable text form into a machine readable summary using text summarization software;
   wherein said text summarization software that computes similarity measurements in text or between text and text excerpts from said editable text form, generates text relation maps for said similarity measurements that exceed a threshold value, and uses said text relation maps as inputs for (i) a clustering process to identify text themes; (ii) traversing texts selectively using individual text excerpts; and (iii) extracting summary statements; and
   wherein said steps (a) through (e) are performed upon a single-click from a user.

2. The single-action method of claim 1, wherein said text summarization software comprises programs that generate vector space diagrams, weighted terms, linguistic, probabilistic, neural and text cohesion analysis alone or in combinations of two or more to compute similarity measurements in text or between text and text excerpts from said editable text form, generates text relation maps for said similarity measurements that exceed a threshold value, and uses said text relation maps as inputs for (i) a clustering process to identify text themes; (ii) traversing texts selectively using individual text excerpts; and (iii) extracting summary statements; and
   wherein said steps (a) through (e) are performed upon a single-click from a user.

3. The single-action method according to claim 1, wherein key subject matter from said editable text is selected and highlighted by user and converted into said machine readable summary using said text summarization software.

4. The single-action method of claim 1, wherein said text summarization software computes similarity measurements between said text and a user query, generates text relation maps for said similarity measurements that exceed a threshold value, and uses said text relation maps as inputs for (i) a clustering process to identify text themes; (ii) traversing texts selectively using individual text excerpts; and (iii) extracting summary statements.

5. The single-action method of claim 1, wherein said machine readable summary is converted into an format selected from the group comprising Roman, numbered, alphabetical or bullet-point outline.

6. The single-action method of claim 1, wherein double clicking of selected words or phrases in said machine summary of said printed paper text displays the selected words or phrases in their original sentences or paragraphs in said editable text of said printed paper text.

7. The single-action method of claim 1, wherein word volume of said machine readable summary may be compressed to said word volume of 10% to 90% of the default value.

8. The single-action method of claim 1, wherein said summarization software comprises programs that highlight designated subsections of printed paper text and convert said subsections into said machine readable summaries using said text summarization software.

* * * * *

UNITED STATES PATENT AND TRADEMARK OFFICE
CERTIFICATE OF CORRECTION

PATENT NO. : 8,488,916 B2
APPLICATION NO. : 13/554398
DATED : July 16, 2013
INVENTOR(S) : David S. Terman Page 1 of 50

It is certified that error appears in the above-identified patent and that said Letters Patent is hereby corrected as shown below:

Please delete patent 8,488,916 B2 in its entirety and insert patent 8,488,916 B2 in its entirety.
(FIGS. 6-11 have been added)

Signed and Sealed this
Twenty-fourth Day of December, 2013

Margaret A. Focarino
*Commissioner for Patents of the United States Patent and Trademark Office*

(12) United States Patent
Terman

(10) Patent No.: US 8,488,916 B2
(45) Date of Patent: Jul. 16, 2013

(54) KNOWLEDGE ACQUISITION NEXUS FOR FACILITATING CONCEPT CAPTURE AND PROMOTING TIME ON TASK

(76) Inventor: David S Terman, Pebble Beach, CA (US)

( * ) Notice: Subject to any disclaimer, the term of this patent is extended or adjusted under 35 U.S.C. 154(b) by 0 days.

(21) Appl. No.: 13/554,398

(22) Filed: Jul. 20, 2012

(65) Prior Publication Data
US 2013/0021346 A1      Jan. 24, 2013

Related U.S. Application Data

(60) Provisional application No. 61/572,853, filed on Jul. 22, 2011.

(51) Int. Cl.
  G06K 9/22      (2006.01)
  G06K 9/00      (2006.01)
  G06F 17/27     (2006.01)
  G06F 17/00     (2006.01)

(52) U.S. Cl.
  USPC ............... 382/315; 382/187; 704/9; 715/254

(58) Field of Classification Search
  USPC ........................................................ 382/305
  See application file for complete search history.

(56) References Cited

U.S. PATENT DOCUMENTS

| | | | |
|---|---|---|---|
| 5,384,703 A * | 1/1995 | Withgott et al. | 715/236 |
| 5,638,543 A * | 6/1997 | Pedersen et al. | 704/1 |
| 5,721,939 A * | 2/1998 | Kaplan | 704/9 |
| 5,778,397 A * | 7/1998 | Kupiec et al. | 715/243 |
| 6,289,304 B1 * | 9/2001 | Grefenstette | 704/9 |
| 6,789,228 B1 * | 9/2004 | Merril et al. | 715/243 |
| 7,322,526 B1 * | 1/2008 | Koenck | 235/462.45 |
| 7,689,898 B2 * | 3/2010 | Merril et al. | 715/201 |
| 2006/0029296 A1 * | 2/2006 | King | 382/313 |
| 2006/0294453 A1 * | 12/2006 | Hirata | 715/500.1 |
| 2008/0018591 A1 * | 1/2008 | Pittel et al. | 345/156 |
| 2009/0081630 A1 * | 3/2009 | Jeffers | 434/362 |
| 2009/0132590 A1 * | 5/2009 | Huang | 707/104.1 |
| 2009/0227283 A1 * | 9/2009 | Pylvanainen | 455/556.1 |
| 2011/0123115 A1 * | 5/2011 | Lee et al. | 382/185 |

* cited by examiner

*Primary Examiner* — David Zarka
(74) *Attorney, Agent, or Firm* — Central Coast Patent

(57) ABSTRACT

Described herein is an interactive digital software program and hardware that enables rapid acquisition of textual or audio subject matter, its conversion to editable text and immediate compression into a user understandable summary. The software program maximizes "time on task" while minimizing the time-consuming steps of "concept capture" and "compression". The instant invention provides an accurate condensate of textual subject matter in a fraction of the time it would take to prepare such a document by manual note taking. In a single step, mobile devices such as cameras, camera phones, tablets, iPODs™, scanners and the like rapidly capture textual images convert them to OCR and to a user understandable summary in a fraction of the time it takes to process such a document by manual note taking. With more study time available for repetitious practice of the lesson, the user improves preparedness and performance on tests and presentations.

8 Claims, 17 Drawing Sheets

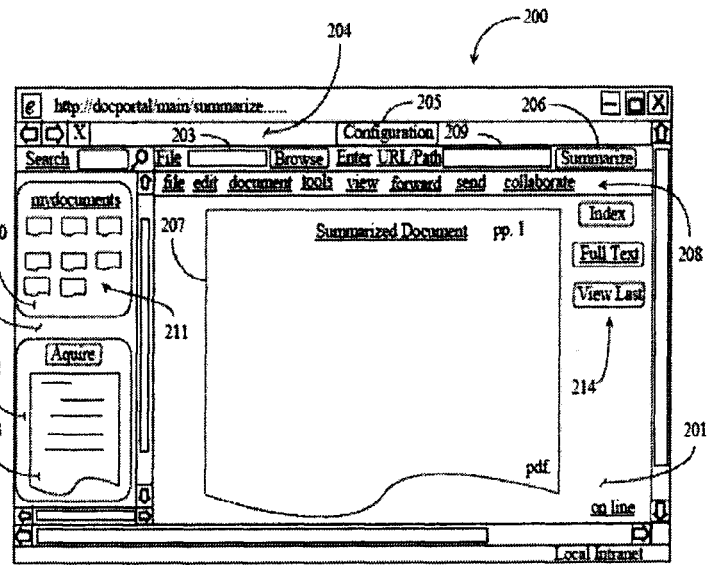

CHAPTER 43  PROTECTION OF INTELLECTUAL PROPERTY  1023 ance, will, or intestate succession. Section 201. A transfer of copyright ownership, other than by operation of law, is not valid, however, unless it is memorialized in a note or memorandum signed by the owner of the rights conveyed or by the owner's duly authorized agent. Section 204. An author may terminate any transfer of copyright ownership, other than that of a work for hire, during the five-year period beginning thirty-five years after the transfer was granted. Section 203.

Ownership of a copyright, or of any of the exclusive rights under a copyright, is distinct from the ownership of any material object that embodies the work. Transferring the ownership of any material object, including the copy or recording in which the work was first fixed, does not of itself convey any rights in the copyrighted work embodied in the object; nor, in the absence of an agreement, does the transfer of copyright ownership or of any exclusive rights under a copyright convey property rights in any material object. Section 202. Thus, the purchase of this textbook neither affects the publisher's copyright nor authorizes the purchaser to make and sell copies of the book. The purchaser may, however, rent, lend, or resell the book.

Infringement and Remedies

Infringement occurs whenever somebody exercises, without authorization, the rights exclusively reserved for the copyright owner. Infringement need not be intentional. To prove infringement, the plaintiff need only establish that he owns the copyright and that the defendant violated one or more of the plaintiff's exclusive rights under the copyright. Proof of infringement usually consists of showing that the allegedly infringing work is substantially similar to the copyrighted work and that the alleged infringer had access to the copyrighted work.

To be the subject of a suit for infringement, the copyright must be registered with the Copyright Office, unless the work is a Berne Convention work whose country of origin is not the United States. For an infringement occurring *after* registration, the following remedies are available: (1) injunction; (2) the impoundment and, possibly, destruction of infringing articles; (3) actual damages, plus profits made by the infringer that are additional to those damages, *or* statutory damages of at least $500 but no more than $20,000 ($100,000 if the infringement is willful), according to what the court determines to be just; (4) costs and, in the court's discretion, reasonable attorneys' fees to the prevailing party; and (5) criminal penalties of a fine of up to $10,000 or up to one year's imprisonment for willful infringement for purposes of commercial advantage or private gain. The Piracy and Counterfeiting Amendments Act of 1982 imposes harsher punishments for large scale piracy: a $250,000 fine and five years' imprisonment for those who pirate 1,000 recordings or 65 films within 180 days.

PATENTS

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patents. Section 101 provides:

Whoever invents or discovers any new and useful process, machine, manufacture, or composition of matter, or any new and useful improvement thereof, may obtain a patent therefor, subject to the conditions and requirements of this title.

Thus, naturally occurring substances are not patentable, as the invention must be made or modified by humans. For example,

Figure 6A

FIGURE 6B

1024 REGULATION OF BUSINESS PART NINE the discovery of a bacterium with useful properties is *not* patentable, whereas the manufacture of a genetically engineered bacterium is. See *Diamond, Commissioner of Patents and Trademarks v. Chakrabarty*. By the same token, laws of nature, principles, bookkeeping systems, fundamental truths, methods of calculation, and ideas are not patentable. Accordingly, as Chief Justice Burger noted in *Diamond, Commissioner of Patents and Trademarks v. Chakrabarty*, "Einstein could not patent his law that $E = mc^2$, nor could Newton have patented the law of gravity." Similarly, isolated computer programs are not patentable, although, as mentioned above, they may be copyrighted.

To be patentable as a utility patent, the process, machine, manufacture, or composition of matter must meet three criteria:

1. Novelty—The invention must not conflict with a prior pending application or a previously issued patent;

2. Utility—The invention must possess specific and substantial usefulness, which must be affirmatively disclosed by the applicant; and 3. Nonobviousness—The invention, in light of the prior art, must not be obvious to a person skilled in such prior art.

In addition to utility patents, the Patent Act provides for plant patents and design patents. A plant patent protects a new and distinctive variety of asexually reproducing plant. Plant patents require (1) novelty, (2) distinctiveness, and (3) nonobviousness. A design patent protects a new, original, ornamental design for an article of manufacture. Design patents require (1) novelty, (2) ornamentality, and (3) nonobviousness. As mentioned above, design patents have a duration of fourteen years; plant patents, like utility patents, have a seventeen-year duration.

Procedure

The United States Patent and Trademark Office issues a patent upon the basis of a patent application containing a *specification*, which describes how the invention works, and *claims*, which describe the features that make the invention patentable. The applicant must be the inventor. Before granting a patent, the Patent Office thoroughly examines the prior art and determines whether the submitted invention is nonobvious and has novelty and utility (or distinctiveness or ornamentality, in the case of plant or design patents). An application for a patent is confidential, and the Patent Office will not divulge its contents. This confidentiality ends, however, upon the granting of the patent. Unlike rights under a copyright, no monopoly rights arise until the Patent Office actually issues a patent.

Figure 42-1 Intellectual Property

| | Trade Secrets | Trade Symbols | Copyright | Patents |
|---|---|---|---|---|
| What is protected | Information | mark | work of authorship | Invention |
| Rights protected | use or sell | use or sell | reproduce, prepare derivative works, distribute, perform, or display | make, use, or sell |
| Duration | until disclosed | until abandoned | usually author's life plus 50 years | 14 years for design patents; 17 years for all others |
| Federally protected | no | yes | yes | yes |
| Requirements for protection | valuable secret | distinctive | original and fixed | novel, useful, and nonobvious |

CHAPTER 42     PROTECTION OF INTELLECTUAL PROPERTY     1025

Therefore, anyone is free to make, use, and sell an invention for which a patent application is filed until the patent has been granted.

An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance *are* defenses to contributory infringement, they are *not* defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

---

CASES

*Trade Secrets*

B. C. ZIEGLER AND COMPANY v. EHREN
Court of Appeals of Wisconsin, 1987.
141 Wis. 2d 19, 414 N.W. 2d 48.

BROWN, J.

Lawrence P. Ehren appeals from a grant of summary judgment restraining him from using or disclosing information contained on business papers and records he bought from a scrap paper company but which originated with B. C. Ziegler and Company (Ziegler). The circuit court held that the information was entitled to common law trade secret protection and that Ehren did not acquire title to the information as a good faith purchaser. We affirm those rulings.

Ziegler is an underwriter of securities located in West Bend. Ehren is employed by a scrap dealer, Lynn's Waste Paper Co., Inc. (Lynn's), where his duties include determining the value for recycling purposes of scrap paper purchased by Lynn's. From 1981 to 1983, Ehren was a licensed securities salesman and worked for two brokerage firms which compete with Ziegler.

Ziegler considered its customer lists confidential and had developed policies for the disposal of scrap paper which were regularly communicated to its employees. Paper containing a customer name was to be burned or shredded on the Ziegler premises before disposal or was to be delivered for shredding to a commercial shredding concern in Appleton, in which case the employee delivering the paper was to wait while it was shredded. Under no circumstances was scrap paper containing names or information about Ziegler customers to leave the possession of its

FIGURE 6C will, by intestate succession. Section 201, transfer of copyright ownership, by operation of law, is not valid, unless it is memorialized in a note or memorandum signed by the owner of the rights conveyed or by the owner's duly authorized agent. Section 204. An author may terminate any transfer of copyright ownership, other than that of a work for hire, during the five-year period beginning thirty-five years after the transfer was granted. Section 203.

Ownership of a copyright, or of any of the exclusive rights under a copyright, is distinct from the ownership of any material object that embodies the work. Transferring the ownership of any material object, including the copy or recording in which the work was first fixed, does not of itself convey any rights in the copyrighted work embodied in the object; nor, in the absence of an agreement, does the transfer of copyright ownership or of any exclusive rights under a copyright convey property rights in any material object. Section 202. Thus, the purchase of this textbook neither affects the publisher's copyright nor authorizes the purchaser to make and sell copies of the book. The purchaser may, however, rent, lend, or resell the book.

Infringement and Remedies

Infringement occurs whenever somebody exercises, without authorization, the rights exclusively reserved for the copyright owner. Infringement need not be intentional. To prove infringement, the plaintiff need only establish that he owns the copyright and that the defendant violated one or more of the plaintiff's exclusive rights under the copyright. Proof of infringement usually consists of showing that the allegedly infringing work is substantially similar to the copyrighted work and that the alleged infringer had access to the copyrighted work.

To be the subject of a suit for infringement, the copyright must be registered with the Copyright Office, unless the work is a Convention work whose country of origin is not the United States. For an infringement occurring after registration, the following remedies are available: (1) injunction; (2) the impoundment and, possibly, destruction of infringing articles; (3) actual damages plus profits made by the infringer that are additional to those damages, or statutory damages of at least $500 but no more than $20,000 ($100,000 if the infringement is willful), according to what the court determines to be just; (4) costs and, in the court's discretion, reasonable attorneys' fees to the prevailing party; and (5) criminal penalties of a fine of up to $10,000 or up to one year's imprisonment for willful infringement for purposes of commercial advantage or private gain. The Piracy and Counterfeiting Amendments Act of 1982 imposes harsher punishments for large scale piracy: a $250,000 fine and five years' imprisonment for those who pirate 1,000 recordings or 65 films within 180 days.

PATENTS

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patents. Section 101 provides:

Whoever invents or discovers any new and useful process, machine, manufacture, or composition of matter, or any new and useful improvement thereof, may obtain a patent therefor, subject to the conditions and requirements of this title.

Thus, naturally occurring substances are not patentable, as the invention must be made or modified by humans. For example,

FIGURE 9A ance, will, or intestate succession. Section 201. A transfer of copyright ownership, other than by operation of law, is not valid, however, unless it is memorialized in a note or memorandum signed by the owner of the rights conveyed or by the owner's duly authorized agent. Section 204. An author may terminate any transfer of copyright ownership, other than that of a work for hire, during the five-year period beginning thirty-five years after the transfer was granted. Section 203.

Ownership of a copyright, or of any of the exclusive rights under a copyright, is distinct from the ownership of any material object that embodies the work. Transferring the ownership of any material object, including the copy or recording in which the work was first fixed, does not of itself convey any rights in the copyrighted work embodied in the object; nor, in the absence of an agreement, does the transfer of copyright ownership or of any exclusive rights under a copyright convey property rights in any material object. Section 202. Thus, the purchase of this textbook neither affects the publisher's copyright nor authorizes the purchaser to make and sell copies of the book. The purchaser may, however, rent, lend, or resell the book.

Infringement and Remedies

Infringement occurs whenever somebody exercises, without authorization, the rights exclusively reserved for the copyright owner. Infringement need not be intentional. To prove infringement, the plaintiff need only establish that he owns the copyright and that the defendant violated one or more of the plaintiff's exclusive rights under the copyright. Proof of infringement usually consists of showing that the allegedly infringing work is substantially similar to the copyrighted work and that the alleged infringer had access to the copyrighted work.

To be the subject of a suit for infringement, the copyright must be registered with the Copyright Office, unless the work is a Berne Convention work whose country of origin is not the United States. For an infringement occurring *after* registration, the following remedies are available: (1) injunction; (2) the impoundment and, possibly, destruction of infringing articles; (3) actual damages, plus profits made by the infringer that are additional to those damages, or statutory damages of at least $500 but no more than $20,000 ($100,000 if the infringement is willful), according to what the court determines to be just; (4) costs and, in the court's discretion, reasonable attorneys' fees to the prevailing party; and (5) criminal penalties of a fine of up to $10,000 or up to one year's imprisonment for willful infringement for purposes of commercial advantage or private gain. The Piracy and Counterfeiting Amendments Act of 1982 imposes harsher punishments for large scale piracy: a $250,000 fine and five years' imprisonment for those who pirate 1,000 recordings or 65 films within 180 days.

PATENTS

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however; upon expiration, the invention enters the "public domain," and anyone may use it.

Patentability

The Patent Act specifies those inventions that may be patented as utility patents. Section 101 provides:

Whoever invents or discovers any now and useful process, manufacture, or composition of matter, or any new and useful improvement thereof, may obtain a patent therefor. Subject to the conditions and requirements of this title.

Thus, naturally occurring substances are not patentable, as the invention must be made or modified by humans. For example,

FIGURE 9B

Therefore, anyone is free to make, use, and sell an invention for which a patent application is filed until the patent has been granted.

An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance are defenses to contributory infringement, they are not defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

FIGURE 9C

KNOWLEDGE ACQUISITION NEXUS FOR FACILITATING CONCEPT CAPTURE AND PROMOTING TIME ON TASK

CROSS REFERENCE TO RELATED DOCUMENTS

The present application claims priority to U.S. provisional patent application Ser. No. 61/572,853 filed on Jul. 22, 2011. U.S. patent application Ser. No. 61/572,853 filed on Jul. 22, 2011 and its references and all references cited in the instant application with their references are incorporated in entirety by reference.

I. BACKGROUND

Most college students in the US and Western Europe use the traditional study method to acquire and learn course material. This method comprises three major steps. First, it consists of identifying, extracting and recording the most relevant subject matter from textbooks, journals and lectures, an exercise known as "concept capture." Second, the key concepts are combined and compressed into a brief condensate. Third, in a process known as "time on task", the condensate is recited repeatedly until rapidly recalled or memorized. Subjects generally use manual or computational note taking for each of the first two steps. Educators assert that the best results from the traditional method are achieved when the largest measure of study time is devoted to step 3, "time on task" rather than step 1, "concept capture." This notion is conceptually rooted in the theory that repeated use or stimulation of information-bearing neural pathways lowers their conduction threshold and facilitates knowledge retention and recall.

In practice, the success of this method has been hampered by the inordinate length of time it takes a student to manually transcribe the key ideas from textual material. Students contend that the manual transcription process is laborious, tedious and interdicts the sustained concentration required to assimilate the subject matter. Importantly, most find that despite long hours of study input the method fails to produce superior test performance. Educators agree that the traditional method is ineffective largely because of the disproportionate amount of study time required in "concept capture" and consequent reduction in the fraction of time devoted to the all important "time on task." They further assert that boredom/frustration with the traditional method is a major cause of student dropout and that conceptually new learning systems are needed.

The claimed method provides a solution this problem. In principle, it rapidly captures textual images from books, journals, manuals and transfers them into a computer or mobile device. It further extracts the key concepts from this material and converts them into an accurate summary. The entire process is accomplished in a single step and a fraction of time it takes to prepare such a document by the manual transcription method. A further advantage of the instant invention is that it reduces the amount of study time spent in "concept capture" and increases that expended in "time on task" or the repeated practice of the summarized material until memorized. As a consequence the claimed method outperforms the traditional method, promoting better command of the subject matter and test performance.

The instant invention uses camera phones, iPODs™, iPADs™, PDAs™, tablets, BlackBerries™, mobile computers and any other mobile device equipped with automated image acquisition software (collectively "image capture devices") to precisely capture textual images. Once framed in the viewfinder, the image capture device automatically stabilizes, focuses (autofocus), rotates, brightens, auto-enhances and deskews/straightens printed lines. Precise and sharp image capture is also facilitated by omnidirectional image sensors in the image capturing device. Next, the image in JPEG, TIFF or binary format is transferred automatically to an OCR program where it is converted to editable text and then to a user understandable summary. The final summary may be practiced repeatedly and memorized in preparation for tests, discussion groups or presentations.

In an additional application the image capturing devices efficiently captures textual images by projecting on the text LED or laser framing brackets with a centered bulls-eye. Once the text is encompassed in the brackets, the image is automatically autofocused and captured as described below.

The claimed invention is rapid, accurate and simple to use and adapted to virtually any subject matter. Summaries can be performed on printed material such as law contracts, book chapters, magazine/newspaper articles, manuals and manuscripts. it is well adapted to the lifestyle of students, business people, lawyers, doctors and other professionals with a limited amount of time to capture and digest the key concepts from a large volume of printed material.

The claimed invention is based on the teachings of framed educational psychologist David Ausubel who held that effective learning occurs when the most significant ideas of a subject are presented first and then expanded progressively by adding related concepts and details.

According to Ausubel, instructional materials should attempt to integrate new material with previously presented information through comparisons and cross-referencing of the new and old ideas (Ausubel D P *The Psychology of Meaningful Verbal Learning*. Orlando, Fla.: Grune & Stratton, 1963; Ausubel, D P In defense of advance organizers: A reply to the critics. *Review of Educational Research* 48:251-257 (1978); Ausubel D P *The Acquisition and Retention of Knowledge* Dordrecht, The Netherlands: Kluwer Academic Publishers, 2000).

The claimed invention applies Ausubel's learning principles by first producing an accurate summary of the subject matter which then functions as a knowledge tree with branches designed to accommodate related material.

The instant invention is especially useful for subjects with reading comprehension disorders the most common of which is failure of "significance detection" in which the subject cannot distinguish key points from less important information or prioritize data with different levels of detail. "Concept recognition dysfunction" is a subset of "significance detection" in which subjects have difficulty recognizing familiar themes in subject matter with only superficial differences. Struggles with these disorders usually surface in high volume college courses such as biology, political science, economics and psychology. The claimed invention is useful in this group because it rapidly identifies, extracts, consolidates and condenses the key concepts in textual subject matter into a machine summary. Frequent drill with this method enhances subjects' ability to recognize the most significant concepts in textual subject matter.

The claimed invention is also useful for short-term memory dysfunction. These subjects absorb information at a slow pace and are unable to keep up with the rapid rate of information in-flow in a classroom lecture. Similarly, subjects with short attention span cannot concentrate long enough to get work done before fatigue sets in. In a related malady, subjects with active working memory dysfunction actually lose track of what they are doing while they are doing it. They have to work fast lest they forget what they are doing.

The claimed method is useful in these disorders because it rapidly captures and summarizes key concepts thereby allowing these subject to concentrate their limited "brain fuel" in repetitive practice of the subject matter. The audio summarizer of the claimed invention described herein is useful for this group because it eliminates note taking during a lecture. The audio summarizer acquires the lecture audio input, converts it from voice to editable text and summarizes the lecture content in real-time as the lecture proceeds. It also provides a printed summary of the entire lecture that can be readily accessed from the summary by clicking on its highlighted key words/phrases. In this way, slow note takers and those with short attention spans can access all the relevant subject matter at their own pace without being overwhelmed by the rapid rate of information input.

The claimed invention's major advantage over the traditional method is streamlining and accelerating the "concept capture" phase thereby allowing more "time on task" and improved mastery of the subject matter. With a single click, the claimed invention captures and autofocuses the textual image, converts it to OCR and summarizes the key concepts with the same alacrity as a barcode scanner that recognizes/decodes barcodes at the point of sale. No other program in the art consolidates these tools into a "simple to use" process that increases learning efficiency and promotes mastery/practical usage of textual subject matter.

II. BRIEF DESCRIPTION OF THE DRAWING FIGURES

FIG. 1 is an architectural overview of a network environment practicing document summarization according to an embodiment of the present invention.

FIG. 2 is an exemplary screen shot of a browser window illustrating a summarization user interface according to an embodiment of the present invention.

FIG. 3 is a process flow chart illustrating acts for summarizing a document according to embodiments of the present invention.

FIG. 4 is an exemplary screen shot of the user interface of FIG. 2 illustrating a voice to text summarization feature according to an embodiment of the present invention.

FIG. 5 is a process flow chart illustrating acts for summarizing voice to text in near real time according to an embodiment of the present invention.

FIGS. 6A, 6B and 6C. Displayed are jpeg images captured from 3 sequential pages of a contract law textbook (6A, 6B, 6C) using a 5 megapixel back camera of the iPAD3™ with desktop lighting and default camera settings.

FIG. 7. Displayed is original Text with curved surface in suboptimal desktop lighting acquired with Canon IXY Digital 800IS 6 megapixel camera using settings described in the text.

FIGS. 8A and 8B. Digital image (JPEG) of two text book pages (FIGS. 8A and 8B) captured with a digital FCCE™ 3.2 megapixel ultra compact digital camera suitable for OCR and machine summarization.

FIGS. 9A, 9B and 9C. Displayed is raw text acquired with a DS6700-DC2001zzr handheld digital image scanner (9A and 9B). In 9C, raw text acquired with DS6700-DC2001 zzr handheld digital image scanner in which form the text is transferred to OCR software where it is converted to editable text FIGS. 10A and 10B. Shown is a textual image captured with DS6700-DC2001zzr handheld digital image scanner. In this form, the text is transferred to ABBYY 9.0 fine reader where it is converted to a pdf file. From there it is transferred to an Idautomation pdfd417 font and encoder wherein it is converted to a pdf417 2D barcode.

FIG. 11. Shown is a pdf417 2D barcode of textual image.

III. SUMMARY OF THE INVENTION

Described herein is an interactive program that enables rapid capture and processing of textual or audio subject matter, extraction of key concepts and conversion to a user understandable summary. The claimed invention uses mobile imaging devices such as cameras, camera phones, tablets, iPODs™, scanners equipped with omnidirectional aim and shoot framing features that automatically focus, stabilize and capture textual images. With a single click, the textual image is processed through OCR and to a user understandable summary. The entire process is completed in a fraction of the time it takes to prepare such a document by the traditional manual note taking method. By virtually minimizing the time-consuming "concept capture" phase the claimed invention maximizes the all important "time on task" function (repeated practice of the subject matter) critical for efficient learning and superior test performance.

IV. DETAILED DESCRIPTION

A. Capture of Textual Material

The claimed method contemplates textual image capture and processing with the same alacrity/efficiency as a bar scanner used to scan and decode barcodes on commercial products at point of sale. In this context, the instant invention efficiently identifies and automatically focuses and sharpens textual image within the monitor screens of camera phones, iPODs™, iPADs™, tablets, Blackberrys™ or other such devices referred to collectively herein as "image capture devices." These devices are equipped with a high resolution digital cameras up to 8 megapixels with most between 3 and 5 megapixels. Tablets with a range of 0.7 to 30 megapixels are useful in this invention. The image need only to be framed within the boundaries of the screen in order to obtain a sharp, focused image of textual material.

Monitor displays in smart phones range from 4.5-5.2 inches and tablets come in 9-10 inch and 7-9 inch screens which makes it easy for the user to identify and frame textual images devoid of training and the hassle/frustration of focusing/centering the object in the small digital camera screens. Tablets with screens ranging from 4 to 25 inches are useful in this invention. Additionally, because the camera in the mobile imaging device contains autofocus, image stabilizing and rotation functions, the user does not have to precisely center or focus the image in the monitor screen in order to obtain a crisp and sharp image. Once the image is positioned within the monitor screen borders the image is captured automatically or the user can click the image capture button or tap the device to lock the focus/exposure. Once captured, the image is further processed to OCR and a user understandable summary as described below.

For most printed documents the distance of the image capture device above the document is two to nine inches depending on the dimensions of the image. For small images, the imaging device is held closer to the documents while for larger images it is held farther from the document. The instant method is particularly adapted to smart phones and tablets because the large viewfinders in these devices allow the user to rapidly identify and frame the image with a minimum of fine tuning manual adjustments. In this fashion, tens of pages of printed images or textual images can be rapidly imaged, focused, sharpened, rotated, deskewed, captured and processed for machine summarization.

To facilitate rapid and accurate image capture, the "mobile imaging devices" are equipped with an automated image finder that projects an image of the textual material in the monitor. Once the entire image is framed within the boundaries of the viewing monitor, the image is captured automatically. This integrated image finder captures small images as well as large legal size documents. The mobile imaging devices can optionally capture between 2 and 35 images of the same textual material which are merged to produce the single sharpest and most accurate image. The devices detect and straighten any curvature and distortion of text content enabling even the areas near the binding to emerge clearly for accurate OCR processing. Mobile imaging devices contain optical image stabilization to reduce motion sensitivity, autofocus and unidirectional imaging which capture and straighten text presented at acute angles. These devices are also equipped with an integrated illumination system, multiple lighting modes and an integrated diffuser that facilitates capture of images in poor lighting without a flash.

In contrast digital point and shoot and SLR cameras require the user to manually identify, frame and focus the textual image within the borders of their small monitors. This task is time consuming. It calls for concentration and a steady hand to optimally identify, frame and focus the image. Optical scanning devices require separate hardware through which pages must be fed and scanned. Images in bulky books and journals cannot be processed unless they are precopied. In the latter two cases, the process is time consuming, requires training and cannot be conveniently carried out in an "out of office" environment such as a lunchroom or café.

In another embodiment, "mobile imaging devices" are equipped with an automated image finder that projects an image framing grid and a bulls-eye centering pattern on textual material. With gentle circular and up and down movement of the device, the image is centered in the bulls eye, framed within the brackets of the grid and then captured automatically by omnidirectional sensor without using the camera monitor screen. This device contains all of the elements described above including automated image finder, page curvature and deskewing distortion, optical image stabilization, unidirectional imaging to capture images viewed at acute angles, integrated illumination, multiple lighting modes and integrated light diffuser.

Most smart phones can be used with default camera settings. With cameras less than 5 megapixels, shooting at low compression and 100 ISO eliminates graininess. Some smart phone have digital zoom and image cropping features that can be used to tightly frame the text. The setting menus of some smart phones allow selection of ISO or Macro which should be used as needed depending on the ambient light and the size of the object. In other instances, add-on lenses such as Photojojo™ or Olloclip™ can be attached to the outer lens to improve close-up quality and resolution of the textual images.

Once the image is captured it is then processed seamlessly through OCR and text summarization programs resulting in a user understandable summary of the text in the captured images. The claimed method is the only one that consolidates such diversified software and hardware into a single program that with a single click of the camera provides a functional summary of the textual images (Example 1).

An excellent image capturing device is the Samsung 10.1 Galaxy Tablet™ or iPAD3™. These devices contains a 5 megapixel rear camera equipped with image recognition and autofocusing functions. The textual image is rapidly framed in the monitor screen by placing the device over the text. The camera automatically centers, focuses, sharpens and deskews the image in the monitor screen. The image is then transferred automatically to OCR where it is readily converted to editable text and then to a user understandable summary. The specifications and configuration of representative tablets useful in this invention are shown below in Table 1.

TABLE 1

| Representative models | OS | Network | Display | Processor | Memory | Front Camera | Rear Camera | Wi-Fi | Bluetooth |
|---|---|---|---|---|---|---|---|---|---|
| Galaxy Tab 10.1V | Android 3.0 Honeycomb | HSPA + 21 Mbit/s 850/900/1900/2100 EDGE/GPRS 850/900/1800/1900 | 1280 × 800 TFT | 1 GHz Dual-Core Nvidia Tegra 2 | 1 GB DDR2 | Yes 2 MPx | Yes 8 MPx | Yes Dual Antenna 802.11 (a/b/g/n) | Yes 2.1 + EDR |
| Galaxy Tab 10.1 | Android 3.1 Honeycomb | HSPA + 21 Mbit/s 850/900/1900/2100 EDGE/GPRS 850/900/1800/1900 | 1280 × 800 TFT | 1 GHz Dual-Core Nvidia Tegra 2 | 1 GB DDR2 | Yes 2 MPx | Yes 3 MPx | Yes Dual Antenna 802.11 (a/b/g/n) | Yes 2.1 + EDR |
| Galaxy Tab 8.9 | Android 3.1 Honeycomb | HSPA + 21 Mbit/s 850/900/1900/2100 EDGE/GPRS 850/900/1800/1900 | 1280 × 800 PLS | 1 GHz Dual-Core Nvidia Tegra 2 | 1 GB DDR2 | Yes 2 MPx | Yes 3 MPx | Yes 802.11 (a/b/g/n) | Yes 3.0 |

Another image capturing device useful in the claimed method is partially exemplified in the Motorola ds6707™ digital image scanner under the control of 123Software™. For use in the claimed application, this software or its likeness is integrated into a camera phone, iPOD™, or tablet and other such mobile imaging device with a camera of 1.3-25 megapixels and additional specifications described above. Preferred configuration settings for 123Software are provided below.

TABLE 2

| Imaging Configuration for 123Software | |
|---|---|
| Trigger Mode | Autoaim |
| Low light Enhancement | Yes |
| Presentation Mode Field of View | Full |
| Image Capture Autoexposure | Yes |
| Illumination Bank Control | Full |
| Fixed Exposure | 100 |
| Image Size (pixels) | Full |
| Image Enhancement | High |
| Image File Format Selection | JPEG, TIFF, BMP |
| JPEG Image Optimization | |
| JPEG Image Options | JPEG Quality or Quantity Detector |
| JPEG Quality and Size Value | 100 |
| JPEG Target File Size | 600 |
| Snapshot Mode | yes |
| Gain Exposure Priority | Autodetect |
| Snapshot Mode Timeout | 30 sec |

TABLE 2-continued

Imaging Configuration for 123Software

| | |
|---|---|
| Snapshot Aiming Pattern | On |
| Image Cropping | On |
| Top Pixel Address | 0 |
| Left Pixel Address | 0 |
| Bottom Pixel Address | 1023 |
| Right Pixel Address | 1279 |

Cameras embedded in "mobile imaging devices" are useful in this invention. Because a text image can be conveniently recognized and framed in their screens, tablets equipped with digital cameras or scanners and 4-10 inch monitor screens are especially useful in this invention. In this context, the text page is imaged in the monitor screen and automatically stabilized, focused and sharpened without manual adjustment by the user. The image is then captured by pressing the capture button or tapping the monitor screen. The captured image may be focused (autofocused), sharpened and brightened before or after capture. Thereupon, the software automatically launches an OCR program which converts the image to editable text which is then summarized by the machine summarizer software. The final product is a user understandable summary of the captured textual material. The entire multi-step process is seamlessly accomplished with a single click or tap of the image capturing device.

The present invention contemplates that the digital camera in "mobile imaging devices" such as the camera phone, smart phone, iPOD™ or tablet uses the following preferred configurations. "Auto" mode uses (i) Image stabilization (ISO) at the highest setting in continuous mode (ii) "Large" recording pixels (2816×2112), (iii) Macro mode to magnify and clarify images within 6-36 inches of the camera (iv) "Superfine" compression mode for high quality images (v) Evaluative Metering mode in which the camera divides the image into several zones, gauges complex lighting conditions and adjusts the settings to the correct exposure (vi) Auto rotate mode which is a sensor that detects the orientation of an image and automatically rotates it to the correct orientation in the monitor screen. In Auto and Evaluative Metering modes, the camera makes automatic adjustments for the lighting conditions making it possible to photograph text even in poor lighting conditions. In Macro and Autorotate modes the page image is focused sharply in the monitor screen with the camera held 6-36 inches above the printed page. ISO mode minimizes and eliminates blurry images from small inadvertent movements of the operator. Thus the camera has multiple built in automatic features and a broad range of error that make it easy for the user to capture page images on curved surfaces that can be readily recognized by the OCR program.

Conventional point and shoot digital cameras independent of mobile devices described above are also useful with the same preferred megapixel range and settings defined in the above paragraph. The image is manually focused on the center of a page and the document image is tightly framed in the monitor screen. Natural light is preferred with the flash disabled (in most point-and-shoot digital cameras, the flash is on auto mode by default). In poor lighting the flash may be used from 20 inches away but should be avoided with glossy paper. The camera may be postioned approximately 14-18 inches from center of the text and one textbook page (10"×7" each) should be photographed at a time. If the camera has manual white balance, a white sheet of paper may used to set white balance. Otherwise, the appropriate balance mode for lighting conditions is selected. The anti-shake or image stabilization setting is enabled, but if absent a tripod or any other steadying device may be employed. In poor lighting conditions autofocus may function incorrectly in which case manual focus is used with the maximum aperture allowed by the camera (2.3 or 4.5). In bright daylight, smaller apertures will produce sharper images. If the camera gives you more than one choice of ISO speed, the highest ISO setting is selected. For camera phones, iPODs™ and tablets, these camera settings may be fixed as default for textual image camera function in the claimed method.

Canon IXY Digital 800 IS (6 megapixels) with image stabilization, 4× zoom, autofocusing, autorotate, evaluative metering and macro modes satisfies most of the above criteria for rapid acquisition of printed images but nearly all digital cameras with at least 1.9 megapixels are useful. Cameras with a range of 3-12 megapixels are preferred. The Canon IXY Digital 800 IS™ (6 megapixels) with image stabilization is a good example for this purpose. The printed material is positioned on a flat surface and the camera is placed 15-36 inches above and parallel to it. The image is focused in the camera's 2.5 cm monitor screen when it is placed in a range of 12-50 inches above the printed page. The page to be imaged is encased tightly within the perimeter of the monitor screen; the camera can be turned 90 degrees horizontally for this purpose. The entire page image may be reduced to 50% of the monitor screen areas and still maintain sharp focus. If parts of the printed surface are curved and the printed lines are slanted, the camera can be raised several inches which will reduce the image size but also will also partially straighten out any curved lines.

In the claimed method, printed images captured by the mobile imaging devices are automatically converted to JPEG or TIFF files and rotated to the vertical position (reading position). Here the image is automatically sharpened, brightened, deskewed, cropped and text lines are straightened. In addition, ABBYY FINE READER Professional 9.0-10 edition™ OCR programs automatically straightens and deskews lines and adjusts resolution of the captured images prior to processing. In the claimed invention, these steps are carried out automatically without user prompting.

In the next automated step, the image is processed through an OCR program, converted to editable text and summarized optionally converted in outline format (Examples 1-4). The preferred OCR programs for this purpose is NUANCE OMNIPAGE™ or ABBYY FINE READER™ 9.0 and 10.0 editions and the preferred summarization program is Megaputer TextAnalyst™ or PolyAnalyst™. In the claimed method, the entire operation from image capture to machine summarization is carried out automatically and seamlessly starting with the step of placing the mobile imaging device over the textual subject matter.

The machine summarization is carried out by several types of text summarization programs of which Megaputer TextAnalyst™ or PolyAnalyst™ is preferred. The text of a single or a multiple page document can be summarized individually or sequentially. The program can automatically summarize individual subsections of the textual material containing relatively homogeneous subject matter. This is accomplished by highlighting the text to be summarized. Several such separate summaries may be obtained in this fashion to be used individually or all subsection summaries can be further summarized as a whole.

Once the mobile imaging device completes the entire process, the machine summary appears in the monitor screen of the device. The summary can be transferred to the top of the original document or transferred to a separate page. The summary can also highlight the key words in the summary which when clicked by the mouse allows the user to instantly access the site in the original text where the term or phrase was originally used. In the fashion, the user can obtain further clarification of the term or phrase from the preceding or succeeding sentences in the original text. The clarifying sentence or phrase can then be immediately copied and placed in the summary or margin next to the highlighted key word. Alternatively, the user can identify the relevant material in the original text and using a microphone connected to Voice to Text technology such as the Nuance PDF-8 Professional™ recite the relevant material and place it in the summary adjacent to the relevant subject matter.

The summary is also be saved or transferred to other devices such as a personal computer, eReader, or any mobile device (e.g., iPhone™, iPOD™, tablets etc.) using a USB cord (or other connecting wire), memory card or wireless technology. For this purpose, Wi-Fi adapters are useful in the present invention making it possible to transfer the text via 802.11 wireless networks to a PC eliminating the need to physically connect the camera or a memory card to a computer. Bluetooth™ or Nikon WT-1™ technology enables the user to access a personal computer in coffee shops, airports, and businesses that have "hotspot" capability. Removable memory card devices that are removed from the device and transferred to a card reader connected to a computer are also useful. Bluetooth™ wireless connectivity allows the user to "send" printed material to another Bluetooth™-enabled device wirelessly such as a computer, camera phone, iPOD™, tablet, reader or a PDA. Infrared (IR) transfer IR image transfer works similarly to Bluetooth™, but are not as fast. Both devices require an IR transceiver to move the printed matter. Images of the textual material and/or summaries can also be sent via email to a computer for further processing. Multimedia Messaging Service (MMS)™ is an extension of the text-only Short Messaging Service (SMS)™ that allows one to send matter from a camera phone to a computer.

Scanners

Acquisition of textual images for OCR and summarization can also effected with an optical scanner which may be fixed or hand held. For actual scanning, the printed material from books or journals can be captured by manually dragging the scanner over the page or by feeding the document into the scanner or placing it over the plate of flat bed scanner. Alternatively, multiple pages may be placed in an automated page feeding device for automatic sequential scanning. Individual pages from books and journals can be scanned by removing binding of the publication and placing free pages in the automated paper feed device. Pages from a bound book or journal may also be first copied with a conventional copier and loaded into the automatic paper feed scanner for sequential scanning.

Most commercial personal scanners or "all in one" scanners, copiers and/or fax machines capable of scanning standard textbook and letter size documents are useful in the present invention. Scanning devices should be capable of processing at least 5-30 documents/min in automatic or manual mode at 90 to at least 1200 dpi. Scanners with automatic paper feed attachments are preferred. In manual mode, the scanner should have previewing feature, which allows the user to select and bracket the printed material to be scanned. Portable scanners are useful for scanning journal articles or reference textbooks in a library or museum. The images acquired by the scanner may be transferred to a computer at a later point via USB port, wireless, infrared, floppy disc or CD. The stored memory of the scanned library material is readily formatted into the word-processing program of a PC or notebook with the aid of the OCR software programs mentioned above. Most commercially available scanners are useful. Particularly preferred for the present system are scanners in the EPSON™ Perfection Series with automatic paper feed but nearly all other commercial desktop or business scanners are useful in this invention.

A particularly preferred scanner is the bendable sheet image scanner. It is 2-5 mm thick and has the unique advantage of conforming to the bent page of a book or document when placed over it. While still in development at this time, the bendable scanner consists of organic transistors as electronic switches and organic diodes as photo detectors, both manufactured on plastic films without optics or mechanical components. Employing this new principle, the bendable scanner can capture images in the reflection geometry. These multilayered structures consist of soft materials except electrodes and, as a consequence, the whole device is mechanically flexible, lightweight, thin and portable.

Capture of Textual Material from CDs, eBooks in WORD, pdf or JPEG/TIFF Files

The present invention contemplates acquiring text from CDs, eBooks, the Internet or other storage vehicles containing the content of textbooks, journals or other printed material in WORD, pdf or JPEG/TIFF binary format. The claimed method processes this material through an OCR program to editable text and converts it to a functional summary of the key concepts in the identical fashion described above for mobile imaging devices and scanners using the Nuance OMNIPAGE™, PDF-8™ or ABBYY FINE READER™ 10 professional™ OCR programs and Megaputer TextAnalysist™ or Polyanalyst™. In some instances, the textual material may be in a format such as WORD or pdf that is transferred directly and converted to a summary by the summarizer program without requiring the intermediary OCR processing. Textual material in JPEG or TIFF format, however, does require OCR processing to editable TEXT or WORD before transfer to the summarizer program at this point in time but can be transferred directly to the summarizer programs when they are capable of processing JPEG and TIFF images.

Software Programs and User Interactions

The software program has several major features which include acquisition of printed matter, digital images and audio input. Digital images in JPEG or PDF format are converted via OCR to editable text in WORD or TEXT format in normal formatting The editable text is machine summarized and converted into a Roman, numbered or bullet-point format. Using a split screen to compare the outline with the original text, the user can add or subtract material from the outline to achieve the desired content density. The user can also query the outline with relevant questions whose answers broadly cover the subject matter. The outline can then be printed or transferred elsewhere for repetition and memorization.

OCR Software

The OCR software converts printed matter from a scanner, camera, camera phone or mobile device into editable text with semantic accuracy >95%. The preferred program is the Fine Reader Professional™ 10.0 edition in which the jpeg images from the digital camera are transferred directly to this program. In a single step, this program focuses the image, straightens the text lines and converts it to editable text. The specifications for this program are listed below.

System Requirements

PC with 1 GHz or higher.

Operating System Microsoft® Windows® 7, Microsoft Windows Vista®, Microsoft Windows Server 2003, Microsoft Windows Server 2008, Microsoft Windows XP.

11

To work with localized interfaces, corresponding language support is required.
Memory: 512 MB available RAM. In a multiprocessor system, an additional 256 MB of RAM is required for each additional processor core.
Hard disk space: 650 MB for typical program installation and 650 MB for program operation.
TWAIN- or WIA-compatible scanner, digital camera or fax-modem (optional).
Video card and monitor (1024×768 or higher).
Keyboard, mouse or other pointing device.
File Input Formats

| Format | Description |
|---|---|
| BMP | black and white, gray, colour |
| PCX, DCX | black and white, gray, colour |
| JPEG, JPEG 2000 | gray, color |
| JBIG2 | black and white |
| PNG | black and white, gray, colour |
| TIFF | black and white, gray, color (RGB, CMYK), multi-image. |
| PDF | any type of PDF |
| XPS | Microsoft .NET Framework 3.0 is required |
| DjVu | file format for storing compressed scanned images |
| GIF | popular image format for Web publishing |
| WDP | Windows Media Photo format. WIC or Microsoft .NET Framework 3.0 required |

Document Saving Formats

| Format | Description |
|---|---|
| DOC | Microsoft Word 97-2003 Document |
| DOCX | Microsoft Word 2007-2010 Document |
| XLS | Microsoft Excel 97-2003 Worksheet |
| XLSX | Microsoft Excel 2007-2010 Workbook |
| PPTX | Microsoft PowerPoint 2007-2010 Presentation |
| RTF | Rich Text Format |
| PDF, PDF/A | text and pictures only, page image only, text over the page image, text under the page image |
| HTML | |
| CSV | |
| TXT | |

Image Saving Formats

| Format | Description |
|---|---|
| BMP | black and white, gray, colour |
| TIFF | black and white, gray, colour (RGB, CMYK), multi-image |
| PCX, DCX | black and white, gray, colour |
| JPEG, JPEG 2000 | gray, colour |
| JBIG2 | black and white |
| PNG | black and white, gray, colour |

Barcode Types Recognized

| | |
|---|---|
| Code 3 of 9 | Check Interleaved 2 of 5 |
| Check Code 3 of 9 | Matrix 2 of 5 |
| Code 3 of 9 without asterisk | Popstnet |
| Codabar | Industrial 2 of 5 |
| Code 93 | UCC-128 |
| Code 128 | UPC-A |
| EAN 8 | UPC-E |

12

-continued

| | |
|---|---|
| EAN 13 | PDF417 |
| IATA 2 of 5 | Aztec Code |
| Interleaved 2 of 5 | Data Matrix |

Supported Equipment
Supported Scanners and MFPs
ABBYY FineReader™ supports TWAIN- or WIA-compatible scanners, multi-function peripherals (MFPs) and all-in-one devices.
A list of tested equipment.
Supported Digital and Mobile Phone Cameras
ABBYY FineReader™ can recognize TIFF and JPEG files created by any digital camera.
Minimum Requirements
2-megapixel sensor with variable focus lens
Recommended Requirements
    5-megapixel sensor
    Optical zoom
    Flash disable feature
    Manual focusing
    Manual aperture control or aperture priority mode
    An anti-shake system or a tripod In older versions such as the Fine Reader 8.0 Professional™, the JPEG or TIFF image taken by a camera or camera phone is first downloaded via USB or wireless device and software into a file on a computer, or mobile imaging device. This file may be accessed and opened by the OCR program. The image is then manually cropped and sharpened and text lines straightened by clicking and selecting each function in the "Image" menu on the toolbar. The image is then read by clicking the "Read Image" icon. The read image is then manually transferred to a WORD or pdf file by clicking the appropriate "Transfer" function. The final product appears as editable text in the selected format. The final text format can appear as a reproduction of the original text or all formatting can be omitted by selecting the preferred format in the Tools options menu. "Omit all Formatting" function in the OCR program is preferred for machine summarization. If the English text contains Greek symbols (as with medical genetics documents), the user can select dual Greek and English as the recognition languages in the OCR program.

Textual material may also be scanned by a flat bed optical scanner by simply opening the Fine Reader™ 8.0 or 9.0 programs and clicking "Scan and Read" icons. The textual material (single or multiple pages) is scanned and converted to editable text in the desired format by the OCR program.

In the multistep operation JPEG images from cameras, camera phones, iPODs, tablets and the like are saved to a file in the computer. The OCR program is then opened to the "Find and Open" function in which the file containing the desired jpeg is identified and opened. The images appear in the OCR program and may be cropped, despeckled, inverted and text lines straightened to improve recognition by the OCR program.
    A. Straighten lines
    B. Despeckle image
    C. Invert image
    D. Crop image The user then clicks the "Read and Transfer to Word" icon wherein the editable text that recognized by a machine summarizer program as described below. Most commercially available OCR programs such as OMNIPAGE™, TEXTREADER™ and FINEREADER™ are acceptable. However, the FINE READER™ 8.0-10.0 Professional Editions™ are preferred. The acquisition of printed matter (pdf) and digital images in JPEG or TIFF format and conversion by OCR to editable text can be accomplished in a single step with a single click of software menu titled "Acquire and Convert to Editable Text".

Likewise audio input is converted to printed text or PDF by voice recognition technology prior to use of the OCR program to convert it to editable text. The voice recognition and conversion by OCR to editable text can be accomplished in one step by selecting the "Acquire and Covert to Editable Text" function.

Summarizer Software

The claimed method uses summarizer technology to summarize the documents captured with the image capture devices and converted to editable text with an OCR program. The summarizer principles of operation are provided below. The summarizer provides a condensate of the key concepts from any printed Material regardless of length or complexity. The user can compress or condense the summary document to varying degrees determined as a percent of the total word volume of the original material. The user can also use summaries at various degrees of compression to determine the volume and depth of meaning in the original document. A summary with a compression of 30% would be expected to include more relevant concepts than one with a compression of 10% (See Example 1).

In practice, the pages to be summarized are placed sequentially in editable WORD, TEXT or PDF format. With a single click the summarizer summarizes the entire document. The summary appears promptly in a box on the same page. For custom summarization of individual paragraphs or subsections at disparate places in a document, the user simply highlights the text of interest at each site. These selections are pooled in order of appearance in the text and all the selections are summarized as a whole. Each subsection can also be summarized by itself in which case the summaries may be optionally summarized collectively.

The key words in the summary identified by the summarizer are routinely highlighted in red. The user can obtain detailed clarification of the meaning of a highlighted word or phrase in the summary by simply double clicking on the word or phrase. This immediately identifies the place(s) in the unsummarized document where the word or phrase appears enabling the reader to clarify the context in which the word/phrase was used originally by simply reading the adjacent sentences. These clarifications from the original text are highlighted, cut and pasted directly into the summary. These same clarifications can also be voice dictated into the summary using voice to text technology available in the present Nuance PDF-8 Professional™.

The summarized word/phrases can be collected as a single document by itself or the key summarized material can be highlighted directly in the original text. The finished summary can then be converted by the user into any outline format (e.g., Roman, bullet points, stars, asterisk etc.) using existing tools in the WORD program.

Summarizer Intervals

Machine summarizers are most effective when summarizing a homogeneous body of information. Authors of journal articles and textbook chapters commonly divide subject matter into sub-sections comprising a body of related concepts that make one or more key points. The user therefore first selects the summarizer intervals from a menu comprising:

A. Summarize entire document
B. Summarize from each emboldened or highlighted subsection of text and eliminate tables and graphs
C. Summarize summaries of all major subsections The program can also recognize markers created by the user in the text that denote the preferred textual sections that should be summarized individually. The program collates these individual subsection summaries into the final output summary and also provides for summarization of this summary.

Concept Density

The user must determine the concept density of the summary. For general overview of the text, a 10% compression of the subject matter will suffice. For more rigorous review, the user may prefer a more concept dense summary. Therefore, he is given a range of concept densities from 10% to 95% from which to choose. The summary density menu can be accessed at any point in the process should the user wish to compare a detailed with a more general summary of the subject matter.

Format

The user can choose the format of the final summary from menu options that include paragraph or sentence form, bullet points of each sentence or Roman outline with subheadings. Hybrid documents consisting of paragraphs, bullet points and Roman outlined material can also be prepared by the user. To confirm the effectiveness of extraction, the user can also view the entire document with the key phrases highlighted or emboldened. Likewise, the non-highlighted text can be deleted while the remaining highlighted phrases and sentences are pooled into a paragraph, bullet points or Roman outline.

Split Screen

Split screen displaying the original and machine summarized text is employed to allow the user to add relevant points from the original text to the machine summary. The key points in the original text are highlighted for ease of recognition and relevant sentences or words are dragged from the original document to the summary.

Summarizing the Final Summary(s)

The present invention envisions that effective learning involves progressive condensation of the subject matter to a final group of notes that can be readily reviewed before a presentation or examination. Thus, the claimed subject matter includes the option of a further summary of the final summary itself to provide a set of condensed notes for rapid review.

Disposition of the Final Summary

The present invention envisions that the entire operation from image capture through OCR and text summarization can be carried out completely in a mobile imaging device. Alternatively, the captured image may be transferred via USB connection or e-mail or wirelessly via Bluetooth™ or WiFi™ to a PC where it is further processed through OCR to a machine summary. The final summary can be printed or distributed to any other digital device such as eReaders of mobile devices via USB, wireless or e-mail.

Real-Time Summarization of Audio

It is estimated that using the traditional note taking method most high school and college students extract less than 30% of the key concepts from a classroom lecture. The act of comprehending an audio concept while transcribing an earlier one is extremely difficult and beyond the capability of most students. Most emerge from a lecture sensing that they may have missed or failed to understand more than 80% of the content. The present invention provides an solution to this problem. It envisions the use of summarization technology to summarize the content of an audio lecture in real-time and provide a summary as the lecture on a digital screen as the lecture is proceeding and a final summary at the end of the lecture. For this purpose, a parabolic or any other sensitive microphone or wireless transmitter is used to transfer the speech of the lecturer to the screen or monitor of a computer or mobile device equipped with voice to text software of which Nuance Dragon™, Via Voice™, Naturally Speaking™ are excellent examples. The verbal input of the speaker is rapidly converted from speech to text using any of the commercially available speech recognition software such as Dragon, Via Voice, Naturally Speaking etc. OCR programs in the computer convert the printed matter to editable text. A machine summarizer program operating in the device continuously summarizes the content of the editable text and projects the summarized/editable material on the screen of the computer or mobile device as the lecture is proceeding. The summarizer continuously updates/revises the summary as it receives new information from the speaker. The user can stop and restart a new summary as the speaker signals a change to new subject matter. In this way, the user can listen to a lecture and at the same time visibly review the speaker's key ideas in real time on his computer screen. At the end of the lecture, the user can access the original text of the lecture to clarify/expand/edit the machine summary for accuracy, clarity and depth. To accomplish this, the key word/phrases of the lecture summary are highlighted so that when clicked by the mouse the user immediately accesses the place in the complete lecture text from which the key word originated. Such complete text of the lecture is provided on the same screen as the summary as a separate box. The real-time system has the following major advantages. It eliminates note taking during a lecture enabling the user to concentrate on understanding the key concepts. By reading the main concepts on the computer screen while the lecture is ongoing, the key elements of the lecture are reinforced. It also permits rapid editing/clarification of key points in the final summary by providing easy reference to the exact place in the complete lecture text from which the summarized phrase/word originated. For use of this invention any personal computer, laptop and its variants or any mobile device such as smart phones, iPods or tablets can be used with the installation of the voice to text software and the summarizer programs described herein. Microphones provided by most computers or long range parabolic microphones are useful for audio acquisition. The computer may also be connected directly to wire or wireless networks originating from the speaker's microphone or its voice dissemination/amplification system.

Principles of Machine Summarization Systems

The claimed method uses OCR to acquire and format text material. Once formatted into editable text, an automatic text summarizer is used to extract the key concepts at the desired degree of compression. Examples of text extraction and summaries of various compression levels are given Example 3. This material is rapidly converted into bullet points or outline form. The machine summary and outlined notes are then reviewed and practiced. The user can also formulate questions from the text, enter them into the summarizer, which will extract and display the answers via a semantic search on the material (See Example 1). The fundamental steps in the summarizer process are given below.

A. Reduction. Information acquired from multiple sources is scanned and OCR used to convert the printed image to editable text in outline form specified above.

B. Parsing. The text is parsed into paragraphs, sentences, and words using a lexical analyzer. A system for separating words into stems (morphological stemming) and affixes, which can be used to reduce incoming texts into word stem form. A morphology analyzer can be used to tag key words based on suffixes employing disambiguation rules for syntactic context. Fast parsing with a full grammar parser such as the Tagged Text Parser (TTP) is also useful. The resultant parse tree is analyzed grammatically and nouns, verbs, adjectives, adverbs identified. The adjacency of each word is evaluated in making the determination. Subjects and predicates are identified. A different set of grammar rules is used for each natural language, making the product multilingual.

C. Analysis. The grammar tree is then analyzed and major concepts extracted according to relevancy rules. These relevancy rules are selected and/or entered by the user. Keywords and phrases are used for relevancy discrimination and assigned weights. The value of the key words and phrases is assessed according to their frequency and weight.

D. Construction of Vector Space Diagrams and Cluster Generation. The subject matter is hierarchically arranged, and derived directly from the text under consideration. Key term weighted vectors based on the above relevance criteria are derived statistically or probabilistically from vector space diagrams and used to construct key term clusters. Synonymy classes and subsumption hierarchies are prepared. Index terms are related to each other via statistical association methods, which compute similarity coefficients between words, word stems or concepts based on co-occurrence patterns between these entities in the sentences of the text material.

E. Relevance Feedback and Reduction. The degree of summarization is determined by the user. Non-essential and redundant verbiage is eliminated, as is redundant information. New key terms and weighted clusters are prepared via relevance feedback, i.e., a repeat of the process after completion of the initial abstracting using new key terms to condense the subject matter.

F. Rendering. The result is presented as a summary and outline. It can be printed, rendered for a web browser or mobile device, eReader or the like. Using text to speech, it could even be read aloud.

G. User Feedback (Query and Answering Feature). The automated program allows the user to provide generic or specific queries about the textual material and provides answers from the text.

Specific Summarization Systems

Neural Network Approach: Megaputer's TextAnalyst™

The present invention contemplates the use of the machine summarization of the digitized text into a useful outline. For this purpose any summarizer program is useful. The principles involved in these systems are below. Megaputer's TextAnalyst™ and PolyAnalyst™ are the preferred summarizers in the claimed invention because they provide many desirable features, including accurate summarization and a query feedback system. Megaputer supports a range of summarizer operations without a predefined knowledge base. The basis for TextAnalyst's processing is a neural network technique that analyzes preprocessed text to develop a semantic network. The semantic network provides the core information required for clustering, summarizing, and navigating textual material.

TextAnalyst uses a three-step process for compiling text mining information in a document, preprocessing, statistical analysis and renormalization. These steps are performed sequentially.

The first pre-processing phase is a language-dependent operation during which "stop" words are eliminated, since they provide no semantic information. Next, the roots of the remaining words are identified so that the subsequent statistical analysis and renormalization phases have to deal only with a canonical form of words, with the text reduced to only semantically important words in standard form.

For statistical analysis, TextAnalyst calculates correlation weights between words. Words that appear together frequently have higher weights than words that appear together infrequently. Weights are also assigned to individual words and multiword terms in order to calculate a sentence weight and then the most relevant sentences are extracted. Using the default threshold of "90" for semantic weight, only a single sentence is extracted for the summary.

The final phase is renormalization. During this stage, the weights between words are adjusted to reflect the strength of the relationship between the words in a sentence. Iterative adjustments are made to the weights until a stable set of weights is found that reflects the most important words and word combinations in the text.

The semantic network in TextAnalyst is the foundation upon which other operations depend. Words and terms are linked to other words and terms according to weight of terms. Multiword terms are identified on the basis of the frequency with which they co-occur. Text Analyst does not usually include verbs outside of noun phrases in person, place, and organization terms, and does not terminate at the first or last multiword term. TextAnalyst uses a strictly mathematical approach, after preprocessing, to formulate the semantic network and limits language-specific operations to the preprocessing stage to provide more adaptability in later stages.

Another analytic approach provided in Megaputer™, is the means to interrogate a text using natural language to find answers to questions not necessarily captured in a summary. Processing questions is similar to processing sentences in documents. Words in the question are scored according to their relationship with other words. Based upon the results of that scoring similar sentences are extracted from the source text. The intuition for this approach is straightforward. A question is a sentence with a placeholder (identified by terms such as who, what, when, and where) and some selection criterion. The selection criterion provides the means of filtering sentences to find matches. The assumption is that at least one of the top matches will contain the answer targeted by the placeholder in the question.

As with other text processing operations, question answering does not entail a full semantic analysis resulting in an elaborate representation of the meaning of a question. Instead, statistical techniques combined with the neural-network-generated semantic network, provide likely answers to the question.

Homepage for the Instant Invention

The textual image or barcode from the mobile imaging devices may be processed directly to a user understandable summary in the mobile imaging device itself or a PC, laptop and the like. The textual image is also transferred directly to the homepage of the mobile imaging device or PC wherein image can be processed automatically through OCR to a final summary or where alterations that facilitate capture by OCR and summarizer programs can be carried out. Textual images from mobile devices in JPEG or TIFF or other format can be imported to the homepage of a PC and converted by OCR to editable text in WORD or TEXT format and then machine summarized (Examples 1, 2, 3, 4). Barcodes encoding textual material can also be acquired by the mobile imaging devices and decoded therein or transferred to a PC using barcode reader alone or embedded in an OCR program such as FINE READER 9.0-10.0 Professional Edition™.

The homepage provides the users with options for the format of the summary, i.e., as non-formatted text, formatted text such as the in the original document or in formatted or non-formatted text with or without Tables. The custom program also specifies the amount of desired detail in the summary ranging from 10-90%. The user can specify or highlight the desired text intervals for summarizations such as subheading to subheading or subsection to subsection within a book chapter. In this case, multiple summarizations of the text material are prepared. The user can also designate the preferred format of the final summary, e.g., Roman outline, bullet points, separate sentences.

The user can optionally highlight the key points in the original text and compare them to the highlights in the machine summary. For this purpose, a split screen is useful that enables the user to incorporate additional points of his own in the machine summary via a drag and drop function.

The homepage contains files for manual or automatic processing of the captured image. The homepage of the instant invention contains space for the complete text image and toolbar icons titled "Import", "Edit Image", "Editable Text Format", "Convert to Editable Text", "Editable Text Modifications", "Summarizer Settings" for processing the image through OCR and machine summarization.

The "Import" toolbar contains the following options:
1. Import Image via Wireless Devices, Cardreader or USB port from:
   a. Cameras or Digital Cameras
   b. Mobile Imaging Devices
2. Import Image from Scanner
3. Import Image from Internet, Files and Folders
4. Acquire Image by Searching By clicking any one of these options, the textual image in thumbnail form containing printed material is acquired from the source into the homepage.

Next the user edits the printed image in the file titled "Edit Image" containing the following options:
1. Rotate Left
2. Rotate Right
3. Sharpen Image
4. Straighten Lines
5. Optimize Contrast & Brightness
6. Crop image Next the user converts the printed text in JPEG or TIFF format to editable and summarizable text. Before doing so, the user selects the preferred format from the folder titled "Editable Text Format" which contains the following menu options:
1. Preferred Layout
   a. Original Layout
   b. Retain Columns, Tables, Paragraphs, Fonts
   c. Retain Tables, Paragraphs, Fonts
2. Preferred Format
   a. PDF
   b. RTF/DOC/WORD
   c. HTML
   d. TXT
   e. DBU
   f. CSU
   g. LIT Next the user converts the printed pages into editable text by opening the next folder titled "Convert to Editable Text" and clicking on "OCR-Convert to Editable Text". Once the text is converted to editable text by OCR the image can be further improved using the file titled "Editable Text Modifications."
1. Eraser
2. Rotate/Flip/Invert
3. Straighten Lines
4. Despeckle image Next the user determines the preferred method of summarization by opening the file titled "Summarizer Settings."
1. Summarize entire document
2. Summarize intervals between subheadings
3. Summarize the summaries 4. Summarize the highlighted text in the original document
5. Summarize with summary on top of original document
6. Summarize the interval summaries
7. Place summary in Roman outline form
8. Place summary in bullet-point form
9. Place summary in paragraph form
10. Desired compression of the summary: 20-75%

The user then clicks the "Summarize" icon. The final summary appears in specified form in a few seconds. It may be further refined and compared to the original document by placing it in split screen next to the original document using the file titled "Split Screen documents." Upon opening this folder, the content of the outline is synchronized with the site from which this content originated in the text. This enables the user to rapidly compare the original paragraphs with the summary outline at the same eye level and add, subtract or edit the outline as desired.

The user can process the initial text images from import to summarization in a single step using preset configurations specified by the user. For single step processing method, the folder marked "Rapid Single Step" containing the following menu options is opened with the following options.
1. Import from Mobile Imaging Device, Barcoder, Read and Summarize
2. Import from wireless/card reader, Read and Summarize
3. Import from pdf file/web, Read and Summarize Capture of Barcodes Encoding Textual Images An additional embodiment of the present invention is to capture 1 or 2D barcodes encoding textual material using barcode reader applications embedded in "mobile imaging devices" such as iPODs™, iPADs™, tablets, BlackBerrys™ and the like. Because barcodes are spatially smaller than the textual material they encode, they are readily captured by conventional 1 or 2D barcode scanners. Digital cameras are also useful in capturing and processing barcodes. Once captured, the barcode is automatically decoded into alphanumeric editable text in WORD format which is thereupon processed seamlessly to a machine summary without requiring OCR text format conversion (Example 6).

In practice, a barcode encoding alphanumeric or binary text is placed in a non-text segment of a printed page where it is captured and decoded by a barcode scanner and converted into alphanumeric text in WORD format. The present invention contemplates attaching such a barcode to each printed page of textbooks or at the end of chapters or sections therein. The barcode scanner captures barcodes encoding text material more rapidly than mobile imaging devices and can facilitate the "concept capture" phase of the learning process.

The present invention envisions that an entire textbook can be converted to barcode that can be rapidly captured and decoded by the mobile operating systems with embedded barcode reading applications such as NeoReader™ for iPhone, ZXing Barcode Scanner™ for Google Android, Nokia Barcode Reader™ for Nokia. Preferentially the barcode encoding the textual material is high density and 2 dimensional such as QR, PDFf417™ or AZTEC™ that can be decoded by simply placing the barcode reader or mobile imaging device over it.

High density and 2 dimensional barcodes such the PDF417™, Data Matrix™, QR™ or Aztec™ that support full ASCII, binary and numeric data and encode foreign language character sets are the most useful barcodes in this invention. The PDF417™ symbology accommodates up to 340 characters per square inch with a maximum alphanumeric of 1850 text characters; with a mix of alphanumeric and binary data, the capacity ranges from 1108 and 1850 bytes. Data Matrix 2D™ matrix style barcode symbology that encodes up to 3116 bytes or characters from binary or alphanumeric data is also useful. The symbol is built on a square grid arranged with a finder pattern around the perimeter of the barcode symbol. The QR 2D™ barcode encodes text, URL and is decoded at high speed with mobile imaging devices equipped with applications that convert the QR code to text. QR codes are utilized in Google's mobile Android™, Nokia's Symbian™, Maemo operating system™s and App World™ applications for BlackBerry™ devices. QR has a maximum of 4296 alphanumeric characters, 7,089 numeric characters and 2953 binary bytes. Aztec Code™, a high density 2D matrix style bar code symbology that encodes up to 3750 characters from the entire 256 byte ASCII character set of binary or alphanumeric data is also useful. The symbol is built on a square grid with a bulls-eye pattern at its center. Data is encoded in a series of "layers" that circle around the bulls-eye pattern. Aztec's primary features include orientation independent scanning and a user selectable error correction mechanism.

Modern bar code scanners are normally available with one of three "output options"—either "Keyboard Wedge" output, RS232 serial output, or USB output and all are useful in this invention.

1) Keyboard Wedge Output or USB Output

If the barcode scanner has Keyboard Wedge output or USB output special data collection software is not needed. Both these outputs will deposit the data into the foreground application on a PC wherever the cursor is flashing.

2) RS232 Output (Includes Some RFID Scanners)

RS232 output is characterized by either a 9 or 25 pin rectangular connector plug. It attaches to one of the COM ports on a PC. BC-Wedge software (short for Bar Code Wedge) is useful for adapting to Windows. It inputs data directly into Windows or DOS applications as if the data were being typed in. For RS232 barcode users requiring more options WinWedge 32 Std™, WinWedge 32 Pro™ and DOS-Wedge Pro™ are useful. These advanced versions offer sophisticated data parsing, filtering and formatting, date and time stamps, 2-way I/O (for RFID), keystroke macro insertion, data translation.

3) TCP/IP Output (Includes Some RFID Scanners)

TCP/IP compatible devices typically connect to an Ethernet™ network. This type of output requires additional software in order to collect data from the barcode scanner directly into most Windows applications. TCP-Wedge™ collects data from TCP/IP ports (i.e. a device connected to a TCP/IP port) directly into any Windows application. It has all the advanced data parsing, filtering, formatting, 2-way communications, etc. of WinWedge Pro™ and is a part of the WinWedge 32 Pro™ package.

Digital cameras or document scanners alone or integrated into a conventional 1D or 2D barcode scanner capable of capturing 1 or 2D barcodes are also useful in the instant invention. An example of such an integrated device is the Motorola™ 6707series which contains both linear barcode scanners and a 1.3 megapixel digital camera which can capture images in binary, TIFF or JPEG format.

Cordless barcode scanners that can communicate barcode data wirelessly to other digital devices such as Analog-99 MHz (Radio Technology) or 802.11a/b/g WLAN or Eye-Fi™ or Digital-Bluetooth™Class 2 radio, v1.2 WPAN™ (Digital Spread Spectrum) with a range of up to 300 feet from the base are also useful in this invention.

The present invention contemplates that all these image capturing devices may be used independently to accomplish the entire process of barcode capture, decoding, conversion to OCR and summary. Mobile imaging devices such as iPODs™, iPADs™, tablets, PDAs,™, mobile computers and the like equipped with applications that incorporate these functions such as NeoReader™, ZXing Barcode Scanner™ and Nokia Barcode Reader™ and the OCR and summarizer programs, e.g., FINE READER™ 10.0 and Megaputer TextAnalyst™ or Polyanalyst™ are preferred for this purpose.
Textual Images in Foreign Languages are Recognized, Translated and Processed in the Same Fashion as the Native Language The claimed invention also contemplates that textual images in foreign languages can be processed in the same fashion as images in a native language. The foreign language document is first captured by the mobile imaging device, autofocused, sharpened and then translated into any of 165 different foreign languages using automated translation software. At this point, the translated image is processed through OCR in the preferred FINE READER™ professional 10.0 program that recognizes 167 foreign languages and then summarized by the preferred summarizer that similarly recognizes the foreign language.

Server-Side Content Summarization System

The present invention envisions a server-side program enabling the summarizer technology to be accessed by a large number of users. The system is best demonstrated by referring to the FIGS. 1-5. FIG. 1 is an architectural overview of a network environment 100 where document summarization is practiced according to an embodiment of the present invention. Network environment 100 is represented herein by an Internet network cloud labeled Internet and further defined in illustration by a network backbone 106. Backbone 106 represents all of the lines equipment and access points making up the Internet network as a whole. Therefore, there are no geographic limitations to the practice of the present invention. It will be appreciated by the skilled artisan that Internet 101 includes all sub networks connected thereto although none are specifically illustrated in this example. These may include local area networks (LANs), wide area networks (WANs) corporate, private or public. Network 100 may hereinafter be referred to as Internet 100.

In accordance with an embodiment of the present invention, an enterprise 102 is illustrated and is adapted to provide document summarization services by maintaining a Web Portal (WP) 110 that is connected in this example to backbone 106. WP 110 is adapted as a service portal accessible to clients subscribing to or otherwise authorized to access document summarization services according to embodiments of the present invention. WP 110 has an instance of summarization software (SSW) 111 provided thereto and executable thereon. SSW 111 is a server-based application that automatically creates document summaries for users who summit or otherwise provided location information to the server enabling server access to documents for summarizing. SSW 111 also performs other tasks which are related to summary management and distribution upon user request and direction.

A client station 101 is illustrated in this example and has connection to backbone 106 via one of several possible Internet access methods. In this case, client 101 has a desktop computer 107a connected by a high speed Internet link to backbone 106. The connection method may be digital services line (DSL), broadband connection, integrated services digital network (ISDN), or some other Internet connection method. Computer 107a may be a laptop computer or any other Internet-capable appliance with a browser display that may access portal 110. Computer 107a has a browser (BR) instance 112a installed thereon and adapted for general Internet access and navigation. The inventor prefers a high-speed Internet connection method over a lower bandwidth dial-up connection; however a dialup Internet access method may be used without departing from the spirit and scope of the present invention. The connecting network may be any telephony carrier network including the public switched telephone network (PSTN) or, perhaps a wireless carrier network. For the sake of simplicity, a carrier network and equipment is not illustrated in this example but may be assumed present in some embodiments. Computer 107a has an optical character recognition (OCR) scanner 109a connected thereto as a peripheral. Scanner 109a may be used in one embodiment to scan documents onto computer 107a for upload to server 110 for summarizing. In one embodiment, documents on computer 107a may be summarized by server 110 without requiring upload to the server. Client 101 maintains an Internet-connected server 108a that is accessible to other authorized users via Internet 100. Client 101 may therefore be an enterprise providing services and/or products to customers. A client station 103 and a client station 105 are illustrated in this example. Client station 103 is similar to station 101 in that a computer 107b running a browser instance 112b is provided as well as an OCR scanner 109b. Client 103 may therefore be an enterprise as was described above with respect to client 101. Furthermore, client 105 is similarly adapted as described above with respect to client station 101 including a computer 107d, a scanner 109d, a BR instance 112d running on computer 107d and an enterprise server 108c.

Clients 101, 103, and 105 may subscribe to the services provided by enterprise 102 and may access those services by accessing portal 110 with respective browser interfaces 112a, 112b, and 112d. A browser plug-in such as an active x control, a java-based plug-in, a direct x plug-in, or some other plug-in component may be temporarily or permanently downloaded to each of computers 107a, 107b, and 107d when portal 110 is accessed and the user is authenticated for first time use of the service. In the case of stations 101, 103, and 105, document summarization as provided by SSW 111 may be performed on any electronic documents that may be uploaded to the server from an internet-capable appliance such as from computers 107a, 107b, and 107d. Document summarization may also be performed on documents that are resident on the connecting appliance, computer 107a, for example, without requiring the documents to be uploaded. In this case, the documents for summarizing may be dragged and dropped into a shared folder that portal 110 is authorized to access over Internet 100.

As described further above, each station 101, 103, and 105 have enterprise servers 108a, 108b, and 108c which may be adapted to hold and serve enterprise documents internally and to serve electronic information pages using hypertext markup language (HTML) or an extension thereof such as SHTML, XML, or the like. Internal documents may include HTML-based information pages addressed in the server, and other document types that may be stored on the servers. These may include extensions such as .doc, .PDF, or virtually any known extension for any known word processing application used to create those documents. In this example, stations 101, 103, and 105 may authorize portal 110 aided by software 111 to search and summarize any documents or electronic information pages maintained in that enterprise servers 108a-108 c. Portal 110 accesses those servers over Internet 100 based on a request from the appropriate client station 101, 103, or 105.

Document summaries created from resident documents accessed remotely by portal 110 may be stored on the same system that holds the documents that were summarized. Portal 110 may associate those summaries to the full-text versions of those documents and may provide notification of the existence of a summary version of a full text document to anyone operating on the network that has requested access to a document that has a summary version associated therewith.

In one embodiment, portal 110 may keep stored document summaries on its own data storage system and may provide network hyperlinks links to those summaries, the links associated with the full text versions of the summaries at any browsable location of those full text documents. It is clear that documents and their summaries need not be stored on a same computing system, server, or hard drive. It is also clear that links to the remotely stored summaries may be placed in a Web page, in a full text document that has been summarized, or simply in an accessible file folder represented as a shortcut icon that is executable as long as the searched system has connection to the Internet network.

A client station 104 is illustrated in this example and includes a computing system 107c and a connected OCR scanner 109c. Computing system 107c has a browser instance 112c resident therein and adapted for browsing the network. Client station 104 may be a private consumer rather than an enterprise maintaining a document and or Web server. Client station 104 may subscribe to services offered through portal 110 and may have documents summarized in the same manners described with respect to the other enterprise stations. For example, a user operating station 104 may scan documents into computing system 107c and have them summarized on the computing system if the system is online and connected to portal 110.

In one embodiment, the scanned documents may be uploaded to portal 110 for summarizing. Word documents such as those with the extensions .doc, .PDF, or other known extensions may be uploaded to portal 110 from computer 107c for summarizing. Those same documents may be summarized on computing system 107c by dragging them from their original folder and dropping them into a shared folder made accessible to portal 110 or a special window that may be part of a browser plug-in adapted to enable portal 110 to gain limited control over the computer for the purpose of summarizing those documents.

A user operating computer 107c and in session with portal 110 using browser 112c may request a summary of a document available through or an electronic information page hosted on an Internet-connected server such as one illustrated in this example as Web server (WS) 109. In this case, the user submits a URL/URI to the document or Web page for summarizing and the portal downloads the page or document in order to summarize the document. The portal then sends the summary document to the user or makes it available to the user at the server depending on enterprise rules and whether the requested document has been made freely available for download.

In one embodiment, portal 110 with the aid of SSW 111 may access documents available through the Internet and may summarize those documents storing the summaries in a searchable data storage facility. Links may be made available to those documents via a search engine as a result of a keyword or phrase entry and submission through a search interface. For example, a third party search service may provide search result pages containing links to Web pages containing documents that have been summarized in the past. Clickable links to those document summaries may be provided along with the links to the full text documents on the search result page.

As more documents are summarized, search results served will provide more and more summary links to those full text documents. There may be some rules in place to determine which documents that are generally available through the Internet should be summarized, such as for example, popularity (frequently accessed), class (education, technical paper, etc.), and so on. Research papers and other technology white papers may be good candidates for document summaries. User guides, product manuals, tutorials, public information works and other frequently accessed materials may be good candidates for summarizing. Each document summary accessed from a search results page may also contain a hyperlink to the full text version of the document summary. Summary formats may vary according to the nature of a document. Summary outlines, searchable indexes, graphics slide shows, and other tools may be provided to help a user determine whether to access a full document or not.

FIG. 2 is an exemplary screen shot of a summarization user interface 200 according to an embodiment of the present invention. Interface 200 is provided of the form of a navigation capable browser window. A browser plug-in may be provided in one embodiment, to enable some of the capabilities of the service of the present invention such as folder sharing. The portal server may perform local document summarizing on the user's appliance if the user authorizes the process. Executable controls may also, in one embodiment, be temporarily downloaded to interface 200 if required, to perform certain server-side functions on the user's device. Those controls may be discarded after the user logs off from the portal.

Interface 200 is illustrated as currently online and logged into an enterprise portal providing the service of the present invention, such as portal 110 aided by SSW 111 described above with reference to FIG. 1. Interface 200 has a toolbar 204 provided thereto similar to any browser interface and may contain user actionable icons and drop down menus typical of a browser interface including text entry fields for entering URLs for navigation and for entering keywords or phrases for initiating data searches. A search window is illustrated in this example, just below toolbar 204. A configuration icon 205 is provided to enable a first time user to configure the service of the invention for use. Configuration options may vary according to service plan.

Interface 200 has a file browse window 203 for finding documents for summarizing, which are stored locally on the computing appliance or on a connected storage medium. The local file-browsing interface 203 may also be used to find previously created document summaries. A data entry field 209 is provided on interface 200 and adapted for enabling a user to enter a URL and document path to a full text document that the user wishes to have a summary of. The entry field may be filled manually by a user or a shortcut may be copied and pasted into the field. A user actionable icon summarize 206 is provided conveniently adjacent to field 209. When the field is populated, the user clicks on summarize to submit the network path to the service of the present invention. The portal aided by software then navigates to the document downloads the full text version and summarizes the document according to configured user preferences if any. If the user has not indicated exact preferences then a default summarization template may be used instead.

Once the document has been acquired and summarized, then the summary version of the document may be sent to the user and may be displayed in a window 201 adapted for the purpose. In this example, page 1 of a PDF file 207 is displayed. The user may scroll normally if there is more of the summary document than can be displayed on the screen. If the service already has a summarized version of a document that the user has provided the network path to, then the service may notify the user that a summary of the document is currently available for display. Once a summary is displayed, the user may save the summary locally and perform other common editing and file tasks that may be available with normal word processing software. Options 208 are provided in this example and may include drop-down menus file, edit, document, tools, and view, forward, send, and collaborate. The option 208 labeled tools may include file converters or plug-in viewers for certain document types. The option 208 labeled views may offer different types of views of the summary based on any considerations. For example, a user may wish to view only a broad outline of the subject matter contained in the full text version of a document.

The user may activate forward or send to deliver the document to a third party through email, file share program, or through some other resident application used to send connected appliances for the purpose of sharing the user's screen and document display with other users. Actionable icons 214 are provided conveniently within window 201 and are adapted to provide other options. An icon of icons 214 labeled index may allow the user to view an index of summarized documents currently available for view. An icon of icons 214 labeled full text enables the user to immediately retrieve a full text version of the summary from the portal if desired. An icon 214 labeled view last enables the user to view the last summary acquired.

Interface 200 has a second scrollable side-bar or area 202 provided thereto and adapted to contain more options. A window 210 provided within scrollable area 202 and adapted to show a user the aggregate of document summaries that have been created for the user. Labeled my documents, the window contains summary documents 211 that are available for viewing. These summary documents 211 may include links to the full text versions of those documents. The folder may be maintained at the portal and made accessible to the user in personalized fashion such that only the user has authorization to access the folder.

Space 202 also supports a scanner interface for acquiring documents via OCR scanner for summarizing. In this example, a page 213 of a document scanning into the commuting appliance is illustrated. If the user is connected to the portal while scanning is taking place, the service of the invention may begin summarizing finished scans as soon as they are completely scanned onto the appliance. The summarization process is flexible such that if subsequent scanned pages parsed by the service indicate a shift in any completed portion of the summary, then that completed portion may be modified. This particular feature of the present invention provides for an organized summary from an otherwise unorganized full text document. In other words, the summary software of the invention may be enabled to determine some priority in arrangement of different sections of a document depending upon what content a user looking for. Interface 212 may support a single document scanner or a multiple document scanner without departing from the spirit and scope of the present invention.

Using interface 200, a user may submit documents to the service portal over the network for summarizing, or the user may allow the portal to summarize documents on the user appliance without requiring document transfer. After a session is complete, any downloaded utilities or plug-ins may be disposed of or rendered unusable. In another embodiment, a persistent browser plug-in may be provided using activeX™, directX™, Java™ bean, or one of many other known executables. The service of the present invention is intended to support a variety of operating platforms including Windows™, Apple™, Linux™, and any other known operating platforms.

In an embodiment wherein the user is an operator of an enterprise station having a large cache of documents to summarize, the URL to the server or folder containing the documents may be submitted to the portal service, at which time the portal may navigate to the URL and search and summarize all of the documents contained at that location such as in the server, or in a file folder or directory. There are many possibilities. Using the present invention in this way enable an enterprise to quickly send many summary documents, perhaps summarizing a complicated sales or other contract to a prospective buyer, who may then access the full-page versions at will if desired.

FIG. 3 is a process flow chart 300 illustrating acts for summarizing a document according to embodiments of the present invention. At act 301a user operating a network-capable appliance launches the Web browser on the appliance. At act 302 the user logs onto portal by clicking on a plug-in icon conveniently placed into the browser. In one embodiment, there is no plug-in downloaded until the user navigates to logs onto the portal analogous to portal 110 of FIG. 1. In this case, the functionality for having documents summarized locally by the portal over the network may be downloaded as an automatically executable control, that executes and displays a user interface in the browser like interface 200 described earlier.

At act 303 the user determines if the document for summarizing is online. If at act 303 the target document for summarizing is online, then at act 304, the user provides the correct network path to the document by manually typing the path or by copying and pasting a shortcut to the document into a data field provided. At act 305, the user may click on summarize to have the service navigate to the URL retrieve the document and summarize it for the user. Step 305 includes making the summary version available to the user by sending it to the user over the network or by placing in a server-side folder personalized to the user wherein the user may access and download the document.

At act 306, the user has the option of sending the created summary to another user or users. If the user decides to send the summary to a third party or parties in act 306, then at act 307 the user clicks on forward or send to launch a preferred email application or some other communications application capable of handling attachments. If at act 306 the user does not want to forward or send the application then at act 311 the process ends. The user may view, edit and perform other tasks with the summarized document.

If at act 303 the user determines that the document to be summarized is not online, then the process proceeds to act 309 where the user determines if the document is in local storage. Local storage means that the document is on a storage medium accessible locally to the station or appliance the user is operating. The storage may be internal or peripherally accessible to the network connected appliance. At act 309 if the document is in local storage, then the process resolves back to act 304 where the user may submit the document to the portal through a file share utility or the user may select the document and drag it into a special share folder accessible to the summarizing software running server side.

In one embodiment, the user may copy a shortcut to the document and submit the shortcut to the portal so that the portal may navigate to the document. In the latter aces the appliance hosting the document would have a network address such as a URL or URL and machine address. In a wireless embodiment, the portal may be a corporate server connected to a local WAN and may have access to a local network supporting the hosting machine. There are many possibilities. At act 305, the document is summarized according to a default protocol or customized protocol if the user has pre-configured any preferences.

Still possible is that at act 309, the user determines that the document is not in local storage and therefore must be acquired such as by scanning. In this case, the user acquires in the document at act 310. In some cases, a peripheral scanning device may be made accessible to the summarization software through the appliance operated by the user. An example might be a networked and shared enterprise scanning device capable of independent storing and, perhaps serving scanned documents. In the latter case, the device may have a network address or URL and the service may be authorized to access the scanning device over the network, thus enabled, may also summarize the document at the scanning device. Likewise, the scanning device may be enabled to serve the full text document directly to the portal upon request where it may be summarized at the portal and sent to the authorizing user or otherwise made available to the authorizing user.

At act 306, after the document has been summarized, an option for sending the summarized version of the document to another party or parties may be presented to the user that ordered the summary. The summarized version might be sent by proxy from the portal server or if the summarized version is available on the user's appliance then the user may send the document at the time the document displays on the user appliance. If at act 306 the user decides not to send a copy to another party or parties, then the process may end at act 311. If at act 306 the user decides to send the summary version to one or more parties, then at act 307 the user may click to send launching a default application. The default application may be an email application, a file sharing application, or some other messaging application capable of handling attachments. In one embodiment, a user may authorize the summary document to be distributed by proxy the user providing the recipient address or list of recipient addresses to the portal.

At act 308, the summary document is sent to one or more intended recipients over the network. As described above, the document may be sent directly by the user or by proxy without the user actually taking possession of the document. After the document is distributed, the process may end for that document at act 311. A user may, of course, perform many other document management tasks such as ordering a re-summarization of a document according to an alternate criterion.

It will be apparent to one with skill in the art of network communication between nodes connected to an Internet or other network that the process of this example may include more or fewer acts than illustrated herein without departing from the spirit and scope of the present invention. For example, an optional act for editing a summary version of a full text document may be provided before act 306 if the summarized version is on the appliance of the user and if the summary version is an editable version. In some cases the summaries may be read only depending upon enterprise rules taking into account user preferences. Act 306 may not be performed at all and other tasks not mentioned here may be contemplated without departing from the spirit and scope of the present invention.

FIG. 4 is an exemplary screen shot of the user interface 200 of FIG. 2 illustrating a voice to text summarization feature according to one embodiment of the present invention. According to one embodiment of the present invention, a voice to text summarization feature is provided that enables near real-time summarization of documents acquired by voice or audio input and translated to text using voice-to-text software.

Interface 200 contains many of the same elements described with respect to FIG. 2 above. Therefore elements in this example that have already been described and that are not changed from their description in this example shall not be re-introduced. Screen area 201 contains a user actionable icon 400, labeled voice input, that is adapted to enable audio input into voice-to-text software provided on the user appliance or, in one embodiment, at the portal server. The voice-to text software is adapted as is generally known in the art to translate the voice input to text.

In one embodiment, the user appliance is enabled for voice input to text translation. In this case, the voice input may be provided to the appliance anytime while online or offline and a text rendition of the voice input may be created for eventual summarizing by the service of the present invention. In another embodiment, the voice-to-text capability is provided server-side with the summarization software. In this embodiment, the user may call the portal server from the user appliance that is supporting interface 200 or from any a voice-capable appliance associated with and verifiably registered with the service. The user may then provide the voice input to the server. Voice over Internet protocol (VoIP) may be used to carry the voice input to the portal sever. In another variation of this embodiment, the user's voice is recorded and converted to voice extensible markup language VXML or some other voice markup language and then recreated at the server as synthesized voice input that is then translated into text at the server.

In one embodiment text summarizing may begin at the portal server once sufficient voice input has been translated into text at the server and before all of the voice input has been received at the server. In an example of this embodiment, a user may speak into the connected appliance and at the server summarization begins almost immediately. In this case, the summarization text rendered is considered temporary and revisable as more input is received and main themes are added and perhaps reprioritized for summary rendition. Once a user is finished with voice input, a signal that the input stream has completed enables the summarizing engine to finalize the summary version of the full text translation. A user option is presented within screen 201 for only rendering summary text instead of a full text version of the document. In this case, the text rendered that ultimately will not be a part of the summary version is not discarded until the final summary version is decided or finalized. At that point the unneeded text may be discarded.

In this example, a voice-to-text (VTT) summary version of a translated document is displayed in browser window 201 once it has been finalized by the system. A window 402 is provided in the browser sidebar area that is very similar to window 210 described with reference to FIG. 2 above accept that it contains voice-to-text rendered summary documents 403 that were acquired ultimately by voice input. One with skill in the art of voice communications will appreciate that voice to text rendering may be performed over a network, the network separating the source of the voice input from the translation software hosted on a network-connected node.

In one embodiment, the VTT software is local to the user appliance and the text translation is completed locally. In this case, the voice summarization may also begin before the voice input has finished as long as the user is connected to the portal server while the process ensues. In this case, the text rendered may be submitted to the service over the network as it is being rendered and the summary may be performed at the server. In another case, the server has access to a shared folder, or a special component of the VTT software that enables the summarizing engine to cooperate with the local instance of VTT software over the network such that the summary may be performed by the portal server but rendered locally on the user appliance.

In one possible example, a user may attend a lecture equipped with a powerful handheld voice and network-capable appliance whereby the user records the lecture live. The appliance may be connected wirelessly to the portal server hosting the summarization software. As the lecture is recorded, the voice is being translated into text and then being summarized such that when the lecture is complete, the user already has a summary text document highlighting the important parts of the lecture to use as notes. The lecture may be recorded off line, translated locally and then summarized when the user next connects to the portal-based document summarizing service.

FIG. 5 is a process flow chart 500 illustrating acts for summarizing voice to text in near real time according to an embodiment of the present invention. At act 501, a user selects a voice to text summarizing option, in one embodiment, while connected online to the service of the present invention. At act 502, a voice input mechanism is activated such as a microphone and VTT software. At act 503, a voice to text translation engine is activated to begin translating the voice input and the voice input begins. The VTT software may, in one embodiment, be locally stored and executable from the user appliance.

At act 504, the VTT software begins rendering text from the voice input. At act 505, the service determines whether there is enough rendered text to begin summarization. If progress is not sufficient to begin summarizing, then the process loops back until there is sufficient text to begin. At act 505 once there is sufficient text rendered for summarizing, then at act 506 the document summarization process begins. It is important to note herein that all of the voice input is translated into text, but only some of the translated text will be included in the summary version. The user may elect to render both a full and summary version of the voice input session, or just to render a summary version discarding the text that is not required for the summary.

At act 507 voice input continues while summarization continues. At act 508 a determination is made whether the content being received and parsed for summary is shifting in theme, perhaps requiring some modification or reorganization in the rendered summary text. If not in act 508, then the process loops back to act 507 and then back to act 508 repeatedly until there is some shift in theme or new content that shifts away from the current summarized content. It is important to note herein that it is certainly possible that a summary may be completed without determining a positive at act 508. However, it is highly likely that a summary begun before all of the text has been acquired will need some revision before presentation. For example, with voice input is likely that a salient or important point may be brought up out of order of importance later in the input stream. This feature accounts for that possibility and enables the system to reprioritize the summary points. At act 508, if there is some shifting of content that might warrant a revision of the format of a summary and/or the text reserved for that summary then at act 509, the system may perform a revision or an adjustment to what has already been rendered as text and reserved for summary presentation.

At act 510, the system determines if the voice input has completed for a current session. If not, the process loops back to act 508 to determine if there is any shifting content that may require an adjustment to form, format or text already reserved for the summary document. If at act 510 it is determined that voice input is complete for that session, then at act 511, the summary rendering is finalized and the summary version is created for display, editing and other task considerations. At act 512, the summary document has been rendered so the process may terminate for that session. It is noted herein that the system continually revises its summary form, format and text while voice input continues and different themes, point, and ideas are interpreted until all of the input has been interpreted, at which time the complete summary is available. If at any time the session is interrupted, the summary version may still be created and presented based on the data that has been received.

In one embodiment, a user may add to a summary document by calling it up from storage and initiating a voice session associated with document editing. In this case, the summarizing engine may pick up where it left off and continue to build and revise the summary document as necessary based on the new content added. This particular feature of near-real-time summarization of translated voice is not available with current document summarization applications. By providing prioritization rules that also recognize key words and phrases that are used to describe importance, the engine can create a prioritized and organized summary almost immediately after the voice input session has completed. For example, the phrase "This is a key component" may be interpreted as it is used in association with one or more paragraphs just received. "The most important aspect" might also be recognized as a prioritization key in summarizing so that whatever aspect is associated with the phrase retains the priority in the summary document. The phrase, "A more important aspect is" . . . or "More importantly" . . . can also be integrated into a prioritization scheme to help create more organized summaries than would otherwise be rendered. This feature, although applicable to summaries created only from text documents, is particularly useful for creating summaries from rendered speech as the organization of voice input is typically not as evident as a prepared text document.

It will be apparent to one with skill in the art that a capability of summarizing VTT renderings is not required in order to practice the present invention. However, the feature enables broadening of the types of input that may be summarized not limited to complete text documents. In an additional embodiment, summarizing may be practiced according to the present invention in near real time wherein the input is a typing session. For example, a user may be creating a document while connected to the service in a session so that whenever the user stops typing input, a latest version of the summary may be presented following generally the process of FIG. 5 where the input is text input instead of voice input. There are many possibilities.

The methods and apparatus of the present invention may be practiced using all of or some of the components described herein without departing from the spirit and scope of the present invention. The invention may be practiced over the Internet network and any connectable sub networks including wireless cells having a routed connection to the Internet.

Operative Features of Automated Summarizer Systems:

1. Overview

This abstracting feature provides an automatic condensation and readable outline of text material. The instant invention provides methods for manipulating and accessing texts in arbitrary subject areas in accordance with user needs. In particular, methods are given for determining text themes, traversing texts selectively, and extracting summary statements that reflect text content.

The system analyzes text material and the extracts key words and phrases from text paragraphs. The content is automatically classified by indexing methods, which assign a weight to each term or phrase. Vector-space diagrams and clustered centroids are constructed based on the measurement of word frequencies and co occurrences. A hierarchy of key words and phrases is established. Clustered centroids with links to related key words and phrases are contracted. The process is aided by additions which classify and collate key terms by syntax, synonyms and semantics. The entire process is also improved by relevance feedback provided by the user in which the content of the analysis is refined and reprocessed. The system also has provision for degrees of precision required by the user and is adjusted for a general versus a more detailed outline of the key subject matter in the text material.

Automated vector space systems information retrieval systems alone or combined with parsing or syntactical programs are used to abstract and produce an outline of text material. In the vector space model, sets, or vectors, of terms, represent text. A term is typically a word, a word stem, or a phrase associated with the text under consideration. In principle, the terms are chosen from a controlled vocabulary list or a thesaurus derived directly from the texts under consideration. Collectively, the terms assigned to a particular text represent text content.

Because the terms are not equally useful for content representation, a term-weighting system is used that assigns high weights to terms deemed important and lower weights to the less important terms. A powerful term-weighting system of this kind is the well-known equation fxI/fr (term frequency times inverse collection frequency), which favors terms with a high frequency (f) in particular subject matter.

The terms used to identify the text items are extracted from the text material after elimination of common words and removal of word suffixes. All texts or text queries are represented by weighted term vectors of the form $D=(d_{i1}, d_{i2} \ldots d_{ik})$, where $d_{ik}$ is the weight assigned to term k in document D and a similarity measure is computed between pairs of vectors that reflects text similarity. Thus, given document $D_i$ and query Q (or sample document $D_j$), a similarity computation produces a ranked list of key terms and phrases in decreasing order of similarity with a query.

2. Text Decomposition and Structure

The system can manage text containing heterogeneous subject matter of varying length, including text sections, paragraphs, groups of adjacent sentences, and individual sentences. Long texts are broken down into smaller text passages.

When analyzing large and diverse subject matter, the combined global and local similarity computations improves abstracting effectiveness over the use of global vector similarity measurements alone. An additional improvement is obtainable by use of the passage identification that identifies text excerpts in addition to full texts. When text passages are available for processing, similarity measurements are computed between texts and text excerpts, text relation maps are generated showing text similarities that exceed a particular threshold value.

3. Text Theme Identification

A text theme is defined as a specific subject that is discussed in some depth in a particular text or in a number of related texts. Themes represent centers of attention and cover subjects of principal interest. The identification of text themes is useful to obtain a snapshot of text content.

Text analysis methods identify text themes using text relation maps as inputs to a clustering process that identifies groups of text excerpts that are closely related to each other but also relatively disconnected from the rest of the text. In this process, first triangles in the relation map are recognized (a triangle is a group of three text excerpts, each of which is related to the other two to a degree that is above the stated similarity threshold). A centroid vector is then constructed for each triangle, as the average vector for the group of three related items. Finally, triangles are merged into a common group (theme) whenever the corresponding centroids are sufficiently similar (that is, when the pairwise centroid similarity exceeds a stated threshold). A global centroid vector that is constructed as the average vector of all text excerpts included in the theme represents each theme.

An alternative theme generation method is to build a text relation map with the use of a high similarity threshold (where the number of linked text excerpts is small). Each disconnected component of the map, consisting of groups of highly related text excerpts, is then identified with a particular theme.

When text relation maps are used as the main input, themes are generated at various levels of detail. The larger the text excerpts used for text grouping purposes, the wider is the scope of the corresponding themes. Contrariwise, when sentences and other short excerpts are used in the grouping process, the theme coverage is normally narrow. By suitable variation of the scope of the theme generation process, it is thus possible to derive a smaller number of broader themes or a larger number of narrower themes.

4. Selective Text Traversal

Text skimming methods are used which are capable of concentrating on text passages that are of immediate interest. These skimming operations are used both for selective text traversal, in which only text passages of special importance are actually retrieved or read, and for text summarization, in which summaries are constructed by extraction of selected text excerpts.

In selective text traversal, starting with a text relation map and a particular text excerpt of special interest, three different strategies are used: (i) the path covers many of the central nodes, which are defined as nodes with a large number of links to other nodes of the map. (ii) the path uses text excerpts located in strategic positions, for example, the first paragraphs in each text section or the first sentences in each paragraph. (iii) the path uses the link weight as the main path generation criterion by starting with the desired initial node and choosing as the next node the one with maximum similarity to the current node. This last strategy is known as a depth-first search.

When individual text excerpts are selected for path formation or summarization, a number of factors receive special attention which includes:

a) coherence of the resulting text, i.e., the ease with which the text can be read and understood b) exhaustive of coverage of the final text, i.e., the degree to which all the main subject areas are covered c) text chronology, i.e., the accuracy with which timing factors are recognized d) The amount of repetition in the selected text excerpts Text chronology is often maintained by the use of only forward-pointing paths and backtracking is not allowed (if a particular paragraph is included in a path, no other text excerpt appearing earlier in the same text can appear in the same path).

Text coherence is used as the main criterion, and forward depth-first paths are used in which each chosen text excerpt is linked to the most similar text excerpt. In a depth-first path, each chosen excerpt is closely related to the next one to minimize the chance of poor transitions between selected paragraphs.

A depth-first path provides a coherent body of information in practically every subject environment. If there is repetition of subject coverage in two or more excerpts in a given path, repeated text passages are eliminated by a sentence-sentence comparison, and removal of duplicate occurrences of sufficiently similar sentences. Alternatively, a shorter excerpt replaces a larger text excerpt in a path with large similarity to the previous text element. An additional method of reducing the path size is to use theme generation methods to obtain text excerpts.

5. Text Summarization

By judicious text extraction methods, collections of text passages are identified that provide adequate coverage of the subject areas of interest. Homogeneous text relation maps produce a good summary using the longer text-traversal paths in chronological (forward) text order.

When the text relation map is substantially disconnected, the text-traversal process does not produce comprehensive summaries. In that case, adequate subject coverage is generally obtained by taking the initial paragraph of the document under consideration, followed by the best paragraph for each text theme.

When paths and themes are used for text summarization, longer summaries are obtained compared to text relation maps generated with low similarity thresholds. This produces denser maps with large number of text links. The themes partly overlap and the summaries obtained by text extraction are discursive. Contrariwise, when high similarity thresholds are used, the maps and themes are disconnected and the summaries are sparser.

Representative computer programs that are useful for automated abstraction of the instant invention include but are not limited to programs which use vector space diagrams and weighted relevance terms, probabilistic and lexical programs. The preferred system comprises consolidation features of these and other programs. Any comprehensive automated text abstraction system, which produces an acceptable outline, is useful in the present application including but not limited to any combination of the above programs. Features of several statistical systems may be adapted for use in the text abstraction function of the present invention.

The vector space system is a fully automatic text processing system which uses synonym dictionaries, hierarchical arrangements of subject identifiers, phrase-generating methods in order to obtain the content identifications useful for the abstracting process. The system does not rely on manually assigned keywords or index terms for the identification of text material and search requests, nor does it use primarily the frequency of occurrence of certain words or phrases included in the text.

The following systems incorporated into the vector space program for text analysis are of principal interest:

a) A system for separating English words into stems and affixes which can be used to reduce incoming texts into word stem form.

b) A synonym dictionary or thesaurus which replaces significant word stems by concept numbers, each concept representing a class of related word stems.

c) A hierarchical arrangement of the concepts included in the thesaurus which makes it possible, given any concept number, to find its "parent" in the hierarchy, its "sons, "it's "brothers," and any of a set of possible cross references.

d) Statistical association methods which compute similarity coefficients between words, word stems, or concepts, based on co-occurrence patterns between these entities in the sentences of a text or in the texts of a collection; associated items can then serve as content identifiers in addition to the original ones.

e) Syntactic analysis methods which permit the recognition and use, as indicators of text content, of phrases consisting of several words or concepts where each element of a phrase must hold a specified syntactic relation to each other element.

f) Statistical phrase recognition methods which operate like the preceding syntactic procedures by using a reconstructed phrase dictionary, except that no test is made to ensure that the syntactic relationships between phrase components, are satisfied.

g) Request-subject matter matching procedures which make it possible to use a variety of different correlation methods to compare analyzed texts with analyzed requests, including concept weight adjustments and variations in the length of the text being analyzed.

Text material is processed by the system without any prior manual analysis using one of several hundred automatic content analysis methods; subject matter which most nearly matches a given search request is identified. Specifically, a correlation coefficient is computed to indicate the degree of similarity between key terms and phrases and each search request, and each is ranked in decreasing order of the correlation coefficient. Then a cutoff is selected, and key text terms and phrase above the chosen cutoff are withdrawn from the file and turned over to the user as answers to the search request.

Individual Components of the Automated System

1. Term Weighting

The standard text content vector matching methods is used to identify the subject matter whose word stem vectors are sufficiently similar to the query vectors. The system retains a large number of content indicators, and the larger number and greater diversity of the terms compensate for the lack of precision in the term selection. Two main operations are needed to transform the word stem vectors into useful term vectors:

a) Term weight is assigned to each term reflecting the usefulness of the term in the text material under consideration b) Terms whose usefulness is inadequate as reflected by a low term weight are transformed into better terms.

The term weighting task is separated into two parts:

a) the term characteristics within the text material b) the term function in the remainder of the text material.

Terms that exhibit high importance in the subject matter to which they are assigned, are those that that show high occurrence frequencies in the text material. At the same time, the best terms are able to distinguish the text subject matter to which they are assigned from the remainder of the subject matter. The importance of a given term in specific subject matter is conveniently measured by the frequency of occurrence in the text. The usefulness of the term in the subject matter as a whole is reflected by the term discrimination value, or by an inverse function of the subject matter frequency (that is, the number of subject areas to which the term is assigned).

Terms with a low weight according to expression are deleted from the indexing vocabulary. The deletion of broad, high frequency terms causes losses in recall, and the elimination of specific, low frequency terms impairs precision. Ranked retrieval and relevance feedback are implemented in binary indexing systems where the index terms are either present or absent from the subject matter and query vectors. However, the text material is easier to rank when weighted terms are assigned to the queries, and to the key terms in the text material, because a composite query subject matter similarity coefficient is computed for each query-text subject matter pair based on the weights of matching query-key terms.

In the present system, text subject matter is represented by a vector of terms and each vector is stored as a complete entity, the use of term weights presents no conceptual problem, because a term weight is simply listed with each term identification in the corresponding term vector. In binary inverted file systems, the term weighting information is included in the various inverted lists.

To compute the cosine measure of expression for the inverted file (binary) system, an additional normalization factor consisting of the sum of the squares of all term weights included in each subject matter and each query is needed. This makes it necessary to provide for each subject matter a certain factor. These factors are computed in advance for each subject matter and stored in a special "subject matter length" file, which is accessed for all subject matter that has a non-zero similarity with the query. The expanded inverted subject matter reference lists together with the subject matter length file permit the computation of the full cosine similarity measure for all terms sharing one or more terms with the query, followed by the ranking of subject matter in decreasing order of the query-text material similarity.

Finding a proper term weighting scheme is critical in term-based retrieval since the rank of the subject matter is determined by the weights of the terms it shares with the query. One popular term weighting scheme, known as tf.idf, weights terms proportionately to their inverted subject matter frequency scores and to the subject matter frequencies (tf). The subject matter length usually normalizes the in-text frequency factor, that is, it is more significant for a term to occur in a short 100-word abstract, than in a 5000-word article. The following terms and principles are used:

a) Terms that occur fairly frequently in a text, which supports only general-type queries (e.g., "all you know about X").
b) Attaching low weights to infrequent, highly specific terms, such as names and phrases, whose only occurrences in the subject matter are often decisive for relevance.

The weighting scheme is altered so that the phrases (but not the names) are more heavily weighted by their idf scores while the text material frequency scores are replaced by logarithms multiplied by sufficiently large constants. In addition, the top N highest-idf matching terms (simple or compound) are counted.

The selection of a weighting formula is partly constrained by the fact that text-length-normalized tf weights are precomputed at the indexing stage and are not altered without reindexing of the entire database. The maximum number of terms on which a query is permitted is restricted to match the text subject matter to N highest weight terms, where N can be the same for all queries or may vary from one query to another. This is not the same as simply taking the N top terms from each query. Rather, for each text subject matter for which there are M matching terms with the query, only those which have highest weights, will be considered when computing the text subject matter score. Moreover, only the global importance weights for terms are considered (such as idf), while either taking a log or replacing them with a constant suppresses local key term frequency. Changing the weighting scheme for compound terms, along with other minor improvements (such as expanding the stop word list for topics, or correcting a few parsing bugs) can lead to an overall increase of precision.

c) Derivation of the Relevance Number

A judgment is made on each term on a probabilistic basis, i.e., to assert that a given term may hold with a certain degree or weight. Given the ability to weight index terms, one can characterize more precisely the information content of text material. The indexer assigns a low weight such as 0.1 or 0.2 to a term, rather than to say that the term does not hold for the text. Conversely, the indexer assigns a weight of 0.8 or 0.9 to a term, rather than to say that it definitely holds for the text subject matter. Thus, given weighted indexing, it is possible to more accurately characterize the information content of the text. The notion of weighting the index terms that are assigned to subject matter and using these weights to compute relevance numbers is basic to the technique called probabilistic indexing.

4. Vector Generation

The text material indexing process or the method is used to construct the text material vectors. The basic function of an indexing system is the segregation of the subset of text material relevant to a query from the remainder of the subject matter. Preferably, all the relevant items might then occur in one or more key term clusters, whereas the nonrelevant items are placed in separate clusters. Such an ideal subject matter space is constructed by assigning to the relevant text set the terms utilized by the user to formulate the corresponding search requests.

In practice, it is not possible to find a single clustering which is ideal for all subject areas and all users, even given full relevance information in advance. Furthermore, new text material must necessarily be processed without the use of term relevance information. The best method is to use index terms capable of distinguishing each particular key term from the remainder of the subject matter. This is achieved by using as a controlling criterion the frequency of each term in the subject matter. The term discrimination theory indicates that the preferred terms are medium-frequency terms that are assigned to a few text subject matter but not to the rest of the subject matter.

In the present system, the text material (or the text of the query statements obtained from the user) is analyzed automatically. Terms whose frequency is neither too large nor too small are incorporated directly into the query vectors for indexing purposes. Terms whose frequency in text material exceeds a given threshold are considered too broad and unspecific and are rendered more specific by being combined with other terms into term phrases before assignment to the subject matter and query vectors. On the other hand, terms with a very low frequency covering one or two areas of subject matter are considered too specific; they are broadened by grouping them into term classes of the kind found in a thesaurus of terms. The thesaurus class identifiers are then incorporated into the term and subject matter vectors instead of the individual rare terms.

a) Vector Processing Model

The vector-processing model is implemented as follows: Indexing terms are regarded as the coordinates of a multidimensional information space. Text material (key phrases and terms) and queries are represented by vectors in which the element, denotes the value of the each term, with the precise value of each such element being determined by the particular term weighting scheme that is being employed. The complete set of values in a vector describes the position of the text material or query in the space, and the similarity between a text material and a query (i.e., their separation in the space) is then calculated by comparing their vectors using a similarity measure such as the cosine coefficient.

This simple, geometric interpretation of retrieval provides a unifying basis for a very wide range of text discrimination operations, including indexing, relevance feedback, and subject matter classification. Indexing involves the assignment of content descriptors to text material in such a way that the latter is readily distinguished from each other by a query.

Indexing in this model separates subject matter from each other in the multidimensional term space. The word-frequency information, which determines the selection of the output sentences, comes entirely from within the text and these relative frequencies are used as criteria for scoring and selecting sentences. Two classes of words are determined i.e., generic words and discriminating words. Generic words are those common to many of the terms in the cluster, and therefore the words whose co-occurrences cause the map structure. Discriminating words are those, which indicate some special purpose or motive of a text material. The effectiveness of a potential indexing term is assessed by its discrimination value, which quantifies the extent to which the use of that term leads to the text subject matter in a database being separated from each other. There is an interactive component of the program wherein the user can provide cognitive input on generic and discriminating words according to his perception of the significance of the cluster, which is known as relevance feedback.

b) Vector Representation and Similarity Computation

The system is characterized as follows:

1) uses fully automatic indexing methods to assign content identifiers to text material and search requests 2) collects related words and phrases into common subject classes, making it possible to start with specific items in a particular subject area and to find related items in neighboring subject fields 3) identifies the key words and phrase by performing similarity computations between stored items and incoming queries, and by ranking the selected items in decreasing order of their similarity with the main subject matter (4) includes automatic procedures for producing improved abstract statements based on information obtained as a result of earlier excerpting operations.

Each term or phrase is represented by a vector of terms. Each term or phrase or collection of terms and phrase in text material represents the weight or importance of the term. By "term" is meant some form of content identifier such as a word extracted from a text, a word phrase, or an entry from a term thesaurus. A given text collection is then represented as an array, or matrix of terms where each row of the matrix is represented and each column represents the assignment of a specific term to the subject matter of the text. Positive term weights above zero are chosen for terms actually assigned to the subject matter of the text c) Automatic Indexing Tools The indexing system is based on language analysis tools as follows:

1. Synonym dictionaries, or thesauruses, are used to group the individual terms into classes of synonymous or related terms. When a thesaurus is available, each original term is replaced by a complete class of related terms, thereby broadening the content description.

2. Hierarchical term arrangements are constructed to relate the content terms in a given subject area. With such preconstructed term hierarchies, the standard content description is "expanded" by adding to a given content description hierarchically superior (more general) terms as well as hierarchically inferior (more specific) terms.

3. Syntactic analysis systems serve for the specification of the syntactic roles of the terms and for the formation of complex content descriptions consisting of term phrases and larger syntactic units. A syntactic analysis system is used to supply specific content identifications and it prevents confusion between compound terms.

4. Semantic analysis systems supplement the syntactic units by using semantic roles attached to the entities making up a given content description. Semantic analysis systems utilize various kinds of knowledge extraneous to the text, often specified by preconstructed "semantic graphs" and other related constructs.

The stepwise process is as follows:

1. The individual words that make up an abstract or a query text are first recognized.

2. A stop list, comprising a few hundred high-frequency function words, such as "and," "of," "or," and "but," is used to eliminate such words from consideration in the subsequent processing.

3. The scope of the remaining word occurrences is broadened by reducing each word-to-word stem form using relatively simple suffix removal methods together with special rules to take care of exceptions.

4. Following suffix removal, multiple occurrences of a given word stem are combined into a single term for incorporation into the text material or query vectors.

5. Correlation Between Indexing Performance and Space Density

In this process, certain word stems are extracted from text material and weighted in accordance with the frequency of occurrence of each term in text material a method known as term-frequency weighting. Recall-precision graphs are used to compare the performance of this standard process against the output produced by more refined indexing methods. Typically, a recall-precision graph is a plot giving precision figures, averaged over a number of user queries, at ten fixed recall levels, ranging from 0.1 to 1.0 in steps of 0.1.

The better indexing method produces higher precision figures at equivalent recall levels. One of the best automatic term weighting procedures consists of multiplying the standard term frequency weight by a factor inversely related to the subject matter frequency of the term (the number of subject matter in the collection to which the term is assigned). A term weighting system assigns the largest weight to those terms, which arise with high frequency in individual terms, but are at the same time relatively rare in the text material as a whole.

Decreased performance implies increased space density and is tested by carrying out term weighting operations inverse to the ones previously used. Specifically, since a weighting system in inverse subject matter frequency order produces a high recall-precision performance, a system which weights the terms directly in order of their term frequencies (terms occurring in a large number of areas in a text receive the highest weights) should be correspondingly poor.

6. Probabilistic Models

Most probabilistic retrieval models incorporate information about the occurrence of index terms in relevant and non-relevant subject matter. Based on a probabilistic model, strategies are proposed for the initial outline and an intermediate outline. The intermediate outline is useful substitute for an outline based on relevance feedback search.

Probabilistic models of abstract generation provide a theoretical basis for methods, which have previously relied on heuristics. A major assumption made in these models is that relevance information is available. Classifying key terms on the basis of the query and presenting them to the user for judgment as relevant or non-relevant obtain partial relevance information. This process of obtaining relevance information and using it in a further search is called relevance feedback which is the information about the relevant text material that is the most important since the characteristics of the non-relevant subject matter is approximated by those of the entire collection. For relevance feedback to be effective, the initial outline using the query should present a relevant outline to the user. The application of probabilistic models to the initial search is used to improve the outlining effectiveness of this search.

Regarding methods for improving the initial search, the simplest approach to this search is to rank the subject matter and key terms according to the number of index terms in common with the query (sometimes called a coordination level search). Terms are weighted using inverse subject matter frequencies and clusters of key terms are searched rather than the key terms themselves. The same probabilistic model for the initial search is used for the relevance feedback search.

The second stage depends on the relevance information obtained in the first stage by presenting retrieved subject matter to the user. The initial search should provide relevant terms at the top end of the ranked list of terms. This leads to the associated problem of methods for dealing with queries, which do not elicit key terms at the top of the ranked list. The outline process is therefore a two-stage application of a probabilistic model where the main difference between the stages is the increase in the amount of relevance information available.

A probabilistic model of abstracting is thus applied to two searches, which can occur before relevance feedback, the initial search and the intermediate search. For the initial search there is no relevance information available whereas for the intermediate search the relevance information is derived from the top-ranking terms or clusters of the initial search. This combination match performed better than the simple match, the match using inverse subject matter frequency weights and the match using the cosine correlation. The combination match is the most effective initial search. A cluster search is a good alternative initial search strategy.

Each subject matter is assumed to be described by a binary vector $x=(x_1, x_2, \ldots x_y)$ where $x_i=0$ or 1 indicates the absence or presence of the ith index term. A decision rule can be formulated by which any subject matter can be assigned to either the relevant or the non-relevant subject matter for a particular query. The rule is to assign a subject matter to the relevant set if the probability of the subject matter being relevant given the subject matter description is greater than the probability of the subject matter being non-relevant, i.e., if:

$$P(\text{Relevant}/x) > P(\text{Non-Relevant}/x)$$

A more convenient form of the decision rule is found by using Bayes' theorem. This new rule when expressed as a weighting function is:

$$g(x) = \log P(x/\text{Relevant}) - \log P(x/\text{Non-Relevant})$$

This means that instead of making a strict decision on the relevance of a key term, the terms are ranked by their value such that the more highly ranked a subject matter is, the more likely it is to be relevant.

The probabilities P (x)Relevant) and P(x/Non-Relevant) are approximated in a number of different ways. If the assumption is made that the index terms occur independently in the relevant and non-relevant key terms then:

$$P(x)/\text{Relevant}) = P(x/\text{Relevant})P(x_2/\text{Relevant}) \ldots P(x_y/\text{Relevant})$$

and similarly for P(x/Non-Relevant). Let $pi = P(x_i=1/\text{Relevant})$ and $q_i = P(x_i=1/\text{Non-Relevant})$ where these are the probabilities that an index term occurs in the relevant and non-relevant sets respectively.

The second term of this function is constant for a given query and will not affect the ranking of the subject matter. The first term involves a summation over all the terms in the text but this summation is usually restricted to just the query terms. This function is then equivalent to a simple matching function between the query and the subject matter wider query term 1 has the weight $\log p_i(1-qi)/(1-p_i)q_i$. If the terms are assumed to be not independently distributed then more accurate approximations for P(x/Relevant) and P(x/Non-Relevant) are possible.

When the model is applied to a retrieval system, the binomial parameter p is estimated from the sample of relevant subject matter obtained by use judgments and q is usually estimated from the total subject matter. The effect of this assumption is seen by splitting the first term of g (x) into two parts.

Where no relevance information is available, the best function for ranking the subject matter is a combination of a simple match and a match using inverse subject matter frequency weights. This function is referred to as the combination match.

Another possible application of the model is to introduce an intermediate search between the initial search and the relevance feedback search. The subject matter at the top of the ranking produced by the initial search has a high probability of being relevant. The assumption underlying the intermediate search is that the subject matter is relevant whether in actual fact they are or not. Therefore before asking the user to give relevance judgments a search is performed in which the top few subject matters are used to provide estimates for $p_i$. The intermediate search would be most useful if the process of interacting with the user to obtain relevance judgments is very expensive or even impractical.

Another application arises when the query does not retrieve any relevant subject matter at a particular cutoff. In this case, the user has judged all the retrieved subject matter as being non-relevant whereas the intermediate search is performed before the user looks at any of the subject matter.

Thus the combination of match, the intermediate search and the negative feedback search are all based on the same probabilistic model and in each case no relevant subject matter is known. The differences in the searches are in the method of estimating the p, values.

7. Parsing: Automatic Abstract Generation by Linguistic Processing

Computer generates abstracts by extracting from text material those sentences, which describe the central subject matter and findings of the paper. Sentences are selected on the basis of various statistical, grammatical, positional and presentational clues. Concatenations of extracted sentences show a lack of cohesion, due partly to the frequent occurrence of anaphoric references. Sentences, which contain non-anaphoric noun phrases and introduce key concepts into the text, are worthy of inclusion in an abstract. In this process key concepts are identified which faithfully reproduce the essence of the text material. The text processing used to identify these anaphors, which enhance the sentence selection criteria, is described. Text processing is necessary to identify these anaphors so that their effects are neutralized in the sentence selection criteria. The sentence selection and rejection rules are coupled to automatic abstracting techniques described above.

Anaphora is often used only to designate pronouns as they operate within the sentence. Coherent texts comprise sequences of sentences or other linguistic units each with a discernable relation of meaning to its predecessors. Successive sentences either discuss further properties of a real or abstract object, related objects, or events instigated or affected by the objects.

Definite noun phrases (DNP) are phrases like the motor, which can refer over long distances. DNPs may involve reference to objects introduced into the discourse by quite different noun phrases (a Ford car, the vehicle or the engine etc). DNPs can also refer back to events, "X bought the purchase". The objective is to analyze texts to find chains of DNPs and to ascertain how far back in the text one should be expected to look to resolve each DNP. These sentences fail to be propositions. It is assumed that the anaphors must be resolved within the boundaries of a proposition: thus the aim is to identify the points in the text where new propositions begin.

Grammatical criteria are used to identify points in the text where new concepts are introduced. Those sentences, which introduce important concepts and do not refer to discourse entities previously mentioned in the text are candidates for extraction. Thus, a new criterion for selecting isolated sentences for abstracting is adopted.

The outcome is a set of heuristics to identify non-anaphoric noun phrases and the selection of sentences containing these key concepts for abstracting. Summaries of those which form part of the sentence selection or rejection criteria are presented here. Text processing, which is necessary to exploit the grammatical clues and text structure in abstracting, is presented.

a) Sentence Selection Rules

The methodology represents an extension of the sentence selection, extraction and rearrange methods. The system is constructed out of two rule sets, the first of which is a selective tagger and parser derived from a similar approach. The tagger assigns grammatical tags to each word in the text according its morphological structure using criteria on the kinds of ending (or suffixes) words will take. The parser is used to disambiguate the tags and in the process structures the sequence of these word categories according to a grammar.

The second rule set identifies two classes of sentence in the source text for inclusion in the abstract. The sentence selection/rejection rules make use of and develop indicator phrases and clue words. Some of the rules specify rhetorical constructs indicating the relative salience of sections of text (conclusions have high salience, references to previous work have low salience and so on). These are mostly concerned with sentence rejection. Other rules rely on logical and linguistic hypotheses about text structure, and exploit more narrowly grammatical criteria to identify points in the text where new concepts are introduced. Sentences lacking anaphors and not introduced by rhetorical connectives frequently introduce key information into a discourse. These two rule sets, to identify non-anaphoric sentences and to identify sentences containing an indicator phrase, are the only sentence selection rules used in the system. Further rules, as stated above, are concerned with the elimination or rejection of sentences. The sequence of the sentence selection rules is based on an adaptation of Definite Clause Grammar (Pereira and Warren) rules are described in Black and Johnson.

Non-anaphoric sentences introduce key concepts into the text. A sentence is rejected if it is introduced by a connective or by an anaphoric prepositional phrase. These sentences are dependent on others in the text and should not be included. This also applies to a connective, which occurs before or just after the main verb. For example, the following sentence would be rejected because the connective "however" appears just after the verb indicating that the statement relies on some previous sentence for its full interpretation.

This approach to sentence selection depends on the ability to recognize anaphoric noun-phrases in a sentence and also any rhetorical structures. Most of the rules are implemented without recourse to real parsing. However, parsing requires that definite noun-phrases (DNPs) be recognized. As such, it requires that text be unambiguously tagged to permit noun-phrase parsing.

The system defines an implementation of the sentence selection and rejection rules as a series of text filters, using the tagger and parser developed for this purpose. The first filter subjects a text to morphological and lexical analysis, assigning grammatical tags to words. This is referred to as initial tagging. Partial parsing to identify the noun-phrases required by the abstracting rules then disambiguates multiple tag assignments. This filter works selectively, only assigning tags where they are required by the sentence selection rules. The use of a parser to disambiguate tags means that a corpus for statistical analysis is not necessary, as in the stochastic methods. Also, the parser segments the sentence into phrasal units rather than relying on a full linguistic analysis with an extensive grammar. This ensures that there is no restriction on the type of sentence structure which the system will attempt to parse, thus for example it will not fail when faced with a garden path sentence, e.g., the largest rocks during the experiment, where local ambiguity forces a parser to backtrack to arrive at a single correct interpretation.

The only manual intervention required is the initial pre-editing of the texts to separate out headings, captions, figures and formulae, and to mark up the start of each new paragraph. This is, in principle, automatable, particularly assuming access to marked up versions of the text. The information is used at a later automated stage to record structural information, which may be used in abstracting.

b) The Dictionary

The construction of a dictionary is important in tagging, since the words in the dictionary carry information about the syntactic structure of a sentence. The initial tag assignment is performed on the basis of a limited dictionary (e.g., 300 words) consisting of most function words and some content words (such as all adverbs not ending in -ly and common verbs do, be and have). Exceptions to the morphology rules are induced, e.g., the irregular forms of the nouns women, men. This allows for the assumption that all plural nouns and s-forms of verbs can be identified. The dictionary lists all the possible parts-of-speech for each word. For instance, the word after has the possible tags preposition, adverb, or adjective.

An extract of the dictionary with its information in the format word and tag is shown below. The features associated with determiners (ana, non) state whether they form anaphoric noun-phrases and the second feature (s,p) state whether the determiner when combined with a noun will form a singular or plural noun-phrase. The features of verbs and auxiliaries (pres, past, ing) state the tense.

c) The MorphologyAnalyzer

The majority of content words not listed in the dictionary can be tagged using morphological information about suffixes (usually, -meet, -ness indicate nouns, -ous, -cal indicate adjectives and -ly adverbs). Various checks are used to avoid incorrect assignments. In general, the stem must contain at least three letters. For example, only words with more than three letters ending in -s are assigned the associated tag of plural noun or s-form verb. This excludes bus and gas. A check to ensure that the penultimate letter is not s, u or rules out s-form tagging of discuss, surplus and analysis. In addition to these rules, a word containing a capital letter is tagged as a likely proper noun. The program for the recognition of word endings was written in C using the UNIX LFX utility for pattern matching.

The default categories of single noun or base form verb are assigned to any word, which does not comply with the morphology rules. The majority of new words will be nouns, abbreviations or proper names. An unknown word may also be an adjective, but since adjectives and nouns occur interchangeably in similar positions in our grammar the information lost by treating adjectives as nouns is not considered to be important in this application.

d) The Parser

Definite Clause Grammar rules are adapted for use with a bottom-up parser by storing the results on the arcs of a chart. The basic principle of bottom-up parsing is to reduce the words whose categories match the right hand side of a grammar rule to a phrase of the type on the left hand side of the rule. There are several rule invocation strategies for chart parsing. A left corner parsing strategy is used which is based on an interaction of data-driven analysis and prediction based on grammar rules. Some state-of-the-art heuristics are used to cut the parser's search space roughly by a third. Details of the implementation are recorded in Johnson, Black, Neal and Paice.

e) The Grammar

The left corner chart parsing strategy is used with a predominantly noun-phrase grammar to return a partial analysis of the text. The NP grammar can correctly identify NPs especially when they are separated by an auxiliary verb, a common verb or a determiner, which signals the end of a verb-phrase. The NPs selected for these sentences are given from their start to end position.

f) The Global Parser

The determination of higher-level syntactic structures that link these groups together is difficult, especially when dealing with unrestricted text. The approach is to recover the units that occur in-between the NPs initially selected. In the global parser these are acceptable units to occur between NPs and for the NPs to be accepted as correct. Further illustration of the global parsing indicates the categories, which appear between two NPs. The parser only does what is necessary in this application and in doing so reduces the search space and thus the time taken.

An enhanced sentence selection method for automatic abstracting may be used, which relies on grammatical criteria to identify desirable isolated sentences to include in an abstract. A simple system, based on the limited resources of a dictionary, morphological analyzer and noun-phrase parser, is used. The advantage of using a partial grammar and a chart parser for simple abstracting procedures means that no restrictions are placed on the text to be abstracted.

The effectiveness of statistical text subject matter abstraction is enhanced by use syntactic compounds to represent the text material and in the user queries, coupled with an appropriate term weighting strategy. For terms that represent text subject matter, e.g., words, syntactic phrases, fixed phrases, and proper names, various levels of "regularization" are needed to assure that syntactic or lexical variations of input do not obscure underlying semantic uniformity. This kind of normalization is achieved through the following processes:

1) Morphological stemming: e.g., retrieving is reduced to retriev;

2) Lexicon-based word normalization: e.g., retrieval is reduced to retrieve;

3) Operator-argument representation of phrases: e.g., information retrieval, retrieving of information, and retrieve relevant information are all assigned the same representation, retrieve+information;

4) Context-based term clustering into synonymy classes and subsumption hierarchies: e.g., take-over is a kind of acquisition (in business), and FORTRAN is a programming language.

An advanced NLP module is inserted between the textual input (new subject matter, user queries) and the database search engine (in our case, the PRISE system). This design produces a better performance than the base statistical system (Strzalkowski, 1993). This system is completely automated, including the statistical core and the natural language processing components and no human intervention or manual encoding is required.

In this system, the text subject matter is first processed with a sequence of programs that include a part-of-speech tagger, a lexicon-based morphological stemmer and a fast syntactic parser. Subsequently certain types of phrases are extracted from the parse trees and used as compound indexing terms in addition to single-word terms. The extracted phrases are statistically analyzed as syntactic contexts in order to discover a variety of similarity links between smaller subphrases and words occurring in them. A further filtering process maps these similarity links onto semantic relations (generalization, specialization, synonymy, etc.) after which they are used to transform a user's request into a search query.

The user's natural language request is also parsed and all indexing terms occurring in it are identified. Certain highly ambiguous, usually single-word terms are dropped, provided that they also occur as elements in some compound terms. For example, "natural" may be deleted from a query already containing "natural language" because "natural" occurs in many unrelated contexts: "natural number", "natural logarithm", "natural approach", etc. At the same time, other terms may be added, namely those which are linked to some query term through admissible similarity relations. For example, "unlawful activity' is added to a query containing the compound term "illegal activity" via a synonymy link between illegal" and "unlawful".

Removing low-quality terms from the queries is as important (and often more so) as adding synonyms and specializations. In some instances (e.g., routing runs), low-quality terms are removed (or inhibited) before similar terms are added to the query or else the effect of query expansion is all but drowned out by the increased noise.

After the final query is processed, the database search follows, and a ranked list of subject matter or key terms is returned. It should be noted that all the processing steps, those performed by the backbone system, and those performed by the natural language processing components, are fully automated, and no human intervention or manual encoding is required.

To summarize, content characterization here involves defining a suitable selection procedure, operating over a larger set of phrasal units than that generated by a typical term identification algorithm (including not only all terms, but term-like phrases, as well as their variants, reduced forms, and anaphoric references), with the following properties. First, it reduces this set to a list of expressions that uniquely refer to objects in the discourse (the referent set). Second, it makes informed choices about the degree to which each phrase is representative of the text as a whole. Finally, it presents its output in a form which retains contextual information for each phrase. The key to normalizing the content of a document to a small set of distinguished, and discriminating, phrasal units is establishing a containment hierarchy of phrases (term-relational context-clause-sentence-paragraph- and so forth; this would eventually be exploited for capsule overview presentation at different levels of granularity), and being able to make refined judgments concerning the degree of importance of each unit, within some segment of text.

The goal is to filter a term set in such a way that those expressions which are identified as most salient are presented as representative of document content. This process of "salience-based content characterization" builds on and extends the notion of salience that forms a crucial component of the anaphora resolution procedure developed by (Lappin & Leass 1994). Moreover, it presupposes very little in the way of linguistic processing, working solely on the basis of the shallow analysis provided by the LINGSOFT tagger. It thus meets the desired requirement of domain independence, permitting extension of the technology to a wide range of texts, without regard to genre, style, or source.

8. Lexical Chains

Lexical chains can serve as a source representation of the original text to build a summary. The next question is how to build a summary representation from this source representation. The most prevalent discourse topic plays an important role in the summary. Lexical chains are a good indicator of the central topic of a text. The summary representation reflects that all these words represent the same concept. Otherwise, the summary generation stage would extract information separately for each term.

For each text, chains are manually ranked in terms of relevance to the main topics. Different formal measures on the chains then computed, including chain length, distribution in the text, text span covered by the chain, density, graph topology (diameter of the graph of the words) and number of repetitions.

a. Extracting Significant Sentences

Once strong chains have been selected, the next step of the summarization algorithm is to extract full sentences from the original text based on chain distribution.

Choose the sentence that contains the first appearance of a chain member in the text. This heuristic produces the summary for the text. A second heuristic based on the notion of representative words is defined: For each chain in the summary representation, the sentence that contains the first appearance of a representative chain member in the text is chosen. Often, the same topic is discussed in a number of places in the text, so its chain is distributed across the whole text. Still, in some text unit, this global topic is the central topic (focus) of the segment. This unit is identified and sentences extracted related to the topic from this segment (or successive segments) only.

For each chain, the text unit where the chain is highly concentrated is identified. The sentence with the first chain appearance in this central unit is extracted. The third heuristic extracts sentences from the middle of the text and several sentences from distant places in the text for a single chain. The best chain for a text is chosen based on the number and weight of different relations in the chain.

Text coherence models in summarization are exemplified by Marco who uses a rhetorical parser for unrestricted text that exploits cue-phrases to build rhetorical structure theory (RST) trees out of clauses in the text. The salience scores are then be used to extract corresponding sentences or clauses to form summaries.

9. Extracting Text

Each component of a summary needs to be instantiated by one or more passages extracted from the original text. These can be paragraphs, paragraph parts, sentences, or even sentence fragments. A well thought out paragraph structure organizes information within a text is exploited for summarization. Content-based segmentation techniques may be applicable.

The following list discusses the passage selection criteria in general.

a) Words and phrases frequently occurring in a text are likely to be indicative of content especially if such words or phrases do not occur often elsewhere.

b) Title of a text is often strongly related to its content. Therefore, words and phrases from the title are considered as important indicators of content concentration within a document.

c) Noun phrases occurring in the opening sentences of multiple paragraphs, or those used in the subject phrases or even as the first non-trivial phrase in multiple sentences tend to refer to entities that are central to text content.

d) Words and phrases occurring in only some paragraphs are weighted more highly than those scattered across the entire document, because such terms are more likely to be discriminators of summary passages. In generic summarization this score is set up so that the summary-worthiness of paragraphs is decreasing, as we read deeper into the text. Examples of summary cue phrases include: "In summary", "To sum up", "The point is", etc.

e) Paragraphs that are closer to the beginning of a news report tend to be more content-loaded than those towards the end. This ordering may be reversed in editorial-like texts. Therefore, the position of each passage carries an additional score. Position scoring is appropriate in generic summarization, but arguably not in topic-based summarization, where themes which are not necessarily central to the original text need to be summarized. In generic summarization this score is set up so that the summary-worthiness of paragraphs is decreasing as one reads deeper into the text. In many cases, a summarizer does not need to look beyond the first 6-7 paragraphs. In the subsequent versions, it has been replaced by a score supplement for summaries containing either the first or the second paragraph of a document. This way, the summarizer naturally defaults to the opening segment of a document if no other information is available to guide the passage selection.

f) Proper names of people, places, organizations, etc., various acronyms, numerical amounts, etc. are likely to refer to factual data that can improve the informativeness of a summary. At present score supplements are added to passages containing names or numbers, if the summary is requested to be an informative digest (approx. 30% of the original).

g) Certain cue phrases explicitly suggest that what follows is a summary or the main point of an article. Passages containing such cues should therefore be preferred for selection. Examples of summary cue phrases include: "In summary", "To sum up", "The point is", etc. In general, such heuristics are of little use, except in summarizing editorials or commentaries, where the usual top-down flow of arguments is frequently reversed. They are not at present implemented in this summarizer.

h) The process of passage selection closely resembles query-based subject matter retrieval. The "documents" here are the passages (paragraphs), and the "query" is a set of words and phrases collected from the title and from across the document. This analogy, while not entirely accurate, is nonetheless a useful one since other proven IR techniques may be applicable to summarization. Specifically, automatic query expansion techniques discussed later in this chapter may benefit the passage search process. We are currently experimenting with such options.

The background section supplies information that makes the summary self-contained. Passages may also be connected via rhetorical and other discourse relations. If a full discourse analysis is an unpalatable option, we can resort, again, to supplying a background/context passage.

10. The Generalized Summarization Algorithm a) Segment text into passages. If no paragraph or sentence structure is available, use approximately equal size chunks.

b) Build a paragraph-search query out of the content words, phrases and other terms found in the title, a user-supplied topic description (if available), as well as the terms occurring frequently in the text. A background link from passage N+1 to passage N means that if passage N+1 is selected for a summary, passage N must also be selected.

c) Normalize passage scores by their length, taking into account the desired target length of the summary. With sum over unique content terms q. In extreme cases, to prevent obtaining empty summaries, the summarizer will default to the first paragraph of the original text. Add premium scores to groups based on the inverse degree of text discontinuity measured as a total amount of edited text material between the passages within a group.

d) Rank passage groups by score. All groups become candidate summaries. Select the top scoring passage or passage group as the final summary.

e) Length of the original text: Discard all passages with length in excess of 1.5 times the target length. This reduces the number of passage combinations the summarizer has to consider, thus improving its efficiency. The decision whether to use this condition depends upon the user's tolerance to length variability. In extreme cases, to prevent obtaining empty summaries, the summarizer will default to the first paragraph of the original text.

f) Combine passages into groups of 2 or more based on their content, composition and length. The goal is to maximize the score, while keeping the length as close to the target length as possible. Any combination of passages is allowed, including non-consecutive passages, although the original ordering of passages is retained. If a passage attached to another through a background link is included into a group, the other passage must also be included, and this rule is applied recursively. The background links work only one way: a passage which is a background for another passage, may stand on its own if selected into a candidate summary.

g) Recalculate scores for all newly created groups. This is necessary, and cannot be obtained as a sum of scores because of possible term repetitions. Again, discard any passage groups longer than 1.5 times the target length. Add premium scores to groups based on the inverse degree of text discontinuity measured as a total amount of edited text material between the passages within a group. Add other premiums as applicable.

h) Rank passage groups by score. All groups become candidate summaries.

i) Repeat steps 6 through 8 until there is no change in top-scoring passage group through 2 consecutive iterations. Select the top scoring passage or passage group as the final summary.

Many robust summarization systems have opted for statistical sentence extraction: systems have been designed which extract "important" sentences from a text, where the importance of the sentence is inferred from low-level properties which can be more or less objectively calculated. Over the years there have been many suggestions as to which low-level features can help determine the importance of a sentence in the context of a source text, such as stochastic measurements for the significance of key words in the sentence, its location in the source text, connections with other sentences and the presence of cue or indicator phrases or of title words. The result of this process is an extract, i.e. a collection of sentences selected verbatim from the text.

These extracts are then used as the abstract of the text. Assuming that the text is coherent, the semantics gaps between potentially unconnected sentences are filled in. Even if these sentences do not form a coherent text that does not matter much: the extract is short enough to still make sense. Simple sentence extraction methods reduce a 20-page article to a 2-page collection of unconnected sentences, a document surrogate that is not adequate as an abstract. To overcome this problem, abstract-worthy material is selected from the source text, whilst at the same time keeping information about the overall rhetorical structure of the source text and of the role of each of the extract sentences in that rhetorical structure. Rather than attempting a full rhetorical analysis of the source text, just enough rhetorical information is extracted so as to be able to determine the rhetorical contribution of all and only the abstract-worthy sentences, without modeling domain knowledge or performing domain-sensitive reasoning. Abstracting means analyzing the argumentative structure of the source text and identifying textual extracts, which constitute appropriate fillers for the template.

Fusion of Multiple Information Systems

The present invention contemplates the use and fusion of multiple input methods and sources as part of the total apparatus for use as a study method. The source of the material to be abstracted and condensed may be written text, computer-generated textual material, e.g., internet, e-mail, audio sources such as lectures and speeches. The digitized textual material is converted into editable text with OCR technology and then compressed into an outline with summarizer software as described in the above methods. The treatment of audio input involves the combination of automatic speech recognition and text abstracting software. In a one step method, speech recognition and abstracting engine is applied to the audio input to generate a time-marked textual representation or transcription of the speech. In a two step method, the speech is first converted to editable text by voice-to-text software and then rendered into a user understandable outline by the summarizer software operating on the computer system. The entire process can operate in real time in the course of a lecture. For example, the user can view a condensation or outline of an ongoing lecture as the lecture is proceeding. At the conclusion of the lecture, an outline of the entire lecture is displayed on the screen for review and memorization. The amount of detail that the user wishes to retain in the outline can be adjusted by users by referring to the full-length transcript of lecture also recorded and transcribed in the computer.

EXAMPLES

Example 1

Exhibit A:
Shown in FIGS. 6A, 6B and 6C are three jpeg images captured from 3 sequential pages of a contract law textbook with a 5 megapixel back camera of the iPAD3™ using desktop lighting with default camera setting. These jpeg images are imported into the OCR program (FINEREADER 9.0 Professional™) and summarized with the Megaputer™ Summarizer.

Exhibit B:
Shown below is the conversion of the above printed text acquired with the iPAD3™ converted to editable text in WORD format by OCR program ABBYY Professional 9.0™.

Patents

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patents. Section 101 provides: Whoever invents or discovers any new and useful process, machine, manufacture, or composition of matter, or any new and useful improvement thereof, may obtain a patent therefore, subject to the conditions and requirements of this title. Thus, naturally occurring substances are not patentable, as the invention must be made or modified by humans. For example, the discovery of a bacterium with useful properties is not patentable, whereas the manufacture of a genetically engineered bacterium is. See *Diamond, Commissioner of Patents and Trademarks* v. *Chakrabarty*. By the same token, laws of nature, principles, bookkeeping systems, fundamental truths, methods of calculation, and ideas are not patentable. Accordingly, as Chief Justice Burger noted in *Diamond, Commissioner of Patents and Trademarks* v. *Chakrabarty*, "Einstein could not patent his law that $E=mc^2$, nor could Newton have patented the law of gravity." Similarly, isolated computer programs are not patentable, although, as mentioned above, they may be copyrighted.

To be patentable as a utility patent, the process, machine, manufacture, or composition of matter must meet three criteria:

1. Novelty—The invention must not conflict with a prior pending application or a previously issued patent;
2. Utility—The invention must possess specific and substantial usefulness, which must be affirmatively disclosed by the application; and
3. Nonobviousness—The invention, in light of the prior art, must not be obvious to a person skilled in such prior art.

In addition to utility patents, the Patent Act provides for plant patents and design patents. A plant patent protects a new and distinctive variety of asexually reproducing plant. Plant patents require (1) novelty, (2) distinctiveness, and (3) nonobviousness. A design patent protects a new, original, ornamental design for an article of manufacture. Design patents require (1) novelty, (2) ornamentality, and (3) nonobviousness. As mentioned above, design patents have a duration of fourteen years; plant patents, like utility patents, have a seventeen-year duration.

Procedure

The United States Patent and Trademark Office issues a patent upon the basis of a patent application containing a specification, which describes how the invention works, and claims, which describe the features that make the invention patentable. The applicant must be the inventor. Before granting a patent, the Patent Office thoroughly examines the prior art and determines whether the submitted invention is nonobvious and has novelty and utility (or distinctiveness or ornamentality, in the case of plant or design patents). An application for a patent is confidential, and the Patent Office will not divulge its contents. This confidentiality ends, however, upon the granting of the patent. Unlike rights under a copyright, no monopoly rights arise until the Patent Office actually issues a patent.

Therefore, anyone is free to make, use, and sell an invention for which a patent application is filed until the patent has been granted. An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance are defenses to contributory infringement, they are not defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

Exhibit C

Shown below are summaries of the above text using the Megaputer summarizer program at varying degrees of compression.

Megaputer TextAnalyst™ Summaries of Varying Lengths

Example for Compression to 21% of Original Text Size

Through a patent, the Federal government grants an inventor a monopolistic right to make, use, or sell an invention to the absolute exclusion of others for the period of the patent, which currently is fourteen years for design patents and seventeen years for all others.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

Before granting a patent, the Patent Office thoroughly examines the prior art and determines whether the submitted invention is nonobvious and has novelty and utility (or distinctiveness or ornamentality, in the case of plant or design patents). Therefore, anyone is free to make, use, and sell an invention for which a patent application is filed until the patent has been granted.

Example of Compression to 30%

Through a patent, the Federal government grants an inventor a monopolistic right to make, use, or sell an invention to the absolute exclusion of others for the period of the patent, which currently is fourteen years for design patents and seventeen years for all others.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

Plant patents require (1) novelty, (2) distinctiveness, and (3) nonobviousness.

The United States Patent and Trademark Office issues a patent upon the basis of a patent application containing a specification, which describes how the invention works, and claims, which describe the features that make the invention patentable.

Before granting a patent, the Patent Office thoroughly examines the prior art and determines whether the submitted invention is nonobvious and has novelty and utility (or distinctiveness or ornamentality, in the case of plant or design patents). Therefore, anyone is free to make, use, and sell an invention for which a patent application is filed until the patent has been granted.

Example of Compression to 48%

Through a patent, the Federal government grants an inventor a monopolistic right to make, use, or sell an invention to the absolute exclusion of others for the period of the patent, which currently is fourteen years for design patents and seventeen years for all others.

The Patent Act specifies those inventions that may be patented as utility patents.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

A plant patent protects a new and distinctive variety of asexually reproducing plant.

Plant patents require (1) novelty, (2) distinctiveness, and (3) nonobviousness.

Design patents require (1) novelty, (2) ornamentality, and (3) nonobviousness.

plant patents, like utility patents, have a seventeen-year duration.

The United States Patent and Trademark Office issues a patent upon the basis of a patent application containing a specification, which describes how the invention works, and claims, which describe the features that make the invention patentable.

Before granting a patent, the Patent Office thoroughly examines the prior art and determines whether the submitted invention is nonobvious and has novelty and utility (or distinctiveness or ornamentality, in the case of plant or design patents).

Therefore, anyone is free to make, use, and sell an invention for which a patent application is filed until the patent has been granted.

Anyone who, without permission, makes, uses, or sells a patented invention is a direct infringer, whereas a person who actively encourages another to make, use, or sell a patented invention without permission is an indirect infringer.

A contributory infringer is one who knowingly sells or supplies a part or component of a patented invention, unless the component is a staple or commodity or is suitable for a substantial noninfringing use.

The right to use a purchased item includes the right to repair it so long as the repair does not constitute reconstruction, which would infringe upon the patent holder's exclusive right to make the invention.

Exhibit D:

Shown below are results of the semantic query of the above text

Q. Define Patentability
Answer
   To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.
   The United States Patent and Trademark Office issues a patent upon the basis of a patent application containing a specification, which describes how the invention works, and claims, which describe the features that make the invention patentable.

Q. What is a patent?
Answer
   Before granting a patent, the Patent Office thoroughly examines the prior art and determines whether the submitted invention is nonobvious and has novelty and utility (or distinctiveness or ornamentality, in the case of plant or design patents).
   To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.
   In addition to utility patents, the Patent Act provides for plant patents and design patents.
   Therefore, anyone is free to make, use, and sell an invention for which a patent application is filed until the patent has been granted.
   The United States Patent and Trademark Office issues a patent upon the basis of a patent application containing a specification, which describes how the invention works, and claims, which describe the features that make the invention patentable.
   Through a patent, the Federal government grants an inventor a monopolistic right to make, use, or sell an invention to the absolute exclusion of others for the period of the patent, which currently is fourteen years for design patents and seventeen years for all others.
   plant patents, like utility patents, have a seventeen-year duration.

Design patents require (1) novelty, (2) ornamentality, and (3) nonobviousness.

Q. What is infringement?

Answer.

Anyone who, without permission, makes, uses, or sells a patented invention is a direct infringer, whereas a person who actively encourages another to make, use, or sell a patented invention without permission is an indirect infringer.

A contributory infringer is one who knowingly sells or supplies a part or component of a patented invention, unless the component is a staple or commodity or is suitable for a substantial noninfringing use.

The right to use a purchased item includes the right to repair it so long as the repair does not constitute reconstruction, which would infringe upon the patent holder's exclusive right to make the invention.

Example 2

Exhibit A.

FIG. 7 shows original Text with curved surface and suboptimal desktop lighting acquired with Canon IXY Digital 800IS 6 megapixel camera using settings described in the text. Note curved surface and variable lighting as user would encounter photographing from a café or library without professional lighting.

Exhibit B.

Conversion of the above image with OCR to unformatted text. Note despite curved surface and poor lighting, the OCR program converted the image to editable text without significant error. This document is now ready for digital summarization.

Removal of Directors a majority vote>> shareholders may remove any director or the entire board of directors, with or without cause, in a meeting called for that purpose—In the case of a corporation having cumulative voting, however, a director may be removed only if the number of votes opposing his removal would be insufficient to elect him. Section 8.08(c). Removal of directors is discussed more fully later in this chapter.

Approval of Fundamental Changes

The board of directors manages the ordinary business affairs of the corporation. Extraordinary matters involving fundamental changes in the corporation require shareholder approval; such matters include amendments to the articles of incorporation, a sale or lease of all or substantially all of the corporate assets not in the regular course of business, most mergers, consolidations, compulsory share exchanges, and dissolution. Fundamental changes are discussed in Chapter 38.

Concentrations of Voting Power

Certain devices enable groups of shareholders to combine their voting power for purposes such as obtaining or maintaining control or maximizing the impact of cumulative voting. The most important methods of concentrating voting power are proxies, voting trusts, and shareholder agreements.

Proxies

A shareholder may vote either in person or by written proxy. Section 7.22(a). As mentioned earlier, a proxy is simply a shareholder's authorization to an agent to vote his shares at a particular meeting or on a particular question. Generally, proxies must be in writing to be effective; furthermore, statutes typically limit the duration of proxies to no more than eleven months, unless the proxy specifically provides otherwise. Section 7.22(c). Since a proxy is the appointment of an agent, it is revocable, as all agencies are, unless conspicuously stated to be irrevocable and coupled with an interest, such as shares held as collateral. Section 7.22(d). The solicitation of proxies by publicly held corporations is also regulated by the Securities Exchange Act of 1934, as discussed in Chapter 46.

Voting Trusts

Voting trusts, which are designed to concentrate corporate control in one or more persons, have been used in both publicly held and closely held corporations. A voting trust is a device by which one or more shareholders separate the voting rights of their shares from the ownership of those shares. Under a voting trust, one or more shareholders confer on a trustee the right to vote or otherwise act for them by signing an agreement setting out the provisions of the trust and transferring their shares to the trustee. Section 7.30(a). In most States, voting trusts are permitted by statute but are usually limited in duration to ten years. The Revised Act permits all or some of the parties to a voting trust to extend it for an additional term of up to ten years by signing an extension agreement and obtaining the voting trustee's written consent. Section 7.30 (c). The extension runs from the time the first shareholder signs the agreement but binds only those shareholders who consent to it Shareholder Voting Agreements In most jurisdictions, shareholders may agree in writing to vote in a specified manner for the election or removal of directors or on any other matter subject to shareholder approval. Section 7.31(a). The Revised Act and some State statutes expressly provide that shareholder agreements are enforceable by a decree of specific performance. Section 7.31(b). Unlike voting trusts, shareholder voting agreements are usually not limited in duration. Shareholder agreements are used frequently in closely held corporations, especially in conjunction with restrictions on the transfer of shares, in order to provide each shareholder with greater control and delectus personae (the right to choose those who will become shareholders).

*Galler y. Galler,* 32 D1.2d 16, 203 N.&&1 577 (1964), provides a well-known example of the effect a shareholder agreement m#

Example 3

Printed Matter Acquisition with Ultra-Compact Digital Camera

FIGS. 8A and 8B show four text pages (each 10"×7") from a textbook on Business Law Documents that were photographed using a FCCE™ ultra compact digital camera with the following specifications: Lens specification: CMOS 2408×1536 Pixels (3.2M pixels); Focus Range: Normal: 1.5 m to infinity, Macro: 50 cm; Exposure Control: Automatic/Manual (−2EV-2EV); Storage Capacity: XXL 12.0M 400× 3000 Pixels; XL 0.0M 3456×2592 Pixels; L 6.0 M 2848× 2136 Pixels; M 3.2 M 2048×1536 Pixels; S XVGA 1600× 1200 Pixels.

The textbook page images are converted by the camera software into jpeg format The camera position and settings used to acquire the images below were as follows: (i) "macro" lens setting, (ii) picture size: large (2848×2136) (iii) superfine compression setting (iv) lighting setting: "0" (v) camera held approximately 14-18 inches above the center of text (vi) no zoom (vii) image encased in monitor screen. With these settings and positions, two textbook pages (10"×7" each) were acquired at the same time (Exhibits 3A and 3B below).

This JPEGs are then transferred from the camera via USB 2.0 port to Adobe PhotoAlbum™ where they were copied and sent to "My Pictures" folder positioned on Desktop. The OCR program (Fine Reader 8.0™) is then opened and the jpeg images are acquired by clicking "Open and Read" that converts the jpeg images of the printed matter to editable text viewable and saved as a WORD file. The formatting instructions for the editable text are provided in OCR program under "Options" and are fixed beforehand. By selecting "Retain only paragraphs, fonts and tables", the editable text that appears in WORD program is devoid of the original columns and major subheading breaks. That format is illustrated in exhibit A below.

The editable text is manually edited to highlight the major subheading and extraneous material is deleted as shown in Exhibit B. The text is now copied and pasted into a summarizer program such as Megaputer Content Analyst™. The final summary from Megaputer is the same as shown above for content acquired via an optical scanner.

Exhibit A. The Digital Photographic Image of Text in jpeg Format is Converted to Editable Text (WORD) Via an OCR Program in Normal Format Devoid of the Columns and Graphs in the Original Text Procedure Applications for copyright are filed with the Register of Copyrights in Washington, D.C. Although copyright registration is not required, since copyright protection begins as soon as the work is fixed in a tangible medium, registration is, nonetheless, advisable because it is a condition of certain remedies (statutory damages and attorneys' fees) for copyright infringement. When a work is published, it is advisable, though no longer required, to place a copyright notice on all publicly distributed copies so as to notify users about the copyright claim. If proper notice appears on the published copies to which a defendant in a copyright infringement case had access, then the defendant will be unable to mitigate actual or statutory damages by asserting a defense of innocent infringement. Section 401.

Rights

In most instances, copyright protection subsists for the duration of the author's life plus an additional fifty years. Section 106 of the Copyright Act gives the owner of the copyright the exclusive right to 1. reproduce the copyrighted work in copies or recordings;
2. prepare derivative works based upon the copyrighted work;
3. distribute copies or recordings of the copyrighted work to the public by sale or other transfer of ownership, or by rental, lease, or lending,
4. perform the copyrighted work publicly, in the case of literary, musical, dramatic, choreographic, pantomime, motion picture, and other audiovisual works; and
5. display the copyrighted work publicly, in the case of literary, musical, dramatic, and choreographic works, pantomimes, and pictorial, graphic, or sculptural works, including the individual images of a motion picture or other audiovisual work.

These broad rights are subject, however, to several limitations, the most important of
which are "compulsory licenses" and "fair use." Compulsory licenses permit certain limited uses of copyrighted material upon the payment of specified royalties and compliance with statutory conditions. Section 107 codifies the common law doctrine of fair use by providing that the fair use of a copyrighted work for purposes such as criticism, comment, news reporting, teaching (including multiple copies for classroom use), scholarship, or research is not an infringement of copyright. In determining whether the use made of a work in any particular case is fair, the courts consider the following factors: (1) the purpose and character of the use, including whether such use is of a commercial nature or is for nonprofit educational purposes; (2) the nature of the copyrighted work; (3) the amount and substantiality of the portion used in relation to the copyrighted work as a whole; and (4) the effect of the use upon the potential market for or value of the copyrighted work. See *Basic Books. Inc.* v. *Kinko's Graphics Corporation.*

Ownership

The author of a creative work owns the entire copyright. Although usually the actual creator of a work is the author, in two situations under the doctrine of works for hire, she is not considered the author. Section 101. First, if an employee prepares a work within the scope of her employment, her employer is considered to be the author of the work. Second, if a work is specially ordered or commissioned for certain purposes specified in the copyright statute and the parties expressly agree in writing that the work shall be considered a work for hire, the person commissioning the work is deemed to be the author. The kinds of works subject to becoming works for hire by commission include contributions to collective works, parts of motion pictures or other audiovisual works, translations, supplementary works such as prefaces, illustrations, or afterwords, compilations, instructional texts, and tests.

The ownership of a copyright may be transferred in whole or in pert by conveyance, will, or intestate succession. Section 201. A transfer of copyright ownership, other than by operation of law, is not valid, however, unless it is memorialized in a note or memorandum signed by the owner of the rights conveyed or by the owners duly authorized agent. Section 204. An author may terminate any transfer of copyright ownership, other than that of a work for hire, during the five-year period beginning thirty-five years after the transfer was granted—

Section 203.

Ownership of a copyright, or of any of the exclusive rights under a copyright, is distinct from the ownership of any material object that embodies the work. Transferring the ownership of any material object, including the copy or recording in which the work was first fixed, does not of itself convey any rights in the copyrighted work embodied in the object; nor, in the absence of an agreement, does the transfer of copyright ownership or of any exclusive rights under a copyright convey property rights in any material object. Section 202. Thus, the purchase of this textbook neither affects the publisher's copyright nor authorizes the purchaser to make and sell copies of the book. The purchaser may, however, rent, lend, or resell the book.

Infringement and Remedies

Infringement occurs whenever somebody exercises, without authorization, the rights exclusively reserved for the copyright owner. Infringement need not be intentional. To prove infringement, the plaintiff need only establish that he owns the copyright and that the defendant violated one or more of the plaintiffs exclusive rights under the copyright. Proof of infringement usually consists of showing that the allegedly infringing work is substantially similar to the copyrighted work and that the alleged infringer had access to the copyrighted work.

To be the subject at a suit for infringement, the copyright must be registered with the Copyright Office, unless the work is a Berne Convention work whose country of origin is not the United States. For an infringement occurring after registration, the following remedies are available: (1) injunction; (2) the impoundment and, possibly, destruction of infringing articles; (3) actual damages, plus profits made by the infringer that are additional to those damages, or statutory damages of at least $500 but no more than $20,000 ($100,000 if the infringement is willful), according to what the court determines to be just; (4) costs and, in the court's discretion, reasonable attorneys' fees to the prevailing party; and (5) criminal penalties of a fine of up to $10,000 or up to one year's imprisonment for willful infringement for purposes of commercial advantage or private gain. The Piracy and Counterfeiting Amendments Act of 1982 imposes harsher punishments for large scale piracy: a $250,000 fine and five years* imprisonment for those who pirate 1,000 recordings or 65 films within 180 days.

Patents

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patent*. Section 101 provides:

Whoever invents or discovers any new and useful process, machine, manufacture, or composition of matter, or any new and useful improvement thereof, may obtain a patent therefor, subject to the conditions and requirement* of this title.

Thus, naturally occurring substances are not patentable, as the invention must be made or modified by humans. For example, the discovery of a bacterium with useful properties is not patentable, whereas the manufacture of a genetically engineered bacterium is. See *Diamond, Commissioner of Patent* and Trademarks* v. *Chakrabarty*. By the same token, laws of nature, principles, bookkeeping systems, fundamental truths, methods of calculation, and ideas are not patentable. Accordingly, as Chief Justice Burger noted in *Diamond, Commissioner of Patents and Trademarks* v. *Chakrabarty*, "Einstein could not patent his law that $E=mc^2$, nor could Newton have patented the law of gravity." Similarly, isolated computer programs are not patentable, although, as mentioned above, they may be copyrighted.

lb be patentable as a utility patent, the process, machine, manufacture, or composition of matter must meet three criteria:

1. Novelty—The invention must not conflict with a prior pending application or a previously issued patent;
2. Utility—The invention must possess specific and substantial usefulness, which must be affirmatively disclosed by the application; and
3. Nbnobviousness—The invention, in light of the prior art, must not be obvious to a person skilled in such prior art.

In addition to utility patents, the Patent Act provides for plant patents and design patents. A plant patent protects a new and distinctive variety of asexually reproducing plant. Plant patents require (1) novelty, (2) distinctiveness, and (3) nonobviousness. A design patent protects a new, original, ornamental design for an article of manufacture. Design patents require (1) novelty, (2) ornamentality, and (31 nonobviousness. As mentioned above, design patents have a duration of fourteen years; plant patents, like utility patents, have a seventeen-year duration.

Procedure

The United States Patent and Trademark Office issues a patent upon the basis of a patent application containing a specification, which describes how the invention works, and claims, which describe the features that make the invention patentable. The applicant must be the inventor. Before granting a patent, the Patent Office thoroughly examines the prior all and determines whether the submitted invention is nonobvious and has novelty and utility (or distinctiveness or ornamentality, in the case of plant or design patents). An application for a patent is confidential, and the Patent Office will not divulge its contents. This confidentiality ends, however, upon the granting of the patent. Unlike rights under a copyright, no monopoly rights arise until the Patent Office actually issues a patent.

Therefore, anyone is free to make, use, and sell an invention for which a patent application is filed until the patent has been granted. An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial non infringing use. While good faith and ignorance are defenses to contributory infringement, they are not defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

Cases

Trade Secrets

*B. C. ZIEGLER AND COMPANY* v. *EHREN*

Court of Appeals of Wisconsin, 1987. MI Wis. 2d 19, 414 N.W. 2d 48.

BROWN, J.

Lawrence P. Ehren appeals from a grant of summary judgment restraining him from using or disclosing information contained on business papers and records he bought from a scrap paper company but which originated with B. C. Ziegler and Company (Ziegler). The circuit court held that the information was entitled to common law trade secret protection and that Ehren did not acquire title to the information as a good faith purchaser. We affirm those rulings.

Ziegler is an underwriter of securities located in West Bend. Ehren is employed by a scrap dealer, Lynn's Waste Paper Co., Inc. (Lynn's), where his duties include determining the value for recycling purposes of scrap paper purchased by Lynn's. From 1981 to 1983, Ehren was a licensed securities salesman and worked for two brokerage firms which compete with Ziegler. Ziegler considered its customer lists confidential and had developed policies for the disposal of scrap paper which were regularly communicated to its employees. Paper containing a customer name was to be burned or shredded on the Ziegler premises before disposal or was to be delivered for shredding to a commercial shredding concern in Apple-ton, in which case the employee delivering the paper was to wait while it was shredded. Under no circumstances was scrap paper containing names or information about Ziegler customers to leave the possession of its Exhibit B. Machine Summarization (Megaputer™) of "3D" above is shown below.

Example of Compression to 30%

Through a patent, the Federal government grants an inventor a monopolistic right to make, use, or sell an invention to the absolute exclusion of others for the period of the patent, which currently is fourteen years for design patents and seventeen years for all others.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

Plant patents require (1) novelty, (2) distinctiveness, and (3) nonobviousness.

The United States Patent and Trademark Office issues a patent upon the basis of a patent application containing a specification, which describes how the invention works, and claims, which describe the features that make the invention patentable.

Before granting a patent, the Patent Office thoroughly examines the prior art and determines whether the submitted invention is nonobvious and has novelty and utility (or distinctiveness or ornamentality, in the case of plant or design patents). Therefore, anyone is free to make, use, and sell an invention for which a patent application is filed until the patent has been granted.

Example 5

Textual material captured using a DS6700-DC2001zzr handheld digital image scanner using the settings described in the application is captured verbatim and converted to editable text by ABBYY Fine Reader OCR 9.0 Professional Edition. The image is captured by pointing the imager at LED crosshairs provided by the imager. The image is automatically focused, framed and captured with a hand held imager without the need for framing in an LED monitor. The image capturing method is as rapid as barscanning a code at the checkout counter in a supermarket. The image can be sharpened, rotated and brightened by image correction software such as Canon Zoom so that is easily recognized, analyzed and read by the OCR software which converts it verbatim to editable text. In this form the text is rapidly summarized by summarization software to a summary that can be used for repetitious practice and "time on task" to improve performance on tests and presentations. Below are examples of image capture using only the autoaim, focusing and framing feature of the DS6700-DC2001zzr handheld digital image scanner. The image is sharpened, brightened in Canon Zoom and then transferred to Fine Reader 9.0 where it is converted to editable text with OCR software. From this point, the content is machine summarized into a user understandable summary.

Exhibit A:

FIG. 9A shows raw text acquired with a DS6700-DC2001zzr handheld digital image scanner. In FIG. 9B, the image is sharpened, brightened in Canon Zoom and then transferred to Fine Reader 9.0 where it is converted to editable text with OCR software.

Exhibit B:

In FIG. 9C raw text is acquired with DS6700-DC2001zzr handheld digital image scanner. In this form, the text is transferred to OCR software where it is converted to editable text shown below.

Therefore, anyone is free to make, use, and sell an invention for which a patent application is filed until the patent has been granted. An applicant whose application is rejected may apply for reexamination. If the application is again rejected, the applicant may appeal to the Patent and Trademark Office's Board of Appeals, and from there to the Fed- Infringement Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance are defenses to contributory infringement, they are not defense* to direct infringement. The rights under a patent do not extend beyond the first sale; that is, the purchaser of a patented item, 1—permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

Example 6

Exhibit A:

FIG. 10 shows a textual image captured with DS6700-DC2001zzr handheld digital image scanner. In this form, the text is transferred to ABBYY 9.0 Fine Reader where it is converted to a pdf file shown below. From there it is transferred to an Idautomation pdfd417 font and encoder where it is converted to a pdf417 2D barcode shown in FIG. 10B.

Patents

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain."

Example 7

Exhibit A:

Below is (a) a textual image as published which, is converted to a pdf417 2D barcode using Idautomation pdfd417 font as shown in FIG. 11. This image is then converted back to the original text with a DS6700-DC2001zzr bar code reader as shown in (b) below.

a. FIG. 1, i.e., shade along the "spine" of the book (photometric distortion) and warping in the shade area (geometric distortion). The distortion introduces problems in image restoration of archived documents and in word spotting for document retrieval from the digital library. Given these problems and the large number of books to be scanned, our objective in this research is to design an efficient content-free algorithm to restore the document images by correcting the above two types of distortion.

There have been related techniques reported in the literature. We classify them into two categories: 1) restoration approaches based on 2D document image processing and 2) restoration approaches based on 3D document shape discovery.

b. FIG. 1, i.e., shade along the "spine" of the book (photometric distortion and warping in the shade area (gemoetric distortion). The distortion introduces problems in image restoration of archived documents and in word spoting for document retrieval from the digital library. Given these problems and the large number of books to be scanned, our objective in this research is to design an efficient content-free algorithm to restore the document images by correcting the above two types of distortion. There have been related techniques reported in the literature. We classify them into two categories: 1) restoration approaches based on 2D document image processing and 2) restoration approaches based on 3D document shape discovery.

All references and their references referred to in this application are incorporated in entirety by reference.

The spirit and scope of the present invention shall be limited only by the claims that follow.

The invention claimed is:

1. A single-action method to facilitate identification, condensation and capture of key concepts from subject matter of printed paper text, said single-action method comprising;
    (a) obtaining still images directly of said printed paper text with one or more compact, handheld, mobile data input devices comprising a digital camera and computer system wherein said compact, handheld, mobile data input device is selected from a group consisting of tablets;
    (b) stabilizing, rotating, deskewing, brightening and focusing said still images; and
    (c) converting said stabilized, rotated and focused still images into digitized text using software operating on said mobile data input device;
    (d) converting said digitized text into editable text form using optical character recognition software; and
    (e) converting said editable text form into a machine readable summary using text summarization software;
    wherein said text summarization software that computes similarity measurements in text or between text and text excerpts from said editable text form, generates text relation maps for said similarity measurements that exceed a threshold value, and uses said text relation maps as inputs for (i) a clustering process to identify text themes; (ii) traversing texts selectively using individual text excerpts; and (iii) extracting summary statements; and
    wherein said steps (a) through (e) are performed upon a single-click from a user.

2. The single-action method of claim 1, wherein said text summarization software comprises programs that generate vector space diagrams, weighted terms, linguistic, probabilistic, neural and text cohesion analysis alone or in combinations of two or more to compute similarity measurements in text or between text and text excerpts from said editable text form, generates text relation maps for said similarity measurements that exceed a threshold value, and uses said text relation maps as inputs for (i) a clustering process to identify text themes; (ii) traversing texts selectively using individual text excerpts; and (iii) extracting summary statements; and
    wherein said steps (a) through (e) are performed upon a single-click from a user.

3. The single-action method according to claim 1, wherein key subject matter from said editable text is selected and highlighted by user and converted into said machine readable summary using said text summarization software.

4. The single-action method of claim 1, wherein said text summarization software computes similarity measurements between said text and a user query, generates text relation maps for said similarity measurements that exceed a threshold value, and uses said text relation maps as inputs for (i) a clustering process to identify text themes; (ii) traversing texts selectively using individual text excerpts; and (iii) extracting summary statements.

5. The single-action method of claim 1, wherein said machine readable summary is converted into an format selected from the group comprising Roman, numbered, alphabetical or bullet-point outline.

6. The single-action method of claim 1, wherein double clicking of selected words or phrases in said machine summary of said printed paper text displays the selected words or phrases in their original sentences or paragraphs in said editable text of said printed paper text.

7. The single-action method of claim 1, wherein word volume of said machine readable summary may be compressed to said word volume of 10% to 90% of the default value.

8. The single-action method of claim 1, wherein said summarization software comprises programs that highlight designated subsections of printed paper text and convert said subsections into said machine readable summaries using said text summarization software.

* * * * *

UNITED STATES PATENT AND TRADEMARK OFFICE
CERTIFICATE OF CORRECTION

PATENT NO. : 8,488,916 B2  
APPLICATION NO. : 13/554398  
DATED : July 16, 2013  
INVENTOR(S) : David S. Terman Page 1 of 50

It is certified that error appears in the above-identified patent and that said Letters Patent is hereby corrected as shown below:

Please delete patent 8,488,916 B2 in its entirety and insert patent 8,488,916 B2 in its entirety.
(FIGS. 6-11 have been added)

This certificate supersedes the Certificate of Correction issued December 24, 2013.

Signed and Sealed this
Fourth Day of February, 2014

Michelle K. Lee
*Deputy Director of the United States Patent and Trademark Office*

CERTIFICATE OF CORRECTION (continued)

(12) United States Patent
Terman

(10) Patent No.: US 8,488,916 B2
(45) Date of Patent: Jul. 16, 2013

(54) KNOWLEDGE ACQUISITION NEXUS FOR FACILITATING CONCEPT CAPTURE AND PROMOTING TIME ON TASK

(76) Inventor: David S Terman, Pebble Beach, CA (US)

( * ) Notice: Subject to any disclaimer, the term of this patent is extended or adjusted under 35 U.S.C. 154(b) by 0 days.

(21) Appl. No.: 13/554,398

(22) Filed: Jul. 20, 2012

(65) Prior Publication Data
US 2013/0021346 A1    Jan. 24, 2013

Related U.S. Application Data

(60) Provisional application No. 61/572,853, filed on Jul. 22, 2011.

(51) Int. Cl.
| | |
|---|---|
| G06K 9/22 | (2006.01) |
| G06K 9/00 | (2006.01) |
| G06F 17/27 | (2006.01) |
| G06F 17/00 | (2006.01) |

(52) U.S. Cl.
USPC .............. 382/315; 382/187; 704/9; 715/254

(58) Field of Classification Search
USPC ........................................................... 382/305
See application file for complete search history.

(56) References Cited

U.S. PATENT DOCUMENTS

| | | | | |
|---|---|---|---|---|
| 5,384,703 | A * | 1/1995 | Withgott et al. | 715/236 |
| 5,638,543 | A * | 6/1997 | Pedersen et al. | 704/1 |
| 5,721,939 | A * | 2/1998 | Kaplan | 704/9 |
| 5,778,397 | A * | 7/1998 | Kupiec et al. | 715/243 |
| 6,289,304 | B1 * | 9/2001 | Grefenstette | 704/9 |
| 6,789,228 | B1 * | 9/2004 | Merril et al. | 715/243 |
| 7,322,526 | B1 * | 1/2008 | Koenck | 235/462.45 |
| 7,689,898 | B2 * | 3/2010 | Merril et al. | 715/201 |
| 2006/0029296 | A1 * | 2/2006 | King | 382/313 |
| 2006/0294453 | A1 * | 12/2006 | Hirata | 715/500.1 |
| 2008/0018591 | A1 * | 1/2008 | Pittel et al. | 345/156 |
| 2009/0081630 | A1 * | 3/2009 | Jeffers | 434/362 |
| 2009/0132590 | A1 * | 5/2009 | Huang | 707/104.1 |
| 2009/0227283 | A1 * | 9/2009 | Pylvanainen | 455/556.1 |
| 2011/0123115 | A1 * | 5/2011 | Lee et al. | 382/185 |

* cited by examiner

*Primary Examiner* — David Zarka
(74) *Attorney, Agent, or Firm* — Central Coast Patent

(57) ABSTRACT

Described herein is an interactive digital software program and hardware that enables rapid acquisition of textual or audio subject matter, its conversion to editable text and immediate compression into a user understandable summary. The software program maximizes "time on task" while minimizing the time-consuming steps of "concept capture" and "compression". The instant invention provides an accurate condensate of textual subject matter in a fraction of the time it would take to prepare such a document by manual note taking. In a single step, mobile devices such as cameras, camera phones, tablets, iPODs™, scanners and the like rapidly capture textual images convert them to OCR and to a user understandable summary in a fraction of the time it takes to process such a document by manual note taking. With more study time available for repetitious practice of the lesson, the user improves preparedness and performance on tests and presentations.

8 Claims, 17 Drawing Sheets

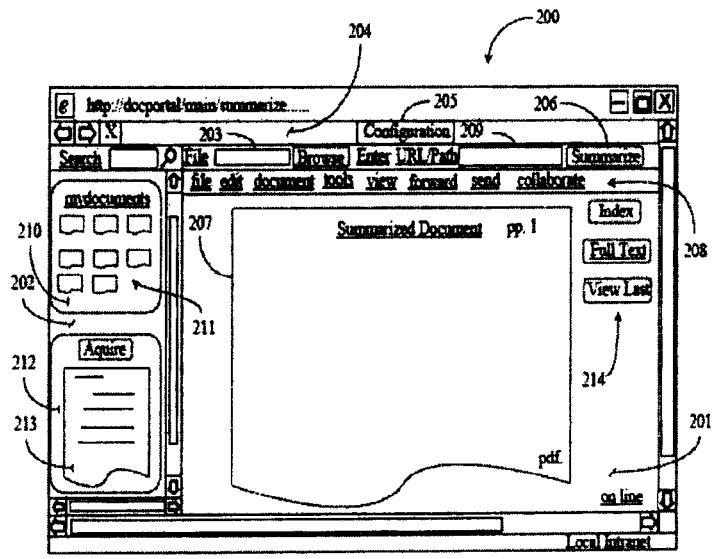

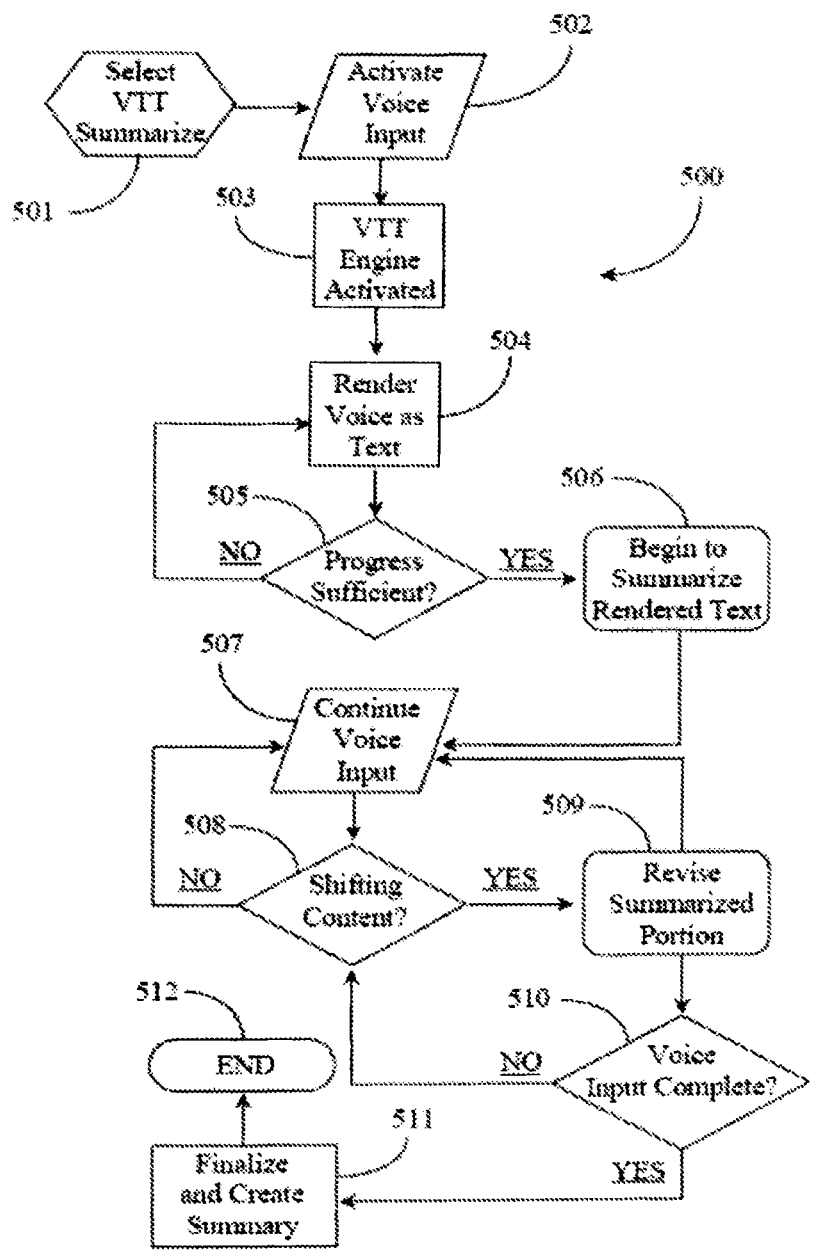

ance, will, or intestate succession. Section 201. A transfer of copyright ownership, other than by operation of law, is not valid, however, unless it is memorialized in a note or memorandum signed by the owner of the rights conveyed or by the owner's duly authorized agent. Section 204. An author may terminate any transfer of copyright ownership, other than that of a work for hire, during the five-year period beginning thirty-five years after the transfer was granted. Section 203.

Ownership of a copyright, or of any of the exclusive rights under a copyright, is distinct from the ownership of any material object that embodies the work. Transferring the ownership of any material object, including the copy or recording in which the work was first fixed, does not of itself convey any rights in the copyrighted work embodied in the object; nor, in the absence of an agreement, does the transfer of copyright ownership or of any exclusive rights under a copyright convey property rights in any material object. Section 202. Thus, the purchase of this textbook neither affects the publisher's copyright nor authorizes the purchaser to make and sell copies of the book. The purchaser may, however, rent, lend, or resell the book.

Infringement and Remedies

Infringement occurs whenever somebody exercises, without authorization, the rights exclusively reserved for the copyright owner. Infringement need *not* be intentional. To prove infringement, the plaintiff need only establish that he owns the copyright and that the defendant violated one or more of the plaintiff's exclusive rights under the copyright. Proof of infringement usually consists of showing that the allegedly infringing work is substantially similar to the copyrighted work and that the alleged infringer had access to the copyrighted work.

To be the subject of a suit for infringement, the copyright must be registered with the Copyright Office, unless the work is a Berne Convention work whose country of origin is not the United States. For an infringement occurring *after* registration, the following remedies are available: (1) injunction; (2) the impoundment and, possibly, destruction of infringing articles; (3) actual damages, plus profits made by the infringer that are additional to those damages, *or* statutory damages of at least $500 but no more than $20,000 ($100,000 if the infringement is willful), according to what the court determines to be just; (4) costs and, in the court's discretion, reasonable attorneys' fees to the prevailing party; and (5) criminal penalties of a fine of up to $10,000 or up to one year's imprisonment for willful infringement for purposes of commercial advantage or private gain. The Piracy and Counterfeiting Amendments Act of 1982 imposes harsher punishments for large scale piracy: a $250,000 fine and five years' imprisonment for those who pirate 1,000 recordings or 65 films within 180 days.

PATENTS

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patents. Section 101 provides:

Whoever invents or discovers any new and useful process, machine, manufacture, or composition of matter, or any new and useful improvement thereof, may obtain a patent therefor, subject to the conditions and requirements of this title.

Thus, naturally occurring substances are not patentable, as the invention must be made or modified by humans. For example,

Figure 6A the discovery of a bacterium with useful properties is *not* patentable, whereas the manufacture of a genetically engineered bacterium is. See *Diamond, Commissioner of Patents and Trademarks v. Chakrabarty.* By the same token, laws of nature, principles, bookkeeping systems, fundamental truths, methods of calculation, and ideas are not patentable. Accordingly, as Chief Justice Burger noted in *Diamond, Commissioner of Patents and Trademarks v. Chakrabarty,* "Einstein could not patent his law that $E = mc^2$, nor could Newton have patented the law of gravity." Similarly, isolated computer programs are not patentable, although, as mentioned above, they may be copyrighted.

To be patentable as a utility patent, the process, machine, manufacture, or composition of matter must meet three criteria:

1. Novelty—The invention must not conflict with a prior pending application or a previously issued patent;

2. Utility—The invention must possess specific and substantial usefulness, which must be affirmatively disclosed by the application; and 3. Nonobviousness—The invention, in light of the prior art, must not be obvious to a person skilled in such prior art.

In addition to utility patents, the Patent Act provides for plant patents and design patents. A plant patent protects a new and distinctive variety of asexually reproducing plant. Plant patents require (1) novelty, (2) distinctiveness, and (3) nonobviousness. A design patent protects a new, original, ornamental design for an article of manufacture. Design patents require (1) novelty, (2) ornamentality, and (3) nonobviousness. As mentioned above, design patents have a duration of fourteen years; plant patents, like utility patents, have a seventeen-year duration.

Procedure

The United States Patent and Trademark Office issues a patent upon the basis of a patent application containing a *specification*, which describes how the invention works, and *claims*, which describe the features that make the invention patentable. The applicant must be the inventor. Before granting a patent, the Patent Office thoroughly examines the prior art and determines whether the submitted invention is nonobvious and has novelty and utility (or distinctiveness or ornamentality, in the case of plant or design patents). An application for a patent is confidential, and the Patent Office will not divulge its contents. This confidentiality ends, however, upon the granting of the patent. Unlike rights under a copyright, no monopoly rights arise until the Patent Office actually issues a patent.

Figure 42-1 Intellectual Property

| | Trade Secrets | Trade Symbols | Copyright | Patents |
|---|---|---|---|---|
| What is protected | information | mark | work of authorship | invention |
| Rights protected | use or sell | use or sell | reproduce, prepare derivative works, distribute, perform, or display | make, use, or sell |
| Duration | until disclosed | until abandoned | usually author's life plus 50 years | 14 years for design patents; 17 years for all others |
| Federally protected | no | yes | yes | yes |
| Requirements for protection | valuable secret | distinctive | original and fixed | novel, useful, and nonobvious |

FIGURE 6B

CHAPTER 42  PROTECTION OF INTELLECTUAL PROPERTY  1025

Therefore, anyone is free to make, use, and sell an invention for which a patent application is filed until the patent has been granted.

An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance *are* defenses to contributory infringement, they are *not* defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

CASES

*Trade Secrets*

B. C. ZIEGLER AND COMPANY v. EHREN

Court of Appeals of Wisconsin, 1987.
141 Wis. 2d 19, 414 N.W. 2d 48.

BROWN, J.

Lawrence P. Ehren appeals from a grant of summary judgment restraining him from using or disclosing information contained on business papers and records he bought from a scrap paper company but which originated with B. C. Ziegler and Company (Ziegler). The circuit court held that the information was entitled to common law trade secret protection and that Ehren did not acquire title to the information as a good faith purchaser. We affirm those rulings.

Ziegler is an underwriter of securities located in West Bend. Ehren is employed by a scrap dealer, Lynn's Waste Paper Co., Inc. (Lynn's), where his duties include determining the value for recycling purposes of scrap paper purchased by Lynn's. From 1981 to 1983, Ehren was a licensed securities salesman and worked for two brokerage firms which compete with Ziegler.

Ziegler considered its customer lists confidential and had developed policies for the disposal of scrap paper which were regularly communicated to its employees. Paper containing a customer name was to be burned or shredded on the Ziegler premises before disposal or was to be delivered for shredding to a commercial shredding concern in Appleton, in which case the employee delivering the paper was to wait while it was shredded. Under no circumstances was scrap paper containing names or information about Ziegler customers to leave the possession of its

..., will, or intestate succession. Section 201. A transfer of copyright ownership, other than by operation of law, is not valid, however, unless it is memorialized in a note or memorandum signed by the owner of the rights conveyed or by the owner's duly authorized agent. Section 204. An author may terminate any transfer of copyright ownership, other than that of a work for hire, during the five-year period beginning thirty-five years after the transfer was granted. Section 203.

Ownership of a copyright, or of any of the exclusive rights under a copyright, is distinct from the ownership of any material object that embodies the work. Transferring the ownership of any material object, including the copy or recording in which the work was first fixed, does not of itself convey any rights in the copyrighted work embodied in the object; nor, in the absence of an agreement, does the transfer of copyright ownership or of any exclusive rights under a copyright convey property rights in any material object. Section 202. Thus, the purchase of this textbook neither affects the publisher's copyright nor authorizes the purchaser to make and sell copies of the book. The purchaser may, however, rent, lend, or resell the book.

Infringement and Remedies

Infringement occurs whenever somebody exercises, without authorization, the rights exclusively reserved for the copyright owner. Infringement need *not* be intentional. To prove infringement, the plaintiff need only establish that he owns the copyright and that the defendant violated one or more of the plaintiff's exclusive rights under the copyright. Proof of infringement usually consists of showing that the allegedly infringing work is substantially similar to the copyrighted work and that the alleged infringer had access to the copyrighted work.

To be the subject of a suit for infringement, the copyright must be registered with the Copyright Office unless the work is a Berne Convention work whose country of origin is not the United States. For an infringement occurring *after* registration, the following remedies are available: (1) injunction; (2) the impoundment and, possibly, destruction of infringing articles; (3) actual damages, plus profits made by the infringer that are additional to those damages, or statutory damages of at least $500 but no more than $20,000 ($100,000 if the infringement is willful), according to what the court determines to be just; (4) costs and, in the court's discretion, reasonable attorneys' fees to the prevailing party; and (5) criminal penalties of a fine of up to $10,000 or up to one year's imprisonment for willful infringement for purposes of commercial advantage or private gain. The Piracy and Counterfeiting Amendments Act of 1982 imposes harsher punishments for large scale piracy: a $250,000 fine and five years' imprisonment for those who pirate 1,000 recordings or 65 films within 180 days.

PATENTS

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however; upon expiration, the invention enters the "public domain," and anyone may use it.

Patentability

The Patent Act specifies those inventions that may be patented as utility patents. Section 101 provides:

Whoever invents or discovers any new and useful process, machine, manufacture, or composition of matter, or any new and useful improvement thereof, may obtain a patent therefor, subject to the conditions and requirements of this title.

Thus, naturally occurring substances are not patentable, as the invention must be made or modified by humans. For example

FIGURE 9A ance, will, or intestate succession. Section 201. A transfer of copyright ownership, other than by operation of law, i- not valid, however, unless it is memorialized in a note or memorandum signed by the owner of the rights conveyed or by the owner's duly authorized agent. Section 204. An author may terminate any transfer of copyright ownership, other than that of a work for hire, during the five-year period beginning thirty-five years after the transfer was granted. Section 203.

Ownership of a copyright, or of any of the exclusive rights under a copyright, is distinct from the ownership of any material object that embodies the work. Transferring the ownership of any material object, including the copy or recording in which the work was first fixed, does not of itself convey any rights in the copyrighted work embodied in the object; nor, in the absence of an agreement, does the transfer of copyright ownership or of any exclusive rights under a copyright convey property rights in any material object. Section 202. Thus, the purchase of this textbook neither affects the publisher's copyright nor authorizes the purchaser to make and sell copies of the book. The purchaser may, however, rent, lend, or resell the book.

Infringement and Remedies

Infringement occurs whenever somebody exercises, without authorization, the rights exclusively reserved for the copyright owner. Infringement need not be intentional. To prove infringement, the plaintiff need only establish that he owns the copyright and that the defendant violated one or more of the plaintiff's exclusive rights under the copyright. Proof of infringement usually consists of showing that the allegedly infringing work is substantially similar to the copyrighted work and that the alleged infringer had access to the copyrighted work.

To be the subject of a suit for infringement, the copyright must be registered with the Copyright Office, unless the work is a Berne Convention work whose country of origin is not the United States. For an infringement occurring *after* registration, the following remedies are available: (1) injunction; (2) the impoundment and, possibly, destruction of infringing articles; (3) actual damages, plus profits made by the infringer that are additional to those damages, or statutory damages of at least $500 but no more than $20,000 ($100,000 if the infringement is willful), according to what the court determines to be just; (4) costs and, in the court's discretion, reasonable attorneys' fees to the prevailing party; and (5) criminal penalties of a fine of up to $10,000 or up to one year's imprisonment for willful infringement for purposes of commercial advantage or private gain. The Piracy and Counterfeiting Amendments Act of 1982 imposes harsher punishments for large scale piracy: a $250,000 fine and five years' imprisonment for those who pirate 1,000 recordings or 65 films within 180 days.

PATENTS

Through a patent, the Federal government grants an inventor a monopolistic right to make, use, or sell on invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patents. Section 101 provides:

Whoever invents or discovers any now and useful
process, manufacture, or composition of matter, or any new and useful improvement thereof, may obtain a putenl therefor. Hubject to
the conditions and requirements of this title.

Thus, naturally occurring substances are not patentable, as the invention must be mudo or modified by humans. For example,

FIGURE 9B

Therefore, anyone is free to make, use, and sell an invention for which a patent application is filed until the patent has been granted.

An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance are defenses to contributory infringement, they are *not* defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

FIGURE 9C

PATENTS

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

FIGURE 10A

KNOWLEDGE ACQUISITION NEXUS FOR FACILITATING CONCEPT CAPTURE AND PROMOTING TIME ON TASK

CROSS REFERENCE TO RELATED DOCUMENTS

The present application claims priority to U.S. provisional patent application Ser. No. 61/572,853 filed on Jul. 22, 2011. U.S. patent application Ser. No. 61/572,853 filed on Jul. 22, 2011 and its references and all references cited in the instant application with their references are incorporated in entirety by reference.

I. BACKGROUND

Most college students in the US and Western Europe use the traditional study method to acquire and learn course material. This method comprises three major steps. First, it consists of identifying, extracting and recording the most relevant subject matter from textbooks, journals and lectures, an exercise known as "concept capture." Second, the key concepts are combined and compressed into a brief condensate. Third, in a process known as "time on task", the condensate is recited repeatedly until rapidly recalled or memorized. Subjects generally use manual or computational note taking for each of the first two steps. Educators assert that the best results from the traditional method are achieved when the largest measure of study time is devoted to step 3, "time on task" rather than step 1, "concept capture." This notion is conceptually rooted in the theory that repeated use or stimulation of information-bearing neural pathways lowers their conduction threshold and facilitates knowledge retention and recall.

In practice, the success of this method has been hampered by the inordinate length of time it takes a student to manually transcribe the key ideas from textual material. Students contend that the manual transcription process is laborious, tedious and interdicts the sustained concentration required to assimilate the subject matter. Importantly, most find that despite long hours of study input the method fails to produce superior test performance. Educators agree that the traditional method is ineffective largely because of the disproportionate amount of study time required in "concept capture" and consequent reduction in the fraction of time devoted to the all important "time on task." They further assert that boredom/frustration with the traditional method is a major cause of student dropout and that conceptually new learning systems are needed.

The claimed method provides a solution this problem. In principle, it rapidly captures textual images from books, journals, manuals and transfers them into a computer or mobile device. It further extracts the key concepts from this material and converts them into an accurate summary. The entire process is accomplished in a single step and a fraction of time it takes to prepare such a document by the manual transcription method. A further advantage of the instant invention is that it reduces the amount of study time spent in "concept capture" and increases that expended in "time on task" or the repeated practice of the summarized material until memorized. As a consequence the claimed method outperforms the traditional method, promoting better command of the subject matter and test performance.

The instant invention uses camera phones, iPODs™, iPADs™, PDAs™, tablets, BlackBerries™, mobile computers and any other mobile device equipped with automated image acquisition software (collectively "image capture devices") to precisely capture textual images. Once framed in the viewfinder, the image capture device automatically stabilizes, focuses (autofocus), rotates, brightens, auto-enhances and deskews/straightens printed lines. Precise and sharp image capture is also facilitated by omnidirectional image sensors in the image capturing device. Next, the image in JPEG, TIFF or binary format is transferred automatically to an OCR program where it is converted to editable text and then to a user understandable summary. The final summary may be practiced repeatedly and memorized in preparation for tests, discussion groups or presentations.

In an additional application the image capturing devices efficiently captures textual images by projecting on the text LED or laser framing brackets with a centered bulls-eye. Once the text is encompassed in the brackets, the image is automatically autofocused and captured as described below.

The claimed invention is rapid, accurate and simple to use and adapted to virtually any subject matter. Summaries can be performed on printed material such as law contracts, book chapters, magazine/newspaper articles, manuals and manuscripts. it is well adapted to the lifestyle of students, business people, lawyers, doctors and other professionals with a limited amount of time to capture and digest the key concepts from a large volume of printed material.

The claimed invention is based on the teachings of framed educational psychologist David Ausubel who held that effective learning occurs when the most significant ideas of a subject are presented first and then expanded progressively by adding related concepts and details.

According to Ausubel, instructional materials should attempt to integrate new material with previously presented information through comparisons and cross-referencing of the new and old ideas (Ausubel D P *The Psychology of Meaningful Verbal Learning*. Orlando, Fla.: Grune & Stratton, 1963; Ausubel, D P In defense of advance organizers: A reply to the critics. *Review of Educational Research* 48:251-257 (1978); Ausubel D P *The Acquisition and Retention of Knowledge* Dordrecht, The Netherlands: Kluwer Academic Publishers, 2000).

The claimed invention applies Ausubel's learning principles by first producing an accurate summary of the subject matter which then functions as a knowledge tree with branches designed to accommodate related material.

The instant invention is especially useful for subjects with reading comprehension disorders the most common of which is failure of "significance detection" in which the subject cannot distinguish key points from less important information or prioritize data with different levels of detail. "Concept recognition dysfunction" is a subset of "significance detection" in which subjects have difficulty recognizing familiar themes in subject matter with only superficial differences. Struggles with these disorders usually surface in high volume college courses such as biology, political science, economics and psychology. The claimed invention is useful in this group because it rapidly identifies, extracts, consolidates and condenses the key concepts in textual subject matter into a machine summary. Frequent drill with this method enhances subjects' ability to recognize the most significant concepts in textual subject matter.

The claimed invention is also useful for short-term memory dysfunction. These subjects absorb information at a slow pace and are unable to keep up with the rapid rate of information in-flow in a classroom lecture. Similarly, subjects with short attention span cannot concentrate long enough to get work done before fatigue sets in. In a related malady, subjects with active working memory dysfunction actually lose track of what they are doing while they are doing it. They have to work fast lest they forget what they are doing.

The claimed method is useful in these disorders because it rapidly captures and summarizes key concepts thereby allowing these subject to concentrate their limited "brain fuel" in repetitive practice of the subject matter. The audio summarizer of the claimed invention described herein is useful for this group because it eliminates note taking during a lecture. The audio summarizer acquires the lecture audio input, converts it from voice to editable text and summarizes the lecture content in real-time as the lecture proceeds. It also provides a printed summary of the entire lecture that can be readily accessed from the summary by clicking on its highlighted key words/phrases. In this way, slow note takers and those with short attention spans can access all the relevant subject matter at their own pace without being overwhelmed by the rapid rate of information input.

The claimed invention's major advantage over the traditional method is streamlining and accelerating the "concept capture" phase thereby allowing more "time on task" and improved mastery of the subject matter. With a single click, the claimed invention captures and autofocuses the textual image, converts it to OCR and summarizes the key concepts with the same alacrity as a barcode scanner that recognizes/decodes barcodes at the point of sale. No other program in the art consolidates these tools into a "simple to use" process that increases learning efficiency and promotes mastery/practical usage of textual subject matter.

II. BRIEF DESCRIPTION OF THE DRAWING FIGURES

FIG. 1 is an architectural overview of a network environment practicing document summarization according to an embodiment of the present invention.

FIG. 2 is an exemplary screen shot of a browser window illustrating a summarization user interface according to an embodiment of the present invention.

FIG. 3 is a process flow chart illustrating acts for summarizing a document according to embodiments of the present invention.

FIG. 4 is an exemplary screen shot of the user interface of FIG. 2 illustrating a voice to text summarization feature according to an embodiment of the present invention.

FIG. 5 is a process flow chart illustrating acts for summarizing voice to text in near real time according to an embodiment of the present invention.

FIGS. 6A, 6B and 6C. Displayed are jpeg images captured from 3 sequential pages of a contract law textbook (6A, 6B, 6C) using a 5 megapixel back camera of the iPAD3™ with desktop lighting and default camera settings.

FIG. 7. Displayed is original Text with curved surface in suboptimal desktop lighting acquired with Canon IXY Digital 800IS 6 megapixel camera using settings described in the text.

FIGS. 8A and 8B. Digital image (JPEG) of two text book pages (FIGS. 8A and 8B) captured with a digital FCCE™ 3.2 megapixel ultra compact digital camera suitable for OCR and machine summarization.

FIGS. 9A, 9B and 9C. Displayed is raw text acquired with a DS6700-DC2001zzr handheld digital image scanner (9A and 9B). In 9C, raw text acquired with DS6700-DC2001 zzr handheld digital image scanner in which form the text is transferred to OCR software where it is converted to editable text FIGS. 10A and 10B. Shown is a textual image captured with DS6700-DC2001zzr handheld digital image scanner. In this form, the text is transferred to ABBYY 9.0 fine reader where it is converted to a pdf file. From there it is transferred to an Idautomation pdfd417 font and encoder wherein it is converted to a pdf417 2D barcode.

FIG. 11. Shown is a pdf417 2D barcode of textual image.

III. SUMMARY OF THE INVENTION

Described herein is an interactive program that enables rapid capture and processing of textual or audio subject matter, extraction of key concepts and conversion to a user understandable summary. The claimed invention uses mobile imaging devices such as cameras, camera phones, tablets, iPODs™, scanners equipped with omnidirectional aim and shoot framing features that automatically focus, stabilize and capture textual images. With a single click, the textual image is processed through OCR and to a user understandable summary. The entire process is completed in a fraction of the time it takes to prepare such a document by the traditional manual note taking method. By virtually minimizing the time-consuming "concept capture" phase the claimed invention maximizes the all important "time on task" function (repeated practice of the subject matter) critical for efficient learning and superior test performance.

IV. DETAILED DESCRIPTION

A. Capture of Textual Material

The claimed method contemplates textual image capture and processing with the same alacrity/efficiency as a bar scanner used to scan and decode barcodes on commercial products at point of sale. In this context, the instant invention efficiently identifies and automatically focuses and sharpens textual image within the monitor screens of camera phones, iPODs™, iPADs™, tablets, Blackberrys™ or other such devices referred to collectively herein as "image capture devices." These devices are equipped with a high resolution digital cameras up to 8 megapixels with most between 3 and 5 megapixels. Tablets with a range of 0.7 to 30 megapixels are useful in this invention. The image need only to be framed within the boundaries of the screen in order to obtain a sharp, focused image of textual material.

Monitor displays in smart phones range from 4.5-5.2 inches and tablets come in 9-10 inch and 7-9 inch screens which makes it easy for the user to identify and frame textual images devoid of training and the hassle/frustration of focusing/centering the object in the small digital camera screens. Tablets with screens ranging from 4 to 25 inches are useful in this invention. Additionally, because the camera in the mobile imaging device contains autofocus, image stabilizing and rotation functions, the user does not have to precisely center or focus the image in the monitor screen in order to obtain a crisp and sharp image. Once the image is positioned within the monitor screen borders the image is captured automatically or the user can click the image capture button or tap the device to lock the focus/exposure. Once captured, the image is further processed to OCR and a user understandable summary as described below.

For most printed documents the distance of the image capture device above the document is two to nine inches depending on the dimensions of the image. For small images, the imaging device is held closer to the documents while for larger images it is held farther from the document. The instant method is particularly adapted to smart phones and tablets because the large viewfinders in these devices allow the user to rapidly identify and frame the image with a minimum of fine tuning manual adjustments. In this fashion, tens of pages of printed images or textual images can be rapidly imaged, focused, sharpened, rotated, deskewed, captured and processed for machine summarization.

To facilitate rapid and accurate image capture, the "mobile imaging devices" are equipped with an automated image finder that projects an image of the textual material in the monitor. Once the entire image is framed within the boundaries of the viewing monitor, the image is captured automatically. This integrated image finder captures small images as well as large legal size documents. The mobile imaging devices can optionally capture between 2 and 35 images of the same textual material which are merged to produce the single sharpest and most accurate image. The devices detect and straighten any curvature and distortion of text content enabling even the areas near the binding to emerge clearly for accurate OCR processing. Mobile imaging devices contain optical image stabilization to reduce motion sensitivity, autofocus and unidirectional imaging which capture and straighten text presented at acute angles. These devices are also equipped with an integrated illumination system, multiple lighting modes and an integrated diffuser that facilitates capture of images in poor lighting without a flash.

In contrast digital point and shoot and SLR cameras require the user to manually identify, frame and focus the textual smart phones allow selection of ISO or Macro which should be used as needed depending on the ambient light and the size of the object. In other instances, add-on lenses such as Photojojo™ or Olloclip™ can be attached to the outer lens to improve close-up quality and resolution of the textual images.

Once the image is captured it is then processed seamlessly through OCR and text summarization programs resulting in a user understandable summary of the text in the captured images. The claimed method is the only one that consolidates such diversified software and hardware into a single program that with a single click of the camera provides a functional summary of the textual images (Example 1).

An excellent image capturing device is the Samsung 10.1 Galaxy Tablet™ or iPAD3™. These devices contains a 5 megapixel rear camera equipped with image recognition and autofocusing functions. The textual image is rapidly framed in the monitor screen by placing the device over the text. The camera automatically centers, focuses, sharpens and deskews the image in the monitor screen. The image is then transferred automatically to OCR where it is readily converted to editable text and then to a user understandable summary. The specifications and configuration of representative tablets useful in this invention are shown below in Table 1.

TABLE 1

| Representative models | OS | Network | Display | Processor | Memory | Front Camera | Rear Camera | Wi-Fi | Bluetooth |
|---|---|---|---|---|---|---|---|---|---|
| Galaxy Tab 10.1V | Android 3.0 Honeycomb | HSPA + 21 Mbit/s 850/900/1900/2100 EDGE/GPRS 850/900/1800/1900 | 1280 × 800 TFT | 1 GHz Dual-Core Nvidia Tegra 2 | 1 GB DDR2 | Yes 2 MPx | Yes 8 MPx | Yes Dual Antenna 802.11 (a/b/g/n) | Yes 2.1 + EDR |
| Galaxy Tab 10.1 | Android 3.1 Honeycomb | HSPA + 21 Mbit/s 850/900/1900/2100 EDGE/GPRS 850/900/1800/1900 | 1280 × 800 TFT | 1 GHz Dual-Core Nvidia Tegra 2 | 1 GB DDR2 | Yes 2 MPx | Yes 3 MPx | Yes Dual Antenna 802.11 (a/b/g/n) | Yes 2.1 + EDR |
| Galaxy Tab 8.9 | Android 3.1 Honeycomb | HSPA + 21 Mbit/s 850/900/1900/2100 EDGE/GPRS 850/900/1800/1900 | 1280 × 800 PLS | 1 GHz Dual-Core Nvidia Tegra 2 | 1 GB DDR2 | Yes 2 MPx | Yes 3 MPx | Yes 802.11 (a/b/g/n) | Yes 3.0 | image within the borders of their small monitors. This task is time consuming. It calls for concentration and a steady hand to optimally identify, frame and focus the image. Optical scanning devices require separate hardware through which pages must be fed and scanned. Images in bulky books and journals cannot be processed unless they are precopied. In the latter two cases, the process is time consuming, requires training and cannot be conveniently carried out in an "out of office" environment such as a lunchroom or café.

In another embodiment, "mobile imaging devices" are equipped with an automated image finder that projects an image framing grid and a bulls-eye centering pattern on textual material. With gentle circular and up and down movement of the device, the image is centered in the bulls eye, framed within the brackets of the grid and then captured automatically by omnidirectional sensor without using the camera monitor screen. This device contains all of the elements described above including automated image finder, page curvature and deskewing distortion, optical image stabilization, unidirectional imaging to capture images viewed at acute angles, integrated illumination, multiple lighting modes and integrated light diffuser.

Most smart phones can be used with default camera settings. With cameras less than 5 megapixels, shooting at low compression and 100 ISO eliminates graininess. Some smart phone have digital zoom and image cropping features that can be used to tightly frame the text. The setting menus of some Another image capturing device useful in the claimed method is partially exemplified in the Motorola ds6707™ digital image scanner under the control of 123Software™. For use in the claimed application, this software or its likeness is integrated into a camera phone, iPOD™, or tablet and other such mobile imaging device with a camera of 1.3-25 megapixels and additional specifications described above. Preferred configuration settings for 123Software are provided below.

TABLE 2

| Imaging Configuration for 123Software | |
|---|---|
| Trigger Mode | Autoaim |
| Low light Enhancement | Yes |
| Presentation Mode Field of View | Full |
| Image Capture Autoexposure | Yes |
| Illumination Bank Control | Full |
| Fixed Exposure | 100 |
| Image Size (pixels) | Full |
| Image Enhancement | High |
| Image File Format Selection | JPEG, TIFF, BMP |
| JPEG Image Optimization | |
| JPEG Image Options | JPEG Quality or Quantity Detector |
| JPEG Quality and Size Value | 100 |
| JPEG Target File Size | 600 |
| Snapshot Mode | yes |
| Gain Exposure Priority | Autodetect |
| Snapshot Mode Timeout | 30 sec |

TABLE 2-continued

| Imaging Configuration for 123Software | |
|---|---|
| Snapshot Aiming Pattern | On |
| Image Cropping | On |
| Top Pixel Address | 0 |
| Left Pixel Address | 0 |
| Bottom Pixel Address | 1023 |
| Right Pixel Address | 1279 |

Cameras embedded in "mobile imaging devices" are useful in this invention. Because a text image can be conveniently recognized and framed in their screens, tablets equipped with digital cameras or scanners and 4-10 inch monitor screens are especially useful in this invention. In this context, the text page is imaged in the monitor screen and automatically stabilized, focused and sharpened without manual adjustment by the user. The image is then captured by pressing the capture button or tapping the monitor screen. The captured image may be focused (autofocused), sharpened and brightened before or after capture. Thereupon, the software automatically launches an OCR program which converts the image to editable text which is then summarized by the machine summarizer software. The final product is a user understandable summary of the captured textual material. The entire multi-step process is seamlessly accomplished with a single click or tap of the image capturing device.

The present invention contemplates that the digital camera in "mobile imaging devices" such as the camera phone, smart phone, iPOD™ or tablet uses the following preferred configurations. "Auto" mode uses (i) Image stabilization (ISO) at the highest setting in continuous mode (ii) "Large" recording pixels (2816×2112), (iii) Macro mode to magnify and clarify images within 6-36 inches of the camera (iv) "Superfine" compression mode for high quality images (v) Evaluative Metering mode in which the camera divides the image into several zones, gauges complex lighting conditions and adjusts the settings to the correct exposure (vi) Auto rotate mode which is a sensor that detects the orientation of an image and automatically rotates it to the correct orientation in the monitor screen. In Auto and Evaluative Metering modes, the camera makes automatic adjustments for the lighting conditions making it possible to photograph text even in poor lighting conditions. In Macro and Autorotate modes the page image is focused sharply in the monitor screen with the camera held 6-36 inches above the printed page. ISO mode minimizes and eliminates blurry images from small inadvertent movements of the operator. Thus the camera has multiple built in automatic features and a broad range of error that make it easy for the user to capture page images on curved surfaces that can be readily recognized by the OCR program.

Conventional point and shoot digital cameras independent of mobile devices described above are also useful with the same preferred megapixel range and settings defined in the above paragraph. The image is manually focused on the center of a page and the document image is tightly framed in the monitor screen. Natural light is preferred with the flash disabled (in most point-and-shoot digital cameras, the flash is on auto mode by default). In poor lighting the flash may be used from 20 inches away but should be avoided with glossy paper. The camera may be postioned approximately 14-18 inches from center of the text and one textbook page (10"×7" each) should be photographed at a time. If the camera has manual white balance, a white sheet of paper may used to set white balance. Otherwise, the appropriate balance mode for lighting conditions is selected. The anti-shake or image stabilization setting is enabled, but if absent a tripod or any other steadying device may be employed. In poor lighting conditions autofocus may function incorrectly in which case manual focus is used with the maximum aperture allowed by the camera (2.3 or 4.5). In bright daylight, smaller apertures will produce sharper images. If the camera gives you more than one choice of ISO speed, the highest ISO setting is selected. For camera phones, iPODs™ and tablets, these camera settings may be fixed as default for textual image camera function in the claimed method.

Canon IXY Digital 800 IS (6 megapixels) with image stabilization, 4× zoom, autofocusing, autorotate, evaluative metering and macro modes satisfies most of the above criteria for rapid acquisition of printed images but nearly all digital cameras with at least 1.9 megapixels are useful. Cameras with a range of 3-12 megapixels are preferred. The Canon IXY Digital 800 IS™ (6 megapixels) with image stabilization is a good example for this purpose. The printed material is positioned on a flat surface and the camera is placed 15-36 inches above and parallel to it. The image is focused in the camera's 2.5 cm monitor screen when it is placed in a range of 12-50 inches above the printed page. The page to be imaged is encased tightly within the perimeter of the monitor screen; the camera can be turned 90 degrees horizontally for this purpose. The entire page image may be reduced to 50% of the monitor screen areas and still maintain sharp focus. If parts of the printed surface are curved and the printed lines are slanted, the camera can be raised several inches which will reduce the image size but also will also partially straighten out any curved lines.

In the claimed method, printed images captured by the mobile imaging devices are automatically converted to JPEG or TIFF files and rotated to the vertical position (reading position). Here the image is automatically sharpened, brightened, deskewed, cropped and text lines are straightened. In addition, ABBYY FINE READER Professional 9.0-10 edition™ OCR programs automatically straightens and deskews lines and adjusts resolution of the captured images prior to processing. In the claimed invention, these steps are carried out automatically without user prompting.

In the next automated step, the image is processed through an OCR program, converted to editable text and summarized optionally converted in outline format (Examples 1-4). The preferred OCR programs for this purpose is NUANCE OMNIPAGE™ or ABBYY FINE READER™ 9.0 and 10.0 editions and the preferred summarization program is Megaputer TextAnalyst™ or PolyAnalyst™. In the claimed method, the entire operation from image capture to machine summarization is carried out automatically and seamlessly starting with the step of placing the mobile imaging device over the textual subject matter.

The machine summarization is carried out by several types of text summarization programs of which Megaputer TextAnalyst™ or PolyAnalyst™ is preferred. The text of a single or a multiple page document can be summarized individually or sequentially. The program can automatically summarize individual subsections of the textual material containing relatively homogeneous subject matter. This is accomplished by highlighting the text to be summarized. Several such separate summaries may be obtained in this fashion to be used individually or all subsection summaries can be further summarized as a whole.

Once the mobile imaging device completes the entire process, the machine summary appears in the monitor screen of the device. The summary can be transferred to the top of the original document or transferred to a separate page. The summary can also highlight the key words in the summary which when clicked by the mouse allows the user to instantly access the site in the original text where the term or phrase was originally used. In the fashion, the user can obtain further clarification of the term or phrase from the preceding or succeeding sentences in the original text. The clarifying sentence or phrase can then be immediately copied and placed in the summary or margin next to the highlighted key word. Alternatively, the user can identify the relevant material in the original text and using a microphone connected to Voice to Text technology such as the Nuance PDF-8 Professional™ recite the relevant material and place it in the summary adjacent to the relevant subject matter.

The summary is also be saved or transferred to other devices such as a personal computer, eReader, or any mobile device (e.g., iPhone™, iPOD™, tablets etc.) using a USB cord (or other connecting wire), memory card or wireless technology. For this purpose, Wi-Fi adapters are useful in the present invention making it possible to transfer the text via 802.11 wireless networks to a PC eliminating the need to physically connect the camera or a memory card to a computer. Bluetooth™ or Nikon WT-1™ technology enables the user to access a personal computer in coffee shops, airports, and businesses that have "hotspot" capability. Removable memory card devices that are removed from the device and transferred to a card reader connected to a computer are also useful. Bluetooth™ wireless connectivity allows the user to "send" printed material to another Bluetooth™-enabled device wirelessly such as a computer, camera phone, iPOD™, tablet, reader or a PDA. Infrared (IR) transfer IR image transfer works similarly to Bluetooth™, but are not as fast. Both devices require an IR transceiver to move the printed matter. Images of the textual material and/or summaries can also be sent via email to a computer for further processing. Multimedia Messaging Service (MMS)™ is an extension of the text-only Short Messaging Service (SMS)™ that allows one to send matter from a camera phone to a computer.

Scanners

Acquisition of textual images for OCR and summarization can also effected with an optical scanner which may be fixed or hand held. For actual scanning, the printed material from books or journals can be captured by manually dragging the scanner over the page or by feeding the document into the scanner or placing it over the plate of flat bed scanner. Alternatively, multiple pages may be placed in an automated page feeding device for automatic sequential scanning. Individual pages from books and journals can be scanned by removing binding of the publication and placing free pages in the automated paper feed device. Pages from a bound book or journal may also be first copied with a conventional copier and loaded into the automatic paper feed scanner for sequential scanning.

Most commercial personal scanners or "all in one" scanners, copiers and/or fax machines capable of scanning standard textbook and letter size documents are useful in the present invention. Scanning devices should be capable of processing at least 5-30 documents/min in automatic or manual mode at 90 to at least 1200 dpi. Scanners with automatic paper feed attachments are preferred. In manual mode, the scanner should have previewing feature, which allows the user to select and bracket the printed material to be scanned. Portable scanners are useful for scanning journal articles or reference textbooks in a library or museum. The images acquired by the scanner may be transferred to a computer at a later point via USB port, wireless, infrared, floppy disc or CD. The stored memory of the scanned library material is readily formatted into the word-processing program of a PC or notebook with the aid of the OCR software programs mentioned above. Most commercially available scanners are useful. Particularly preferred for the present system are scanners in the EPSON™ Perfection Series with automatic paper feed but nearly all other commercial desktop or business scanners are useful in this invention.

A particularly preferred scanner is the bendable sheet image scanner. It is 2-5 mm thick and has the unique advantage of conforming to the bent page of a book or document when placed over it. While still in development at this time, the bendable scanner consists of organic transistors as electronic switches and organic diodes as photo detectors, both manufactured on plastic films without optics or mechanical components. Employing this new principle, the bendable scanner can capture images in the reflection geometry. These multilayered structures consist of soft materials except electrodes and, as a consequence, the whole device is mechanically flexible, lightweight, thin and portable.

Capture of Textual Material from CDs, eBooks in WORD, pdf or JPEG/TIFF Files

The present invention contemplates acquiring text from CDs, eBooks, the Internet or other storage vehicles containing the content of textbooks, journals or other printed material in WORD, pdf or JPEG/TIFF binary format. The claimed method processes this material through an OCR program to editable text and converts it to a functional summary of the key concepts in the identical fashion described above for mobile imaging devices and scanners using the Nuance OMNIPAGE™, PDF-8™ or ABBYY FINE READER™ 10 professional™ OCR programs and Megaputer TextAnalysist™ or Polyanalyst™. In some instances, the textual material may be in a format such as WORD or pdf that is transferred directly and converted to a summary by the summarizer program without requiring the intermediary OCR processing. Textual material in JPEG or TIFF format, however, does require OCR processing to editable TEXT or WORD before transfer to the summarizer program at this point in time but can be transferred directly to the summarizer programs when they are capable of processing JPEG and TIFF images.

Software Programs and User Interactions

The software program has several major features which include acquisition of printed matter, digital images and audio input. Digital images in JPEG or PDF format are converted via OCR to editable text in WORD or TEXT format in normal formatting The editable text is machine summarized and converted into a Roman, numbered or bullet-point format. Using a split screen to compare the outline with the original text, the user can add or subtract material from the outline to achieve the desired content density. The user can also query the outline with relevant questions whose answers broadly cover the subject matter. The outline can then be printed or transferred elsewhere for repetition and memorization.

OCR Software

The OCR software converts printed matter from a scanner, camera, camera phone or mobile device into editable text with semantic accuracy >95%. The preferred program is the Fine Reader Professional™ 10.0 edition in which the jpeg images from the digital camera are transferred directly to this program. In a single step, this program focuses the image, straightens the text lines and converts it to editable text. The specifications for this program are listed below.

System Requirements

PC with 1 GHz or higher.

Operating System Microsoft® Windows® 7, Microsoft Windows Vista®, Microsoft Windows Server 2003, Microsoft Windows Server 2008, Microsoft Windows XP.

To work with localized interfaces, corresponding language support is required.

Memory: 512 MB available RAM. In a multiprocessor system, an additional 256 MB of RAM is required for each additional processor core.

Hard disk space: 650 MB for typical program installation and 650 MB for program operation.

TWAIN- or WIA-compatible scanner, digital camera or fax-modem (optional).

Video card and monitor (1024×768 or higher).

Keyboard, mouse or other pointing device.

File Input Formats

| Format | Description |
|---|---|
| BMP | black and white, gray, colour |
| PCX, DCX | black and white, gray, colour |
| JPEG, JPEG 2000 | gray, color |
| JBIG2 | black and white |
| PNG | black and white, gray, colour |
| TIFF | black and white, gray, color (RGB, CMYK), multi-image. |
| PDF | any type of PDF |
| XPS | Microsoft .NET Framework 3.0 is required |
| DjVu | file format for storing compressed scanned images |
| GIF | popular image format for Web publishing |
| WDP | Windows Media Photo format. WIC or Microsoft .NET Framework 3.0 required |

Document Saving Formats

| Format | Description |
|---|---|
| DOC | Microsoft Word 97-2003 Document |
| DOCX | Microsoft Word 2007-2010 Document |
| XLS | Microsoft Excel 97-2003 Worksheet |
| XLSX | Microsoft Excel 2007-2010 Workbook |
| PPTX | Microsoft PowerPoint 2007-2010 Presentation |
| RTF | Rich Text Format |
| PDF, PDF/A | text and pictures only, page image only, text over the page image, text under the page image |
| HTML | |
| CSV | |
| TXT | |

Image Saving Formats

| Format | Description |
|---|---|
| BMP | black and white, gray, colour |
| TIFF | black and white, gray, colour (RGB, CMYK), multi-image |
| PCX, DCX | black and white, gray, colour |
| JPEG, JPEG 2000 | gray, colour |
| JBIG2 | black and white |
| PNG | black and white, gray, colour |

Barcode Types Recognized

| | |
|---|---|
| Code 3 of 9 | Check Interleaved 2 of 5 |
| Check Code 3 of 9 | Matrix 2 of 5 |
| Code 3 of 9 without asterisk | Popstnet |
| Codabar | Industrial 2 of 5 |
| Code 93 | UCC-128 |
| Code 128 | UPC-A |
| EAN 8 | UPC-E |
| EAN 13 | PDF417 |
| IATA 2 of 5 | Aztec Code |
| Interleaved 2 of 5 | Data Matrix |

Supported Equipment

Supported Scanners and MFPs

ABBYY FineReader™ supports TWAIN- or WIA-compatible scanners, multi-function peripherals (MFPs) and all-in-one devices.

A list of tested equipment.

Supported Digital and Mobile Phone Cameras

ABBYY FineReader™ can recognize TIFF and JPEG files created by any digital camera.

Minimum Requirements 2-megapixel sensor with variable focus lens

Recommended Requirements 5-megapixel sensor

Optical zoom

Flash disable feature

Manual focusing

Manual aperture control or aperture priority mode

An anti-shake system or a tripod

In older versions such as the Fine Reader 8.0 Professional™, the JPEG or TIFF image taken by a camera or camera phone is first downloaded via USB or wireless device and software into a file on a computer, or mobile imaging device. This file may be accessed and opened by the OCR program. The image is then manually cropped and sharpened and text lines straightened by clicking and selecting each function in the "Image" menu on the toolbar. The image is then read by clicking the "Read Image" icon. The read image is then manually transferred to a WORD or pdf file by clicking the appropriate "Transfer" function. The final product appears as editable text in the selected format. The final text format can appear as a reproduction of the original text or all formatting can be omitted by selecting the preferred format in the Tools options menu. "Omit all Formatting" function in the OCR program is preferred for machine summarization. If the English text contains Greek symbols (as with medical genetics documents), the user can select dual Greek and English as the recognition languages in the OCR program.

Textual material may also be scanned by a flat bed optical scanner by simply opening the Fine Reader™ 8.0 or 9.0 programs and clicking "Scan and Read" icons. The textual material (single or multiple pages) is scanned and converted to editable text in the desired format by the OCR program.

In the multistep operation JPEG images from cameras, camera phones, iPODs, tablets and the like are saved to a file in the computer. The OCR program is then opened to the "Find and Open" function in which the file containing the desired jpeg is identified and opened. The images appear in the OCR program and may be cropped, despeckled, inverted and text lines straightened to improve recognition by the OCR program.

A. Straighten lines

B. Despeckle image

C. Invert image

D. Crop image

The user then clicks the "Read and Transfer to Word" icon wherein the editable text that recognized by a machine summarizer program as described below. Most commercially available OCR programs such as OMNIPAGE™, TEXTREADER™ and FINEREADER™ are acceptable. However, the FINE READER™ 8.0-10.0 Professional Editions™ are preferred. The acquisition of printed matter (pdf) and digital images in JPEG or TIFF format and conversion by OCR to editable text can be accomplished in a single step with a single click of software menu titled "Acquire and Convert to Editable Text".

Likewise audio input is converted to printed text or PDF by voice recognition technology prior to use of the OCR program to convert it to editable text. The voice recognition and conversion by OCR to editable text can be accomplished in one step by selecting the "Acquire and Covert to Editable Text" function.

Summarizer Software

The claimed method uses summarizer technology to summarize the documents captured with the image capture devices and converted to editable text with an OCR program. The summarizer principles of operation are provided below. The summarizer provides a condensate of the key concepts from any printed Material regardless of length or complexity. The user can compress or condense the summary document to varying degrees determined as a percent of the total word volume of the original material. The user can also use summaries at various degrees of compression to determine the volume and depth of meaning in the original document. A summary with a compression of 30% would be expected to include more relevant concepts than one with a compression of 10% (See Example 1).

In practice, the pages to be summarized are placed sequentially in editable WORD, TEXT or PDF format. With a single click the summarizer summarizes the entire document. The summary appears promptly in a box on the same page. For custom summarization of individual paragraphs or subsections at disparate places in a document, the user simply highlights the text of interest at each site. These selections are pooled in order of appearance in the text and all the selections are summarized as a whole. Each subsection can also be summarized by itself in which case the summaries may be optionally summarized collectively.

The key words in the summary identified by the summarizer are routinely highlighted in red. The user can obtain detailed clarification of the meaning of a highlighted word or phrase in the summary by simply double clicking on the word or phrase. This immediately identifies the place(s) in the unsummarized document where the word or phrase appears enabling the reader to clarify the context in which the word/phrase was used originally by simply reading the adjacent sentences. These clarifications from the original text are highlighted, cut and pasted directly into the summary. These same clarifications can also be voice dictated into the summary using voice to text technology available in the present Nuance PDF-8 Professional™.

The summarized word/phrases can be collected as a single document by itself or the key summarized material can be highlighted directly in the original text. The finished summary can then be converted by the user into any outline format (e.g., Roman, bullet points, stars, asterisk etc.) using existing tools in the WORD program.

Summarizer Intervals

Machine summarizers are most effective when summarizing a homogeneous body of information. Authors of journal articles and textbook chapters commonly divide subject matter into sub-sections comprising a body of related concepts that make one or more key points. The user therefore first selects the summarizer intervals from a menu comprising:

A. Summarize entire document

B. Summarize from each emboldened or highlighted subsection of text and eliminate tables and graphs C. Summarize summaries of all major subsections The program can also recognize markers created by the user in the text that denote the preferred textual sections that should be summarized individually. The program collates these individual subsection summaries into the final output summary and also provides for summarization of this summary.

Concept Density

The user must determine the concept density of the summary. For general overview of the text, a 10% compression of the subject matter will suffice. For more rigorous review, the user may prefer a more concept dense summary. Therefore, he is given a range of concept densities from 10% to 95% from which to choose. The summary density menu can be accessed at any point in the process should the user wish to compare a detailed with a more general summary of the subject matter.

Format

The user can choose the format of the final summary from menu options that include paragraph or sentence form, bullet points of each sentence or Roman outline with subheadings. Hybrid documents consisting of paragraphs, bullet points and Roman outlined material can also be prepared by the user. To confirm the effectiveness of extraction, the user can also view the entire document with the key phrases highlighted or emboldened. Likewise, the non-highlighted text can be deleted while the remaining highlighted phrases and sentences are pooled into a paragraph, bullet points or Roman outline.

Split Screen

Split screen displaying the original and machine summarized text is employed to allow the user to add relevant points from the original text to the machine summary. The key points in the original text are highlighted for ease of recognition and relevant sentences or words are dragged from the original document to the summary.

Summarizing the Final Summary(s)

The present invention envisions that effective learning involves progressive condensation of the subject matter to a final group of notes that can be readily reviewed before a presentation or examination. Thus, the claimed subject matter includes the option of a further summary of the final summary itself to provide a set of condensed notes for rapid review.

Disposition of the Final Summary

The present invention envisions that the entire operation from image capture through OCR and text summarization can be carried out completely in a mobile imaging device. Alternatively, the captured image may be transferred via USB connection or e-mail or wirelessly via Bluetooth™ or WiFi™ to a PC where it is further processed through OCR to a machine summary. The final summary can be printed or distributed to any other digital device such as eReaders of mobile devices via USB, wireless or e-mail.

Real-Time Summarization of Audio

It is estimated that using the traditional note taking method most high school and college students extract less than 30% of the key concepts from a classroom lecture. The act of comprehending an audio concept while transcribing an earlier one is extremely difficult and beyond the capability of most students. Most emerge from a lecture sensing that they may have missed or failed to understand more than 80% of the content. The present invention provides an solution to this problem. It envisions the use of summarization technology to summarize the content of an audio lecture in real-time and provide a summary as the lecture on a digital screen as the lecture is proceeding and a final summary at the end of the lecture. For this purpose, a parabolic or any other sensitive microphone or wireless transmitter is used to transfer the speech of the lecturer to the screen or monitor of a computer or mobile device equipped with voice to text software of which Nuance Dragon™, Via Voice™, Naturally Speaking™ are excellent examples. The verbal input of the speaker is rapidly converted from speech to text using any of the commercially available speech recognition software such as Dragon, Via Voice, Naturally Speaking etc. OCR programs in the computer convert the printed matter to editable text. A machine summarizer program operating in the device continuously summarizes the content of the editable text and projects the summarized/editable material on the screen of the computer or mobile device as the lecture is proceeding. The summarizer continuously updates/revises the summary as it receives new information from the speaker. The user can stop and restart a new summary as the speaker signals a change to new subject matter. In this way, the user can listen to a lecture and at the same time visibly review the speaker's key ideas in real time on his computer screen. At the end of the lecture, the user can access the original text of the lecture to clarify/expand/edit the machine summary for accuracy, clarity and depth. To accomplish this, the key word/phrases of the lecture summary are highlighted so that when clicked by the mouse the user immediately accesses the place in the complete lecture text from which the key word originated. Such complete text of the lecture is provided on the same screen as the summary as a separate box. The real-time system has the following major advantages. It eliminates note taking during a lecture enabling the user to concentrate on understanding the key concepts. By reading the main concepts on the computer screen while the lecture is ongoing, the key elements of the lecture are reinforced. It also permits rapid editing/clarification of key points in the final summary by providing easy reference to the exact place in the complete lecture text from which the summarized phrase/word originated. For use of this invention any personal computer, laptop and its variants or any mobile device such as smart phones, iPods or tablets can be used with the installation of the voice to text software and the summarizer programs described herein. Microphones provided by most computers or long range parabolic microphones are useful for audio acquisition. The computer may also be connected directly to wire or wireless networks originating from the speaker's microphone or its voice dissemination/amplification system.

Principles of Machine Summarization Systems

The claimed method uses OCR to acquire and format text material. Once formatted into editable text, an automatic text summarizer is used to extract the key concepts at the desired degree of compression. Examples of text extraction and summaries of various compression levels are given Example 3. This material is rapidly converted into bullet points or outline form. The machine summary and outlined notes are then reviewed and practiced. The user can also formulate questions from the text, enter them into the summarizer, which will extract and display the answers via a semantic search on the material (See Example 1). The fundamental steps in the summarizer process are given below.

A. Reduction. Information acquired from multiple sources is scanned and OCR used to convert the printed image to editable text in outline form specified above.

B. Parsing. The text is parsed into paragraphs, sentences, and words using a lexical analyzer. A system for separating words into stems (morphological stemming) and affixes, which can be used to reduce incoming texts into word stem form. A morphology analyzer can be used to tag key words based on suffixes employing disambiguation rules for syntactic context. Fast parsing with a full grammar parser such as the Tagged Text Parser (TTP) is also useful. The resultant parse tree is analyzed grammatically and nouns, verbs, adjectives, adverbs identified. The adjacency of each word is evaluated in making the determination. Subjects and predicates are identified. A different set of grammar rules is used for each natural language, making the product multilingual.

C. Analysis. The grammar tree is then analyzed and major concepts extracted according to relevancy rules. These relevancy rules are selected and/or entered by the user. Keywords and phrases are used for relevancy discrimination and assigned weights. The value of the key words and phrases is assessed according to their frequency and weight.

D. Construction of Vector Space Diagrams and Cluster Generation. The subject matter is hierarchically arranged, and derived directly from the text under consideration. Key term weighted vectors based on the above relevance criteria are derived statistically or probabilistically from vector space diagrams and used to construct key term clusters. Synonymy classes and subsumption hierarchies are prepared. Index terms are related to each other via statistical association methods, which compute similarity coefficients between words, word stems or concepts based on co-occurrence patterns between these entities in the sentences of the text material.

E. Relevance Feedback and Reduction. The degree of summarization is determined by the user. Non-essential and redundant verbiage is eliminated, as is redundant information. New key terms and weighted clusters are prepared via relevance feedback, i.e., a repeat of the process after completion of the initial abstracting using new key terms to condense the subject matter.

F. Rendering. The result is presented as a summary and outline. It can be printed, rendered for a web browser or mobile device, eReader or the like. Using text to speech, it could even be read aloud.

G. User Feedback (Query and Answering Feature). The automated program allows the user to provide generic or specific queries about the textual material and provides answers from the text.

Specific Summarization Systems

Neural Network Approach: Megaputer's TextAnalyst™

The present invention contemplates the use of the machine summarization of the digitized text into a useful outline. For this purpose any summarizer program is useful. The principles involved in these systems are below. Megaputer's TextAnalyst™ and PolyAnalyst™ are the preferred summarizers in the claimed invention because they provide many desirable features, including accurate summarization and a query feedback system. Megaputer supports a range of summarizer operations without a predefined knowledge base. The basis for TextAnalyst's processing is a neural network technique that analyzes preprocessed text to develop a semantic network. The semantic network provides the core information required for clustering, summarizing, and navigating textual material.

TextAnalyst uses a three-step process for compiling text mining information in a document, preprocessing, statistical analysis and renormalization. These steps are performed sequentially.

The first pre-processing phase is a language-dependent operation during which "stop" words are eliminated, since they provide no semantic information. Next, the roots of the remaining words are identified so that the subsequent statistical analysis and renormalization phases have to deal only with a canonical form of words, with the text reduced to only semantically important words in standard form.

For statistical analysis, TextAnalyst calculates correlation weights between words. Words that appear together frequently have higher weights than words that appear together infrequently. Weights are also assigned to individual words and multiword terms in order to calculate a sentence weight and then the most relevant sentences are extracted. Using the default threshold of "90" for semantic weight, only a single sentence is extracted for the summary.

The final phase is renormalization. During this stage, the weights between words are adjusted to reflect the strength of the relationship between the words in a sentence. Iterative adjustments are made to the weights until a stable set of weights is found that reflects the most important words and word combinations in the text.

The semantic network in TextAnalyst is the foundation upon which other operations depend. Words and terms are linked to other words and terms according to weight of terms. Multiword terms are identified on the basis of the frequency with which they co-occur. Text Analyst does not usually include verbs outside of noun phrases in person, place, and organization terms, and does not terminate at the first or last multiword term. TextAnalyst uses a strictly mathematical approach, after preprocessing, to formulate the semantic network and limits language-specific operations to the preprocessing stage to provide more adaptability in later stages.

Another analytic approach provided in Megaputer™, is the means to interrogate a text using natural language to find answers to questions not necessarily captured in a summary. Processing questions is similar to processing sentences in documents. Words in the question are scored according to their relationship with other words. Based upon the results of that scoring similar sentences are extracted from the source text. The intuition for this approach is straightforward. A question is a sentence with a placeholder (identified by terms such as who, what, when, and where) and some selection criterion. The selection criterion provides the means of filtering sentences to find matches. The assumption is that at least one of the top matches will contain the answer targeted by the placeholder in the question.

As with other text processing operations, question answering does not entail a full semantic analysis resulting in an elaborate representation of the meaning of a question. Instead, statistical techniques combined with the neural-network-generated semantic network, provide likely answers to the question.

Homepage for the Instant Invention

The textual image or barcode from the mobile imaging devices may be processed directly to a user understandable summary in the mobile imaging device itself or a PC, laptop and the like. The textual image is also transferred directly to the homepage of the mobile imaging device or PC wherein image can be processed automatically through OCR to a final summary or where alterations that facilitate capture by OCR and summarizer programs can be carried out. Textual images from mobile devices in JPEG or TIFF or other format can be imported to the homepage of a PC and converted by OCR to editable text in WORD or TEXT format and then machine summarized (Examples 1, 2, 3, 4). Barcodes encoding textual material can also be acquired by the mobile imaging devices and decoded therein or transferred to a PC using barcode reader alone or embedded in an OCR program such as FINE READER 9.0-10.0 Professional Edition™.

The homepage provides the users with options for the format of the summary, i.e., as non-formatted text, formatted text such as the in the original document or in formatted or non-formatted text with or without Tables. The custom program also specifies the amount of desired detail in the summary ranging from 10-90%. The user can specify or highlight the desired text intervals for summarizations such as subheading to subheading or subsection to subsection within a book chapter. In this case, multiple summarizations of the text material are prepared. The user can also designate the preferred format of the final summary, e.g., Roman outline, bullet points, separate sentences.

The user can optionally highlight the key points in the original text and compare them to the highlights in the machine summary. For this purpose, a split screen is useful that enables the user to incorporate additional points of his own in the machine summary via a drag and drop function.

The homepage contains files for manual or automatic processing of the captured image. The homepage of the instant invention contains space for the complete text image and toolbar icons titled "Import", "Edit Image", "Editable Text Format", "Convert to Editable Text", "Editable Text Modifications", "Summarizer Settings" for processing the image through OCR and machine summarization.

The "Import" toolbar contains the following options:
1. Import Image via Wireless Devices, Cardreader or USB port from:
   a. Cameras or Digital Cameras
   b. Mobile Imaging Devices
2. Import Image from Scanner
3. Import Image from Internet, Files and Folders
4. Acquire Image by Searching By clicking any one of these options, the textual image in thumbnail form containing printed material is acquired from the source into the homepage.

Next the user edits the printed image in the file titled "Edit Image" containing the following options:
1. Rotate Left
2. Rotate Right
3. Sharpen Image
4. Straighten Lines
5. Optimize Contrast & Brightness
6. Crop image Next the user converts the printed text in JPEG or TIFF format to editable and summarizable text. Before doing so, the user selects the preferred format from the folder titled "Editable Text Format" which contains the following menu options:
1. Preferred Layout
   a. Original Layout
   b. Retain Columns, Tables, Paragraphs, Fonts
   c. Retain Tables, Paragraphs, Fonts
2. Preferred Format
   a. PDF
   b. RTF/DOC/WORD
   c. HTML
   d. TXT
   e. DBU
   f. CSU
   g. LIT Next the user converts the printed pages into editable text by opening the next folder titled "Convert to Editable Text" and clicking on "OCR-Convert to Editable Text". Once the text is converted to editable text by OCR the image can be further improved using the file titled "Editable Text Modifications."
1. Eraser
2. Rotate/Flip/Invert
3. Straighten Lines
4. Despeckle image Next the user determines the preferred method of summarization by opening the file titled "Summarizer Settings."
1. Summarize entire document
2. Summarize intervals between subheadings
3. Summarize the summaries 4. Summarize the highlighted text in the original document
5. Summarize with summary on top of original document
6. Summarize the interval summaries
7. Place summary in Roman outline form
8. Place summary in bullet-point form
9. Place summary in paragraph form
10. Desired compression of the summary: 20-75%

The user then clicks the "Summarize" icon. The final summary appears in specified form in a few seconds. It may be further refined and compared to the original document by placing it in split screen next to the original document using the file titled "Split Screen documents." Upon opening this folder, the content of the outline is synchronized with the site from which this content originated in the text. This enables the user to rapidly compare the original paragraphs with the summary outline at the same eye level and add, subtract or edit the outline as desired.

The user can process the initial text images from import to summarization in a single step using preset configurations specified by the user. For single step processing method, the folder marked "Rapid Single Step" containing the following menu options is opened with the following options.

1. Import from Mobile Imaging Device, Barcoder, Read and Summarize
2. Import from wireless/card reader, Read and Summarize
3. Import from pdf file/web, Read and Summarize Capture of Barcodes Encoding Textual Images An additional embodiment of the present invention is to capture 1 or 2D barcodes encoding textual material using barcode reader applications embedded in "mobile imaging devices" such as iPODs™, iPADs™, tablets, BlackBerrys™ and the like. Because barcodes are spatially smaller than the textual material they encode, they are readily captured by conventional 1 or 2D barcode scanners. Digital cameras are also useful in capturing and processing barcodes. Once captured, the barcode is automatically decoded into alphanumeric editable text in WORD format which is thereupon processed seamlessly to a machine summary without requiring OCR text format conversion (Example 6).

In practice, a barcode encoding alphanumeric or binary text is placed in a non-text segment of a printed page where it is captured and decoded by a barcode scanner and converted into alphanumeric text in WORD format. The present invention contemplates attaching such a barcode to each printed page of textbooks or at the end of chapters or sections therein. The barcode scanner captures barcodes encoding text material more rapidly than mobile imaging devices and can facilitate the "concept capture" phase of the learning process.

The present invention envisions that an entire textbook can be converted to barcode that can be rapidly captured and decoded by the mobile operating systems with embedded barcode reading applications such as NeoReader™ for iPhone, ZXing Barcode Scanner™ for Google Android, Nokia Barcode Reader™ for Nokia. Preferentially the barcode encoding the textual material is high density and 2 dimensional such as QR, PDFf417™ or AZTEC™ that can be decoded by simply placing the barcode reader or mobile imaging device over it.

High density and 2 dimensional barcodes such the PDF417™, Data Matrix™, QR™ or Aztec™ that support full ASCII, binary and numeric data and encode foreign language character sets are the most useful barcodes in this invention. The PDF417™ symbology accommodates up to 340 characters per square inch with a maximum alphanumeric of 1850 text characters; with a mix of alphanumeric and binary data, the capacity ranges from 1108 and 1850 bytes. Data Matrix 2D™ matrix style barcode symbology that encodes up to 3116 bytes or characters from binary or alphanumeric data is also useful. The symbol is built on a square grid arranged with a finder pattern around the perimeter of the barcode symbol. The QR 2D™ barcode encodes text, URL and is decoded at high speed with mobile imaging devices equipped with applications that convert the QR code to text. QR codes are utilized in Google's mobile Android™, Nokia's Symbian™, Maemo operating system™s and App World™ applications for BlackBerry™ devices. QR has a maximum of 4296 alphanumeric characters, 7,089 numeric characters and 2953 binary bytes. Aztec Code™, a high density 2D matrix style bar code symbology that encodes up to 3750 characters from the entire 256 byte ASCII character set of binary or alphanumeric data is also useful. The symbol is built on a square grid with a bulls-eye pattern at its center. Data is encoded in a series of "layers" that circle around the bulls-eye pattern. Aztec's primary features include orientation independent scanning and a user selectable error correction mechanism.

Modern bar code scanners are normally available with one of three "output options"—either "Keyboard Wedge" output, RS232 serial output, or USB output and all are useful in this invention.

1) Keyboard Wedge Output or USB Output

If the barcode scanner has Keyboard Wedge output or USB output special data collection software is not needed. Both these outputs will deposit the data into the foreground application on a PC wherever the cursor is flashing.

2) RS232 Output (Includes Some RFID Scanners)

RS232 output is characterized by either a 9 or 25 pin rectangular connector plug. It attaches to one of the COM ports on a PC. BC-Wedge software (short for Bar Code Wedge) is useful for adapting to Windows. It inputs data directly into Windows or DOS applications as if the data were being typed in. For RS232 barcode users requiring more options WinWedge 32 Std™, WinWedge 32 Pro™ and DOS-Wedge Pro™ are useful. These advanced versions offer sophisticated data parsing, filtering and formatting, date and time stamps, 2-way I/O (for RFID), keystroke macro insertion, data translation.

3) TCP/IP Output (Includes Some RFID Scanners)

TCP/IP compatible devices typically connect to an Ethernet™ network. This type of output requires additional software in order to collect data from the barcode scanner directly into most Windows applications. TCP-Wedge™ collects data from TCP/IP ports (i.e. a device connected to a TCP/IP port) directly into any Windows application. It has all the advanced data parsing, filtering, formatting, 2-way communications, etc. of WinWedge Pro™ and is a part of the WinWedge 32 Pro™ package.

Digital cameras or document scanners alone or integrated into a conventional 1D or 2D barcode scanner capable of capturing 1 or 2D barcodes are also useful in the instant invention. An example of such an integrated device is the Motorola™ 6707series which contains both linear barcode scanners and a 1.3 megapixel digital camera which can capture images in binary, TIFF or JPEG format.

Cordless barcode scanners that can communicate barcode data wirelessly to other digital devices such as Analog-99 MHz (Radio Technology) or 802.11a/b/g WLAN or Eye-Fi™ or Digital-Bluetooth™Class 2 radio, v1.2 WPAN™ (Digital Spread Spectrum) with a range of up to 300 feet from the base are also useful in this invention.

The present invention contemplates that all these image capturing devices may be used independently to accomplish the entire process of barcode capture, decoding, conversion to OCR and summary. Mobile imaging devices such as iPODs™, iPADs™, tablets, PDAs,™, mobile computers and the like equipped with applications that incorporate these functions such as NeoReader™, ZXing Barcode Scanner™ and Nokia Barcode Reader™ and the OCR and summarizer programs, e.g., FINE READER™ 10.0 and Megaputer TextAnalyst™ or Polyanalyst™ are preferred for this purpose.

Textual Images in Foreign Languages are Recognized, Translated and Processed in the Same Fashion as the Native Language The claimed invention also contemplates that textual images in foreign languages can be processed in the same fashion as images in a native language. The foreign language document is first captured by the mobile imaging device, autofocused, sharpened and then translated into any of 165 different foreign languages using automated translation software. At this point, the translated image is processed through OCR in the preferred FINE READER™ professional 10.0 program that recognizes 167 foreign languages and then summarized by the preferred summarizer that similarly recognizes the foreign language.

Server-Side Content Summarization System

The present invention envisions a server-side program enabling the summarizer technology to be accessed by a large number of users. The system is best demonstrated by referring to the FIGS. 1-5. FIG. 1 is an architectural overview of a network environment 100 where document summarization is practiced according to an embodiment of the present invention. Network environment 100 is represented herein by an Internet network cloud labeled Internet and further defined in illustration by a network backbone 106. Backbone 106 represents all of the lines equipment and access points making up the Internet network as a whole. Therefore, there are no geographic limitations to the practice of the present invention. It will be appreciated by the skilled artisan that Internet 101 includes all sub networks connected thereto although none are specifically illustrated in this example. These may include local area networks (LANs), wide area networks (WANs) corporate, private or public. Network 100 may hereinafter be referred to as Internet 100.

In accordance with an embodiment of the present invention, an enterprise 102 is illustrated and is adapted to provide document summarization services by maintaining a Web Portal (WP) 110 that is connected in this example to backbone 106. WP 110 is adapted as a service portal accessible to clients subscribing to or otherwise authorized to access document summarization services according to embodiments of the present invention. WP 110 has an instance of summarization software (SSW) 111 provided thereto and executable thereon. SSW 111 is a server-based application that automatically creates document summaries for users who summit or otherwise provided location information to the server enabling server access to documents for summarizing. SSW 111 also performs other tasks which are related to summary management and distribution upon user request and direction.

A client station 101 is illustrated in this example and has connection to backbone 106 via one of several possible Internet access methods. In this case, client 101 has a desktop computer 107a connected by a high speed Internet link to backbone 106. The connection method may be digital services line (DSL), broadband connection, integrated services digital network (ISDN), or some other Internet connection method. Computer 107a may be a laptop computer or any other Internet-capable appliance with a browser display that may access portal 110. Computer 107a has a browser (BR) instance 112a installed thereon and adapted for general Internet access and navigation. The inventor prefers a high-speed Internet connection method over a lower bandwidth dial-up connection; however a dialup Internet access method may be used without departing from the spirit and scope of the present invention. The connecting network may be any telephony carrier network including the public switched telephone network (PSTN) or, perhaps a wireless carrier network. For the sake of simplicity, a carrier network and equipment is not illustrated in this example but may be assumed present in some embodiments. Computer 107a has an optical character recognition (OCR) scanner 109a connected thereto as a peripheral. Scanner 109a may be used in one embodiment to scan documents onto computer 107a for upload to server 110 for summarizing. In one embodiment, documents on computer 107a may be summarized by server 110 without requiring upload to the server. Client 101 maintains an Internet-connected server 108a that is accessible to other authorized users via Internet 100. Client 101 may therefore be an enterprise providing services and/or products to customers. A client station 103 and a client station 105 are illustrated in this example. Client station 103 is similar to station 101 in that a computer 107b running a browser instance 112b is provided as well as an OCR scanner 109b. Client 103 may therefore be an enterprise as was described above with respect to client 101. Furthermore, client 105 is similarly adapted as described above with respect to client station 101 including a computer 107d, a scanner 109d, a BR instance 112d running on computer 107d and an enterprise server 108c.

Clients 101, 103, and 105 may subscribe to the services provided by enterprise 102 and may access those services by accessing portal 110 with respective browser interfaces 112a, 112b, and 112d. A browser plug-in such as an active x control, a java-based plug-in, a direct x plug-in, or some other plug-in component may be temporarily or permanently downloaded to each of computers 107a, 107b, and 107d when portal 110 is accessed and the user is authenticated for first time use of the service. In the case of stations 101, 103, and 105, document summarization as provided by SSW 111 may be performed on any electronic documents that may be uploaded to the server from an internet-capable appliance such as from computers 107a, 107b, and 107d. Document summarization may also be performed on documents that are resident on the connecting appliance, computer 107a, for example, without requiring the documents to be uploaded. In this case, the documents for summarizing may be dragged and dropped into a shared folder that portal 110 is authorized to access over Internet 100.

As described further above, each station 101, 103, and 105 have enterprise servers 108a, 108b, and 108c which may be adapted to hold and serve enterprise documents internally and to serve electronic information pages using hypertext markup language (HTML) or an extension thereof such as SHTML, XML, or the like. Internal documents may include HTML-based information pages addressed in the server, and other document types that may be stored on the servers. These may include extensions such as .doc, .PDF, or virtually any known extension for any known word processing application used to create those documents. In this example, stations 101, 103, and 105 may authorize portal 110 aided by software 111 to search and summarize any documents or electronic information pages maintained in that enterprise servers 108a-108c. Portal 110 accesses those servers over Internet 100 based on a request from the appropriate client station 101, 103, or 105.

Document summaries created from resident documents accessed remotely by portal 110 may be stored on the same system that holds the documents that were summarized. Portal 110 may associate those summaries to the full-text versions of those documents and may provide notification of the existence of a summary version of a full text document to anyone operating on the network that has requested access to a document that has a summary version associated therewith.

In one embodiment, portal 110 may keep stored document summaries on its own data storage system and may provide network hyperlinks links to those summaries, the links associated with the full text versions of the summaries at any browsable location of those full text documents. It is clear that documents and their summaries need not be stored on a same computing system, server, or hard drive. It is also clear that links to the remotely stored summaries may be placed in a Web page, in a full text document that has been summarized, or simply in an accessible file folder represented as a shortcut icon that is executable as long as the searched system has connection to the Internet network.

A client station 104 is illustrated in this example and includes a computing system 107c and a connected OCR scanner 109c. Computing system 107c has a browser instance 112c resident therein and adapted for browsing the network. Client station 104 may be a private consumer rather than an enterprise maintaining a document and or Web server. Client station 104 may subscribe to services offered through portal 110 and may have documents summarized in the same manners described with respect to the other enterprise stations. For example, a user operating station 104 may scan documents into computing system 107c and have them summarized on the computing system if the system is online and connected to portal 110.

In one embodiment, the scanned documents may be uploaded to portal 110 for summarizing. Word documents such as those with the extensions .doc, .PDF, or other known extensions may be uploaded to portal 110 from computer 107c for summarizing. Those same documents may be summarized on computing system 107c by dragging them from their original folder and dropping them into a shared folder made accessible to portal 110 or a special window that may be part of a browser plug-in adapted to enable portal 110 to gain limited control over the computer for the purpose of summarizing those documents.

A user operating computer 107c and in session with portal 110 using browser 112c may request a summary of a document available through or an electronic information page hosted on an Internet-connected server such as one illustrated in this example as Web server (WS) 109. In this case, the user submits a URL/URI to the document or Web page for summarizing and the portal downloads the page or document in order to summarize the document. The portal then sends the summary document to the user or makes it available to the user at the server depending on enterprise rules and whether the requested document has been made freely available for download.

In one embodiment, portal 110 with the aid of SSW 111 may access documents available through the Internet and may summarize those documents storing the summaries in a searchable data storage facility. Links may be made available to those documents via a search engine as a result of a keyword or phrase entry and submission through a search interface. For example, a third party search service may provide search result pages containing links to Web pages containing documents that have been summarized in the past. Clickable links to those document summaries may be provided along with the links to the full text documents on the search result page.

As more documents are summarized, search results served will provide more and more summary links to those full text documents. There may be some rules in place to determine which documents that are generally available through the Internet should be summarized, such as for example, popularity (frequently accessed), class (education, technical paper, etc.), and so on. Research papers and other technology white papers may be good candidates for document summaries. User guides, product manuals, tutorials, public information works and other frequently accessed materials may be good candidates for summarizing. Each document summary accessed from a search results page may also contain a hyperlink to the full text version of the document summary. Summary formats may vary according to the nature of a document. Summary outlines, searchable indexes, graphics slide shows, and other tools may be provided to help a user determine whether to access a full document or not.

FIG. 2 is an exemplary screen shot of a summarization user interface 200 according to an embodiment of the present invention. Interface 200 is provided of the form of a navigation capable browser window. A browser plug-in may be provided in one embodiment, to enable some of the capabilities of the service of the present invention such as folder sharing. The portal server may perform local document summarizing on the user's appliance if the user authorizes the process. Executable controls may also, in one embodiment, be temporarily downloaded to interface 200 if required, to perform certain server-side functions on the user's device. Those controls may be discarded after the user logs off from the portal.

Interface 200 is illustrated as currently online and logged into an enterprise portal providing the service of the present invention, such as portal 110 aided by SSW 111 described above with reference to FIG. 1. Interface 200 has a toolbar 204 provided thereto similar to any browser interface and may contain user actionable icons and drop down menus typical of a browser interface including text entry fields for entering URLs for navigation and for entering keywords or phrases for initiating data searches. A search window is illustrated in this example, just below toolbar 204. A configuration icon 205 is provided to enable a first time user to configure the service of the invention for use. Configuration options may vary according to service plan.

Interface 200 has a file browse window 203 for finding documents for summarizing, which are stored locally on the computing appliance or on a connected storage medium. The local file-browsing interface 203 may also be used to find previously created document summaries. A data entry field 209 is provided on interface 200 and adapted for enabling a user to enter a URL and document path to a full text document that the user wishes to have a summary of. The entry field may be filled manually by a user or a shortcut may be copied and pasted into the field. A user actionable icon summarize 206 is provided conveniently adjacent to field 209. When the field is populated, the user clicks on summarize to submit the network path to the service of the present invention. The portal aided by software then navigates to the document downloads the full text version and summarizes the document according to configured user preferences if any. If the user has not indicated exact preferences then a default summarization template may be used instead.

Once the document has been acquired and summarized, then the summary version of the document may be sent to the user and may be displayed in a window 201 adapted for the purpose. In this example, page 1 of a PDF file 207 is displayed. The user may scroll normally if there is more of the summary document than can be displayed on the screen. If the service already has a summarized version of a document that the user has provided the network path to, then the service may notify the user that a summary of the document is currently available for display. Once a summary is displayed, the user may save the summary locally and perform other common editing and file tasks that may be available with normal word processing software. Options 208 are provided in this example and may include drop-down menus file, edit, document, tools, and view, forward, send, and collaborate. The option 208 labeled tools may include file converters or plug-in viewers for certain document types. The option 208 labeled views may offer different types of views of the summary based on any considerations. For example, a user may wish to view only a broad outline of the subject matter contained in the full text version of a document.

The user may activate forward or send to deliver the document to a third party through email, file share program, or through some other resident application used to send connected appliances for the purpose of sharing the user's screen and document display with other users. Actionable icons 214 are provided conveniently within window 201 and are adapted to provide other options. An icon of icons 214 labeled index may allow the user to view an index of summarized documents currently available for view. An icon of icons 214 labeled full text enables the user to immediately retrieve a full text version of the summary from the portal if desired. An icon 214 labeled view last enables the user to view the last summary acquired.

Interface 200 has a second scrollable side-bar or area 202 provided thereto and adapted to contain more options. A window 210 provided within scrollable area 202 and adapted to show a user the aggregate of document summaries that have been created for the user. Labeled my documents, the window contains summary documents 211 that are available for viewing. These summary documents 211 may include links to the full text versions of those documents. The folder may be maintained at the portal and made accessible to the user in personalized fashion such that only the user has authorization to access the folder.

Space 202 also supports a scanner interface for acquiring documents via OCR scanner for summarizing. In this example, a page 213 of a document scanning into the commuting appliance is illustrated. If the user is connected to act portal while scanning is taking place, the service of the invention may begin summarizing finished scans as soon as they are completely scanned onto the appliance. The summarization process is flexible such that if subsequent scanned pages parsed by the service indicate a shift in any completed portion of the summary, then that completed portion may be modified. This particular feature of the present invention provides for an organized summary from an otherwise unorganized full text document. In other words, the summary software of the invention may be enabled to determine some priority in arrangement of different sections of a document depending upon what content a user looking for. Interface 212 may support a single document scanner or a multiple document scanner without departing from the spirit and scope of the present invention.

Using interface 200, a user may submit documents to the service portal over the network for summarizing, or the user may allow the portal to summarize documents on the user appliance without requiring document transfer. After a session is complete, any downloaded utilities or plug-ins may be disposed of or rendered unusable. In another embodiment, a persistent browser plug-in may be provided using activeX™, directX™, Java™ bean, or one of many other known executables. The service of the present invention is intended to support a variety of operating platforms including Windows™, Apple™, Linux™, and any other known operating platforms.

In an embodiment wherein the user is an operator of an enterprise station having a large cache of documents to summarize, the URL to the server or folder containing the documents may be submitted to the portal service, at which time the portal may navigate to the URL and search and summarize all of the documents contained at that location such as in the server, or in a file folder or directory. There are many possibilities. Using the present invention in this way enable an enterprise to quickly send many summary documents, perhaps summarizing a complicated sales or other contract to a prospective buyer, who may then access the full-page versions at will if desired.

FIG. 3 is a process flow chart 300 illustrating acts for summarizing a document according to embodiments of the present invention. At act 301a user operating a network-capable appliance launches the Web browser on the appliance. At act 302 the user logs onto portal by clicking on a plug-in icon conveniently placed into the browser. In one embodiment, there is no plug-in downloaded until the user navigates to logs onto the portal analogous to portal 110 of FIG. 1. In this case, the functionality for having documents summarized locally by the portal over the network may be downloaded as an automatically executable control, that executes and displays a user interface in the browser like interface 200 described earlier.

At act 303 the user determines if the document for summarizing is online. If at act 303 the target document for summarizing is online, then at act 304, the user provides the correct network path to the document by manually typing the path or by copying and pasting a shortcut to the document into a data field provided. At act 305, the user may click on summarize to have the service navigate to the URL retrieve the document and summarize it for the user. Step 305 includes making the summary version available to the user by sending it to the user over the network or by placing in a server-side folder personalized to the user wherein the user may access and download the document.

At act 306, the user has the option of sending the created summary to another user or users. If the user decides to send the summary to a third party or parties in act 306, then at act 307 the user clicks on forward or send to launch a preferred email application or some other communications application capable of handling attachments. If at act 306 the user does not want to forward or send the application then at act 311 the process ends. The user may view, edit and perform other tasks with the summarized document.

If at act 303 the user determines that the document to be summarized is not online, then the process proceeds to act 309 where the user determines if the document is in local storage. Local storage means that the document is on a storage medium accessible locally to the station or appliance the user is operating. The storage may be internal or peripherally accessible to the network connected appliance. At act 309 if the document is in local storage, then the process resolves back to act 304 where the user may submit the document to the portal through a file share utility or the user may select the document and drag it into a special share folder accessible to the summarizing software running server side.

In one embodiment, the user may copy a shortcut to the document and submit the shortcut to the portal so that the portal may navigate to the document. In the latter aces the appliance hosting the document would have a network address such as a URL or URL and machine address. In a wireless embodiment, the portal may be a corporate server connected to a local WAN and may have access to a local network supporting the hosting machine. There are many possibilities. At act 305, the document is summarized according to a default protocol or customized protocol if the user has pre-configured any preferences.

Still possible is that at act 309, the user determines that the document is not in local storage and therefore must be acquired such as by scanning. In this case, the user acquires in the document at act 310. In some cases, a peripheral scanning device may be made accessible to the summarization software through the appliance operated by the user. An example might be a networked and shared enterprise scanning device capable of independent storing and, perhaps serving scanned documents. In the latter case, the device may have a network address or URL and the service may be authorized to access the scanning device over the network, thus enabled, may also summarize the document at the scanning device. Likewise, the scanning device may be enabled to serve the full text document directly to the portal upon request where it may be summarized at the portal and sent to the authorizing user or otherwise made available to the authorizing user.

At act 306, after the document has been summarized, an option for sending the summarized version of the document to another party or parties may be presented to the user that ordered the summary. The summarized version might be sent by proxy from the portal server or if the summarized version is available on the user's appliance then the user may send the document at the time the document displays on the user appliance. If at act 306 the user decides not to send a copy to another party or parties, then the process may end at act 311. If at act 306 the user decides to send the summary version to one or more parties, then at act 307 the user may click to send launching a default application. The default application may be an email application, a file sharing application, or some other messaging application capable of handling attachments. In one embodiment, a user may authorize the summary document to be distributed by proxy the user providing the recipient address or list of recipient addresses to the portal.

At act 308, the summary document is sent to one or more intended recipients over the network. As described above, the document may be sent directly by the user or by proxy without the user actually taking possession of the document. After the document is distributed, the process may end for that document at act 311. A user may, of course, perform many other document management tasks such as ordering a re-summarization of a document according to an alternate criterion.

It will be apparent to one with skill in the art of network communication between nodes connected to an Internet or other network that the process of this example may include more or fewer acts than illustrated herein without departing from the spirit and scope of the present invention. For example, an optional act for editing a summary version of a full text document may be provided before act 306 if the summarized version is on the appliance of the user and if the summary version is an editable version. In some cases the summaries may be read only depending upon enterprise rules taking into account user preferences. Act 306 may not be performed at all and other tasks not mentioned here may be contemplated without departing from the spirit and scope of the present invention.

FIG. 4 is an exemplary screen shot of the user interface 200 of FIG. 2 illustrating a voice to text summarization feature according to one embodiment of the present invention. According to one embodiment of the present invention, a voice to text summarization feature is provided that enables near real-time summarization of documents acquired by voice or audio input and translated to text using voice-to-text software.

Interface 200 contains many of the same elements described with respect to FIG. 2 above. Therefore elements in this example that have already been described and that are not changed from their description in this example shall not be re-introduced. Screen area 201 contains a user actionable icon 400, labeled voice input, that is adapted to enable audio input into voice-to-text software provided on the user appliance or, in one embodiment, at the portal server. The voice-to text software is adapted as is generally known in the art to translate the voice input to text.

In one embodiment, the user appliance is enabled for voice input to text translation. In this case, the voice input may be provided to the appliance anytime while online or offline and a text rendition of the voice input may be created for eventual summarizing by the service of the present invention. In another embodiment, the voice-to-text capability is provided server-side with the summarization software. In this embodiment, the user may call the portal server from the user appliance that is supporting interface 200 or from any a voice-capable appliance associated with and verifiably registered with the service. The user may then provide the voice input to the server. Voice over Internet protocol (VoIP) may be used to carry the voice input to the portal sever. In another variation of this embodiment, the user's voice is recorded and converted to voice extensible markup language VXML or some other voice markup language and then recreated at the server as synthesized voice input that is then translated into text at the server.

In one embodiment text summarizing may begin at the portal server once sufficient voice input has been translated into text at the server and before all of the voice input has been received at the server. In an example of this embodiment, a user may speak into the connected appliance and at the server summarization begins almost immediately. In this case, the summarization text rendered is considered temporary and revisable as more input is received and main themes are added and perhaps reprioritized for summary rendition. Once a user is finished with voice input, a signal that the input stream has completed enables the summarizing engine to finalize the summary version of the full text translation. A user option is presented within screen 201 for only rendering summary text instead of a full text version of the document. In this case, the text rendered that ultimately will not be a part of the summary version is not discarded until the final summary version is decided or finalized. At that point the unneeded text may be discarded.

In this example, a voice-to-text (VTT) summary version of a translated document is displayed in browser window 201 once it has been finalized by the system. A window 402 is provided in the browser sidebar area that is very similar to window 210 described with reference to FIG. 2 above accept that it contains voice-to-text rendered summary documents 403 that were acquired ultimately by voice input. One with skill in the art of voice communications will appreciate that voice to text rendering may be performed over a network, the network separating the source of the voice input from the translation software hosted on a network-connected node.

In one embodiment, the VTT software is local to the user appliance and the text translation is completed locally. In this case, the voice summarization may also begin before the voice input has finished as long as the user is connected to the portal server while the process ensues. In this case, the text rendered may be submitted to the service over the network as it is being rendered and the summary may be performed at the server. In another case, the server has access to a shared folder, or a special component of the VTT software that enables the summarizing engine to cooperate with the local instance of VTT software over the network such that the summary may be performed by the portal server but rendered locally on the user appliance.

In one possible example, a user may attend a lecture equipped with a powerful handheld voice and network-capable appliance whereby the user records the lecture live. The appliance may be connected wirelessly to the portal server hosting the summarization software. As the lecture is recorded, the voice is being translated into text and then being summarized such that when the lecture is complete, the user already has a summary text document highlighting the important parts of the lecture to use as notes. The lecture may be recorded off line, translated locally and then summarized when the user next connects to the portal-based document summarizing service.

FIG. 5 is a process flow chart 500 illustrating acts for summarizing voice to text in near real time according to an embodiment of the present invention. At act 501, a user selects a voice to text summarizing option, in one embodiment, while connected online to the service of the present invention. At act 502, a voice input mechanism is activated such as a microphone and VTT software. At act 503, a voice to text translation engine is activated to begin translating the voice input and the voice input begins. The VTT software may, in one embodiment, be locally stored and executable from the user appliance.

At act 504, the VTT software begins rendering text from the voice input. At act 505, the service determines whether there is enough rendered text to begin summarization. If progress is not sufficient to begin summarizing, then the process loops back until there is sufficient text to begin. At act 505 once there is sufficient text rendered for summarizing, then at act 506 the document summarization process begins. It is important to note herein that all of the voice input is translated into text, but only some of the translated text will be included in the summary version. The user may elect to render both a full and summary version of the voice input session, or just to render a summary version discarding the text that is not required for the summary.

At act 507 voice input continues while summarization continues. At act 508 a determination is made whether the content being received and parsed for summary is shifting in theme, perhaps requiring some modification or reorganization in the rendered summary text. If not in act 508, then the process loops back to act 507 and then back to act 508 repeatedly until there is some shift in theme or new content that shifts away from the current summarized content. It is important to note herein that it is certainly possible that a summary may be completed without determining a positive at act 508. However, it is highly likely that a summary begun before all of the text has been acquired will need some revision before presentation. For example, with voice input is likely that a salient or important point may be brought up out of order of importance later in the input stream. This feature accounts for that possibility and enables the system to reprioritize the summary points. At act 508, if there is some shifting of content that might warrant a revision of the format of a summary and/or the text reserved for that summary then at act 509, the system may perform a revision or an adjustment to what has already been rendered as text and reserved for summary presentation.

At act 510, the system determines if the voice input has completed for a current session. If not, the process loops back to act 508 to determine if there is any shifting content that may require an adjustment to form, format or text already reserved for the summary document. If at act 510 it is determined that voice input is complete for that session, then at act 511, the summary rendering is finalized and the summary version is created for display, editing and other task considerations. At act 512, the summary document has been rendered so the process may terminate for that session. It is noted herein that the system continually revises its summary form, format and text while voice input continues and different themes, point, and ideas are interpreted until all of the input has been interpreted, at which time the complete summary is available. If at any time the session is interrupted, the summary version may still be created and presented based on the data that has been received.

In one embodiment, a user may add to a summary document by calling it up from storage and initiating a voice session associated with document editing. In this case, the summarizing engine may pick up where it left off and continue to build and revise the summary document as necessary based on the new content added. This particular feature of near-real-time summarization of translated voice is not available with current document summarization applications. By providing prioritization rules that also recognize key words and phrases that are used to describe importance, the engine can create a prioritized and organized summary almost immediately after the voice input session has completed. For example, the phrase "This is a key component" may be interpreted as it is used in association with one or more paragraphs just received. "The most important aspect" might also be recognized as a prioritization key in summarizing so that whatever aspect is associated with the phrase retains the priority in the summary document. The phrase, "A more important aspect is" . . . or "More importantly" . . . can also be integrated into a prioritization scheme to help create more organized summaries than would otherwise be rendered. This feature, although applicable to summaries created only from text documents, is particularly useful for creating summaries from rendered speech as the organization of voice input is typically not as evident as a prepared text document.

It will be apparent to one with skill in the art that a capability of summarizing VTT renderings is not required in order to practice the present invention. However, the feature enables broadening of the types of input that may be summarized not limited to complete text documents. In an additional embodiment, summarizing may be practiced according to the present invention in near real time wherein the input is a typing session. For example, a user may be creating a document while connected to the service in a session so that whenever the user stops typing input, a latest version of the summary may be presented following generally the process of FIG. 5 where the input is text input instead of voice input. There are many possibilities.

The methods and apparatus of the present invention may be practiced using all of or some of the components described herein without departing from the spirit and scope of the present invention. The invention may be practiced over the Internet network and any connectable sub networks including wireless cells having a routed connection to the Internet.

Operative Features of Automated Summarizer Systems:
1. Overview

This abstracting feature provides an automatic condensation and readable outline of text material. The instant invention provides methods for manipulating and accessing texts in arbitrary subject areas in accordance with user needs. In particular, methods are given for determining text themes, traversing texts selectively, and extracting summary statements that reflect text content.

The system analyzes text material and the extracts key words and phrases from text paragraphs. The content is automatically classified by indexing methods, which assign a weight to each term or phrase. Vector-space diagrams and clustered centroids are constructed based on the measurement of word frequencies and co occurrences. A hierarchy of key words and phrases is established. Clustered centroids with links to related key words and phrases are contracted. The process is aided by additions which classify and collate key terms by syntax, synonyms and semantics. The entire process is also improved by relevance feedback provided by the user in which the content of the analysis is refined and reprocessed. The system also has provision for degrees of precision required by the user and is adjusted for a general versus a more detailed outline of the key subject matter in the text material.

Automated vector space systems information retrieval systems alone or combined with parsing or syntactical programs are used to abstract and produce an outline of text material. In the vector space model, sets, or vectors, of terms, represent text. A term is typically a word, a word stem, or a phrase associated with the text under consideration. In principle, the terms are chosen from a controlled vocabulary list or a thesaurus derived directly from the texts under consideration. Collectively, the terms assigned to a particular text represent text content.

Because the terms are not equally useful for content representation, a term-weighting system is used that assigns high weights to terms deemed important and lower weights to the less important terms. A powerful term-weighting system of this kind is the well-known equation fxl/fr (term frequency times inverse collection frequency), which favors terms with a high frequency (f) in particular subject matter.

The terms used to identify the text items are extracted from the text material after elimination of common words and removal of word suffixes. All texts or text queries are represented by weighted term vectors of the form $D=(d_{i1}, d_{i2} \ldots d_{ik})$, where $d_{ik}$ is the weight assigned to term k in document D and a similarity measure is computed between pairs of vectors that reflects text similarity. Thus, given document $D_i$ and query Q (or sample document $D_j$), a similarity computation produces a ranked list of key terms and phrases in decreasing order of similarity with a query.

2. Text Decomposition and Structure

The system can manage text containing heterogeneous subject matter of varying length, including text sections, paragraphs, groups of adjacent sentences, and individual sentences. Long texts are broken down into smaller text passages.

When analyzing large and diverse subject matter, the combined global and local similarity computations improves abstracting effectiveness over the use of global vector similarity measurements alone. An additional improvement is obtainable by use of the passage identification that identifies text excerpts in addition to full texts. When text passages are available for processing, similarity measurements are computed between texts and text excerpts, text relation maps are generated showing text similarities that exceed a particular threshold value.

3. Text Theme Identification

A text theme is defined as a specific subject that is discussed in some depth in a particular text or in a number of related texts. Themes represent centers of attention and cover subjects of principal interest. The identification of text themes is useful to obtain a snapshot of text content.

Text analysis methods identify text themes using text relation maps as inputs to a clustering process that identifies groups of text excerpts that are closely related to each other but also relatively disconnected from the rest of the text. In this process, first triangles in the relation map are recognized (a triangle is a group of three text excerpts, each of which is related to the other two to a degree that is above the stated similarity threshold). A centroid vector is then constructed for each triangle, as the average vector for the group of three related items. Finally, triangles are merged into a common group (theme) whenever the corresponding centroids are sufficiently similar (that is, when the pairwise centroid similarity exceeds a stated threshold). A global centroid vector that is constructed as the average vector of all text excerpts included in the theme represents each theme.

An alternative theme generation method is to build a text relation map with the use of a high similarity threshold (where the number of linked text excerpts is small). Each disconnected component of the map, consisting of groups of highly related text excerpts, is then identified with a particular theme.

When text relation maps are used as the main input, themes are generated at various levels of detail. The larger the text excerpts used for text grouping purposes, the wider is the scope of the corresponding themes. Contrariwise, when sentences and other short excerpts are used in the grouping process, the theme coverage is normally narrow. By suitable variation of the scope of the theme generation process, it is thus possible to derive a smaller number of broader themes or a larger number of narrower themes.

4. Selective Text Traversal

Text skimming methods are used which are capable of concentrating on text passages that are of immediate interest. These skimming operations are used both for selective text traversal, in which only text passages of special importance are actually retrieved or read, and for text summarization, in which summaries are constructed by extraction of selected text excerpts.

In selective text traversal, starting with a text relation map and a particular text excerpt of special interest, three different strategies are used: (i) the path covers many of the central nodes, which are defined as nodes with a large number of links to other nodes of the map. (ii) the path uses text excerpts located in strategic positions, for example, the first paragraphs in each text section or the first sentences in each paragraph. (iii) the path uses the link weight as the main path generation criterion by starting with the desired initial node and choosing as the next node the one with maximum similarity to the current node. This last strategy is known as a depth-first search.

When individual text excerpts are selected for path formation or summarization, a number of factors receive special attention which includes:

a) coherence of the resulting text, i.e., the ease with which the text can be read and understood
b) exhaustive of coverage of the final text, i.e., the degree to which all the main subject areas are covered
c) text chronology, i.e., the accuracy with which timing factors are recognized
d) The amount of repetition in the selected text excerpts Text chronology is often maintained by the use of only forward-pointing paths and backtracking is not allowed (if a particular paragraph is included in a path, no other text excerpt appearing earlier in the same text can appear in the same path).

Text coherence is used as the main criterion, and forward depth-first paths are used in which each chosen text excerpt is linked to the most similar text excerpt. In a depth-first path, each chosen excerpt is closely related to the next one to minimize the chance of poor transitions between selected paragraphs.

A depth-first path provides a coherent body of information in practically every subject environment. If there is repetition of subject coverage in two or more excerpts in a given path, repeated text passages are eliminated by a sentence-sentence comparison, and removal of duplicate occurrences of sufficiently similar sentences. Alternatively, a shorter excerpt replaces a larger text excerpt in a path with large similarity to the previous text element. An additional method of reducing the path size is to use theme generation methods to obtain text excerpts.

5. Text Summarization

By judicious text extraction methods, collections of text passages are identified that provide adequate coverage of the subject areas of interest. Homogeneous text relation maps produce a good summary using the longer text-traversal paths in chronological (forward) text order.

When the text relation map is substantially disconnected, the text-traversal process does not produce comprehensive summaries. In that case, adequate subject coverage is generally obtained by taking the initial paragraph of the document under consideration, followed by the best paragraph for each text theme.

When paths and themes are used for text summarization, longer summaries are obtained compared to text relation maps generated with low similarity thresholds. This produces denser maps with large number of text links. The themes partly overlap and the summaries obtained by text extraction are discursive. Contrariwise, when high similarity thresholds are used, the maps and themes are disconnected and the summaries are sparser.

Representative computer programs that are useful for automated abstraction of the instant invention include but are not limited to programs which use vector space diagrams and weighted relevance terms, probabilistic and lexical programs. The preferred system comprises consolidation features of these and other programs. Any comprehensive automated text abstraction system, which produces an acceptable outline, is useful in the present application including but not limited to any combination of the above programs. Features of several statistical systems may be adapted for use in the text abstraction function of the present invention.

The vector space system is a fully automatic text processing system which uses synonym dictionaries, hierarchical arrangements of subject identifiers, phrase-generating methods in order to obtain the content identifications useful for the abstracting process. The system does not rely on manually assigned keywords or index terms for the identification of text material and search requests, nor does it use primarily the frequency of occurrence of certain words or phrases included in the text.

The following systems incorporated into the vector space program for text analysis are of principal interest:

a) A system for separating English words into stems and affixes which can be used to reduce incoming texts into word stem form.

b) A synonym dictionary or thesaurus which replaces significant word stems by concept numbers, each concept representing a class of related word stems.

c) A hierarchical arrangement of the concepts included in the thesaurus which makes it possible, given any concept number, to find its "parent" in the hierarchy, its "sons," "it's "brothers," and any of a set of possible cross references.

d) Statistical association methods which compute similarity coefficients between words, word stems, or concepts, based on co-occurrence patterns between these entities in the sentences of a text or in the texts of a collection; associated items can then serve as content identifiers in addition to the original ones.

e) Syntactic analysis methods which permit the recognition and use, as indicators of text content, of phrases consisting of several words or concepts where each element of a phrase must hold a specified syntactic relation to each other element.

f) Statistical phrase recognition methods which operate like the preceding syntactic procedures by using a reconstructed phrase dictionary, except that no test is made to ensure that the syntactic relationships between phrase components, are satisfied.

g) Request-subject matter matching procedures which make it possible to use a variety of different correlation methods to compare analyzed texts with analyzed requests, including concept weight adjustments and variations in the length of the text being analyzed.

Text material is processed by the system without any prior manual analysis using one of several hundred automatic content analysis methods; subject matter which most nearly matches a given search request is identified. Specifically, a correlation coefficient is computed to indicate the degree of similarity between key terms and phrases and each search request, and each is ranked in decreasing order of the correlation coefficient. Then a cutoff is selected, and key text terms and phrase above the chosen cutoff are withdrawn from the file and turned over to the user as answers to the search request.

Individual Components of the Automated System

1. Term Weighting

The standard text content vector matching methods is used to identify the subject matter whose word stem vectors are sufficiently similar to the query vectors. The system retains a large number of content indicators, and the larger number and greater diversity of the terms compensate for the lack of precision in the term selection. Two main operations are needed to transform the word stem vectors into useful term vectors:

a) Term weight is assigned to each term reflecting the usefulness of the term in the text material under consideration b) Terms whose usefulness is inadequate as reflected by a low term weight are transformed into better terms.

The term weighting task is separated into two parts:

a) the term characteristics within the text material b) the term function in the remainder of the text material.

Terms that exhibit high importance in the subject matter to which they are assigned, are those that that show high occurrence frequencies in the text material. At the same time, the best terms are able to distinguish the text subject matter to which they are assigned from the remainder of the subject matter. The importance of a given term in specific subject matter is conveniently measured by the frequency of occurrence in the text. The usefulness of the term in the subject matter as a whole is reflected by the term discrimination value, or by an inverse function of the subject matter frequency (that is, the number of subject areas to which the term is assigned).

Terms with a low weight according to expression are deleted from the indexing vocabulary. The deletion of broad, high frequency terms causes losses in recall, and the elimination of specific, low frequency terms impairs precision. Ranked retrieval and relevance feedback are implemented in binary indexing systems where the index terms are either present or absent from the subject matter and query vectors. However, the text material is easier to rank when weighted terms are assigned to the queries, and to the key terms in the text material, because a composite query subject matter similarity coefficient is computed for each query-text subject matter pair based on the weights of matching query-key terms.

In the present system, text subject matter is represented by a vector of terms and each vector is stored as a complete entity, the use of term weights presents no conceptual problem, because a term weight is simply listed with each term identification in the corresponding term vector. In binary inverted file systems, the term weighting information is included in the various inverted lists.

To compute the cosine measure of expression for the inverted file (binary) system, an additional normalization factor consisting of the sum of the squares of all term weights included in each subject matter and each query is needed. This makes it necessary to provide for each subject matter a certain factor. These factors are computed in advance for each subject matter and stored in a special "subject matter length" file, which is accessed for all subject matter that has a non-zero similarity with the query. The expanded inverted subject matter reference lists together with the subject matter length file permit the computation of the full cosine similarity measure for all terms sharing one or more terms with the query, followed by the ranking of subject matter in decreasing order of the query-text material similarity.

Finding a proper term weighting scheme is critical in term-based retrieval since the rank of the subject matter is determined by the weights of the terms it shares with the query. One popular term weighting scheme, known as tf.idf, weights terms proportionately to their inverted subject matter frequency scores and to the subject matter frequencies (tf). The subject matter length usually normalizes the in-text frequency factor, that is, it is more significant for a term to occur in a short 100-word abstract, than in a 5000-word article. The following terms and principles are used:

a) Terms that occur fairly frequently in a text, which supports only general-type queries (e.g., "all you know about X").

b) Attaching low weights to infrequent, highly specific terms, such as names and phrases, whose only occurrences in the subject matter are often decisive for relevance.

The weighting scheme is altered so that the phrases (but not the names) are more heavily weighted by their idf scores while the text material frequency scores are replaced by logarithms multiplied by sufficiently large constants. In addition, the top N highest-idf matching terms (simple or compound) are counted.

The selection of a weighting formula is partly constrained by the fact that text-length-normalized tf weights are precomputed at the indexing stage and are not altered without re-indexing of the entire database. The maximum number of terms on which a query is permitted is restricted to match the text subject matter to N highest weight terms, where N can be the same for all queries or may vary from one query to another. This is not the same as simply taking the N top terms from each query. Rather, for each text subject matter for which there are M matching terms with the query, only those which have highest weights, will be considered when computing the text subject matter score. Moreover, only the global importance weights for terms are considered (such as idf), while either taking a log or replacing them with a constant suppresses local key term frequency. Changing the weighting scheme for compound terms, along with other minor improvements (such as expanding the stop word list for topics, or correcting a few parsing bugs) can lead to an overall increase of precision.

c) Derivation of the Relevance Number

A judgment is made on each term on a probabilistic basis, i.e., to assert that a given term may hold with a certain degree or weight. Given the ability to weight index terms, one can characterize more precisely the information content of text material. The indexer assigns a low weight such as 0.1 or 0.2 to a term, rather than to say that the term does not hold for the text. Conversely, the indexer assigns a weight of 0.8 or 0.9 to a term, rather than to say that it definitely holds for the text subject matter. Thus, given weighted indexing, it is possible to more accurately characterize the information content of the text. The notion of weighting the index terms that are assigned to subject matter and using these weights to compute relevance numbers is basic to the technique called probabilistic indexing.

4. Vector Generation

The text material indexing process or the method is used to construct the text material vectors. The basic function of an indexing system is the segregation of the subset of text material relevant to a query from the remainder of the subject matter. Preferably, all the relevant items might then occur in one or more key term clusters, whereas the nonrelevant items are placed in separate clusters. Such an ideal subject matter space is constructed by assigning to the relevant text set the terms utilized by the user to formulate the corresponding search requests.

In practice, it is not possible to find a single clustering which is ideal for all subject areas and all users, even given full relevance information in advance. Furthermore, new text material must necessarily be processed without the use of term relevance information. The best method is to use index terms capable of distinguishing each particular key term from the remainder of the subject matter. This is achieved by using as a controlling criterion the frequency of each term in the subject matter. The term discrimination theory indicates that the preferred terms are medium-frequency terms that are assigned to a few text subject matter but not to the rest of the subject matter.

In the present system, the text material (or the text of the query statements obtained from the user) is analyzed automatically. Terms whose frequency is neither too large nor too small are incorporated directly into the query vectors for indexing purposes. Terms whose frequency in text material exceeds a given threshold are considered too broad and unspecific and are rendered more specific by being combined with other terms into term phrases before assignment to the subject matter and query vectors. On the other hand, terms with a very low frequency covering one or two areas of subject matter are considered too specific; they are broadened by grouping them into term classes of the kind found in a thesaurus of terms. The thesaurus class identifiers are then incorporated into the term and subject matter vectors instead of the individual rare terms.

a) Vector Processing Model

The vector-processing model is implemented as follows: Indexing terms are regarded as the coordinates of a multidimensional information space. Text material (key phrases and terms) and queries are represented by vectors in which the element, denotes the value of the each term, with the precise value of each such element being determined by the particular term weighting scheme that is being employed. The complete set of values in a vector describes the position of the text material or query in the space, and the similarity between a text material and a query (i.e., their separation in the space) is then calculated by comparing their vectors using a similarity measure such as the cosine coefficient.

This simple, geometric interpretation of retrieval provides a unifying basis for a very wide range of text discrimination operations, including indexing, relevance feedback, and subject matter classification. Indexing involves the assignment of content descriptors to text material in such a way that the latter is readily distinguished from each other by a query.

Indexing in this model separates subject matter from each other in the multidimensional term space. The word-frequency information, which determines the selection of the output sentences, comes entirely from within the text and these relative frequencies are used as criteria for scoring and selecting sentences. Two classes of words are determined i.e., generic words and discriminating words. Generic words are those common to many of the terms in the cluster, and therefore the words whose co-occurrences cause the map structure. Discriminating words are those, which indicate some special purpose or motive of a text material. The effectiveness of a potential indexing term is assessed by its discrimination value, which quantifies the extent to which the use of that term leads to the text subject matter in a database being separated from each other. There is an interactive component of the program wherein the user can provide cognitive input on generic and discriminating words according to his perception of the significance of the cluster, which is known as relevance feedback.

b) Vector Representation and Similarity Computation

The system is characterized as follows:

1) uses fully automatic indexing methods to assign content identifiers to text material and search requests 2) collects related words and phrases into common subject classes, making it possible to start with specific items in a particular subject area and to find related items in neighboring subject fields 3) identifies the key words and phrase by performing similarity computations between stored items and incoming queries, and by ranking the selected items in decreasing order of their similarity with the main subject matter (4) includes automatic procedures for producing improved abstract statements based on information obtained as a result of earlier excerpting operations.

Each term or phrase is represented by a vector of terms. Each term or phrase or collection of terms and phrase in text material represents the weight or importance of the term. By "term" is meant some form of content identifier such as a word extracted from a text, a word phrase, or an entry from a term thesaurus. A given text collection is then represented as an array, or matrix of terms where each row of the matrix is represented and each column represents the assignment of a specific term to the subject matter of the text. Positive term weights above zero are chosen for terms actually assigned to the subject matter of the text c) Automatic Indexing Tools The indexing system is based on language analysis tools as follows:

1. Synonym dictionaries, or thesauruses, are used to group the individual terms into classes of synonymous or related terms. When a thesaurus is available, each original term is replaced by a complete class of related terms, thereby broadening the content description.

2. Hierarchical term arrangements are constructed to relate the content terms in a given subject area. With such preconstructed term hierarchies, the standard content description is "expanded" by adding to a given content description hierarchically superior (more general) terms as well as hierarchically inferior (more specific) terms.

3. Syntactic analysis systems serve for the specification of the syntactic roles of the terms and for the formation of complex content descriptions consisting of term phrases and larger syntactic units. A syntactic analysis system is used to supply specific content identifications and it prevents confusion between compound terms.

4. Semantic analysis systems supplement the syntactic units by using semantic roles attached to the entities making up a given content description. Semantic analysis systems utilize various kinds of knowledge extraneous to the text, often specified by preconstructed "semantic graphs" and other related constructs.

The stepwise process is as follows:

1. The individual words that make up an abstract or a query text are first recognized.

2. A stop list, comprising a few hundred high-frequency function words, such as "and," "of," "or," and "but," is used to eliminate such words from consideration in the subsequent processing.

3. The scope of the remaining word occurrences is broadened by reducing each word-to-word stem form using relatively simple suffix removal methods together with special rules to take care of exceptions.

4. Following suffix removal, multiple occurrences of a given word stem are combined into a single term for incorporation into the text material or query vectors.

5. Correlation Between Indexing Performance and Space Density

In this process, certain word stems are extracted from text material and weighted in accordance with the frequency of occurrence of each term in text material a method known as term-frequency weighting. Recall-precision graphs are used to compare the performance of this standard process against the output produced by more refined indexing methods. Typically, a recall-precision graph is a plot giving precision figures, averaged over a number of user queries, at ten fixed recall levels, ranging from 0.1 to 1.0 in steps of 0.1.

The better indexing method produces higher precision figures at equivalent recall levels. One of the best automatic term weighting procedures consists of multiplying the standard term frequency weight by a factor inversely related to the subject matter frequency of the term (the number of subject matter in the collection to which the term is assigned). A term weighting system assigns the largest weight to those terms, which arise with high frequency in individual terms, but are at the same time relatively rare in the text material as a whole.

Decreased performance implies increased space density and is tested by carrying out term weighting operations inverse to the ones previously used. Specifically, since a weighting system in inverse subject matter frequency order produces a high recall-precision performance, a system which weights the terms directly in order of their term frequencies (terms occurring in a large number of areas in a text receive the highest weights) should be correspondingly poor.

6. Probabilistic Models

Most probabilistic retrieval models incorporate information about the occurrence of index terms in relevant and non-relevant subject matter. Based on a probabilistic model, strategies are proposed for the initial outline and an intermediate outline. The intermediate outline is useful substitute for an outline based on relevance feedback search.

Probabilistic models of abstract generation provide a theoretical basis for methods, which have previously relied on heuristics. A major assumption made in these models is that relevance information is available. Classifying key terms on the basis of the query and presenting them to the user for judgment as relevant or non-relevant obtain partial relevance information. This process of obtaining relevance information and using it in a further search is called relevance feedback which is the information about the relevant text material that is the most important since the characteristics of the non-relevant subject matter is approximated by those of the entire collection. For relevance feedback to be effective, the initial outline using the query should present a relevant outline to the user. The application of probabilistic models to the initial search is used to improve the outlining effectiveness of this search.

Regarding methods for improving the initial search, the simplest approach to this search is to rank the subject matter and key terms according to the number of index terms in common with the query (sometimes called a coordination level search). Terms are weighted using inverse subject matter frequencies and clusters of key terms are searched rather than the key terms themselves. The same probabilistic model for the initial search is used for the relevance feedback search.

The second stage depends on the relevance information obtained in the first stage by presenting retrieved subject matter to the user. The initial search should provide relevant terms at the top end of the ranked list of terms. This leads to the associated problem of methods for dealing with queries, which do not elicit key terms at the top of the ranked list. The outline process is therefore a two-stage application of a probabilistic model where the main difference between the stages is the increase in the amount of relevance information available.

A probabilistic model of abstracting is thus applied to two searches, which can occur before relevance feedback, the initial search and the intermediate search. For the initial search there is no relevance information available whereas for the intermediate search the relevance information is derived from the top-ranking terms or clusters of the initial search. This combination match performed better than the simple match, the match using inverse subject matter frequency weights and the match using the cosine correlation. The combination match is the most effective initial search. A cluster search is a good alternative initial search strategy.

Each subject matter is assumed to be described by a binary vector $x=(x_1, x_2, \ldots x_y)$ where $x_i=0$ or 1 indicates the absence or presence of the ith index term. A decision rule can be formulated by which any subject matter can be assigned to either the relevant or the non-relevant subject matter for a particular query. The rule is to assign a subject matter to the relevant set if the probability of the subject matter being relevant given the subject matter description is greater than the probability of the subject matter being non-relevant, i.e., if:

$$P(\text{Relevant}/x) > P(\text{Non-Relevant}/x)$$

A more convenient form of the decision rule is found by using Bayes' theorem. This new rule when expressed as a weighting function is:

$$g(x) = \log P(x/\text{Relevant}) - \log P(x/\text{Non-Relevant})$$

This means that instead of making a strict decision on the relevance of a key term, the terms are ranked by their value such that the more highly ranked a subject matter is, the more likely it is to be relevant.

The probabilities P(x)Relevant) and P(x/Non-Relevant) are approximated in a number of different ways. If the assumption is made that the index terms occur independently in the relevant and non-relevant key terms then:

$P(x/\text{Relevant})=P(x_1/\text{Relevant})P(x_2/\text{Relevant})\ldots P(x_y/\text{Relevant})$ and similarly for $P(x/\text{Non-Relevant})$. Let $pi=P(x_i=1/\text{Relevant})$ and $q_i=P(x_i=1/\text{Non-Relevant})$ where these are the probabilities that an index term occurs in the relevant and non-relevant sets respectively.

The second term of this function is constant for a given query and will not affect the ranking of the subject matter. The first term involves a summation over all the terms in the text but this summation is usually restricted to just the query terms. This function is then equivalent to a simple matching function between the query and the subject matter wider query term 1 has the weight $\log p_i(1-qi)/(1-p_i)q_i$. If the terms are assumed to be not independently distributed then more accurate approximations for $P(x/\text{Relevant})$ and $P(x/\text{Non-Relevant})$ are possible.

When the model is applied to a retrieval system, the binomial parameter p is estimated from the sample of relevant subject matter obtained by use judgments and q is usually estimated from the total subject matter. The effect of this assumption is seen by splitting the first term of g(x) into two parts.

Where no relevance information is available, the best function for ranking the subject matter is a combination of a simple match and a match using inverse subject matter frequency weights. This function is referred to as the combination match.

Another possible application of the model is to introduce an intermediate search between the initial search and the relevance feedback search. The subject matter at the top of the ranking produced by the initial search has a high probability of being relevant. The assumption underlying the intermediate search is that the subject matter is relevant whether in actual fact they are or not. Therefore before asking the user to give relevance judgments a search is performed in which the top few subject matters are used to provide estimates for $p_i$. The intermediate search would be most useful if the process of interacting with the user to obtain relevance judgments is very expensive or even impractical.

Another application arises when the query does not retrieve any relevant subject matter at a particular cutoff. In this case, the user has judged all the retrieved subject matter as being non-relevant whereas the intermediate search is performed before the user looks at any of the subject matter.

Thus the combination of match, the intermediate search and the negative feedback search are all based on the same probabilistic model and in each case no relevant subject matter is known. The differences in the searches are in the method of estimating the p, values.

7. Parsing: Automatic Abstract Generation by Linguistic Processing

Computer generates abstracts by extracting from text material those sentences, which describe the central subject matter and findings of the paper. Sentences are selected on the basis of various statistical, grammatical, positional and presentational clues. Concatenations of extracted sentences show a lack of cohesion, due partly to the frequent occurrence of anaphoric references. Sentences, which contain non-anaphoric noun phrases and introduce key concepts into the text, are worthy of inclusion in an abstract. In this process key concepts are identified which faithfully reproduce the essence of the text material. The text processing used to identify these anaphors, which enhance the sentence selection criteria, is described. Text processing is necessary to identify these anaphors so that their effects are neutralized in the sentence selection criteria. The sentence selection and rejection rules are coupled to automatic abstracting techniques described above.

Anaphora is often used only to designate pronouns as they operate within the sentence. Coherent texts comprise sequences of sentences or other linguistic units each with a discernable relation of meaning to its predecessors. Successive sentences either discuss further properties of a real or abstract object, related objects, or events instigated or affected by the objects.

Definite noun phrases (DNP) are phrases like the motor, which can refer over long distances. DNPs may involve reference to objects introduced into the discourse by quite different noun phrases (a Ford car, the vehicle or the engine etc). DNPs can also refer back to events, "X bought the purchase". The objective is to analyze texts to find chains of DNPs and to ascertain how far back in the text one should be expected to look to resolve each DNP. These sentences fail to be propositions. It is assumed that the anaphors must be resolved within the boundaries of a proposition: thus the aim is to identify the points in the text where new propositions begin.

Grammatical criteria are used to identify points in the text where new concepts are introduced. Those sentences, which introduce important concepts and do not refer to discourse entities previously mentioned in the text are candidates for extraction. Thus, a new criterion for selecting isolated sentences for abstracting is adopted.

The outcome is a set of heuristics to identify non-anaphoric noun phrases and the selection of sentences containing these key concepts for abstracting. Summaries of those which form part of the sentence selection or rejection criteria are presented here. Text processing, which is necessary to exploit the grammatical clues and text structure in abstracting, is presented.

a) Sentence Selection Rules

The methodology represents an extension of the sentence selection, extraction and rearrange methods. The system is constructed out of two rule sets, the first of which is a selective tagger and parser derived from a similar approach. The tagger assigns grammatical tags to each word in the text according its morphological structure using criteria on the kinds of ending (or suffixes) words will take. The parser is used to disambiguate the tags and in the process structures the sequence of these word categories according to a grammar.

The second rule set identifies two classes of sentence in the source text for inclusion in the abstract. The sentence selection/rejection rules make use of and develop indicator phrases and clue words. Some of the rules specify rhetorical constructs indicating the relative salience of sections of text (conclusions have high salience, references to previous work have low salience and so on). These are mostly concerned with sentence rejection. Other rules rely on logical and linguistic hypotheses about text structure, and exploit more narrowly grammatical criteria to identify points in the text where new concepts are introduced. Sentences lacking anaphors and not introduced by rhetorical connectives frequently introduce key information into a discourse. These two rule sets, to identify non-anaphoric sentences and to identify sentences containing an indicator phrase, are the only sentence selection rules used in the system. Further rules, as stated above, are concerned with the elimination or rejection of sentences. The sequence of the sentence selection rules is based on an adaptation of Definite Clause Grammar (Pereira and Warren) rules are described in Black and Johnson.

Non-anaphoric sentences introduce key concepts into the text. A sentence is rejected if it is introduced by a connective or by an anaphoric prepositional phrase. These sentences are dependent on others in the text and should not be included. This also applies to a connective, which occurs before or just after the main verb. For example, the following sentence would be rejected because the connective "however" appears just after the verb indicating that the statement relies on some previous sentence for its full interpretation.

This approach to sentence selection depends on the ability to recognize anaphoric noun-phrases in a sentence and also any rhetorical structures. Most of the rules are implemented without recourse to real parsing. However, parsing requires that definite noun-phrases (DNPs) be recognized. As such, it requires that text be unambiguously tagged to permit noun-phrase parsing.

The system defines an implementation of the sentence selection and rejection rules as a series of text filters, using the tagger and parser developed for this purpose. The first filter subjects a text to morphological and lexical analysis, assigning grammatical tags to words. This is referred to as initial tagging. Partial parsing to identify the noun-phrases required by the abstracting rules then disambiguates multiple tag assignments. This filter works selectively, only assigning tags where they are required by the sentence selection rules. The use of a parser to disambiguate tags means that a corpus for statistical analysis is not necessary, as in the stochastic methods. Also, the parser segments the sentence into phrasal units rather than relying on a full linguistic analysis with an extensive grammar. This ensures that there is no restriction on the type of sentence structure which the system will attempt to parse, thus for example it will not fail when faced with a garden path sentence, e.g., the largest rocks during the experiment, where local ambiguity forces a parser to backtrack to arrive at a single correct interpretation.

The only manual intervention required is the initial pre-editing of the texts to separate out headings, captions, figures and formulae, and to mark up the start of each new paragraph. This is, in principle, automatable, particularly assuming access to marked up versions of the text. The information is used at a later automated stage to record structural information, which may be used in abstracting.

b) The Dictionary

The construction of a dictionary is important in tagging, since the words in the dictionary carry information about the syntactic structure of a sentence. The initial tag assignment is performed on the basis of a limited dictionary (e.g., 300 words) consisting of most function words and some content words (such as all adverbs not ending in -ly and common verbs do, be and have). Exceptions to the morphology rules are induced, e.g., the irregular forms of the nouns women, men. This allows for the assumption that all plural nouns and s-forms of verbs can be identified. The dictionary lists all the possible parts-of-speech for each word. For instance, the word after has the possible tags preposition, adverb, or adjective.

An extract of the dictionary with its information in the format word and tag is shown below. The features associated with determiners (ana, non) state whether they form anaphoric noun-phrases and the second feature (s,p) state whether the determiner when combined with a noun will form a singular or plural noun-phrase. The features of verbs and auxiliaries (pres, past, ing) state the tense.

c) The MorphologyAnalyzer

The majority of content words not listed in the dictionary can be tagged using morphological information about suffixes (usually, -meet, -ness indicate nouns, -ous, -cal indicate adjectives and -ly adverbs). Various checks are used to avoid incorrect assignments. In general, the stem must contain at least three letters. For example, only words with more than three letters ending in -s are assigned the associated tag of plural noun or s-form verb. This excludes bus and gas. A check to ensure that the penultimate letter is not s, u or rules out s-form tagging of discuss, surplus and analysis. In addition to these rules, a word containing a capital letter is tagged as a likely proper noun. The program for the recognition of word endings was written in C using the UNIX LFX utility for pattern matching.

The default categories of single noun or base form verb are assigned to any word, which does not comply with the morphology rules. The majority of new words will be nouns, abbreviations or proper names. An unknown word may also be an adjective, but since adjectives and nouns occur interchangeably in similar positions in our grammar the information lost by treating adjectives as nouns is not considered to be important in this application.

d) The Parser

Definite Clause Grammar rules are adapted for use with a bottom-up parser by storing the results on the arcs of a chart. The basic principle of bottom-up parsing is to reduce the words whose categories match the right hand side of a grammar rule to a phrase of the type on the left hand side of the rule. There are several rule invocation strategies for chart parsing. A left corner parsing strategy is used which is based on an interaction of data-driven analysis and prediction based on grammar rules. Some state-of-the-art heuristics are used to cut the parser's search space roughly by a third. Details of the implementation are recorded in Johnson, Black, Neal and Paice.

e) The Grammar

The left corner chart parsing strategy is used with a predominantly noun-phrase grammar to return a partial analysis of the text. The NP grammar can correctly identify NPs especially when they are separated by an auxiliary verb, a common verb or a determiner, which signals the end of a verb-phrase. The NPs selected for these sentences are given from their start to end position.

f) The Global Parser

The determination of higher-level syntactic structures that link these groups together is difficult, especially when dealing with unrestricted text. The approach is to recover the units that occur in-between the NPs initially selected. In the global parser these are acceptable units to occur between NPs and for the NPs to be accepted as correct. Further illustration of the global parsing indicates the categories, which appear between two NPs. The parser only does what is necessary in this application and in doing so reduces the search space and thus the time taken.

An enhanced sentence selection method for automatic abstracting may be used, which relies on grammatical criteria to identify desirable isolated sentences to include in an abstract. A simple system, based on the limited resources of a dictionary, morphological analyzer and noun-phrase parser, is used. The advantage of using a partial grammar and a chart parser for simple abstracting procedures means that no restrictions are placed on the text to be abstracted.

The effectiveness of statistical text subject matter abstraction is enhanced by use syntactic compounds to represent the text material and in the user queries, coupled with an appropriate term weighting strategy. For terms that represent text subject matter, e.g., words, syntactic phrases, fixed phrases, and proper names, various levels of "regularization" are needed to assure that syntactic or lexical variations of input do not obscure underlying semantic uniformity. This kind of normalization is achieved through the following processes:

1) Morphological stemming: e.g., retrieving is reduced to retriev;

2) Lexicon-based word normalization: e.g., retrieval is reduced to retrieve;

3) Operator-argument representation of phrases: e.g., information retrieval, retrieving of information, and retrieve relevant information are all assigned the same representation, retrieve+information;

4) Context-based term clustering into synonymy classes and subsumption hierarchies: e.g., take-over is a kind of acquisition (in business), and FORTRAN is a programming language.

An advanced NLP module is inserted between the textual input (new subject matter, user queries) and the database search engine (in our case, the PRISE system). This design produces a better performance than the base statistical system (Strzalkowski, 1993). This system is completely automated, including the statistical core and the natural language processing components and no human intervention or manual encoding is required.

In this system, the text subject matter is first processed with a sequence of programs that include a part-of-speech tagger, a lexicon-based morphological stemmer and a fast syntactic parser. Subsequently certain types of phrases are extracted from the parse trees and used as compound indexing terms in addition to single-word terms. The extracted phrases are statistically analyzed as syntactic contexts in order to discover a variety of similarity links between smaller subphrases and words occurring in them. A further filtering process maps these similarity links onto semantic relations (generalization, specialization, synonymy, etc.) after which they are used to transform a user's request into a search query.

The user's natural language request is also parsed and all indexing terms occurring in it are identified. Certain highly ambiguous, usually single-word terms are dropped, provided that they also occur as elements in some compound terms. For example, "natural" may be deleted from a query already containing "natural language" because "natural" occurs in many unrelated contexts: "natural number", "natural logarithm", "natural approach", etc. At the same time, other terms may be added, namely those which are linked to some query term through admissible similarity relations. For example, "unlawful activity' is added to a query containing the compound term "illegal activity" via a synonymy link between illegal" and "unlawful".

Removing low-quality terms from the queries is as important (and often more so) as adding synonyms and specializations. In some instances (e.g., routing runs), low-quality terms are removed (or inhibited) before similar terms are added to the query or else the effect of query expansion is all but drowned out by the increased noise.

After the final query is processed, the database search follows, and a ranked list of subject matter or key terms is returned. It should be noted that all the processing steps, those performed by the backbone system, and those performed by the natural language processing components, are fully automated, and no human intervention or manual encoding is required.

To summarize, content characterization here involves defining a suitable selection procedure, operating over a larger set of phrasal units than that generated by a typical term identification algorithm (including not only all terms, but term-like phrases, as well as their variants, reduced forms, and anaphoric references), with the following properties. First, it reduces this set to a list of expressions that uniquely refer to objects in the discourse (the referent set). Second, it makes informed choices about the degree to which each phrase is representative of the text as a whole. Finally, it presents its output in a form which retains contextual information for each phrase. The key to normalizing the content of a document to a small set of distinguished, and discriminating, phrasal units is establishing a containment hierarchy of phrases (term-relational context-clause-sentence-paragraph- and so forth; this would eventually be exploited for capsule overview presentation at different levels of granularity), and being able to make refined judgments concerning the degree of importance of each unit, within some segment of text.

The goal is to filter a term set in such a way that those expressions which are identified as most salient are presented as representative of document content. This process of "salience-based content characterization" builds on and extends the notion of salience that forms a crucial component of the anaphora resolution procedure developed by (Lappin & Leass 1994). Moreover, it presupposes very little in the way of linguistic processing, working solely on the basis of the shallow analysis provided by the LINGSOFT tagger. It thus meets the desired requirement of domain independence, permitting extension of the technology to a wide range of texts, without regard to genre, style, or source.

8. Lexical Chains

Lexical chains can serve as a source representation of the original text to build a summary. The next question is how to build a summary representation from this source representation. The most prevalent discourse topic plays an important role in the summary. Lexical chains are a good indicator of the central topic of a text. The summary representation reflects that all these words represent the same concept. Otherwise, the summary generation stage would extract information separately for each term.

For each text, chains are manually ranked in terms of relevance to the main topics. Different formal measures on the chains then computed, including chain length, distribution in the text, text span covered by the chain, density, graph topology (diameter of the graph of the words) and number of repetitions.

a. Extracting Significant Sentences

Once strong chains have been selected, the next step of the summarization algorithm is to extract full sentences from the original text based on chain distribution.

Choose the sentence that contains the first appearance of a chain member in the text. This heuristic produces the summary for the text. A second heuristic based on the notion of representative words is defined: For each chain in the summary representation, the sentence that contains the first appearance of a representative chain member in the text is chosen. Often, the same topic is discussed in a number of places in the text, so its chain is distributed across the whole text. Still, in some text unit, this global topic is the central topic (focus) of the segment. This unit is identified and sentences extracted related to the topic from this segment (or successive segments) only.

For each chain, the text unit where the chain is highly concentrated is identified. The sentence with the first chain appearance in this central unit is extracted. The third heuristic extracts sentences from the middle of the text and several sentences from distant places in the text for a single chain. The best chain for a text is chosen based on the number and weight of different relations in the chain.

Text coherence models in summarization are exemplified by Marco who uses a rhetorical parser for unrestricted text that exploits cue-phrases to build rhetorical structure theory (RST) trees out of clauses in the text. The salience scores are then be used to extract corresponding sentences or clauses to form summaries.

9. Extracting Text

Each component of a summary needs to be instantiated by one or more passages extracted from the original text. These can be paragraphs, paragraph parts, sentences, or even sentence fragments. A well thought out paragraph structure organizes information within a text is exploited for summarization. Content-based segmentation techniques may be applicable.

The following list discusses the passage selection criteria in general.

a) Words and phrases frequently occurring in a text are likely to be indicative of content especially if such words or phrases do not occur often elsewhere.

b) Title of a text is often strongly related to its content. Therefore, words and phrases from the title are considered as important indicators of content concentration within a document.

c) Noun phrases occurring in the opening sentences of multiple paragraphs, or those used in the subject phrases or even as the first non-trivial phrase in multiple sentences tend to refer to entities that are central to text content.

d) Words and phrases occurring in only some paragraphs are weighted more highly than those scattered across the entire document, because such terms are more likely to be discriminators of summary passages. In generic summarization this score is set up so that the summary-worthiness of paragraphs is decreasing, as we read deeper into the text. Examples of summary cue phrases include: "In summary", "To sum up", "The point is", etc.

e) Paragraphs that are closer to the beginning of a news report tend to be more content-loaded than those towards the end. This ordering may be reversed in editorial-like texts. Therefore, the position of each passage carries an additional score. Position scoring is appropriate in generic summarization, but arguably not in topic-based summarization, where themes which are not necessarily central to the original text need to be summarized. In generic summarization this score is set up so that the summary-worthiness of paragraphs is decreasing as one reads deeper into the text. In many cases, a summarizer does not need to look beyond the first 6-7 paragraphs. In the subsequent versions, it has been replaced by a score supplement for summaries containing either the first or the second paragraph of a document. This way, the summarizer naturally defaults to the opening segment of a document if no other information is available to guide the passage selection.

f) Proper names of people, places, organizations, etc., various acronyms, numerical amounts, etc. are likely to refer to factual data that can improve the informativeness of a summary. At present score supplements are added to passages containing names or numbers, if the summary is requested to be an informative digest (approx. 30% of the original).

g) Certain cue phrases explicitly suggest that what follows is a summary or the main point of an article. Passages containing such cues should therefore be preferred for selection. Examples of summary cue phrases include: "In summary", "To sum up", "The point is", etc. In general, such heuristics are of little use, except in summarizing editorials or commentaries, where the usual top-down flow of arguments is frequently reversed. They are not at present implemented in this summarizer.

h) The process of passage selection closely resembles query-based subject matter retrieval. The "documents" here are the passages (paragraphs), and the "query" is a set of words and phrases collected from the title and from across the document. This analogy, while not entirely accurate, is nonetheless a useful one since other proven IR techniques may be applicable to summarization. Specifically, automatic query expansion techniques discussed later in this chapter may benefit the passage search process. We are currently experimenting with such options.

The background section supplies information that makes the summary self-contained. Passages may also be connected via rhetorical and other discourse relations. If a full discourse analysis is an unpalatable option, we can resort, again, to supplying a background/context passage.

10. The Generalized Summarization Algorithm a) Segment text into passages. If no paragraph or sentence structure is available, use approximately equal size chunks.

b) Build a paragraph-search query out of the content words, phrases and other terms found in the title, a user-supplied topic description (if available), as well as the terms occurring frequently in the text. A background link from passage N+1 to passage N means that if passage N+1 is selected for a summary, passage N must also be selected.

c) Normalize passage scores by their length, taking into account the desired target length of the summary. With sum over unique content terms q. In extreme cases, to prevent obtaining empty summaries, the summarizer will default to the first paragraph of the original text. Add premium scores to groups based on the inverse degree of text discontinuity measured as a total amount of edited text material between the passages within a group.

d) Rank passage groups by score. All groups become candidate summaries. Select the top scoring passage or passage group as the final summary.

e) Length of the original text: Discard all passages with length in excess of 1.5 times the target length. This reduces the number of passage combinations the summarizer has to consider, thus improving its efficiency. The decision whether to use this condition depends upon the user's tolerance to length variability. In extreme cases, to prevent obtaining empty summaries, the summarizer will default to the first paragraph of the original text.

f) Combine passages into groups of 2 or more based on their content, composition and length. The goal is to maximize the score, while keeping the length as close to the target length as possible. Any combination of passages is allowed, including non-consecutive passages, although the original ordering of passages is retained. If a passage attached to another through a background link is included into a group, the other passage must also be included, and this rule is applied recursively. The background links work only one way: a passage which is a background for another passage, may stand on its own if selected into a candidate summary.

g) Recalculate scores for all newly created groups. This is necessary, and cannot be obtained as a sum of scores because of possible term repetitions. Again, discard any passage groups longer than 1.5 times the target length. Add premium scores to groups based on the inverse degree of text discontinuity measured as a total amount of edited text material between the passages within a group. Add other premiums as applicable.

h) Rank passage groups by score. All groups become candidate summaries.

i) Repeat steps 6 through 8 until there is no change in top-scoring passage group through 2 consecutive iterations. Select the top scoring passage or passage group as the final summary.

Many robust summarization systems have opted for statistical sentence extraction: systems have been designed which extract "important" sentences from a text, where the importance of the sentence is inferred from low-level properties which can be more or less objectively calculated. Over the years there have been many suggestions as to which low-level features can help determine the importance of a sentence in the context of a source text, such as stochastic measurements for the significance of key words in the sentence, its location in the source text, connections with other sentences and the presence of cue or indicator phrases or of title words. The result of this process is an extract, i.e. a collection of sentences selected verbatim from the text.

These extracts are then used as the abstract of the text. Assuming that the text is coherent, the semantics gaps between potentially unconnected sentences are filled in. Even if these sentences do not form a coherent text that does not matter much: the extract is short enough to still make sense. Simple sentence extraction methods reduce a 20-page article to a 2-page collection of unconnected sentences, a document surrogate that is not adequate as an abstract. To overcome this problem, abstract-worthy material is selected from the source text, whilst at the same time keeping information about the overall rhetorical structure of the source text and of the role of each of the extract sentences in that rhetorical structure. Rather than attempting a full rhetorical analysis of the source text, just enough rhetorical information is extracted so as to be able to determine the rhetorical contribution of all and only the abstract-worthy sentences, without modeling domain knowledge or performing domain-sensitive reasoning. Abstracting means analyzing the argumentative structure of the source text and identifying textual extracts, which constitute appropriate fillers for the template.

Fusion of Multiple Information Systems

The present invention contemplates the use and fusion of multiple input methods and sources as part of the total apparatus for use as a study method. The source of the material to be abstracted and condensed may be written text, computer-generated textual material, e.g., internet, e-mail, audio sources such as lectures and speeches. The digitized textual material is converted into editable text with OCR technology and then compressed into an outline with summarizer software as described in the above methods. The treatment of audio input involves the combination of automatic speech recognition and text abstracting software. In a one step method, speech recognition and abstracting engine is applied to the audio input to generate a time-marked textual representation or transcription of the speech. In a two step method, the speech is first converted to editable text by voice-to-text software and then rendered into a user understandable outline by the summarizer software operating on the computer system. The entire process can operate in real time in the course of a lecture. For example, the user can view a condensation or outline of an ongoing lecture as the lecture is proceeding. At the conclusion of the lecture, an outline of the entire lecture is displayed on the screen for review and memorization. The amount of detail that the user wishes to retain in the outline can be adjusted by users by referring to the full-length transcript of lecture also recorded and transcribed in the computer.

EXAMPLES

Example 1

Exhibit A:
Shown in FIGS. 6A, 6B and 6C are three jpeg images captured from 3 sequential pages of a contract law textbook with a 5 megapixel back camera of the iPAD3™ using desktop lighting with default camera setting. These jpeg images are imported into the OCR program (FINEREADER 9.0 Professional™) and summarized with the Megaputer™ Summarizer.

Exhibit B:
Shown below is the conversion of the above printed text acquired with the iPAD3™ converted to editable text in WORD format by OCR program ABBYY Professional 9.0™.

Patents

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patents. Section 101 provides: Whoever invents or discovers any new and useful process, machine, manufacture, or composition of matter, or any new and useful improvement thereof, may obtain a patent therefore, subject to the conditions and requirements of this title. Thus, naturally occurring substances are not patentable, as the invention must be made or modified by humans. For example, the discovery of a bacterium with useful properties is not patentable, whereas the manufacture of a genetically engineered bacterium is. See *Diamond, Commissioner of Patents and Trademarks v. Chakrabarty*. By the same token, laws of nature, principles, bookkeeping systems, fundamental truths, methods of calculation, and ideas are not patentable. Accordingly, as Chief Justice Burger noted in *Diamond, Commissioner of Patents and Trademarks v. Chakrabarty*, "Einstein could not patent his law that $E=mc^2$, nor could Newton have patented the law of gravity." Similarly, isolated computer programs are not patentable, although, as mentioned above, they may be copyrighted.

To be patentable as a utility patent, the process, machine, manufacture, or composition of matter must meet three criteria:

1. Novelty—The invention must not conflict with a prior pending application or a previously issued patent;
2. Utility—The invention must possess specific and substantial usefulness, which must be affirmatively disclosed by the application; and
3. Nonobviousness—The invention, in light of the prior art, must not be obvious to a person skilled in such prior art.

In addition to utility patents, the Patent Act provides for plant patents and design patents. A plant patent protects a new and distinctive variety of asexually reproducing plant. Plant patents require (1) novelty, (2) distinctiveness, and (3) nonobviousness. A design patent protects a new, original, ornamental design for an article of manufacture. Design patents require (1) novelty, (2) ornamentality, and (3) nonobviousness. As mentioned above, design patents have a duration of fourteen years; plant patents, like utility patents, have a seventeen-year duration.

Procedure

The United States Patent and Trademark Office issues a patent upon the basis of a patent application containing a specification, which describes how the invention works, and claims, which describe the features that make the invention patentable. The applicant must be the inventor. Before granting a patent, the Patent Office thoroughly examines the prior art and determines whether the submitted invention is nonobvious and has novelty and utility (or distinctiveness or ornamentality, in the case of plant or design patents). An application for a patent is confidential, and the Patent Office will not divulge its contents. This confidentiality ends, however, upon the granting of the patent. Unlike rights under a copyright, no monopoly rights arise until the Patent Office actually issues a patent.

Therefore, anyone is free to make, use, and sell an invention for which a patent application is filed until the patent has been granted. An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance are defenses to contributory infringement, they are not defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

Exhibit C

Shown below are summaries of the above text using the Megaputer summarizer program at varying degrees of compression.

Megaputer TextAnalyst™ Summaries of Varying Lengths

Example for Compression to 21% of Original Text Size

Through a patent, the Federal government grants an inventor a monopolistic right to make, use, or sell an invention to the absolute exclusion of others for the period of the patent, which currently is fourteen years for design patents and seventeen years for all others.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

Before granting a patent, the Patent Office thoroughly examines the prior art and determines whether the submitted invention is nonobvious and has novelty and utility (or distinctiveness or ornamentality, in the case of plant or design patents). Therefore, anyone is free to make, use, and sell an invention for which a patent application is filed until the patent has been granted.

Example of Compression to 30%

Through a patent, the Federal government grants an inventor a monopolistic right to make, use, or sell an invention to the

51 absolute exclusion of others for the period of the patent, which currently is fourteen years for design patents and seventeen years for all others.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

Plant patents require (1) novelty, (2) distinctiveness, and (3) nonobviousness.

The United States Patent and Trademark Office issues a patent upon the basis of a patent application containing a specification, which describes how the invention works, and claims, which describe the features that make the invention patentable.

Before granting a patent, the Patent Office thoroughly examines the prior art and determines whether the submitted invention is nonobvious and has novelty and utility (or distinctiveness or ornamentality, in the case of plant or design patents).

Therefore, anyone is free to make, use, and sell an invention for which a patent application is filed until the patent has been granted.

Example of Compression to 48%

Through a patent, the Federal government grants an inventor a monopolistic right to make, use, or sell an invention to the absolute exclusion of others for the period of the patent, which currently is fourteen years for design patents and seventeen years for all others.

The Patent Act specifies those inventions that may be patented as utility patents.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

A plant patent protects a new and distinctive variety of asexually reproducing plant.

Plant patents require (1) novelty, (2) distinctiveness, and (3) nonobviousness.

Design patents require (1) novelty, (2) ornamentality, and (3) nonobviousness.

plant patents, like utility patents, have a seventeen-year duration.

The United States Patent and Trademark Office issues a patent upon the basis of a patent application containing a specification, which describes how the invention works, and claims, which describe the features that make the invention patentable.

Before granting a patent, the Patent Office thoroughly examines the prior art and determines whether the submitted invention is nonobvious and has novelty and utility (or distinctiveness or ornamentality, in the case of plant or design patents).

52

Therefore, anyone is free to make, use, and sell an invention for which a patent application is filed until the patent has been granted.

Anyone who, without permission, makes, uses, or sells a patented invention is a direct infringer, whereas a person who actively encourages another to make, use, or sell a patented invention without permission is an indirect infringer.

A contributory infringer is one who knowingly sells or supplies a part or component of a patented invention, unless the component is a staple or commodity or is suitable for a substantial noninfringing use.

The right to use a purchased item includes the right to repair it so long as the repair does not constitute reconstruction, which would infringe upon the patent holder's exclusive right to make the invention.

Exhibit D:

Shown below are results of the semantic query of the above text

Q. Define Patentability

Answer

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

The United States Patent and Trademark Office issues a patent upon the basis of a patent application containing a specification, which describes how the invention works, and claims, which describe the features that make the invention patentable.

Q. What is a patent?

Answer

Before granting a patent, the Patent Office thoroughly examines the prior art and determines whether the submitted invention is nonobvious and has novelty and utility (or distinctiveness or ornamentality, in the case of plant or design patents).

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

Therefore, anyone is free to make, use, and sell an invention for which a patent application is filed until the patent has been granted.

The United States Patent and Trademark Office issues a patent upon the basis of a patent application containing a specification, which describes how the invention works, and claims, which describe the features that make the invention patentable.

Through a patent, the Federal government grants an inventor a monopolistic right to make, use, or sell an invention to the absolute exclusion of others for the period of the patent, which currently is fourteen years for design patents and seventeen years for all others.

plant patents, like utility patents, have a seventeen-year duration.

Design patents require (1) novelty, (2) ornamentality, and (3) nonobviousness.

Q. What is infringement?

Answer.

Anyone who, without permission, makes, uses, or sells a patented invention is a direct infringer, whereas a person who actively encourages another to make, use, or sell a patented invention without permission is an indirect infringer.

A contributory infringer is one who knowingly sells or supplies a part or component of a patented invention, unless the component is a staple or commodity or is suitable for a substantial noninfringing use.

The right to use a purchased item includes the right to repair it so long as the repair does not constitute reconstruction, which would infringe upon the patent holder's exclusive right to make the invention.

Example 2

Exhibit A.

FIG. 7 shows original Text with curved surface and suboptimal desktop lighting acquired with Canon IXY Digital 800IS 6 megapixel camera using settings described in the text. Note curved surface and variable lighting as user would encounter photographing from a café or library without professional lighting.

Exhibit B.

Conversion of the above image with OCR to unformatted text. Note despite curved surface and poor lighting, the OCR program converted the image to editable text without significant error. This document is now ready for digital summarization.

Removal of Directors a majority vote>> shareholders may remove any director or the entire board of directors, with or without cause, in a meeting called for that purpose—In the case of a corporation having cumulative voting, however, a director may be removed only if the number of votes opposing his removal would be insufficient to elect him. Section 8.08(c). Removal of directors is discussed more fully later in this chapter.

Approval of Fundamental Changes

The board of directors manages the ordinary business affairs of the corporation. Extraordinary matters involving fundamental changes in the corporation require shareholder approval; such matters include amendments to the articles of incorporation, a sale or lease of all or substantially all of the corporate assets not in the regular course of business, most mergers, consolidations, compulsory share exchanges, and dissolution. Fundamental changes are discussed in Chapter 38.

Concentrations of Voting Power

Certain devices enable groups of shareholders to combine their voting power for purposes such as obtaining or maintaining control or maximizing the impact of cumulative voting. The most important methods of concentrating voting power are proxies, voting trusts, and shareholder agreements.

Proxies

A shareholder may vote either in person or by written proxy. Section 7.22(a). As mentioned earlier, a proxy is simply a shareholder's authorization to an agent to vote his shares at a particular meeting or on a particular question. Generally, proxies must be in writing to be effective; furthermore, statutes typically limit the duration of proxies to no more than eleven months, unless the proxy specifically provides otherwise. Section 7.22(c). Since a proxy is the appointment of an agent, it is revocable, as all agencies are, unless conspicuously stated to be irrevocable and coupled with an interest, such as shares held as collateral. Section 7.22(d). The solicitation of proxies by publicly held corporations is also regulated by the Securities Exchange Act of 1934, as discussed in Chapter 46.

Voting Trusts

Voting trusts, which are designed to concentrate corporate control in one or more persons, have been used in both publicly held and closely held corporations. A voting trust is a device by which one or more shareholders separate the voting rights of their shares from the ownership of those shares. Under a voting trust, one or more shareholders confer on a trustee the right to vote or otherwise act for them by signing an agreement setting out the provisions of the trust and transferring their shares to the trustee. Section 7.30(a). In most States, voting trusts are permitted by statute but are usually limited in duration to ten years. The Revised Act permits all or some of the parties to a voting trust to extend it for an additional term of up to ten years by signing an extension agreement and obtaining the voting trustee's written consent. Section 7.30 (c). The extension runs from the time the first shareholder signs the agreement but binds only those shareholders who consent to it Shareholder Voting Agreements In most jurisdictions, shareholders may agree in writing to vote in a specified manner for the election or removal of directors or on any other matter subject to shareholder approval. Section 7.31(a). The Revised Act and some State statutes expressly provide that shareholder agreements are enforceable by a decree of specific performance. Section 7.31(b). Unlike voting trusts, shareholder voting agreements are usually not limited in duration. Shareholder agreements are used frequently in closely held corporations, especially in conjunction with restrictions on the transfer of shares, in order to provide each shareholder with greater control and delectus personae (the right to choose those who will become shareholders).

*Galler y. Galler,* 32 D1.2d 16, 203 N.&&1 577 (1964), provides a well-known example of the effect a shareholder agreement m#

Example 3

Printed Matter Acquisition with Ultra-Compact Digital Camera

FIGS. 8A and 8B show four text pages (each 10"×7") from a textbook on Business Law Documents that were photographed using a FCCE™ ultra compact digital camera with the following specifications: Lens specification: CMOS 2408×1536 Pixels (3.2M pixels); Focus Range: Normal: 1.5 m to infinity, Macro: 50 cm; Exposure Control: Automatic/Manual (−2EV-2EV); Storage Capacity: XXL 12.0M 400× 3000 Pixels; XL 0.0M 3456×2592 Pixels; L 6.0 M 2848× 2136 Pixels; M 3.2 M 2048×1536 Pixels; S XVGA 1600× 1200 Pixels.

The textbook page images are converted by the camera software into jpeg format The camera position and settings used to acquire the images below were as follows: (i) "macro" lens setting, (ii) picture size: large (2848×2136) (iii) superfine compression setting (iv) lighting setting: "0" (v) camera held approximately 14-18 inches above the center of text (vi) no zoom (vii) image encased in monitor screen. With these settings and positions, two textbook pages (10"×7" each) were acquired at the same time (Exhibits 3A and 3B below).

This JPEGs are then transferred from the camera via USB 2.0 port to Adobe PhotoAlbum™ where they were copied and sent to "My Pictures" folder positioned on Desktop. The OCR program (Fine Reader 8.0™) is then opened and the jpeg images are acquired by clicking "Open and Read" that converts the jpeg images of the printed matter to editable text viewable and saved as a WORD file. The formatting instructions for the editable text are provided in OCR program under "Options" and are fixed beforehand. By selecting "Retain only paragraphs, fonts and tables", the editable text that appears in WORD program is devoid of the original columns and major subheading breaks. That format is illustrated in exhibit A below.

The editable text is manually edited to highlight the major subheading and extraneous material is deleted as shown in Exhibit B. The text is now copied and pasted into a summarizer program such as Megaputer Content Analyst™. The final summary from Megaputer is the same as shown above for content acquired via an optical scanner.

Exhibit A. The Digital Photographic Image of Text in jpeg Format is Converted to Editable Text (WORD) Via an OCR Program in Normal Format Devoid of the Columns and Graphs in the Original Text Procedure Applications for copyright are filed with the Register of Copyrights in Washington, D.C. Although copyright registration is not required, since copyright protection begins as soon as the work is fixed in a tangible medium, registration is, nonetheless, advisable because it is a condition of certain remedies (statutory damages and attorneys' fees) for copyright infringement. When a work is published, it is advisable, though no longer required, to place a copyright notice on all publicly distributed copies so as to notify users about the copyright claim. If proper notice appears on the published copies to which a defendant in a copyright infringement case had access, then the defendant will be unable to mitigate actual or statutory damages by asserting a defense of innocent infringement. Section 401.

Rights

In most instances, copyright protection subsists for the duration of the author's life plus an additional fifty years. Section 106 of the Copyright Act gives the owner of the copyright the exclusive right to 1. reproduce the copyrighted work in copies or recordings;
2. prepare derivative works based upon the copyrighted work;
3. distribute copies or recordings of the copyrighted work to the public by sale or other transfer of ownership, or by rental, lease, or lending,
4. perform the copyrighted work publicly, in the case of literary, musical, dramatic, choreographic, pantomime, motion picture, and other audiovisual works; and
5. display the copyrighted work publicly, in the case of literary, musical, dramatic, and choreographic works, pantomimes, and pictorial, graphic, or sculptural works, including the individual images of a motion picture or other audiovisual work.

These broad rights are subject, however, to several limitations, the most important of which are "compulsory licenses" and "fair use." Compulsory licenses permit certain limited uses of copyrighted material upon the payment of specified royalties and compliance with statutory conditions. Section 107 codifies the common law doctrine of fair use by providing that the fair use of a copyrighted work for purposes such as criticism, comment, news reporting, teaching (including multiple copies for classroom use), scholarship, or research is not an infringement of copyright. In determining whether the use made of a work in any particular case is fair, the courts consider the following factors: (1) the purpose and character of the use, including whether such use is of a commercial nature or is for nonprofit educational purposes; (2) the nature of the copyrighted work; (3) the amount and substantiality of the portion used in relation to the copyrighted work as a whole; and (4) the effect of the use upon the potential market for or value of the copyrighted work. See *Basic Books, Inc. v. Kinko's Graphics Corporation.*

Ownership

The author of a creative work owns the entire copyright. Although usually the actual creator of a work is the author, in two situations under the doctrine of works for hire, she is not considered the author. Section 101. First, if an employee prepares a work within the scope of her employment, her employer is considered to be the author of the work. Second, if a work is specially ordered or commissioned for certain purposes specified in the copyright statute and the parties expressly agree in writing that the work shall be considered a work for hire, the person commissioning the work is deemed to be the author. The kinds of works subject to becoming works for hire by commission include contributions to collective works, parts of motion pictures or other audiovisual works, translations, supplementary works such as prefaces, illustrations, or afterwords, compilations, instructional texts, and tests.

The ownership of a copyright may be transferred in whole or in pert by conveyance, will, or intestate succession. Section 201. A transfer of copyright ownership, other than by operation of law, is not valid, however, unless it is memorialized in a note or memorandum signed by the owner of the rights conveyed or by the owners duly authorized agent. Section 204. An author may terminate any transfer of copyright ownership, other than that of a work for hire, during the five-year period beginning thirty-five years after the transfer was granted—

Section 203.

Ownership of a copyright, or of any of the exclusive rights under a copyright, is distinct from the ownership of any material object that embodies the work. Transferring the ownership of any material object, including the copy or recording in which the work was first fixed, does not of itself convey any rights in the copyrighted work embodied in the object; nor, in the absence of an agreement, does the transfer of copyright ownership or of any exclusive rights under a copyright convey property rights in any material object. Section 202. Thus, the purchase of this textbook neither affects the publisher's copyright nor authorizes the purchaser to make and sell copies of the book. The purchaser may, however, rent, lend, or resell the book.

Infringement and Remedies

Infringement occurs whenever somebody exercises, without authorization, the rights exclusively reserved for the copyright owner. Infringement need not be intentional. To prove infringement, the plaintiff need only establish that he owns the copyright and that the defendant violated one or more of the plaintiffs exclusive rights under the copyright. Proof of infringement usually consists of showing that the allegedly infringing work is substantially similar to the copyrighted work and that the alleged infringer had access to the copyrighted work.

To be the subject at a suit for infringement, the copyright must be registered with the Copyright Office, unless the work is a Berne Convention work whose country of origin is not the United States. For an infringement occurring after registration, the following remedies are available: (1) injunction; (2) the impoundment and, possibly, destruction of infringing articles; (3) actual damages, plus profits made by the infringer that are additional to those damages, or statutory damages of at least $500 but no more than $20,000 ($100,000 if the infringement is willful), according to what the court determines to be just; (4) costs and, in the court's discretion, reasonable attorneys' fees to the prevailing party; and (5) criminal penalties of a fine of up to $10,000 or up to one year's imprisonment for willful infringement for purposes of commercial advantage or private gain. The Piracy and Counterfeiting Amendments Act of 1982 imposes harsher punishments for large scale piracy: a $250,000 fine and five years* imprisonment for those who pirate 1,000 recordings or 65 films within 180 days.

Patents

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain," and anyone may use it.

Patentability

The Patent Act specifies those inventions that may be patented as utility patent*. Section 101 provides:

Whoever invents or discovers any new and useful process, machine, manufacture, or composition of matter, or any new and useful improvement thereof, may obtain a patent therefor, subject to the conditions and requirement* of this title.

Thus, naturally occurring substances are not patentable, as the invention must be made or modified by humans. For example, the discovery of a bacterium with useful properties is not patentable, whereas the manufacture of a genetically engineered bacterium is. See *Diamond, Commissioner of Patent* and Trademarks* v. *Chakrabarty*. By the same token, laws of nature, principles, bookkeeping systems, fundamental truths, methods of calculation, and ideas are not patentable. Accordingly, as Chief Justice Burger noted in *Diamond, Commissioner of Patents and Trademarks* v. *Chakrabarty*, "Einstein could not patent his law that $E=mc^2$, nor could Newton have patented the law of gravity." Similarly, isolated computer programs are not patentable, although, as mentioned above, they may be copyrighted.

To be patentable as a utility patent, the process, machine, manufacture, or composition of matter must meet three criteria:

1. Novelty—The invention must not conflict with a prior pending application or a previously issued patent;
2. Utility—The invention must possess specific and substantial usefulness, which must be affirmatively disclosed by the application; and
3. Nbnobviousness—The invention, in light of the prior art, must not be obvious to a person skilled in such prior art.

In addition to utility patents, the Patent Act provides for plant patents and design patents. A plant patent protects a new and distinctive variety of asexually reproducing plant. Plant patents require (1) novelty, (2) distinctiveness, and (3) nonobviousness. A design patent protects a new, original, ornamental design for an article of manufacture. Design patents require (1) novelty, (2) ornamentality, and (31 nonobviousness. As mentioned above, design patents have a duration of fourteen years; plant patents, like utility patents, have a seventeen-year duration.

Procedure

The United States Patent and Trademark Office issues a patent upon the basis of a patent application containing a specification, which describes how the invention works, and claims, which describe the features that make the invention patentable. The applicant must be the inventor. Before granting a patent, the Patent Office thoroughly examines the prior all and determines whether the submitted invention is nonobvious and has novelty and utility (or distinctiveness or ornamentality, in the case of plant or design patents). An application for a patent is confidential, and the Patent Office will not divulge its contents. This confidentiality ends, however, upon the granting of the patent. Unlike rights under a copyright, no monopoly rights arise until the Patent Office actually issues a patent.

Therefore, anyone is free to make, use, and sell an invention for which a patent application is filed until the patent has been granted. An applicant whose application is rejected may apply for reexamination. If the application is again rejected, the applicant may appeal to the Patent and Trademark Office's Board of Appeals, and from there to the Federal courts.

Infringement

Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial non infringing use. While good faith and ignorance are defenses to contributory infringement, they are not defenses to direct infringement.

The rights under a patent do not extend beyond the first sale; that is, the purchaser of a patented item is permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

Cases

Trade Secrets

*B. C. ZIEGLER AND COMPANY* v. *EHREN*

Court of Appeals of Wisconsin, 1987. MI Wis. 2d 19, 414 N.W. 2d 48.

BROWN, J.

Lawrence P. Ehren appeals from a grant of summary judgment restraining him from using or disclosing information contained on business papers and records he bought from a scrap paper company but which originated with B. C. Ziegler and Company (Ziegler). The circuit court held that the information was entitled to common law trade secret protection and that Ehren did not acquire title to the information as a good faith purchaser. We affirm those rulings.

Ziegler is an underwriter of securities located in West Bend. Ehren is employed by a scrap dealer, Lynn's Waste Paper Co., Inc. (Lynn's), where his duties include determining the value for recycling purposes of scrap paper purchased by Lynn's. From 1981 to 1983, Ehren was a licensed securities salesman and worked for two brokerage firms which compete with Ziegler. Ziegler considered its customer lists confidential and had developed policies for the disposal of scrap paper which were regularly communicated to its employees. Paper containing a customer name was to be burned or shredded on the Ziegler premises before disposal or was to be delivered for shredding to a commercial shredding concern in Apple-ton, in which case the employee delivering the paper was to wait while it was shredded. Under no circumstances was scrap paper containing names or information about Ziegler customers to leave the possession of its Exhibit B. Machine Summarization (Megaputer™) of "3D" above is shown below.

Example of Compression to 30%

Through a patent, the Federal government grants an inventor a monopolistic right to make, use, or sell an invention to the absolute exclusion of others for the period of the patent, which currently is fourteen years for design patents and seventeen years for all others.

To be patentable as a utility patent, the process, machine, manufacture, or composition of matter must meet three criteria (1) Novelty—The invention must not conflict with a prior pending application or a previously issued patent (2) Utility—The invention must possess specific and substantial usefulness, which must be affirmatively disclosed by the application and (3) Nonobviousness—The invention, in light of the prior art, must not be obvious to a person skilled in such prior art.

In addition to utility patents, the Patent Act provides for plant patents and design patents.

Plant patents require (1) novelty, (2) distinctiveness, and (3) nonobviousness.

The United States Patent and Trademark Office issues a patent upon the basis of a patent application containing a specification, which describes how the invention works, and claims, which describe the features that make the invention patentable.

Before granting a patent, the Patent Office thoroughly examines the prior art and determines whether the submitted invention is nonobvious and has novelty and utility (or distinctiveness or ornamentality, in the case of plant or design patents). Therefore, anyone is free to make, use, and sell an invention for which a patent application is filed until the patent has been granted.

Example 5

Textual material captured using a DS6700-DC2001zzr handheld digital image scanner using the settings described in the application is captured verbatim and converted to editable text by ABBYY Fine Reader OCR 9.0 Professional Edition. The image is captured by pointing the imager at LED crosshairs provided by the imager. The image is automatically focused, framed and captured with a hand held imager without the need for framing in an LED monitor. The image capturing method is as rapid as barscanning a code at the checkout counter in a supermarket. The image can be sharpened, rotated and brightened by image correction software such as Canon Zoom so that is easily recognized, analyzed and read by the OCR software which converts it verbatim to editable text. In this form the text is rapidly summarized by summarization software to a summary that can be used for repetitious practice and "time on task" to improve performance on tests and presentations. Below are examples of image capture using only the autoaim, focusing and framing feature of the DS6700-DC2001zzr handheld digital image scanner. The image is sharpened, brightened in Canon Zoom and then transferred to Fine Reader 9.0 where it is converted to editable text with OCR software. From this point, the content is machine summarized into a user understandable summary.

Exhibit A:

FIG. 9A shows raw text acquired with a DS6700-DC2001zzr handheld digital image scanner. In FIG. 9B, the image is sharpened, brightened in Canon Zoom and then transferred to Fine Reader 9.0 where it is converted to editable text with OCR software.

Exhibit B:

In FIG. 9C raw text is acquired with DS6700-DC2001zzr handheld digital image scanner. In this form, the text is transferred to OCR software where it is converted to editable text shown below.

Therefore, anyone is free to make, use, and sell an invention for which a patent application is filed until the patent has been granted. An applicant whose application is rejected may apply for reexamination. If the application is again rejected, the applicant may appeal to the Patent and Trademark Office's Board of Appeals, and from there to the Fed- Infringement Anyone who, without permission, makes, uses, or sells a patented invention is a direct infringer, whereas a person who actively encourages another to make, use, or sell a patented invention without permission is an indirect infringer. A contributory infringer is one who knowingly sells or supplies a part or component of a patented invention, unless the component is a staple or commodity or is suitable for a substantial noninfringing use. While good faith and ignorance are defenses to contributory infringement, they are not defense* to direct infringement. The rights under a patent do not extend beyond the first sale; that is, the purchaser of a patented item, 1—permitted to use or resell that item. The right to use a purchased item includes the right to repair it so long as the repair does not constitute reconstruction, which would infringe upon the patent holder's exclusive right to make the invention.

Remedies

The remedies for infringement under the Patent Act are (1) injunctive relief; (2) damages adequate to compensate the plaintiff but "in no event less than a reasonable royalty for the use made of the invention by the infringer"; (3) treble damages, when appropriate; (4) attorneys' fees in exceptional cases, such as those that involve knowing infringement; and (5) costs.

Example 6

Exhibit A:

FIG. 10 shows a textual image captured with DS6700-DC2001zzr handheld digital image scanner. In this form, the text is transferred to ABBYY 9.0 Fine Reader where it is converted to a pdf file shown below. From there it is transferred to an Idautomation pdfd417 font and encoder where it is converted to a pdf417 2D barcode shown in FIG. 10B.

Patents

Through a patent, the Federal government grants an inventor a monopolistic right to make, use, or sell an invention to the absolute exclusion of others for the period of the patent, which currently is fourteen years for design patents and seventeen years for all others. The patent owner may also profit by licensing others to use the patent on a royalty basis. The patent may not be renewed, however: upon expiration, the invention enters the "public domain."

Example 7

Exhibit A:

Below is (a) a textual image as published which, is converted to a pdf417 2D barcode using Idautomation pdfd417 font as shown in FIG. 11. This image is then converted back to the original text with a DS6700-DC2001zzr bar code reader as shown in (b) below.

a. FIG. 1, i.e., shade along the "spine" of the book (photometric distortion) and warping in the shade area (geometric distortion). The distortion introduces problems in image restoration of archived documents and in word spotting for document retrieval from the digital library. Given these problems and the large number of books to be scanned, our objective in this research is to design an efficient content-free algorithm to restore the document images by correcting the above two types of distortion.

There have been related techniques reported in the literature. We classify them into two categories: 1) restoration approaches based on 2D document image processing and 2) restoration approaches based on 3D document shape discovery.

b. FIG. 1, i.e., shade along the "spine" of the book (photometric distortion and warping in the shade area (gemoetric distortion). The distortion introduces problems in image restoration of archived documents and in word spoting for document retrieval from the digital library. Given these problems and the large number of books to be scanned, our objective in this research is to design an efficient content-free algorithm to restore the document images by correcting the above two types of distortion. There have been related techniques reported in the literature. We classify them into two categories: 1) restoration approaches based on 2D document image processing and 2) restoration approaches based on 3D document shape discovery.

All references and their references referred to in this application are incorporated in entirety by reference.

The spirit and scope of the present invention shall be limited only by the claims that follow.

The invention claimed is:

1. A single-action method to facilitate identification, condensation and capture of key concepts from subject matter of printed paper text, said single-action method comprising;
   (a) obtaining still images directly of said printed paper text with one or more compact, handheld, mobile data input devices comprising a digital camera and computer system wherein said compact, handheld, mobile data input device is selected from a group consisting of tablets;
   (b) stabilizing, rotating, deskewing, brightening and focusing said still images; and
   (c) converting said stabilized, rotated and focused still images into digitized text using software operating on said mobile data input device;
   (d) converting said digitized text into editable text form using optical character recognition software; and
   (e) converting said editable text form into a machine readable summary using text summarization software;
   wherein said text summarization software that computes similarity measurements in text or between text and text excerpts from said editable text form, generates text relation maps for said similarity measurements that exceed a threshold value, and uses said text relation maps as inputs for (i) a clustering process to identify text themes; (ii) traversing texts selectively using individual text excerpts; and (iii) extracting summary statements; and
   wherein said steps (a) through (e) are performed upon a single-click from a user.

2. The single-action method of claim 1, wherein said text summarization software comprises programs that generate vector space diagrams, weighted terms, linguistic, probabilistic, neural and text cohesion analysis alone or in combinations of two or more to compute similarity measurements in text or between text and text excerpts from said editable text form, generates text relation maps for said similarity measurements that exceed a threshold value, and uses said text relation maps as inputs for (i) a clustering process to identify text themes; (ii) traversing texts selectively using individual text excerpts; and (iii) extracting summary statements; and
   wherein said steps (a) through (e) are performed upon a single-click from a user.

3. The single-action method according to claim 1, wherein key subject matter from said editable text is selected and highlighted by user and converted into said machine readable summary using said text summarization software.

4. The single-action method of claim 1, wherein said text summarization software computes similarity measurements between said text and a user query, generates text relation maps for said similarity measurements that exceed a threshold value, and uses said text relation maps as inputs for (i) a clustering process to identify text themes; (ii) traversing texts selectively using individual text excerpts; and (iii) extracting summary statements.

5. The single-action method of claim 1, wherein said machine readable summary is converted into an format selected from the group comprising Roman, numbered, alphabetical or bullet-point outline.

6. The single-action method of claim 1, wherein double clicking of selected words or phrases in said machine summary of said printed paper text displays the selected words or phrases in their original sentences or paragraphs in said editable text of said printed paper text.

7. The single-action method of claim 1, wherein word volume of said machine readable summary may be compressed to said word volume of 10% to 90% of the default value.

8. The single-action method of claim 1, wherein said summarization software comprises programs that highlight designated subsections of printed paper text and convert said subsections into said machine readable summaries using said text summarization software.

* * * * *